United States Patent
Itoh et al.

(10) Patent No.: US 6,323,962 B1
(45) Date of Patent: *Nov. 27, 2001

(54) FACSIMILE MACHINE WITH FACSIMILE DATA RECEIVER AND EXTERNAL COMPUTER

(75) Inventors: Shingo Itoh, Komaki; Fumihiro Minamizawa, Toyoake; Yuji Asano, Nagoya, all of (JP)

(73) Assignee: Brother Kogyo Kabushiki Kaisha, Nagoya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/780,330

(22) Filed: Jan. 8, 1997

Related U.S. Application Data

(63) Continuation of application No. 08/450,560, filed on May 25, 1995, now abandoned.

(30) Foreign Application Priority Data

| May 30, 1994 | (JP) | 6-116325 |
| May 30, 1994 | (JP) | 6-116327 |
| May 30, 1994 | (JP) | 6-116450 |
| May 30, 1994 | (JP) | 6-116573 |

(51) Int. Cl.[7] .................. H04N 1/32; H04N 1/00
(52) U.S. Cl. .......... 358/468; 358/437; 358/440; 358/442; 358/407; 358/434
(58) Field of Search .................. 358/442, 440, 358/407, 405, 468, 402, 434, 437; 379/100.01, 100.02, 100.09, 100.05, 100.06, 100.12

(56) References Cited

U.S. PATENT DOCUMENTS

| 4,586,086 | * | 4/1986 | Ohzeki | 358/405 |
| 4,907,094 | * | 3/1990 | Mishima et al. | 358/404 |
| 4,920,427 | * | 4/1990 | Hirata | 358/444 |
| 4,930,017 | | 5/1990 | Izawa | 358/296 |
| 5,041,918 | * | 8/1991 | Ishida et al. | 358/442 |
| 5,170,428 | * | 12/1992 | Watanabe | 358/407 |
| 5,214,690 | | 5/1993 | Kato et al. | 379/100.05 |
| 5,255,311 | * | 10/1993 | Yoshida | 358/468 |

(List continued on next page.)

FOREIGN PATENT DOCUMENTS

| 0355838 | * | 2/1990 | (EP) | H04N/1/32 |
| 60-48661 | | 3/1985 | (JP) | . |
| 60180365 | | 9/1985 | (JP) | . |
| 62-234452 | | 10/1987 | (JP) | . |
| 62281661 | | 12/1987 | (JP) | . |
| 3139962 | | 6/1991 | (JP) | . |
| 5300301 | | 11/1993 | (JP) | . |
| 6070054 | | 3/1994 | (JP) | . |

Primary Examiner—Cheukfan Lee
(74) Attorney, Agent, or Firm—Oliff & Berridge, PLC

(57) ABSTRACT

A facsimile machine including a first facsimile-data transmitter including a first connector connectable to an external computer via a first communication line, and a second connector connectable to a second facsimile-data transmitter via a second communication line, the first facsimile-data transmitter transmitting, to the external computer via the first communication line, facsimile data transmitted from the second facsimile-data transmitter via the second communication line, the machine also including a facsimile-data receiver, and a control device which controls the first facsimile-data transmitter not to transmit the facsimile data to the external computer, and controls the facsimile-data receiver to receive the facsimile data, in place of the external computer.

55 Claims, 47 Drawing Sheets

U.S. PATENT DOCUMENTS

| | | | |
|---|---|---|---|
| 5,255,312 | * 10/1993 | Koshiishi | 358/442 |
| 5,257,117 | * 10/1993 | Kang et al. | 358/442 |
| 5,280,519 | * 1/1994 | Nakajima et al. | 358/442 |
| 5,287,199 | * 2/1994 | Zoccolillo | 358/407 |
| 5,357,562 | * 10/1994 | Mester et al. | 358/442 |
| 5,363,206 | * 11/1994 | Fukushima | 358/407 |
| 5,367,564 | * 11/1994 | Sutoh et al. | 358/407 |
| 5,442,463 | * 8/1995 | Ohnishi | 358/468 |
| 5,448,378 | * 9/1995 | Mastumoto | 358/468 |
| 5,452,106 | * 9/1995 | Perkins | 358/442 |
| 5,461,488 | * 10/1995 | Witek | 358/407 |
| 5,465,162 | * 11/1995 | Nishii et al. | 358/442 |

* cited by examiner

| RAM 202 | | | |
|---|---|---|---|
| PC RECEPTION DATA BUFFER | 250 | EMERGENCY FLAG | 286 |
| PC TRANSMISSION DATA BUFFER | 252 | PC OUTPUT FLAG | 288 |
| FAX RECEPTION DATA BUFFER | 254 | RECORD-SHEET-OUTPUT-MODE-RELATED EMERGENCY RECEPTION FLAG | 292 |
| FAX TRANSMISSION DATA BUFFER | 256 | | |
| READING IMAGE-DATA BUFFER | 258 | PC-ONLY-MODE-RELATED EMERGENCY RECEPTION FLAG | 294 |
| RECORDING TEMPORARY BUFFER | 260 | PC-PRIORITY-MODE-RELATED EMERGENCY RECEPTION FLAG | 296 |
| RECORDING IMAGE-DATA BUFFER | 262 | TIME-UP FLAG | 298 |
| PC COMMUNICATION PARAMETER BUFFER | 263 | FLAG A | |
| OWN FACSIMILE NUMBER BUFFER | 264 | FLAG B | |
| DIAL BUFFER | 266 | FLAG C | |
| DECODING CODE BUFFER | 270 | FLAG D | |
| CODING CODE BUFFER | 271 | FLAG E | |
| ONE-PAGE DATA BUFFER | 277 | 0-FILL-DATA COUNTER | 340 |
| IMAGE-DATA-RECEPTION-RELATED COMMUNICATION PARAMETER BUFFER | 290 | 0-BYTE-DATA COUNTER | 342 |
| PC-DATA TRANSMISSION FLAG | 268 | LINE COUNTER | 344 |
| DLE FLAG | 272 | IMAGE-DATA BIT-NUMBER COUNTER | 346 |
| CANCEL FLAG | 274 | ERROR LINE COUNTER | 348 |
| PRINT FLAG | 276 | . | |
| PC-TEL FLAG | 278 | . | |
| DATA RECEPTION READY FLAG | 280 | . | |
| FAX-DATA RECEPTION FLAG | 282 | . | |
| RECORD-SHEET OUTPUT FLAG | 284 | | |

FIG. 5

FACSIMILE MACHINE WITH FACSIMILE DATA RECEIVER AND EXTERNAL COMPUTER

This is a Continuation of application Ser. No. 08/450,560 filed May 25, 1995 now abandoned.

BACKGROUND OF THE INVENTION

1. Field of the Invention

The present invention relates to a facsimile machine which is connectable to an external computer, and particularly relates to the art of transmitting data to the computer.

2. Related Art Statement

There is known a facsimile machine ("FAX" machine) comprising a first facsimile-data transmitter including a first connector connectable to an external computer via a first communication line, and a second connector connectable to a second facsimile-data transmitter (second "FAX") via a second communication line. The first facsimile-data transmitter transmits, to the computer via the first communication line, facsimile data ("FAX" data) transmitted from the second FAX via the second communication line. An example of this FAX machine is disclosed in Japanese Patent Application laid open for inspection purposes under Publication No. 60(1985)-48661. This FAX machine transmits, to the computer, the FAX data transmitted from the second FAX, so that a data memory of the computer may be utilized to store the FAX data or so that the computer may be utilized to edit or revise the FAX data.

The above-mentioned second facsimile-data transmitter, i.e., second FAX may be any kind of apparatus which has the function of transmitting FAX data, for example, an apparatus which has the function of transmitting the FAX data supplied from an external data processing device, such as a computer, an apparatus which has the function of reading images from an original and producing FAX data based on image data obtained from the image reading and additionally has the function of transmitting the thus produced FAX data, or an apparatus which has the function of transmitting FAX data and additionally has the function of receiving FAX data and/or the function of recording, on a recording medium, images represented by image data contained in FAX data.

However, in some cases, the FAX machine or the first facsimile-data transmitter thereof is not permitted to transmit, to the computer, the FAX data transmitted from the second FAX. For example, when the computer is not connected to the FAX machine, when the computer is not supplied with electric power, when a facsimile-data memory of the computer is full of FAX data and accordingly has no remaining memory capacity for storing additional FAX data, when the computer is executing a complex and long control program other than a facsimile-data receiving program, or when the computer is not executing a facsimile-data receiving program, the FAX machine is not permitted to transmit the FAX data to the computer.

In addition, in some cases, the FAX machine transmits data other than FAX data to the computer, or transmits FAX data to the computer though the computer cannot receive FAX data. For example, in the case where the FAX machine includes a telephone set, the FAX machine receives FAX data transmitted from the second FAX and additionally receives telephone data ("TEL" data) from a different telephone set which may be a telephone set of the second FAX. However, if the computer does not have the function of receiving TEL data, a communication error occurs when the FAX machine transmits TEL data to the computer. To avoid this error, a user of the FAX machine must see what kind of data the received data are each time the FAX machine receives data and, only when the received data are FAX data, operate the FAX machine to transmit the received FAX data to the computer. The FAX machine is not permitted to transmit any data to the computer unless the user operates and permits the FAX machine to transmit the data. This is very cumbersome for the user.

Moreover, in other cases, the computer fails to receive FAX data transmitted from the FAX machine. For example, in the case where the FAX machine transmits FAX data to the computer when the computer is executing a control program other than a facsimile-data receiving program, the computer cannot execute the facsimile-data receiving program and accordingly cannot receive a portion of the FAX data transmitted from the FAX machine. In other words, the FAX machine is not permitted to transmit the FAX data to the computer. If the FAX data are transmitted to the computer when the computer has just finished a certain cycle of the control program other than the facsimile-data receiving program and is waiting for the next cycle of the same program, the computer can receive the FAX data.

SUMMARY OF THE INVENTION

It is therefore a first object of the present invention to provide a facsimile machine which does not fail to receive FAX data transmitted from a different facsimile-data transmitter even if the facsimile machine is not permitted to transmit the FAX data to a computer connected to the facsimile machine.

The first object has been achieved according to a first aspect of the present invention, which provides a facsimile machine comprising: a first facsimile-data transmitter including a first connector connectable to an external computer via a first communication line, and a second connector connectable to a second facsimile-data transmitter via a second communication line, the first facsimile-data transmitter transmitting, to the external computer via the first communication line, facsimile data transmitted from the second facsimile-data transmitter via the second communication line; a facsimile-data receiver; and a control device which controls the first facsimile-data transmitter not to transmit the facsimile data to the external computer, and controls the facsimile-data receiver to receive the facsimile data, in place of the external computer.

In the FAX machine in accordance with the first aspect of the invention, the control device controls, when the first facsimile-data transmitter is not permitted to transmit the FAX data to the computer for some reason, the facsimile-data receiver to receive the facsimile data in place of the computer. Thus, the present FAX machine receives FAX data transmitted from a different facsimile-data transmitter, in place of the computer, even if the first facsimile-data transmitter thereof is not permitted to transmit the FAX data to the computer, i.e., even if the computer cannot receive the FAX data. The FAX machine does not fail to receive any portion of FAX data transmitted from other facsimile-data transmitters.

According to a preferred feature of the first aspect of the invention, the control device comprises judging means for judging whether the first facsimile-data transmitter is permitted to transmit the facsimile data to the external computer, based on information indicative of a state of the computer relating to data reception, and the control device controls the facsimile-data receiver to start receiving the facsimile data in place of the computer when the judging means makes a negative judgment and to continue the reception of the facsimile data until the second facsimile-data transmitter ends the transmission of the facsimile data. The information indicative of the state of the computer relating to data reception is typically a facsimile-data-reception-incapability signal indicating that the computer is not capable of receiving FAX data, or a facsimile-data-transmission-inhibiting signal to inhibit the FAX machine from transmitting FAX data to the computer, each signal being produced by the computer. However, this information may be a facsimile-data-reception-capability signal indicating that the computer is capable of receiving FAX data, or a facsimile-data-transmission-permitting signal to permit the FAX machine to transmit FAX data to the computer, each signal being produced by the computer. If the computer does not supply the facsimile-data-reception-capability signal or the facsimile-data-transmission-permitting signal to the FAX machine, then the FAX machine can judge that the first facsimile-data transmitter thereof is not permitted to transmit FAX data to the computer. In this sense, the facsimile-data-reception-incapability signal or the facsimile-data-transmission-inhibiting signal is substantially the same as the facsimile-data-reception-capability signal or the facsimile-data-transmission-permitting signal, respectively. Each signal may be transmitted from the computer to the FAX machine, in the form of a high and a low voltage, via an exclusive signal line or cable. Otherwise, each signal may be supplied in the form of bit data via a common data line through which other data are also transmitted. In the latter case, each signal may be provided by a single set of bit data or a plurality of sets of bit data. The state in which the computer is not capable of receiving FAX data is, for example, (a) that the computer is not connected to the FAX machine, (b) that the computer is not supplied with electric power, (c) that the computer is not provided with any facsimile-data receiving program, (d) that the computer is provided with a facsimile-data receiving program, but is not ordered to execute that program, (e) a facsimile-data memory of the computer does not have a remaining capacity for storing additional FAX data, or (f) the computer is executing a control program other than a facsimile-data receiving program. As to the states (c) to (f) out of the states (a) to (f), the computer can supply information indicative of each state (c) to (f), to the FAX machine, whereas as to the states (a), (b), the computer cannot supply any information to the FAX machine. However, if the FAX machine receives information indicative of any state (c) to (f), then it means that the computer is free from the states (a), (b). Thus, the FAX machine can regard a signal indicative of one of the states (c) to (f) as a signal indicative of freedom from the states (a), (b). The FAX machine can recognize the presence or absence of each state (a) to (f), by receiving, or not receiving, a signal indicative of the presence or absence of each state (a) to (f). For example, the state (f) in which the computer is executing a control program other than a facsimile-data receiving program, is known to the FAX machine by receiving a signal indicative of the state itself or a signal indicative of its converse state that the computer is executing a facsimile-data receiving program, because the negation of one of two incompatible states means the affirmation of the other state. Moreover, the FAX machine can recognize that the computer is executing a control program other than a facsimile-data receiving program, by not receiving a signal indicating that the computer is executing a facsimile-data receiving program, or can recognize that the computer is executing a facsimile-data receiving program, by not receiving a signal indicating that the computer is executing a control program other than a facsimile-data receiving program. In the case where the computer checks the presence or absence of each of a plurality of sorts of facsimile-data-reception-incapability states which may or may not include one or more of the above-mentioned states (a) to (f) in each of which the computer is not capable of receiving FAX data and the computer supplies a facsimile-data-reception-incapability signal or a facsimile-data-transmission-inhibiting signal to the FAX machine upon identification of the presence of at least one of the reception-incapability states, the FAX machine can recognize, upon reception of the single signal from the computer, that the computer is currently in one or more reception-incapability states, i.e., that the FAX machine is not permitted to transmit FAX data to the computer. In the case where the computer supplies a facsimile-data-reception-capability signal or a facsimile-data-transmission-permitting signal to the FAX machine upon identification of the absence of each reception-incapability state, the FAX machine can recognize, by not receiving the signal from the computer, that the computer is currently in one or more reception-incapability states. For example, as will be described in detailed description of the preferred embodiments, the FAX 2 (FIG. 1) judges that the PC 4 is currently incapable of receiving FAX data, by receiving no response signal from the PC 4 in response to the supplying thereto of a signal from the FAX 2 informing that the FAX 2 has FAX data to be transmitted to the PC 4. The FAX machine may be adapted to receive, from the computer, a plurality of signals indicative of facsimile-data-reception-incapability states and additionally itself collect information indicative of another or other facsimile-data-reception-incapability states. For example, the FAX machine can obtain information as to whether the computer is connected to the FAX machine or not. In the latter case, the signals supplied from the computer may correspond, one to one, to the reception-incapability states of the computer, respectively, or one of the signals may correspond to two or more of the states. The judging means of the control means makes a negative judgment, when the FAX machine obtains at least one signal, or at least one piece of information, indicating that the computer is incapable of receiving FAX data, i.e., that the FAX data is not permitted to transmit FAX data to the computer, or when the FAX machine does not obtain at least one signal, or at least one piece of information, indicating that the computer is capable of receiving FAX data. The above-exemplified incapability states (a) to (f) include the fifth and sixth states (e) and (f) (in particular, state (f)) each of which changes to a capability state at a high frequency as the computer operates, and the first to fourth states (a) to (d) each of which changes to a capability state not by operation of the computer but by intervention of the user at a low frequency. Therefore, each of the incapability states (e) and (f) changes to a capability state at a high probability in a short waiting time, but each of the incapability states (a) and (f) does not change to a capability state even in a considerably long waiting time. Similarly, the signals (and/or the pieces of information) corresponding to those incapability states include signals which change at a high frequency and signals which change at a low frequency. A signal corresponding to both a high-frequency-changeable incapability state and a low-frequency-changeable incapability state, can be thought as a high-frequency-changeable signal. It is therefore preferred that the judging means of the control device include both instant-type judging means for instantly judging whether the computer is in an incapability state, and delayed-type judging means for judging whether the computer is in an incapability state, after a delayed time. The delayed-type judging means makes a positive judgment, for example, when an incapability state of the computer continues for more than a prescribed waiting or delayed time. When an incapability state of the computer changes to a capability state in the waiting time, the delayed-type judging means does not make a positive judgment, even if the computer is in an incapability state at a certain time.

According to another feature of the first aspect of the invention, the judging means comprises means for judging whether the first facsimile-data transmitter is permitted to transmit the facsimile data to the external computer, before the second facsimile-data transmitter starts transmitting the facsimile data to the facsimile machine. Facsimile data ("FAX" data) contain both image data and transmission-related data. Transmission-related data are output at the leading end of image data, between two portions of image data, and/or at the trailing end of image data, and contain exchange data needed for the transmission of image data. The phrase "before the transmission of FAX data" means the time when FAX data have not been transmitted yet and transmission-related data have just been transmitted to the FAX machine. Transmission-related data may be a calling signal (i.e., CI signal) or a facsimile-data-transmission signal (i.e., CNG signal) each from the second facsimile-data transmitter. Since whether the computer can receive FAX data or not is judged before the transmission of the FAX data to the FAX machine, the FAX machine can handle the FAX data in its entirety, for example, store all the FAX data in a facsimile-data memory, or record images corresponding to all image data contained in the FAX data.

According to yet another feature of the first aspect of the invention, the judging means comprises means for judging whether the first facsimile-data transmitter is permitted to transmit the facsimile data to the external computer, while the second facsimile-data transmitter transmits the facsimile data to the facsimile machine. If the judging means makes a negative judgment during the transmission of FAX data to the FAX machine, the facsimile-data receiver starts receiving the FAX data in response to the negative judgment and continues to the end of the FAX data. Even when the computer changes to be unable to receive additional FAX data after the computer has started to receive the FAX data, the FAX machine receives, in place of the computer, the remaining portion of FAX data to the end, without failing to receive any portion of the FAX data.

According to another feature of the first aspect of the invention, the control device comprises means for controlling the facsimile-data receiver to receive the facsimile data in place of the external computer, while the judging means judges whether the first facsimile-data transmitter is permitted to transmit the facsimile data to the external computer. In this case, the FAX machine does not lose a portion of the FAX data which is transmitted to the FAX machine while the judging means judges.

According to another feature of the first aspect of the invention, the control device comprises means for transmitting a command to inhibit the second facsimile-data transmitter from transmitting the facsimile data to the facsimile machine, while the judging means judges whether the first facsimile-data transmitter is permitted to transmit the facsimile data to the external computer. In this case, the second facsimile-data transmitter does not transmit FAX data to the FAX machine, while the judging means judges. Therefore, the FAX machine does not lose any portion of the FAX data even if the computer is unable to receive the FAX data while the judging means judges.

According to another feature of the first aspect of the invention, the facsimile-data receiver comprises a memory which stores the facsimile data received by the facsimile-data receiver. Since the FAX data received by the facsimile-data receiver in place of the computer are stored in the memory, the FAX machine does not lose any portion of the received FAX data. For example, in the case where the FAX machine is not equipped with any recording device, or in the case where the FAX machine is equipped with a recording device but is currently in an emergency state in which the recording device cannot perform a recording operation, the FAX data are received by the receiver and are stored intact in the memory.

According to another feature of the first aspect of the invention, the control device comprises means for transmitting a command to request the external computer to receive the facsimile data received by the facsimile-data receiver, after the second facsimile-data transmitter ends the transmission of the facsimile data, and the first facsimile-data transmitter transmits, to the computer, the facsimile data received by the facsimile-data receiver, when the judging means makes a positive judgment after the ending of the transmission of the facsimile data.

According to another feature of the first aspect of the invention, the FAX machine further comprises a recorder which records, on a recording medium such as a record sheet, an image corresponding to the facsimile data received by the facsimile-data receiver. In this case, the user can check the contents of the FAX data by reviewing the image or images recorded on the record sheet provided by the recorder. This FAX machine is free from a problem that the FAX data received by the receiver in place of the computer are lost because of occurrence of, e.g., an electric trouble. The FAX data stored in a memory of the FAX machine may be lost due to an electric trouble taking place in the FAX machine.

According to another feature of the first aspect of the invention, the control device comprises judging means for judging whether the first facsimile-data transmitter is permitted to transmit the facsimile data to the external computer, based on information indicative of a state of the computer relating to data reception, and the facsimile-data receiver comprises a memory which stores the facsimile data received by the facsimile-data receiver when the judging means makes the negative judgment and simultaneously when the recorder can not record the image. For example, when no record sheet is left, or when an insufficient amount of toner is left in a laser printer, the recorder cannot record any image. Even in those cases, the FAX data received by the receiver are stored in the memory with safety.

According to another feature of the first aspect of the invention, the control device comprises means for controlling the recorder to record the image corresponding to the facsimile data stored in the memory, when the recorder becomes able to record the image. When the recorder changes to be able to perform a recording operation, because of supplying of record sheets or toner, the recorder utilizes the FAX data stored in the memory, for recording the image or images represented by the image data contained in the stored FAX data.

According to another feature of the first aspect of the invention, the control device comprises means for controlling the facsimile-data receiver to receive the facsimile data having a highest one of a plurality of different levels of at least one communication parameter each of which levels is feasible by the facsimile machine, more preferably both the facsimile machine and the second facsimile-data transmitter. The at least one communication parameter may be selected from the group consisting of image resolution, sheet width, coding method, and data-transmission speed. This FAX machine can receive FAX data at a high rate or speed, i.e., in a short time, and/or can record, with a high degree of reproducibility (i.e., faithfulness of reproduction), images represented by the received FAX data.

It is a second object of the present invention to provide a facsimile machine which receives FAX data transmitted from a different facsimile-data transmitter, even if the facsimile machine is not permitted to transmit the received FAX data to a computer connected to the facsimile machine, and modifies the received FAX data into modified FAX data having a higher or lower level of a communication parameter which level is feasible by the computer.

The second object has been achieved according to a second aspect of the present invention, which provides a facsimile machine comprising: a first facsimile-data transmitter including a first connector connectable to an external computer via a first communication line, and a second connector connectable to a second facsimile-data transmitter via a second communication line, the first facsimile-data transmitter transmitting, to the external computer via the first communication line, facsimile data transmitted from the second facsimile-data transmitter via the second communication line; a facsimile-data receiver; a control device which controls the first facsimile-data transmitter not to transmit the facsimile data to the external computer, and controls the facsimile-data receiver to receive the facsimile data, in place of the external computer; and a modifying device which modifies the facsimile data received by the facsimile-data receiver, into the modified facsimile data having a level of at least one communication parameter which level is feasible by the external computer.

In the FAX machine in accordance with the second aspect of the invention, the control device controls, when the first facsimile-data transmitter is not permitted to transmit the FAX data to the computer for some reason, the facsimile-data receiver to receive the FAX data in place of the computer. Thus, the present FAX machine receives FAX data transmitted from a different facsimile-data transmitter, in place of the computer, even if the first facsimile-data transmitter thereof is not permitted to transmit the FAX data to the computer, i.e., even if the computer cannot receive the FAX data. The FAX machine does not fail to receive any portion of FAX data transmitted from other facsimile-data transmitters. When the FAX machine receives FAX data transmitted from a different facsimile-data transmitter, the FAX machine specifies the level or levels of one or more communication parameters with respect to the reception of the FAX data from that facsimile-data transmitter (hereinafter, referred to as the "second FAX"). The communication parameters may comprise one or more selected from image resolution, sheet width, data coding method, and data transmission speed. As will be explained in detailed description of the preferred embodiments, each communication parameter has a plurality of different degrees or levels. For example, the parameter of 'image resolution' has 'super-fine', 'fine', and 'standard' levels. The 'sheet width' has 'A-4 size', 'B-4 size', and 'B-5 size' levels, and the 'data coding method' has 'MMR (modified MR) method', 'MR (modified READ (relative element address designate)) method', and 'MH (modified Huffman) method' levels. The 'data transmission speed' has '2,400 bps (bit per second)' and '4,800 bps' levels. In the case where FAX data are communicated (i.e., transmitted or received) between two facsimile machines, it is preferred that the communication parameter or parameters be specified at the highest level or levels thereof which are commonly feasible by both the two facsimile machines. As the present invention is concerned, the highest level refers to the finest-resolution level for the image resolution (i.e., 'super-fine' resolution of the above three levels), the greatest-width level for the sheet width ('A-4' size of the above three levels), the least-output-data level for the data coding method ('MMR' method of the above three levels), and the highest-speed level for the data transmission speed ('4,800 bps' level of the above two levels). The higher the respective levels of image resolution and sheet width are, the higher the degree of reproducibility of images represented by FAX data is. The higher the respective levels of coding method and transmission speed are, the shorter time it takes to transmit FAX data. However, if the second FAX transmits, to the FAX machine, FAX data whose sheet-width level is lower (or narrower) than the highest level feasible by both the two machines, the FAX machine specifies not the highest but the lower sheet-width level at which to receive the FAX data. The external computer also has the level or levels of one or more communication parameters. In the case where the FAX machine transmits FAX data to the computer, it is preferred that the communication parameter or parameters be specified at the highest level or levels thereof which are commonly feasible by both the FAX machine and the computer. In some cases, however, the parameter level specified between the FAX machine and the second FAX is different from the level specified between the FAX machine and the computer. If the former level is higher than the latter level, and if the FAX machine uses the latter, lower level at which to receive FAX data from the second FAX, the FAX machine is wasteful of the former, higher level. In order to avoid this wastefulness when the facsimile-data receiver receives the FAX data in place of the computer, it is preferred that the FAX machine specify the highest communication parameter level or levels which is/are commonly feasible by both the FAX machine and the second FAX, so that the FAX machine can receive the FAX data with the higher degree of reproducibility in the shorter time duration. Since, however, the FAX data thus received by the FAX machine are not feasible by the computer, the modifying device modifies the FAX data into modified FAX data having a lower parameter level or levels which is/are feasible by the computer. On the other hand, if the parameter level specified between the FAX machine and the second FAX is lower than the level specified between the FAX machine and the computer, and if the FAX machine uses the former, lower level at which to receive, in place of the computer, FAX data from the second FAX, it is preferred that the modifying device modify the received FAX data into modified FAX data having a higher parameter level or levels which is/are feasible by the computer. Since the present FAX machine has the modifying device for changing the communication parameter level or levels of received FAX data, the FAX machine can receive, from the second FAX, FAX data at the parameter level or levels specified between the FAX machine and the second FAX, irrespective of the parameter level or levels specified between the FAX machine and the computer. Thus, the FAX machine can receive FAX data with a high degree of reproducibility in a short time duration. In addition, if the parameter level or levels of FAX data received by the FAX machine in place of the computer is/are lower than the level or levels specified between the FAX machine and the computer, and if the modifying device changes the parameter level or levels of the received FAX data to a higher parameter level or levels which is/are feasible by the computer, the FAX machine can, for example, transmit, to the computer, the FAX data with a higher degree of reproducibility in a shorter time duration.

According to a preferred feature of the second aspect of the invention, the modifying device comprises means for modifying the facsimile data received by the facsimile-data receiver, into the modified facsimile data having a highest one of a plurality of different levels of the communication parameter each of which levels is feasible by the external computer, more preferably both the computer and the facsimile machine. In the case where a single communication parameter or each of a plurality of communication parameters of the computer has only one level, that one level is regarded as the highest level of that communication parameter which is feasible by the computer. In this case, the FAX machine modifies the FAX data received in place of the computer, into modified FAX data which the FAX machine can transmit to the computer with the highest degree of reproducibility in the shortest time duration. However, the modifying device may be provided with means for modifying the received FAX data into modified FAX data having one of the different communication parameter levels which one level is feasible by both the computer and the FAX machine but is not the highest level, i.e., is lower than the highest level.

It is a third object of the present invention to provide a facsimile machine which transmits, to a computer connected to the facsimile machine, a first batch of data out of a plurality of batches of data transmitted from a different data transmitter, and does not to transmit, to the computer, a second batch of data out of the batches of data transmitted from the different data transmitter.

The third object has been achieved according to a third aspect of the present invention, which provides a facsimile machine comprising: a facsimile-data transmitter as a first data transmitter including a first connector connectable to an external computer via a first communication line, and a second connector connectable to a second data transmitter via a second communication line; and a control device which controls the first data transmitter to transmit, to the external computer via the first communication line, a first batch of data out of a plurality of batches of data transmitted from the second data transmitter via the second communication line, and not to transmit, to the computer, a second batch of data out of the plurality of batches of data. The first data transmitter may transmit the first batch of data to the computer, for example, because the first batch of data are of a kind which the computer is designed to be capable of receiving, or because the computer is currently capable of receiving any data, and may not transmit the second batch of data to the computer, for example, because the second batch of data are of a kind which the computer is designed to be incapable of receiving, and/or because the computer is currently incapable of receiving any data.

In the FAX machine in accordance with the third aspect of the present invention, the control device selects, from a plurality of batches of data transmitted from a different data transmitter, a first batch of data to transmit to the computer and a second batch of data not to transmit to the same. The computer receives, from the FAX machine, an appropriate batch or batches of data only, and does not receive any inappropriate batches of data, without employing any additional hardware or software equipment. Thus, the FAX machine improves not only the ease of use of the computer but also the efficiency of data transmission thereof to the computer.

According to a preferred feature of the third aspect of the invention, the facsimile machine further comprises a telephone set, and wherein the control device comprises: judging means for judging whether each batch of data out of the plurality of batches of data transmitted from the second data transmitter is facsimile data comprising image data, or telephone data comprising sound data; and means for controlling, when the judging means judges that the each batch of data is the facsimile data, the first data transmitter to transmit the facsimile data as the first batch of data, to the external computer, and supplying, when the judging means judges that the each batch of data is the telephone data, the telephone data as the second batch of data, to the telephone set. In this case, the telephone ("TEL" data) are not transmitted to the computer. Therefore, the computer need not be provided with any equipment for judging whether the data transmitted from the FAX machine is FAX data or TEL data, and receiving the FAX data only and rejecting the TEL data. Thus, a wider range of computers may be used with the present FAX machine. In addition, since the FAX machine does not transmit any TEL data to the computer, the efficiency of data transmission of the FAX machine to the computer is improved as such. In the case where other data transmitters (e.g., FAX machines or TEL sets of customers) are divided into a plurality of transmitter groups more important and less important, the FAX machine may further comprise different judging means for judging from which transmitter group the FAX machine has received data. In this case, the FAX machine selects the data received from an important transmitter group or groups, and transmits only the selected data to the computer.

According to another feature of the third aspect of the invention, the control device comprises judging means for judging whether each batch of data out of the plurality of batches of data transmitted from the second data transmitter is facsimile data comprising image data, based on at least one detectable event relating to transmission of facsimile data. FAX data are accompanied by, e.g., a CNG (calling) signal the reception of which is an event specific to the transmission of FAX data. The detectable event relating to the transmission of FAX data may be an event directly representing the transmission of FAX data, for example, the reception of CNG signal, or may be an event indirectly representing the transmission of FAX data. In either case, the judging means judges whether each batch of data transmitted from a different data transmitter is FAX data comprising image data, based on the one or more detectable events relating to the transmission of FAX data.

According to yet another feature of the third aspect of the invention, the judging means comprises means for judging whether the each batch of data transmitted from the second data transmitter is the facsimile data, based on the at least one event selected from the group consisting of (a) a first event that the facsimile machine has received, from the second data transmitter, a CNG signal indicating that a batch of facsimile data follows, (b) a second event that a predetermined time has passed after the facsimile machine receives a call signal from the second data transmitter, (c) a third event that a user has input a command to receive the each batch of data transmitted from the second data transmitter, (d) a fourth event that the facsimile machine has generated a predetermined number of calling sounds to call a user, and (e) a fifth event that the facsimile machine has not received any sound data from the second data transmitter for more than a predetermined time after the facsimile machine transmits an answering message to the second data transmitter. In this case, the FAX machine transmits, to the computer, the FAX data only with high reliability and efficiency. If the FAX machine were adapted to identify TEL data and not to transmit the TEL data to the computer, the FAX machine might transmit data other than FAX data or TEL data, to the computer, to a disadvantage. In contrast, the present FAX machine selects FAX data from other kinds of data and transmits only the thus selected FAX data to the computer, so that the computer advantageously receives the FAX data only.

According to a further feature of the third aspect of the invention, the control device comprises judging means for judging whether the first data transmitter is permitted to transmit, to the external computer, each batch of data out of the batches of data transmitted from the second data transmitter, based on information indicative of a state of the computer relating to data reception; and means for controlling, when the judging means makes a positive judgment, the first data transmitter to transmit, to the external computer, the each batch of data as the first batch of data, and controlling, when the judging means makes a negative judgment, not to transmit, to the computer, the each batch of data as the second batch of data. The information indicative of the state of the computer relating to data reception has been explained in detail with respect to the FAX machine in accordance with the first aspect of the invention. When this information indicates that the computer is currently not capable of receiving any data, or FAX data in particular, it is wasteful that the FAX machine should transmit the received data to the computer, even resulting in loosing the data.

It is a fourth object of the present invention to provide a facsimile machine which receives FAX data transmitted from a different facsimile-data transmitter, even if the facsimile machine is not permitted to transmit the FAX data to a computer connected to the facsimile machine, and transmits the FAX data when the facsimile machine is permitted to transmit the FAX data to the computer.

The fourth object has been achieved according to a fourth aspect of the present invention, which provides a facsimile machine comprising: a first facsimile-data transmitter including a first connector connectable to an external computer via a first communication line, and a second connector connectable to a second facsimile-data transmitter via a second communication line; a storing device including a memory, for storing facsimile data transmitted from the second facsimile-data transmitter, in the memory, at a timing of transmission of the facsimile data; judging means for consecutively judging whether the first facsimile-data transmitter is permitted to transmit the facsimile data stored in the memory, to the external computer, while the storing device stores, in the memory, the facsimile data transmitted from the second facsimile-data transmitter; and a control device which controls, while the judging means continues to make a positive judgment, the first facsimile-data transmitter to transmit, to the external computer, the facsimile data stored in the memory by the storing device.

In the FAX machine in accordance with the fourth aspect of the invention, the storing device stores, in the memory, the FAX data transmitted from the second facsimile-data transmitter, at the timing of transmission of the FAX data to the FAX machine, and the first facsimile-data transmitter transmits, to the computer, the FAX data stored in the memory, while the judging means continues to make positive judgements that the first facsimile-data transmitter is permitted to transmit the FAX data. The judging means consecutively judges whether the first facsimile-data transmitter is permitted to transmit the FAX data stored in the memory, to the external computer, while the storing device stores, in the memory, the FAX data transmitted from the second facsimile-data transmitter. At some points of time, the judging means makes negative judgments. However, at other points of time, the judging means makes positive judgments, so that the first facsimile-data transmitter is permitted to transmit the FAX data to the computer. Since the first facsimile-data transmitter is inhibited from transmitting the FAX data to the computer while the judging means continues to make negative judgments, the computer is effectively prevented from failing to receiving any portion of the FAX data received and stored by the FAX machine. The judging means may comprise means for judging whether the first data transmitter is permitted to transmit the FAX data to the external computer, based on information indicative of a state of the computer relating to data reception. The information indicative of the state of the computer relating to data reception has been explained in detail with respect to the FAX machine in accordance with the first aspect of the invention. Even if the FAX machine is not permitted to transmit, to the computer, the FAX data transmitted from a different facsimile-data transmitter, the storing device receives the FAX data and stores the received FAX data in the memory, and the FAX machine does not transmit the FAX data to the computer. Thus, the FAX machine does not fail to receive any portion of the FAX data.

According to a preferred feature of the fourth aspect of the invention, the control device comprises first control means for controlling the first facsimile-data transmitter to end the transmission of the facsimile data stored in the memory, when the judging means has continued to make negative judgments for more than a predetermined time. In this case, the storing device stores, in the memory, all the other portion of FAX data received after the ending of the FAX-data transmission to the computer. After this ending, the judging means need not operate for making any judgments. Accordingly, the FAX machine more easily executes a FAX-data receiving program, i.e., more easily receives the other portion of FAX data.

According to another feature of the fourth aspect of the invention, the facsimile machine further comprises a recorder, and the control device comprises second control means for controlling the recorder to record, on a recording medium, an image corresponding to the facsimile data stored in the memory, when the first control means ends the transmission of the facsimile data stored in the memory and after the second facsimile-data transmitter ends the transmission of the facsimile data to the facsimile machine. In this case, a user can check the contents of the FAX data by reviewing the image or images recorded on the recording medium (e.g., record sheet) provided by the recorder. The present FAX machine is free from a problem that the FAX data stored in the memory by the storing device may be erased or lost because of occurrence of, e.g., an electric trouble taking place in the FAX machine. The images recorded on the record sheets are not lost due to such electric troubles and are kept with safety.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 5 is a diagrammatic view of a random access memory (RAM) of a computer as an essential part of the FAX control device of FIG. 4;

DETAILED DESCRIPTION OF THE PREFERRED EMBODIMENTS

Figure 1:
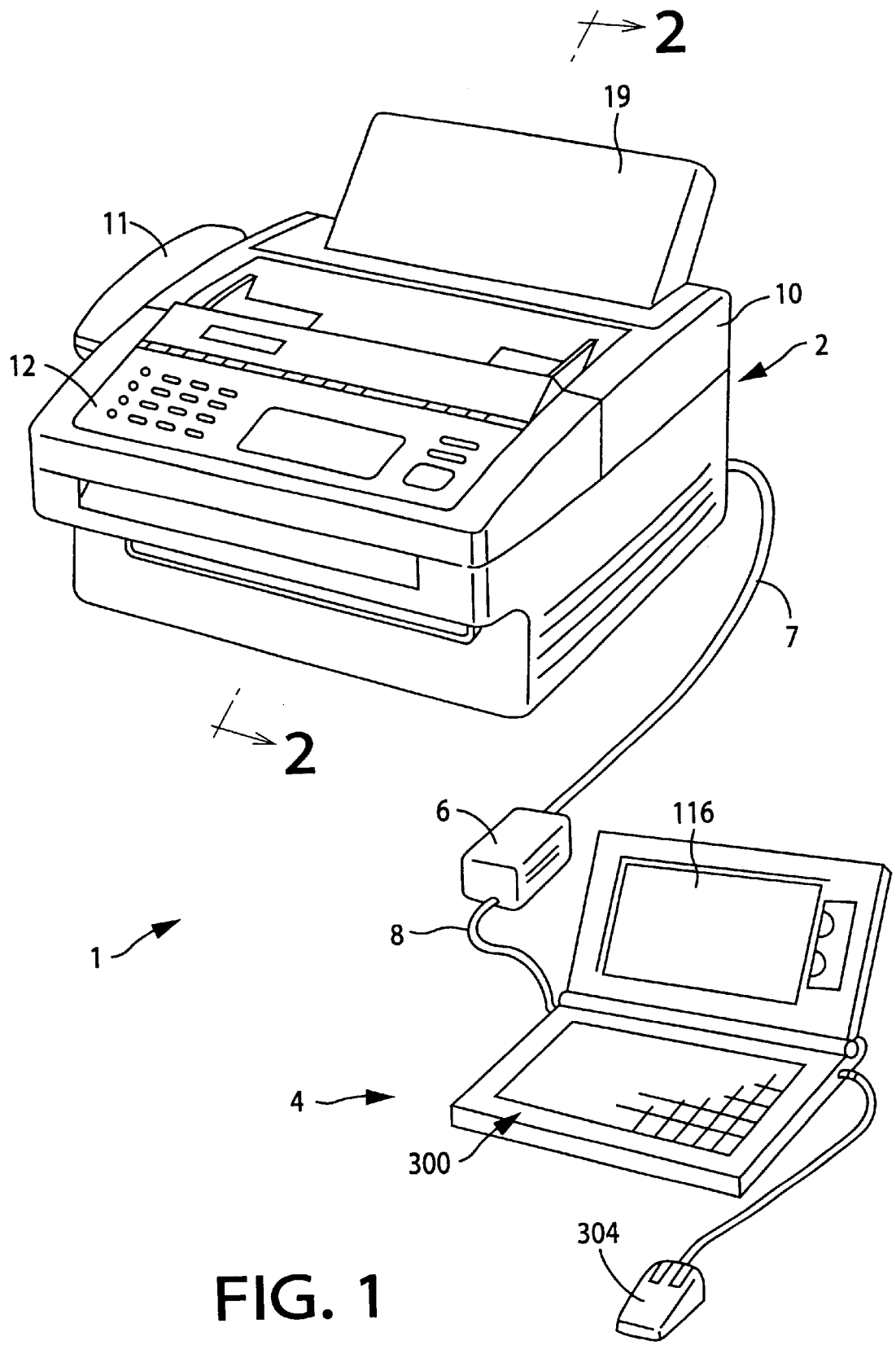
FIG. 1 is a perspective view of a data processing system to which the present invention is applied, the system including a facsimile machine (FAX), a personal computer (PC), and an interface (I/F) box connecting the FAX and the PC with each other.

Referring first to FIG. 1, there is shown a data processing system (DPS) 1 to which the present invention is applied. The DPS 1 includes a facsimile machine (FAX) 2 and a personal computer (PC) 4. The FAX 2 and the PC 4 are connected to each other via an interface (I/F) box 6, so that the two devices 2, 4 can exchange data with each other and each can store, edit, or correct the exchanged data and so that each device 2, 4 can utilize the functions of the other device 4, 2.

The FAX 2 and the I/F box 6 are connected to each other via a personal cable 7, and the box 6 and the PC 4 are connected to each other via a modem cable 8. The I/F box 6 has a plurality of resistors, and interfaces the FAX 2 using the interface, RS232C, of the PC 4 that is a standard interface for serial data transmission. To this end, the I/F box 6 converts the voltage of start stop signals.

Each of the personal cable 7 and the modem cable 8 has an RTS control signal line, a CTS control signal line, two data lines, and an earth line. The two cables 7, 8 are connected to each other via the I/F box 6. The personal cable 7 additionally has a sensor line used for identifying whether the cable 7 has been disconnected the I/F box 6.

The RTS control signal line is for transmitting an RTS control signal indicating whether the FAX 2 is in a first ('RTS ENABLE') state thereof in which the FAX 2 allows the PC 4 to transmit personal-computer data (PC data) thereto or in a second ('RTS DISABLE') state thereof in which the FAX 2 inhibits the PC 4 from transmitting PC data thereto. The FAX 2 generates the RTS control signal that selectively takes a high-voltage ('H') state or a low-voltage ('L') state, and the PC 4 identifies, based on the RTS control signal, whether the FAX 2 is in the RTS ENABLE or RTS DISABLE state thereof.

Similarly, the CTS control signal line is for transmitting a CTS control signal indicating whether the PC 4 is in a first ('CTS ENABLE') state thereof in which the PC 4 allows the FAX 2 to transmit facsimile data (FAX data) thereto or in a second ('CTS DISABLE') state thereof in which the PC 4 inhibits the FAX 2 from transmitting FAX data thereto. The PC 4 generates the CTS control signal that selectively takes a H state or a L state, and the FAX 2 identifies, based on the CTS control signal, whether the PC 4 is in the CTS ENABLE or CTS DISABLE state thereof.

One of the two data lines is for transmitting FAX data from the FAX 2 to the PC 4, and the other data line is for transmitting PC data from the PC 4 to the FAX 2. Each of the FAX data and the PC data contain coded image data, and control data (hereinafter, referred to as the "command" data) used for controlling the transmission and reception of the coded image data.

Each of the RTS and CTS control signal lines and the two data lines is a one-way line.

FAX data which are transmitted between the FAX 2 and another facsimile machine 114 (hereinafter, referred to as the "second FAX" 114) also contain coded image data and command data.

Figure 2:
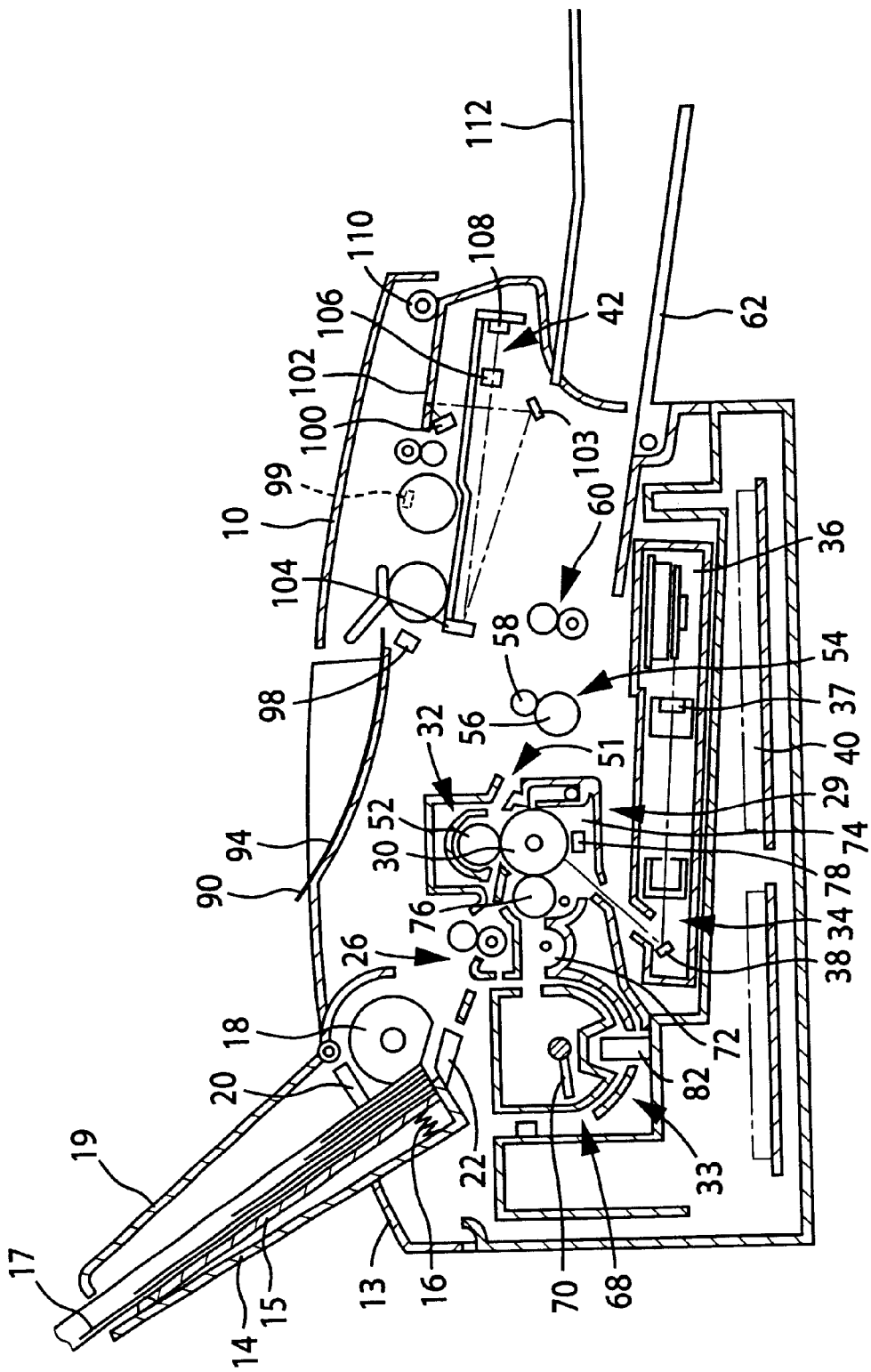
FIG. 2 is a cross-sectional view of the FAX of FIG. 1, taken along line 2—2.

The FAX 2 has a housing 10, and a handset 11 rests on a hook (not shown) provided in a left-hand side portion of the housing 10. A user picks up the handset 11 from the hook to start a telephone call, thereby placing the FAX 2 in an hook-on state thereof, and puts the same 11 down on the hook to end the call, thereby placing the FAX 2 in a hook-off state thereof. An operation panel 12 is provided in a top and front portion of the housing 10. A sheet-holdler receiver 13 (FIG. 2) is provided in a rear portion of the housing 10. As shown in FIG. 2, a record-sheet holder 14 is detachably set in the holder receiver 13. The sheet holder 14 has the shape of a shallow box, and a sheet-press plate 15 is provided inside the sheet holder 14 and is rotatably attached to the same 14. A spring 16 biases the press plate 15 in a direction to bring a record sheet 17 into pressed contact with a record-sheet-feed roller 18.

A cover member 19 is rotatably attached to the housing 10, to cover an opening of the record-sheet holder 14. Between the cover member 19 and the sheet-press plate 15, there is provided a joining device (not shown) for joining the two members 19, 15 with each other with the holder 14 being set in the receiver 13. When the cover 19 is opened, the joining device pushes the press plate 15 down against the biasing force of the spring 16, so as to provide, between the plate 15 and the roller 18, a space into which new record sheets 17 can be inserted. When the cover 19 is closed, the press plate 15 is biased by the spring 16, as shown in FIG. 2, so that a record sheet 17 is held in pressed contact with the roller 18.

A record-sheet sensor 20 is provided upstream of, and adjacent to, the feed roller 18 as seen in a direction of feeding of record sheets 17 in the housing 10. The sheet sensor 20 is of contact type, and identifies whether any record sheet 17 remains in the sheet holder 14. When the cover member 19 is closed and a record sheet 17 is brought into pressed contact with the feed roller 18, a probe of the sheet sensor 20 is pushed by the sheet 17. When no sheet 17 remains in the holder 17, the probe of the sensor 20 is not pushed.

The record sheets 17 held in the holder 14 are taken out, one by one, from top to bottom, by the feed roller 18 and a sheet-separate pad 22 which cooperate with each other to provide an automatic sheet-feed device 18, 22. Each sheet 17 taken out from the holder 14 by the sheet-feed device 18, 22, is conveyed by a pair of sheet-convey rollers 26 to an image-record device 29.

The image-record device 29 includes a photosensitive drum 30, an image-transfer device 32, an image-develop device 33, etc. The record sheet 17 is fed by the convey rollers 26 to a space between the drum 30 and the transfer device 32. The circumferential surface of the drum 30 is scanned by laser beams emitted from a laser-beam scanning device 34, so that latent images are formed in the scanned surface of the drum 30. The scanning device 34 includes a laser-emit device 36, a lens 37, a reflection mirror 38, etc. The laser-emit device 36 includes a laser-beam source which emits laser beams in accordance with image data supplied from a FAX control device 40, and a polygon mirror which reflects the laser beams emitted from the source. The laser beams emitted from the source are converged by the lens 37, subsequently are reflected by the mirror 38, and then are incident to the surface of the drum 30.

As the drum 30 is rotated and as the drum surface is scanned by the laser beams, latent images are formed in the drum surface. An area in which latent images can be formed (i.e., photosensitive area provided on the outer circumferential surface of the drum 30) is regarded as a set of multiple dots each of which is the smallest possible unit of the latent images. In the FAX 2, the image-record device 29 forms each dot having about 0.07 mm×0.07 mm dimensions, since the laser beams of the scanning device 34 have an 80 $\mu$m spot diameter. Two of these dots (i.e., about 0.13 mm×0.07 mm) correspond to the smallest possible area, i.e., picture element, that can be read by an image-read device 42 of the FAX 2 (described later) when being operated at the highest resolution level thereof, i.e., super-fine ('S-FINE') resolution. Thus, the image-record device 29 can record images at a resolution level higher than the highest resolution level of the image-read device 42.

The drum 30 is rotated by a drum motor (not shown) which is connected via a drive circuit (not shown) to the FAX control device 40. The rotation operation of the drum 30 is controlled by the control device 40.

The operation of the laser-beam scanning device 34 is controlled according to recording image data supplied from the FAX control device 40. While the scanning device 34 emits laser beams in accordance with the image data, the surface of the drum 30 is scanned, one line by one (i.e., one dot-line by one), with the laser beams, so that latent images corresponding to the image data are formed in the drum surface. The latent images formed in the drum surface are developed by the image-develop device 33 in such a manner that toner as a developing powder is applied to the drum surface. The thus obtained toner images are transferred onto the record sheet 17 by the image-transfer device 32. The toner left on the drum surface after the developed toner images are transferred to the record sheet 17, is removed from the drum 30 by a cleaning device 51.

The image-transfer device 32 includes an image-transfer roller 52 which applies electric charge to the record sheet 17 and transfers the toner images from the drum 30 onto the sheet 17. Thus, the images developed on the drum 30 are transferred to the record sheet 17. The thus image recorded sheet 17 is discharged by an electric discharger (not shown), and is guided by a guide member (not shown) to an image-fix device 54. The fixing device 54 includes a heater roller 56 and a presser roller 58. The record sheet 17 having the fixed images is output by a pair of record-sheet output rollers 60 into a record-sheet tray 62 attached to a front portion of the housing 10.

When a toner cartridge 68 is set in the image-develop device 33, the toner of the cartridge 68 is supplied, while being stirred by a stirring member 70, to a stirring chamber 72. The toner of the stirring member 70 is supplied, while being stirred, to an image-develop chamber 74 where the toner is stirred together with magnetic carrier pre-stored therein and is splashed toward an image-develop sleeve 76.

The toner carried by the magnetic carrier is adhered to the surface of the image-develop sleeve 76, subsequently is charged by an electric charger 78, and then is supplied onto the surface of the drum 30 which has been scanned by the laser-beam scanning device 34.

The image-develop device 33 includes a remaining toner measuring device 80 (FIG. 4) which measures the amount of toner remaining in the toner cartridge 68. The measuring device 80 includes a measuring probe 82 secured to the housing 10, a wiper (not shown) secured to the stirring member 70, and a signal-producing device which produces an output signal of the measuring probe 82.

The measuring probe 82 is an optical sensor of transmission type, and includes a light emitter and a light receiver each of which externally fits in a corresponding one of two recesses formed in a transparent bottom wall of the toner cartridge 68. The measuring device 80 measures the remaining amount of the toner by measuring the length of a time duration for which the light receiver continues to receive the light emitted from the light emitter. When the FAX control device 40 identifies that the FAX 2 is receiving FAX data, the control device 40 controls the stirring member 70 to start rotating and thereby stirring the toner. Consequently an amount of the toner located in a space between the above-mentioned two recessed portions is splashed by the stirring member 70 and the opposed inner surfaces of the recessed portions are wiped away by the wiper. Thus, the light receiver starts receiving the light emitted from the light emitter. The more the remaining amount of the toner is, the sooner the space between the two recessed portions is covered with the toner, i.e., the sooner the light reception of the light receiver is interrupted. Therefore, the length of the time duration for which the receiver continues to receive the light from the emitter, corresponds to the remaining amount of the toner. In the present embodiment, the remaining toner measuring device 80 generates an empty signal when the remaining amount of the toner is reduced to such an extent that the image-record device 29 cannot carry out an image recording operation. Thus, the presence of the empty signal indicates that the image-record device 29 is currently placed in a state thereof in which the device 29 cannot record images on a record sheet 17. Since the stirring of the toner is started upon identification of the reception of FAX data, the measuring device 80 identifies whether the remaining amount of the toner is enough or not, before the recording device 29 starts an image recording operation.

In a top portion of the housing 10, there is provided the image-read device 42 which reads images from an original sheet 90. One or more original sheets 90 are set in an original receiver 94 provided in a top and intermediate portion of the housing 10. In response to a reading-start command, an original-feed device 96 (FIG. 4) takes out the original sheets 90, one by one, from on the original receiver 94. Each original sheet 90 is conveyed by feed rollers (not shown) to the image-read device 42. An original-sheet sensor 98 identifies whether any original sheet 90 remains in the original receiver 94. The feed device 96 includes a sheet-end sensor 99 which detects the leading and trailing ends of each original sheet 90 being fed by the feed device 96. When a prescribed time elapses after the leading end of an original sheet 90 has been detected by the sheet-end sensor 99, the FAX control device 40 judges that the original sheet 90 has been fed to an image-reading position where the images on the original sheet 90 are read by the image-read device 42. Meanwhile, when the trailing end of the original sheet 90 is detected by the sheet-end sensor 99, the control device 40 judges that the original sheet 90 has been fed to a prescribed position, and terminates the reading of the original sheet 90. Thus, the reading of one page 90 is ended.

The image-read device 42 includes a light source 100 which irradiates an original sheet 90 located on an original-support plate 102, and two mirrors 103, 104 which sequentially reflect the light from the original sheet 90, a lens 106 which converges the light reflected from the mirror 104, and a line-image reader 108 which reads, as each line of the original 90, the light converged by the lens 106 and then incident thereto.

The line-image reader 108 has a multiplicity of CCDs (charge coupled devices) each of which detects light. Each CCD is a photoelectric transfer element which outputs an electric voltage corresponding to the intensity of received reflected light. The output voltage of each CCD increases as the intensity of received light increases (i.e., as the color of received light becomes more white). As described later, if a reflected light received by each CCD has an intensity greater than a threshold value, an area read by that CCD is regarded as a white area and a set of dot data indicative of "0" is produced for the white area. On the other hand, if a reflected light received by each CCD has an intensity not greater than the threshold value, an area read by that CCD is regarded as a black area and a set of dot data indicative of "1" is produced for the black area. The area read by each CCD is the smallest possible unit, i.e., picture element of original images that can be read by the image-read device 42.

A dimension of each picture element is defined by an amount of feeding of an original sheet 90 by the original-feed device 96 in a time duration in which reading of one line of the original 90 is performed by the read device 42, i.e., rate of feeding of the original 90. The dimension of each picture element as taken in the direction of scanning of the scanning device 34, is standardized, i.e., prescribed. On the other hand, the above mentioned feeding rate of the original sheet 90 is changeable depending upon a resolution level selected on the FAX 2.

In the present embodiment, the feeding rate is changeable over three steps corresponding to three resolution levels selectable on the FAX 2, i.e., SUPER-FINE (S-FINE), FINE, and STANDARD resolutions. When the S-FINE resolution is selected, the feeding rate is determined at about 0.07 mm (i.e., 15.4 lines/mm); when the FINE resolution is selected, the feeding rate is determined at about 0.13 mm (i.e., 7.7 lines/mm); and when the STANDARD resolution is selected, the feeding rate is determined at about 0.26 mm (i.e., 3.85 lines/mm).

That is, for the S-FINE resolution, each picture element has about 0.13 mm×0.07 mm dimensions; for the FINE resolution, each picture element has about 0.13 mm×0.13 mm dimensions; and for the STANDARD resolution, each picture element has about 0.13 mm×0.26 mm dimensions. On the other hand, as previously described, the image-record device 29 forms each dot, i.e., each picture element having 0.07 mm×0.07 mm dimensions. Therefore, in order to convert initial image data prepared at the S-FINE resolution by the image-read device 42, into recording image data compatible with the image-record device 29, it is required that the number of sets of dot data as taken in the direction of scanning of the scanning device 34 be doubled.

After each original sheet 90 is read by the image-read device 42, the original 90 is fed by an original-output roller 110 and output through an outlet into an original-output tray 112.

Next, there will be described the manner of specifying one or more parameters relating to the communication (i.e., transmission or reception) of image data, between the FAX 2 and the PC 4, or between the FAX 2 and the second FAX 114. In addition, there will be described the manner of dealing with the received image data.

When the FAX 2 transmits, or receive, FAX data to, or from, the second FAX 114, the FAX 2 specifies various communication parameters including data-transmission speed, image resolution, sheet width, data-coding method, etc. Each of the communication parameters is selectable at a plurality of different degrees or levels as described later. The FAX 2 transmits or receives FAX data at the highest possible levels of respective parameters which are common to both the FAX 2 and the second FAX 114. This principle also applies to the communication between the FAX 2 and the PC 4.

In the present embodiment, the respective levels of the communication parameters of the PC 4 are lower than those of the FAX 2. Therefore, when PC data are transmitted via the FAX 2 to the second FAX 114, or when FAX data from the second FAX 114 are received via the FAX 2 by the PC 4, the parameter levels of the PC 4 are regarded as the parameter levels of the FAX 2. In these cases, therefore, the FAX 2 transmits or receives data at the highest parameter levels which are common to both the PC 4 and the second FAX 114.

First, there will be described the manner of specifying the resolution as one of the communication parameters. For the purpose of simplicity, it is assumed that the dimension of each picture element in the scanning direction is common to the FAX 2, the second FAX 114, and the PC 4. On the other hand, the dimension of each picture element in the sub-scanning direction perpendicular to the scanning direction is changeable over the three levels, 0.07 mm, 0.13 mm, and 0.26 mm, corresponding to the S-FINE, FINE, and STANDARD resolutions.

In the case where the FAX 2 transmits or receives FAX data to and from the second FAX 114, independent of the PC 4, the FAX 2 specifies, as the resolution, the S-FINE level that is the highest of the selectable three levels, if the second FAX 114 is operable at the S-FINE level as the highest resolution level thereof, or specifies the FINE level if the second FAX 114 is operable at the FINE level as the highest resolution level thereof.

The resolution level of the PC 4 is the resolution level of a PC display device 116 which displays images thereon in a manner described later. Assuming that the display device 116 is provided by a liquid-crystal display having a 200 dpi (dots per inch)×400 dpi screen, each dot on the display 116 has the same dimensions as those of each picture element at the S-FINE resolution of the FAX 2. However, the PC 4 may not be operable at the S-FINE resolution. In fact, generally, the PC 4 is operable at the FINE level as the highest resolution level thereof. The PC 4 processes received image data according to a prescribed control program, so that the processed image data correspond to the respective dots on the liquid-crystal display 116. More specifically, according to the prescribed control program, the PC 4 produces displaying image data at the FINE or STANDARD resolution, so that the display 116 can display the images represented by the produced image data.

The FAX 2 in accordance with the present embodiment is operable at the S-FINE level as the highest level thereof, whereas many PCs are operable at the FINE degree as the highest level thereof. In many cases, therefore, the FAX 2 specifies, as the resolution, the FINE level as the highest level common to the FAX 2 and the PC 4.

When the FAX 2 transmits the image data received from the PC 4, to the second FAX 114, the FAX 2 specifies the FINE level as the resolution, even if the second FAX 114 may be operable at the S-FINE resolution. In this case, the FINE resolution is regarded as the highest resolution level of the FAX 2.

In some cases, for the purpose of assuring excellent reproduction of original images, the FAX control device 40 is required to process the image data transmitted to, or received from, the second FAX 114, depending upon the difference between the dimensions of the smallest unit readable by the image-read device 42 and the dimensions of each dot recordable by the image-record device 29 and/or depending upon the difference between the respective highest resolution levels of the FAX 2 and the second FAX 114.

Similarly, the control device 40 may be required to process the image data transmitted to, or received from, the PC 4, depending upon the difference between the respective highest resolution levels of the FAX 2 and the second FAX 114.

Initially, there will be described the case where the FAX 2 receives the image data sent from the PC 4 and the image-record device 29 records the images represented by the image data.

In this case, the resolution is specified or selected at the FINE level, and the FAX 2 receives the image data produced at the FINE resolution from the PC 4. For recording the images represented by the received image data, the control device 40 processes the received image data by doubling each set of dot data thereof with respect to the scanning direction and doubling each batch of one-line data with respect to the sub-scanning direction. A batch of one-line data contain a number of sets of dot data corresponding to a single line of original images in the scanning direction. After all, each set of dot data is increased to four sets of dot data.

Next, there will be described the case where the FAX 2 receives the image data sent from the second FAX 2 and subsequently sends the received image data to the PC 4.

When the resolution is specified at the S-FINE level, the FAX 2 extracts every other batch of one-line data from the received image data, with respect to the sub-scanning direction, and sends the thus processed image data to the PC 4. On the other hand, when the resolution is specified at the FINE level, the FAX 2 need not process the received image data.

In the case where the FAX 2 sends the image data produced by the image-read device 42, to the PC 4, the FAX 2 need not process the image data, since the resolution is specified at the FINE level.

Even if the second FAX 114 or the PC 4 may be operable at the STANDARD level only, the FAX 2 processes image data, as needed, in a similar manner.

For example, if the resolution of the image data received by the FAX 2 from the second FAX 114 is the S-FINE level and the highest resolution level of the PC 4 is the STANDARD level, the FAX 2 processes the received image data by extracting every fourth batch of one-line data therefrom. If the resolution of the image data received from the second FAX 114 is the FINE resolution, the FAX 2 processes the received image data by extracting every second batch of one-line data therefrom, and sends the thus processed image data to the PC 4.

Meanwhile, if the resolution of the image data received by the FAX 2 from the PC 4 is the FINE resolution and the highest resolution level of the second FAX 114 is the STANDARD resolution, the FAX 2 processes the received image data by extracting every second batch of one-line data therefrom.

Second, there will be described the manner of specifying the sheet width as one of the communication parameters.

The FAX 2 is operable at the greatest sheet width thereof that corresponds to the greatest sheet width readable by the image-read device 42 and also corresponds to the greatest sheet width recordable by the image-record device 29. In the present embodiment, the greatest sheet width of the FAX 2 is the 'B4' size in accordance with Japanese Industrial Standards (JIS). Meanwhile, the PC 4 is operable at the greatest sheet width thereof that corresponds to the greatest screen-image width indicatable by the display device 116. This greatest screen-image width includes a length of scrolling of the screen image. In the present embodiment, it is assumed that the greatest sheet width of the PC 4 is the 'A4' size in accordance with JIS that is smaller than the B4-size sheet width.

Either between the FAX 2 and the second FAX 114 or between the FAX 2 and the PC 4, the sheet width is specified according to such a rule that if the sheet-width level of the image data being transmitted is not higher than the highest sheet-width level of the data receiver 2, 4, 114, the sheet width is specified at the sheet-width level of the image data being transmitted and such that if the former level is higher than the latter level, the sheet width is specified at the highest sheet-width level of the data receiver.

Therefore, if the sheet-width level specified between the FAX 2 and the second FAX 114 is different from that specified between the FAX 2 and the PC 4, or if the sheet width of the original sheet 90 read by the image-read device 42 is different from that specified between the FAX 2 and the PC 4, the FAX 2 is required to process the image data.

For example, if the image data received by the FAX 2 has the B4-size sheet width and the FAX 2 transmits the B4-size image data to the PC4 having the A4-size sheet-width level as the highest sheet width level thereof, the FAX 2 processes the B4-size image data by extracting four from every five sets of dot data thereof with respect to the sheet-width direction, i.e., scanning direction, and extracting four from every five batches of one-line data with respect to the sheet-length direction, i.e., sub-scanning direction.

In the present embodiment, the FAX 2 carries out, in one step, the image-data processing necessary to compensate for the difference between the highest sheet-width levels of the FAX 2 and the other device 4, 114 and the data processing necessary to compensate for the difference between the highest resolution levels of the FAX 2 and the other device 4, 114. That is, the FAX 2 determines a rate of extraction of dot data from the image data with respect to each of the scanning and sub-scanning directions, based on the rate of decreasing of image data corresponding to the difference between the two highest sheet-width levels and on the rate of increasing or decreasing of image data corresponding to the difference between the two highest resolution levels.

In the present embodiment, the sheet-width parameter is specified at a sheet-width level different from (i.e., smaller than) that of the image data being transmitted, in the case where the sheet-width level of the image data being transmitted is greater than the highest sheet-width level of the data receiver 2, 4, 114; otherwise the parameter is specified at the sheet-width level of the image data being transmitted. Therefore, the FAX 2 never increases the sheet-width level of the image data or never increases the total amount of dot data of the same. Regarding the resolution parameter, too, the FAX 2 never increases the total amount of dot data of the image data, since the resolution is specified at the lower one of the respective highest resolution levels of the data transmitter and receiver 2, 4, 114 when the image data is transmitted or received between the two devices 2, 4, 114. However, when the image data are used by the image-record device 29 of the FAX 2, the FAX 2 may need to increase the amount of dot data of the image data.

Third, there will be described the manner of specifying the data-coding method one of the communication parameters.

For transmitting FAX data, the FAX 2 is selectively operable in one of three digital-data coding methods, MMR (modified MR) method, MR (modified READ (relative element address designate)) method, and MH (modified Huffman) method. Of these three methods, the MMR method is to produce the least data from the same data, and the MR method is the second. Thus, the MMR method is the highest data coding method, and the MR method is the second.

In the present embodiment, the FAX 2 and the second FAX 114 have the MMR, MR, and MH coding methods, and the PC 4 has the MH coding method only that is the lowest of the three methods.

The data coding method is specified at the highest coding method which is common to the data transmitter and receiver 2, 4, 114. In the case where the FAX 2 receives image data from the second FAX 114 and transmits the received image data to the PC 4, or in the case where the FAX 2 receives image data from the PC 4 and transmits the received image data to the second FAX 114, it is not needed to change the data coding methods if the image data received by the FAX 2 have been coded with a data coding method common to the data receiver 4, 114. Therefore, the FAX 2 transmits the image data without modifying the image data. On the other hand, if the received image data have been coded with a data coding method which is not common to the data receiver 4, 114, the FAX 2 needs to decode the received image data into dot data, codes the dot data with the data coding method specified for the FAX 2 and the data receiver 4, 114, and transmits the thus coded image data to the data receiver 4, 114.

Figure 3:
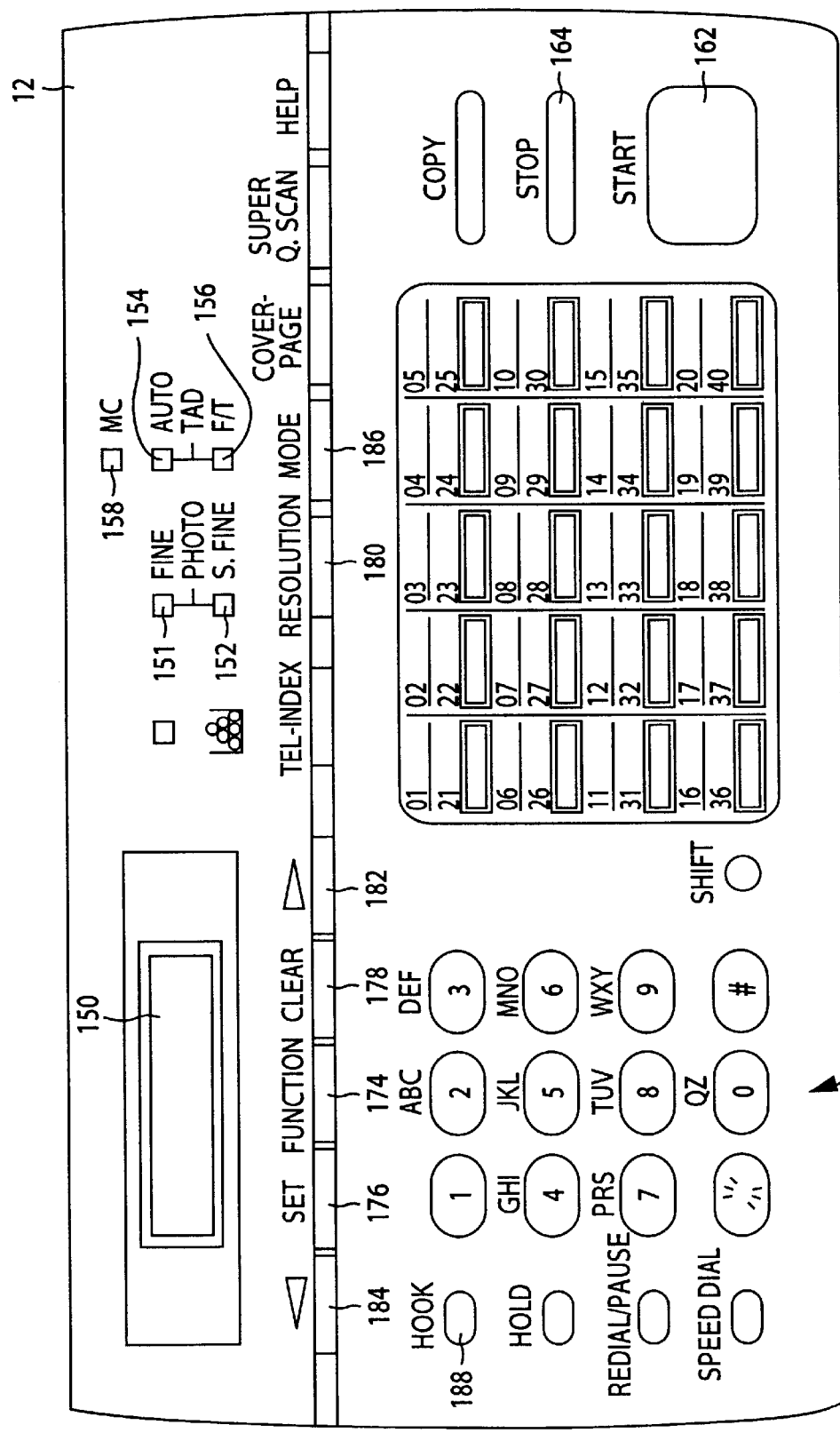
FIG. 3 is a plan view of an operation panel of the FAX of FIG. 1.

FIG. 3 shows the operation panel 12 provided on the top and front part of the FAX 2. In a rear part of the operation panel 12, there are provided a FAX display device 150, a fine ("FINE") lamp 151, a super-fine ("S-FINE") lamp 152, an auto mode ("AUTO") lamp 154, a facsimile-telephone-switch mode ("F/T") lamp 156, and an inside-message-record mode ("MC") lamp 158. In a front part of the panel 12, there are provided ten numeral keys ("0" to "9") 160, a start ("START") key 162, and a stop ("STOP") key 1164. In an intermediate part of the panel 12, there are provided a function ("FUNCTION") key 174, a set ("SET") key 176, a clear ("CLEAR") key 178, a resolution ("RESOLUTION") key 180, a first cursor key 182, a second cursor key 184, a reception-mode ("MODE") key 186, and a hook ("HOOK") key 188.

The FAX display device 150 displays various messages indicating current states of the FAX 2, and various instructions about how to operate the FAX 2. The numeral keys 160 are used for inputting a facsimile number of the second FAX 114, or selecting one of various functions of the FAX 2.

The START key 162 is operable for inputting a command to start transmitting, receiving, or recording FAX data, and the STOP key 164 is used for inputting a command to stop selecting one of the functions of the FAX 2, or stop performing the selected function.

The first and second cursor keys 182, 184 are used for moving a cursor (not shown) on the display 150, or selecting one of the functions of the FAX 2.

The FUNCTION key 174 is used for inputting a command to start displaying, on the display 150, the various functions selectable on the FAX 2, so that the numeral keys 160 and/or cursor keys 182, 184 may be used for selecting one of the functions displayed on the display 150. The SET key 176 is operable for inputting a command to finally fix the selection of one of the functions of the FAX 2. The CLEAR key 178 is used for cancelling the selected function.

The RESOLUTION key 180 is used for selecting one of various resolution levels of the image-read device 42 of the FAX 2. Upon initialization, the FAX 2 is selected at the STANDARD resolution level. In this case, neither of the FINE lamp 151 nor the S-FINE lamp 152 is put on. If the RESOLUTION key 180 is pushed once, the FINE resolution is selected, and the FINE lamp 151 is put on. If the RESOLUTION key 180 is pushed twice, the S-FINE resolution is selected, and the FINE lamp 151 is put out and the S-FINE lamp 152 is put on. If the RESOLUTION key 180 is pushed three times, a middle-tone mode is selected, and the FINE and S-FINE lamps 151, 152 are put on and the display 150 displays a message to request the user to select one of a 16-gradation level and a 32-gradation level for the middle-tone mode, by using the FUNCTION key 174, numeral keys 160, and cursor keys 182, 184.

Figure 4:
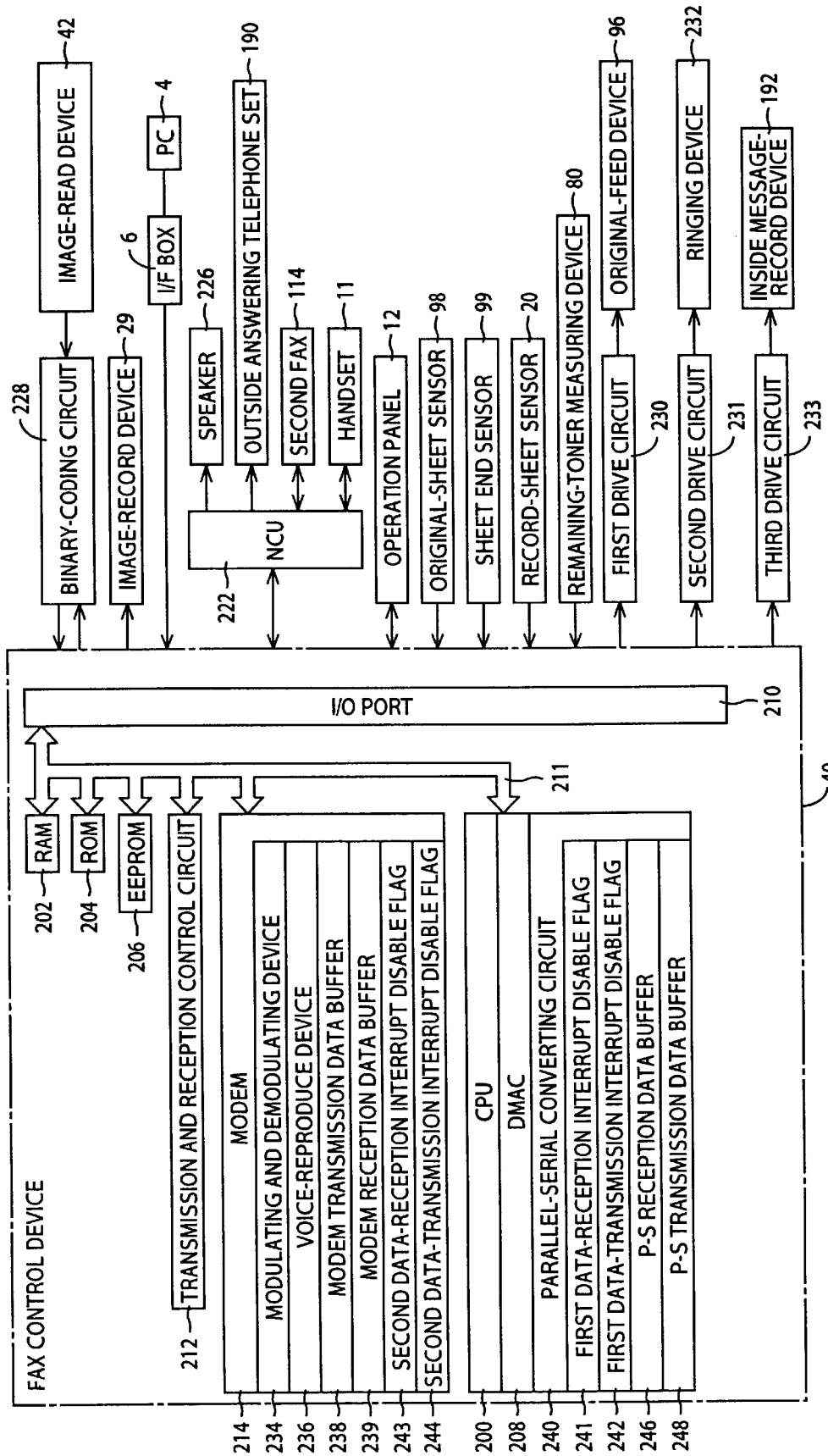
FIG. 4 is a block diagram of a control device of the FAX of FIG. 1 and other elements connected to the FAX control device.

The MODE key 186 is used for selectively placing the FAX 2 in one of an automatic data reception ("AUTO") mode, a manual data reception ("MANUAL") mode, a facsimile-telephone-switch ("F/T") mode, an outside-message-record ("TAD") mode, and an inside-message-record ("MC") mode. The AUTO mode is for automatically receiving data, and the MANUAL mode is for receiving data in response to user's operation of an appropriate key or keys. The F/T mode is for controlling, upon arrival of FAX data including image data, the facsimile function to automatically receive the FAX data and controlling, upon arrival of telephone (TEL) data including sound data, the telephone function to call the user so that the user picks up the handset 11 and talks with the calling person. The FAX data and the TEL data are transmitted to the FAX 2 via an external public telephone line 224 (FIG. 4). The TAD mode is one of answering-telephone modes in which the messages of a calling person are recorded by an outside answering telephone set 190 (i.e., outside message-record device) externally added to the FAX 2. The MC mode is another of the answering-telephone modes in which the messages of a calling person are recorded by an inside message-record device 192 incorporated in the FAX 2.

The HOOK key 188 is used for inputting a command to connect the FAX 2 with the telephone line 224. If the HOOK key 188 is pushed once with the handset 11 resting on the housing 2, the FAX 2 is connected to the telephone line 224, so that the FAX 2 is placed in a monitor mode in which the user can hear the voices of a calling or called person through a speaker 226. If the HOOK key 188 is pushed once more with the handset 11 resting on the housing 2, the FAX 2 is disconnected from the telephone line 224.

If the AUTO mode is selected, the AUTO lamp 154 is put on; if the F/T mode is selected, the F/T lamp 156 is put on; if the MANUAL mode is selected, no lamp 154, 156 is put on; if the TAD mode is selected, the two lamps 154, 156 are put on; and if the MC mode is selected, the MC lamp 158 is put on.

The FAX 2 receives FAX data from the second FAX 114, in one of a record-sheet-output mode, a PC-only mode, and a PC-priority mode.

The record-sheet-output mode is for recording the images represented by FAX data, on a record sheet or sheets 17, and outputting the image-recorded sheet(s). The PC-only mode is for causing the PC 4 to receive FAX data, when the PC 4 is currently in a state in which the PC 4 can receive data, and storing the FAX data in a buffer 252 (described later), when the PC 4 cannot receive any data. The PC-priority mode is for causing the PC 4 to receive FAX data, when the PC 4 can receive data, and causing the image-record device 29 to record the images represented by the FAX data, when the PC 4 cannot receive any data.

When the FUNCTION key 174 is pushed, the various functions of the FAX 2 are displayed one after another in a prescribed order on the display 150. If the SET key 176 is pushed with the indication of output-mode selection being output on the display 150, the selection of an output mode is started, so that upon operation of the cursor key 186, 188 the above mentioned three output modes (i.e., sheet-output, PC-only, and PC-priority modes) are displayed one after another in a prescribed order on the display 150. If the SET key 176 is pushed with the user's desired output mode being displayed, the selection of that output mode is finally fixed.

FIG. 4 shows the FAX control device 40 provided in a lower part of the housing 10 of the FAX 2. The control device 40 includes a data processing device in the form of a CPU (central processing unit) 200, a data memory device in the form of a RAM (random access memory) 202, a ROM (read only memory) 204, an EEPROM (electrically erasable and programmable ROM) 206, an input and output (I/O) port 210, and bus 211. Additionally, the FAX 2 includes a transmission and reception (T-R) control circuit 212, and a modem 214. The CPU 200 includes a DMAC (direct memory access channel) 208 and a parallel-to-serial and serial-to-parallel (P-S) converting circuit 240 (described later).

The DMAC 208 is for transferring data between the RAM 202 and the I/O port 210 without any intervention of the CPU 200. The DMAC 208 supplies a transfer-request signal to the CPU 200 through a 47th channel thereof and, if the CPU 200 generates a transfer-permission signal to the DMAC 208, the DMAC 208 commands a direct memory access for transferring data from the RAM 202 or EEPROM 206 to the I/O port 210, or from the I/O port 210 to the RAM 202.

The record-sheet sensor 20, remaining-toner measuring device 80, original-sheet sensor 98, sheet-end sensor 99, and operation panel 12 are connected to the I/O port 210. In addition, to the I/O port 210, the PC 4 is connected via the I/F box 6, and the external telephone line 224 is connected via a network control unit ("NCU") 222. To the NCU 222, the handset 11, outside answering telephone set 190, and speaker 226 are connected. A binary-coding circuit 228 and the image-record device 29 are connected to the I/O port 210. Furthermore, to the I/O port 210, the original-feed device 96, a calling-sound generating device in the form of a ringing device 232, and the inside message-record device 192 are connected via a first, a second, and a third drive circuit 230, 231, 233, respectively.

The binary-coding circuit 228 is for converting the image data produced by the image-read device 42, into binary data. Specifically, the circuit 228 judges whether an analog output voltage of each CCD of the device 42 is greater than a threshold value supplied from the EEPROM 206 (this digital threshold value is converted into a corresponding analog signal by the circuit 228), and produces a set of "0" or "white" data if a positive judgment is made and produces a set of "1" or "black" data if a negative judgment is made. Thus, sets of binary data are produced. In the case where the RESOLUTION key 180 has been operated to select the middle-tone mode, the circuit 228 converts the image data from the image-read device 42, into binary data, by utilizing a dither matrix.

The illuminous flux density produced by the light source 100 varies over an original sheet 90. For example, the central area of the original 90 may be radiated with higher illuminous flux densities than those for the peripheral area of the same 90. Accordingly, the output voltage of each CCD of the image-read device 42 may not accurately correspond to the degree of lightness (or darkness) of a corresponding picture element on the original 90. For solving this problem, the EEPROM 206 of the FAX 2 stores a threshold table containing a matrix of threshold values pre-determined based on different illuminous flux densities over an original 90 of each size.

The supplying of a threshold table from the EEPROM 206 to the I/O port 210 is carried out through the DMAC 208.

The image-read device 42 of the FAX 2 reads each line of image from an original sheet 90, in about 2.5 msec. Each line of an A4-size original 90 has a length corresponding to 1,728 picture elements. Thus, the image-read device 42 can read 8 picture elements in about 10 $\mu$sec (=2.5 msec/(1728/8)). Accordingly, the binary-coding circuit 228 receives the corresponding threshold values, every 10 $\mu$sec.

When the FAX 2 transmits image data to the PC 4, the P-S converting circuit 240 converts the image data into serial data. In addition, when the PC 4 transmits coded image data to the FAX 2, the P-S converting circuit 240 converts the image data into parallel data.

In the present embodiment, a clock signal is supplied to the P-S converting circuit 240, for about 1 msec, for converting 8-bit parallel data to serial data. Since the rate of data transmission between the FAX 2 and the PC 4 is 9,600 bps (bits per second), about 1 msec (=1/(9600×8)) is needed for converting 8-bit data into serial data.

This clock signal is supplied via the 47th input and output (I/O) channel of the CPU 200.

As described previously, the 47th I/O channel (i.e., clock-signal channel) of the CPU 200 is also used by the DMAC 208 to supply a data-transfer request to the CPU 200. Thus, the 47th I/O channel is used by both the DMAC 208 and the P-S converting circuit 240. The switching between the DMAC 208 and the P-S converting circuit 240 is carried out by a multiplexer (not shown). However, as described previously, when the 47th clock-signal I/O channel is used by the P-S converting circuit 240, the access of the DMAC 208 to the I/O channel is impossible for a period of at least 1 msec. Therefore, it is impossible that the multiplexer switches the 47th I/O channel between the DMAC 208 and the P-S converting circuit 240, at a cyclic period shorter than 1 msec. On the other hand, it is required to supply, to the I/O port 210, the threshold data at a cyclic period of 10 $\mu$sec. Thus, it is impossible to concurrently carry out the image reading of the image-read device 42 and the transmission of image data.

Meanwhile, the transferring of the binary-coded image data from the I/O port 210 to the RAM 202 is carried out in response to a command from the DMAC 208. This command is generated each time 8 bits of the image data are supplied to a pre-selected gate array of the I/O port 210.

The clock-signal supplying to the P-S converting circuit 240 is started by a clock-start signal from the CPU 200, and ended by a clock-end signal from the same 200. Therefore, the CPU 200 can execute another or other programs during a period in which the clock signal is being supplied to the P-S converting circuit 240.

Hence, while the FAX control device 40 supplies the clock signal to the P-S converting circuit 240, simultaneously the control device 40 carries out the coding of image data according to control programs (described later) pre-stored in the ROM 204.

As shown in FIG. 4, the P-S converting circuit 240 is provided with a first data reception (DR) interrupt disable flag 241, a first data transmission (DT) interrupt disable flag 242, a P-S reception data (RD) buffer 246, and a P-S transmission data (TD) buffer 246. The P-S TD buffer 246 is for temporarily storing data to be transmitted. The image data and command data transmitted from the PC 4 are input to a pre-selected gate array of the I/O port 210, subsequently are converted into parallel data by the P-S converting circuit 240, and then are stored in the P-S RD buffer 246. The image data and command data stored in the P-S TD buffer 248 are converted into serial data by the circuit 240, and subsequently are transmitted from a pre-selected port of the I/O port 210.

The T-R control circuit 212 is for exchanging communication-related information including facsimile numbers and resolution levels with the second FAX 114, when the FAX 2 is connected with the second FAX 114 via the external communication line 224.

The modem 214 modulates digital signals into analog signals, to output the analog signals to the external line 224 via the NCU 222, and demodulates the analog signals input from the external line 224 via the NCU 222, into digital signals. To this end, the modem 214 includes a modulating and demodulating (M-D) device 234, and a voice-reproduce device 236 for converting received analog sound data into audible sounds or voices. The M-D device 234, voice-reproduce device 236, NCU 222, handset 11, and others cooperate with one another to provide the telephone function or set of the FAX 2.

The modem 214 further includes a modem transmission data (TD) buffer 238, a modem reception data (RD) buffer 239, a second data reception (DR) interrupt disable flag 243, and a second data transmission (DT) interrupt disable flag 244, all of which are used when FAX data are transmitted to, or received from, the second FAX 114 as described later. The NCU 222 is for automatically receiving a call via the external line 224 when data are being transmitted via the same 224, and automatically calling another machine, such as the second FAX 114, via the external line 224 to transmit data via the same 224. The digital data representing the telephone or facsimile number of another machine to be called, are supplied from the CPU 200 to the NCU 222 via the I/O port 210.

The ringing device 232 generates a calling sound in accordance with the pattern of a command signal supplied from the FAX control device 40 to the second drive circuit 231, when the NCU 222 receives a call signal from the second FAX 114 or another telephone set via the external line 224. The second drive circuit 231 supplies electric voltage, and stop the supplying, to the second drive circuit 232, according to the pattern of the received call signal.

As shown in FIG. 5, the RAM 202 includes a PC received data (RD) buffer 250; a PC transmission data (TD) buffer 252; a FAX reception data (RD) buffer 254; a FAX transmission data (TD) buffer 256; a reading image-data buffer 258; a recording temporary buffer 260; a recording image-data buffer 262; a PC communication parameter (CP) buffer 263; an own facsimile number buffer 264; a dial buffer 266; a one-page data buffer 277; a decoding data buffer 270; a coding data buffer 271; an image-data-reception-related communication parameter (CP) buffer 290; a PC-data transmission flag 268; a DLE flag 272; a cancel flag 274; a print flag 276; a PC-TEL flag 278; a data reception ready flag 280; a FAX-data reception flag 282; a record-sheet output flag 284; an emergency flag 286; a PC output flag 288; a record-sheet-output-mode-related emergency reception flag 292; a PC-only-mode-related emergency reception flag 294; a PC-priority-mode-related emergency reception flag 296; a time-up flag 298; a flag A; a flag B; a flag C; a flag D; a flag E; a 0-fill-data counter 340; a 0-bite-data counter 342; a line counter 344; an image-data bit-number counter 346; an error-line counter 348.

The data which are received by the FAX 2 from the PC 4 and transmitted to the second FAX 114, are stored in the FAX TD buffer 256, and the FAX data received by the FAX 2 from the second FAX 114 are stored in the FAX RD buffer 254. The FAX data which are to be transmitted by the FAX 2 to the PC 4, are stored in the PC TD buffer 252, and the PC data which are received by the FAX 2 to be recorded, are stored in the PC RD buffer 250.

The RAM 202 includes a sharing buffer serving as each of the above data buffers 250, 252, 254, 256, 258, 260, 262, 263, 264, 266, 270, 271, 277, 290.

Figure 42:
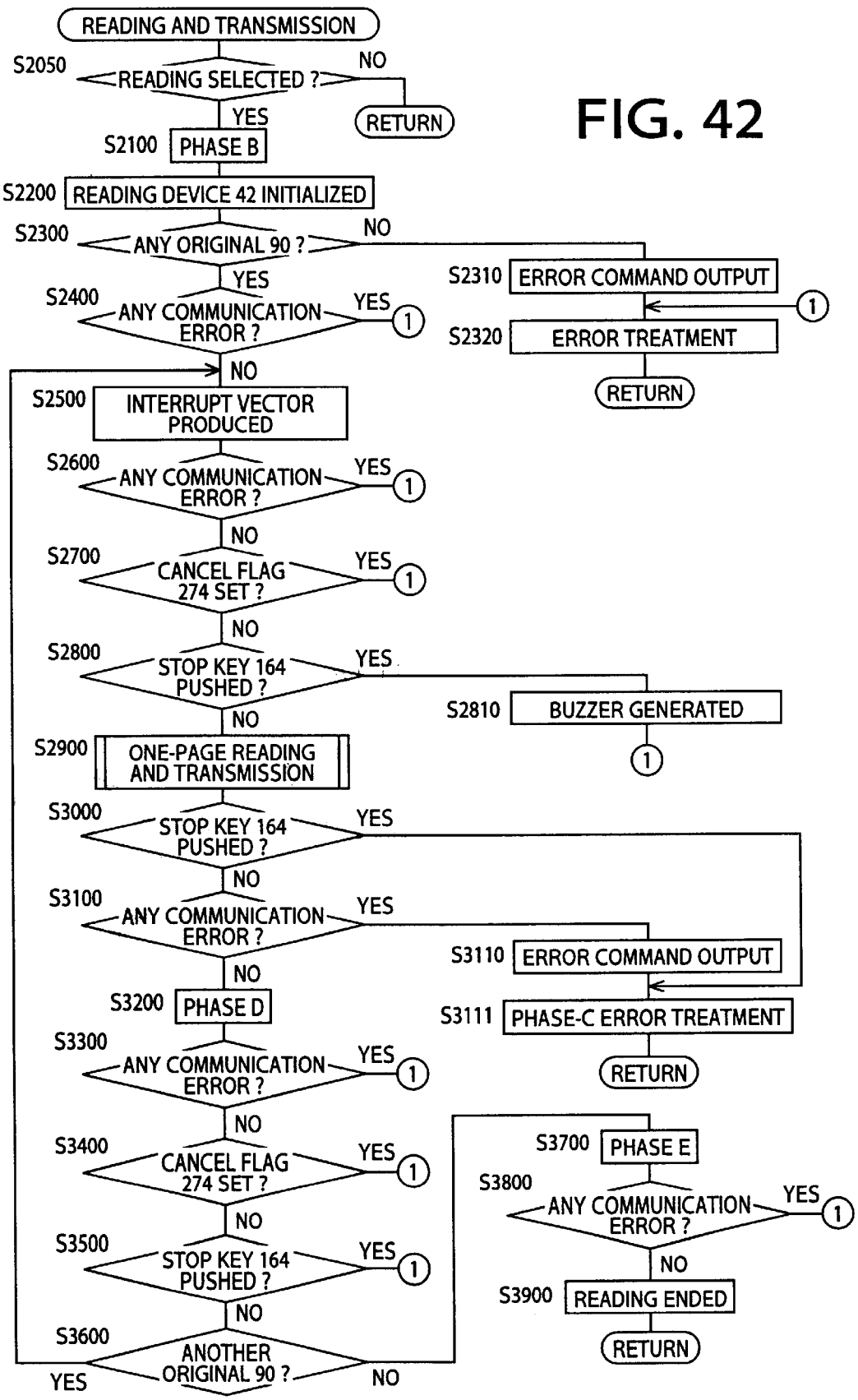
FIG. 42 is a flow chart representing a reading and transmission performing program pre-stored in the ROM of the FAX of FIG. 1.
Figure 43:
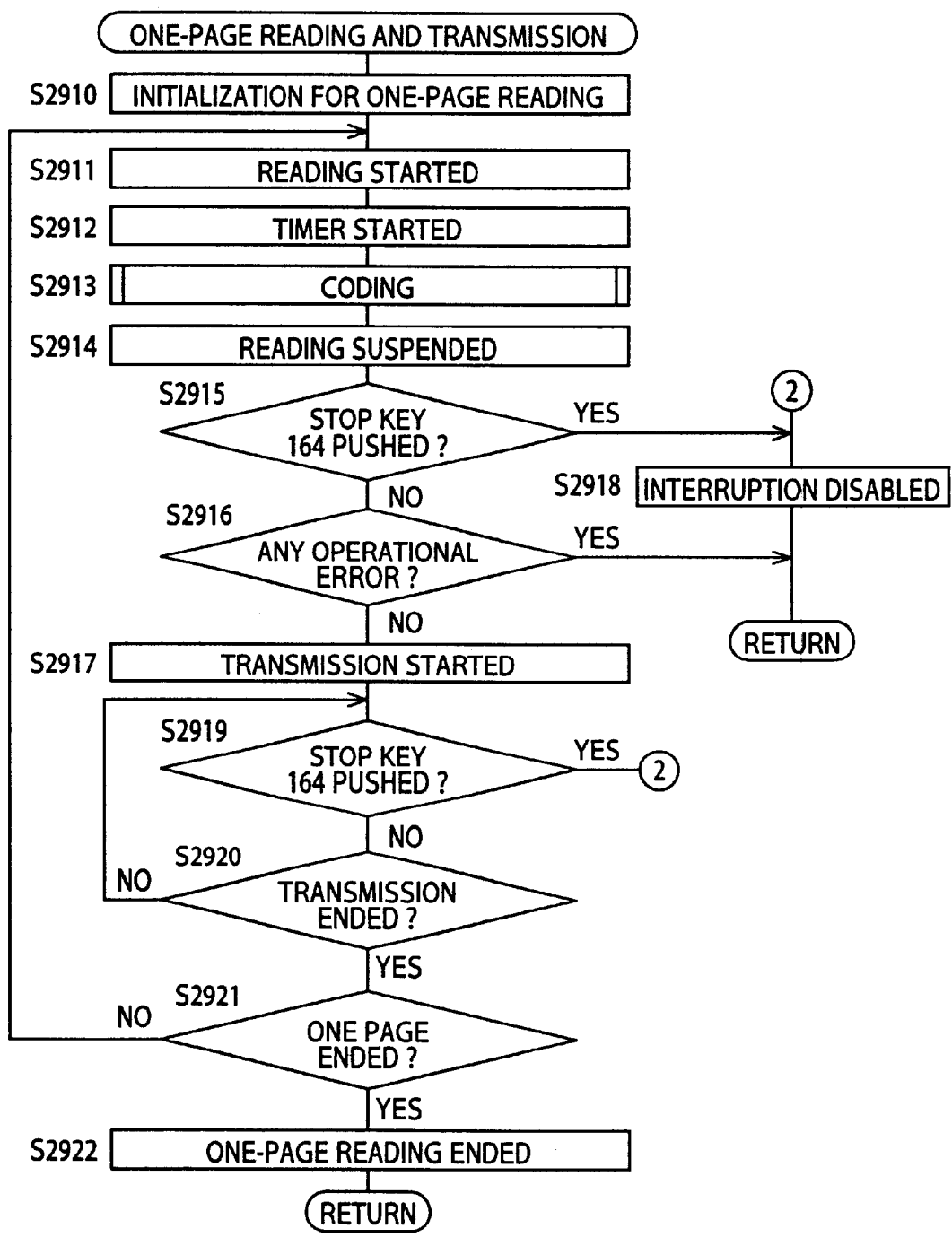
FIG. 43 is a flow chart representing a one-page reading and transmission performing program as a part of the program of FIG. 42.
Figure 44:
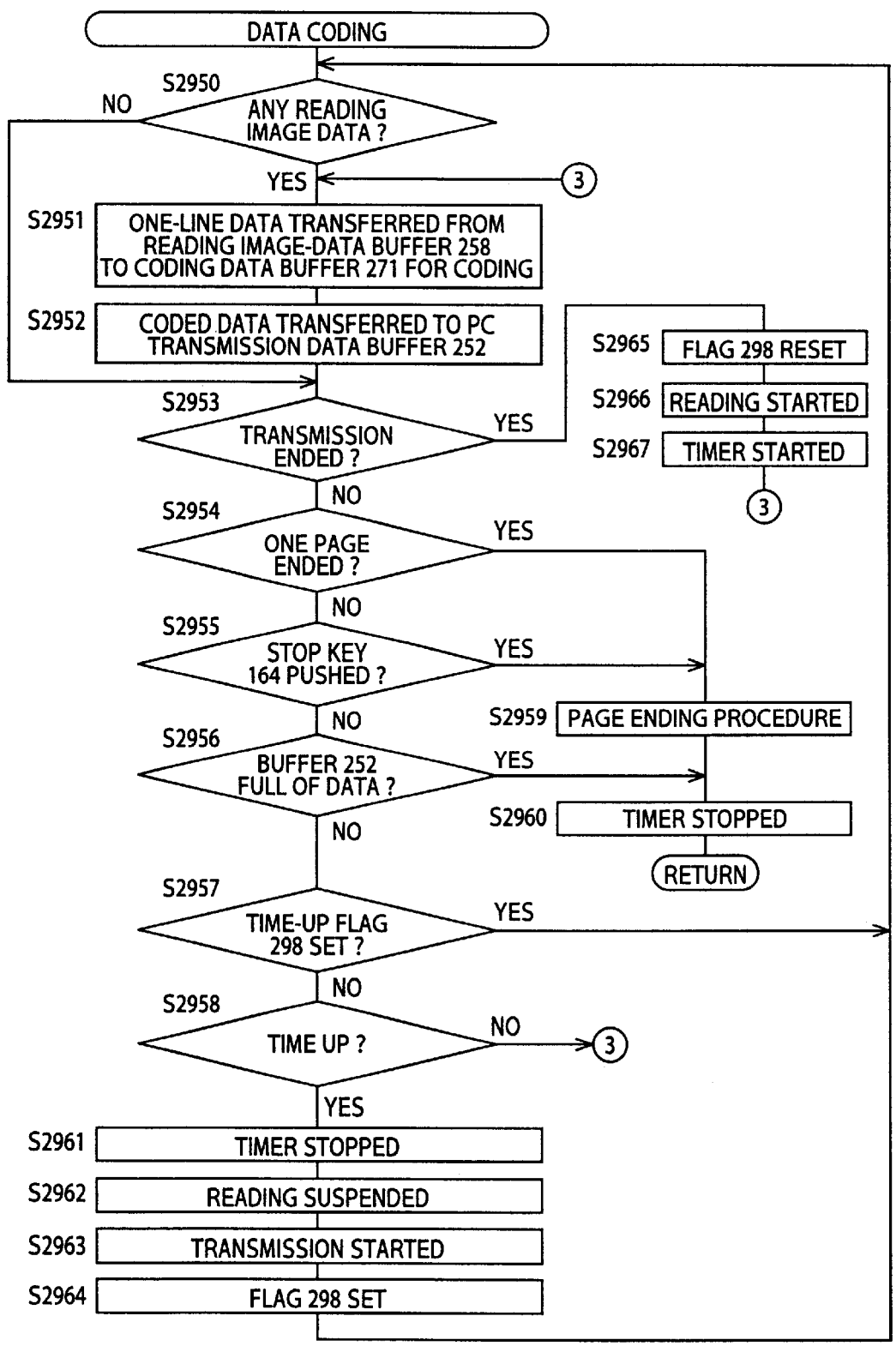
FIG. 44 is a flow chart representing a data coding program as a part of the program of FIG. 43.

The ROM 204 includes memory areas in which are stored an image-data coding program, an image-data decoding program, and the programs represented by the flow charts of FIGS. 9, 10, 14 to 20, 22 to 24, and 26 to 40, and a memory area in which is stored a reading and transmitting program represented by the flow charts of FIGS. 42, 43, and 44.

Figure 7:
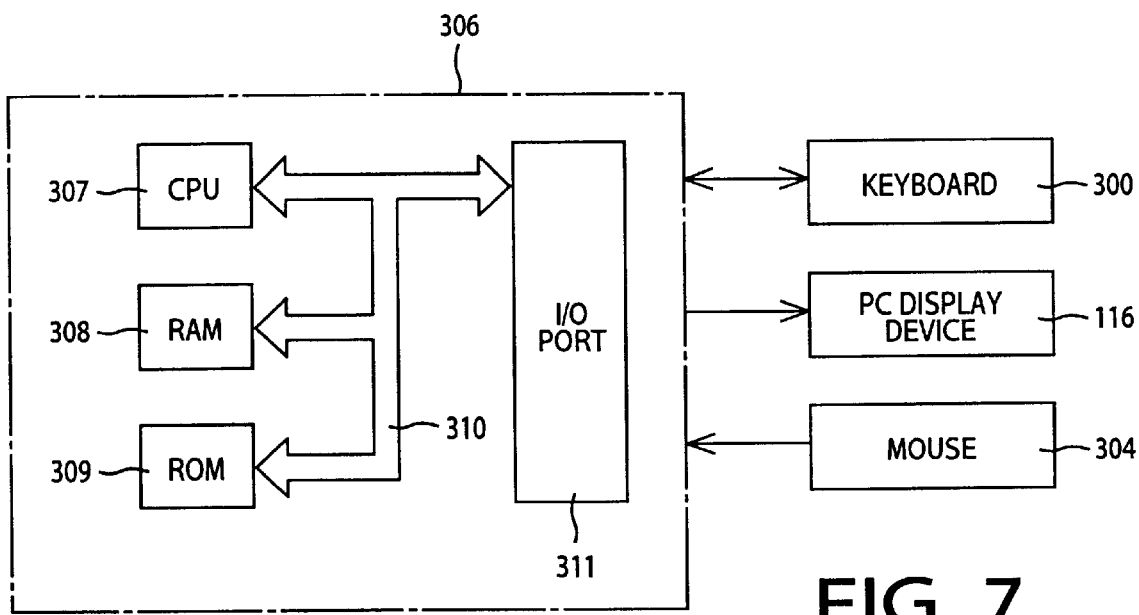
FIG. 7 is a block diagram of a control device of the PC of FIG. 1 and other elements connected to the PC control device.

The PC 4 includes, as shown in FIGS. 1 and 7, a keyboard 300, the PC display device 116, a mouse 304 connected to the keyboard 300, and a PC control device 306. The PC control device 306 includes a CPU 307 as a processing device, a RAM 308 and a ROM 309 as memory devices, and bus 310 for connecting the elements 307, 308, 309 with one another. The PC control device 306 further includes an I/O port 311 to which the keyboard 300, display device 116, and mouse 304 are connected.

Figure 6:
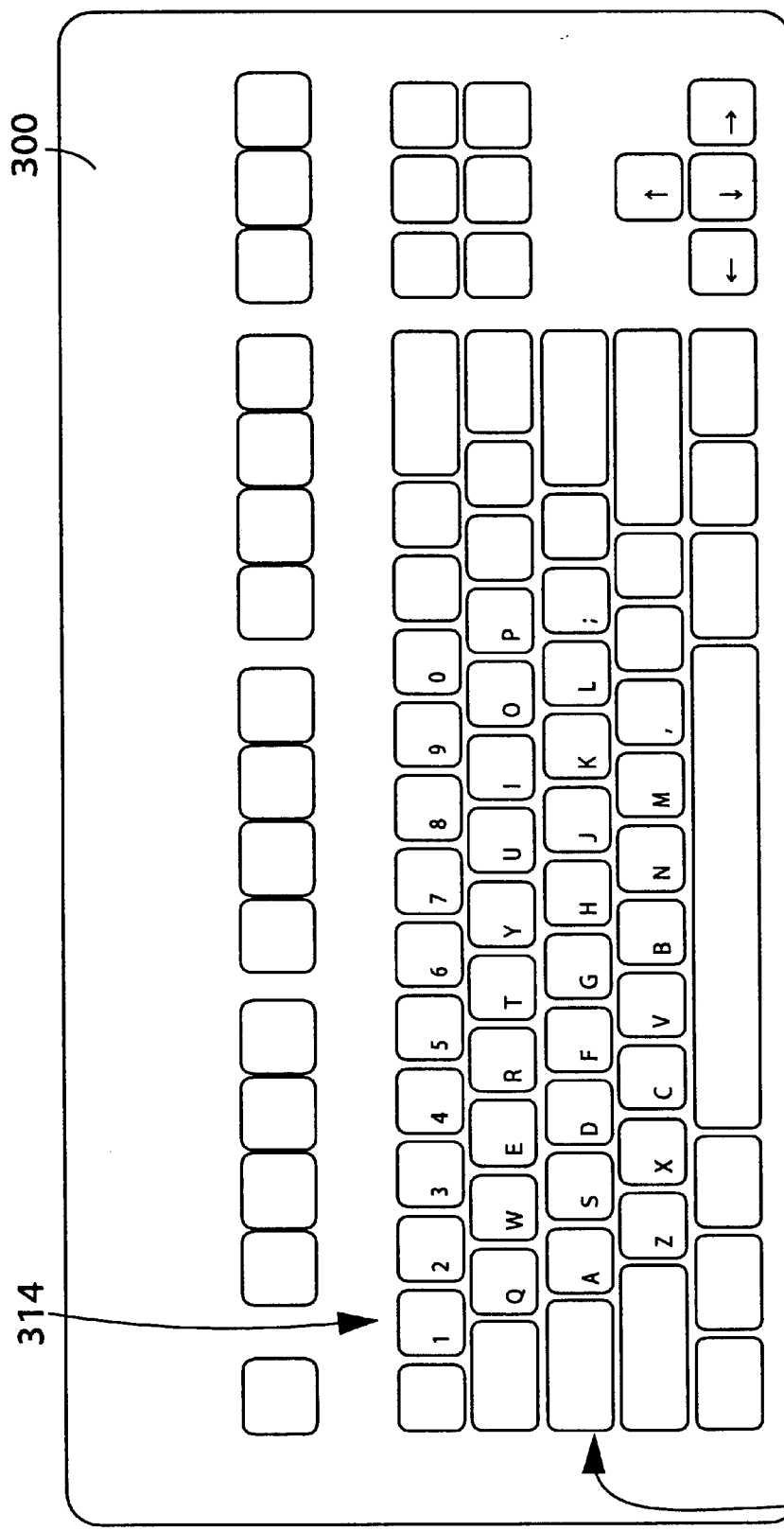
FIG. 6 is a plan view of a keyboard of the PC of FIG. 1.

The mouse 304 is manually operable by the user for selecting a desired one of the several functions (i.e., corresponding imaged pads) displayed on the display device 116. As shown in FIG. 6, the keyboard 300 are provided with alphabet character keys 312, numeral keys 314, etc., and is operable for inputting the facsimile or telephone number of a machine to which data are to be transmitted.

When the PC 4 is connected to the FAX 2, the PC display 116 displays at least the image pads corresponding to five functions, i.e., transmission, reception, recording, reading, and telephone call. The user can move a cursor (not shown) in a screen image on the display 116, by moving the mouse 304 on an operation plate (not shown), so that the cursor is moved to the user's desired one of the imaged pads or functions on the display 116. In this situation, the user can fix the selection of that function by pushing a first one of two buttons provided on the mouse 304, and cancel the selected function by pushing the other, second button. The user can start the selected function by pushing the first button of the mouse 304 once more.

In the case where the transmission function is selected, the PC 4 transmits PC data to the FAX 2, so that the FAX data contained in the PC data are transmitted to the second FAX 114.

If the reception function is selected, the PC 4 makes ready for receiving the FAX data transmitted from the second FAX 114 to the FAX 2. That is, the PC 4 starts a program for receiving the FAX data, so that the output mode of the FAX 2 is changed to the PC-only mode or the PC-priority mode and the PC 4 can receive the FAX data transmitted from the FAX 2.

If the reading function is selected, the image data produced by the image-read device 42 of the FAX 2 are transmitted to the PC 4.

If the recording function is selected, the PC 4 transmits PC data to the FAX 2 so that the images represented by the PC data are recorded by the image-record device 29.

If the telephone function is selected, the PC 4 specifies a telephone machine to be called by the telephone set of the FAX 2, so that the telephone set of the FAX 2 calls the telephone machine specified by the PC 4.

Figure 8:
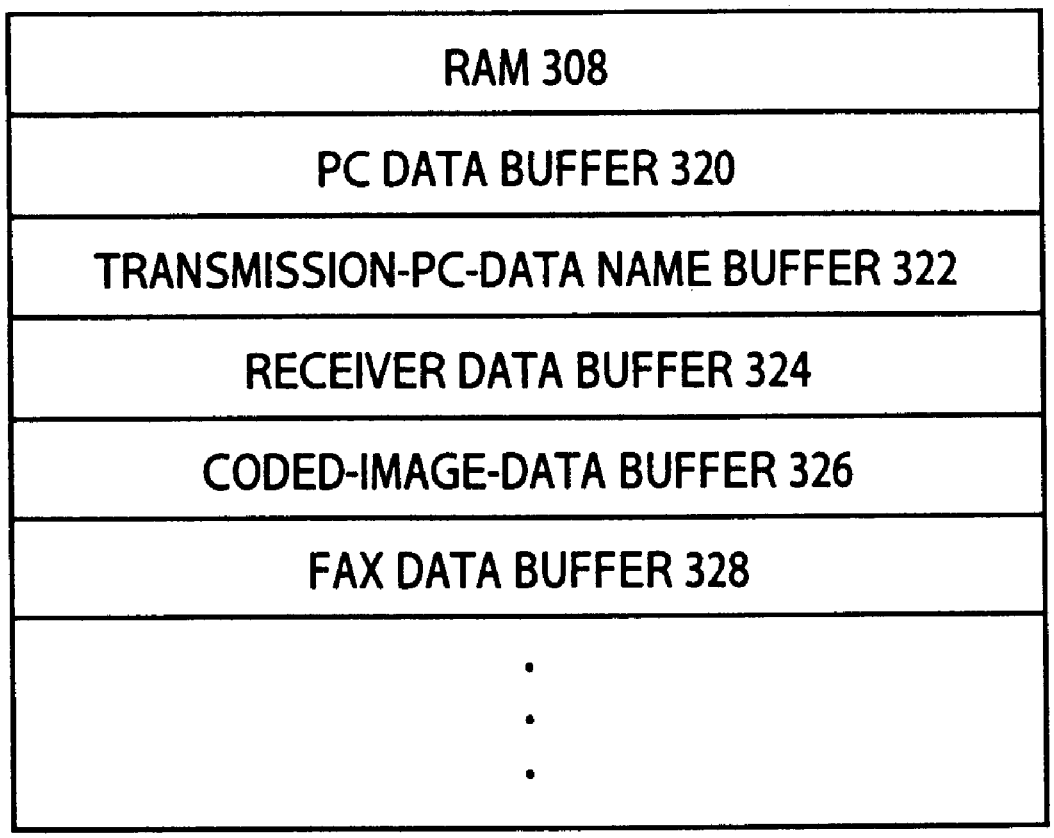
FIG. 8 is a diagrammatic view of a RAM of the PC control device of FIG. 7.
Figure 12:
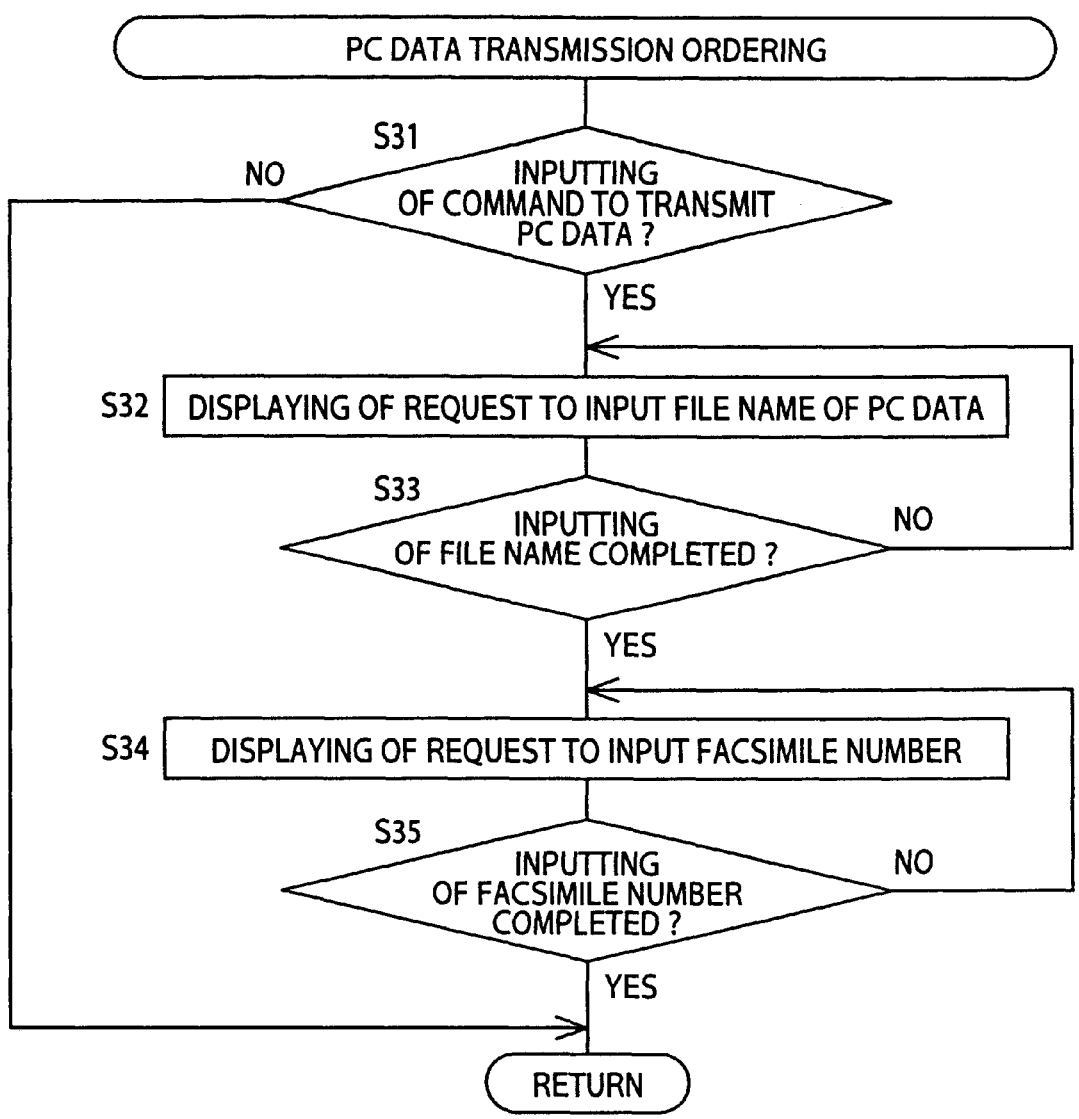
FIG. 12 is a flow chart representing a PC-data-transmission ordering program pre-stored in a ROM of the PC control device of FIG. 7.

As shown in FIG. 8, the RAM 308 of the PC 4 includes a PC data buffer 320, a transmission PC-data name buffer 322, a receiver data buffer 324, a coding image-data buffer 326, and a FAX data buffer 328. The ROM 309 of the PC 4 includes a memory area in which is stored a PC-data transmission ordering program represented by the flow chart of FIG. 12, and a memory area in which is stored a PC-data transmitting program represented by the flow chart of FIG. 13.

The communication between the FAX 2 and the second FAX 114 progresses in five phases, Phases A to E. Phase A is for sending a call and establishing a communication line between the FAX 2 and the second FAX 114; Phase B is for detecting the conditions of the personal and modem cables 7, 8 (e.g., data lines) and specifying the communication parameters such as resolution and/or sheet width. Phase C is for transmitting message such as image data, and Phase D is for making pauses in message and identifying the reception of message. Until all the batch of message to be transmitted has been transmitted, Phase B or Phase C is repeated and the transmission of message continues. Phase E is for terminating the call, i.e., disconnecting the FAX 2 from the external line 224, or the second FAX 114.

The communication between the FAX 2 and the PC 4 does not require Phase A, i.e., sending a call or establishing a communication line therebetween. Therefore, the communication progresses in four phases, Phases B to E.

Phases A to E will be described later in more detail.

Next, there will be described the operation of the FAX 2 constructed as described above.

While the FAX 2 is in an idling state, the FAX 2 is waiting for starting of one of the functions of FAX data transmission, reception, recording, image reading, and telephone talk.

When the PC 4 transmits command data to the FAX 2 being in the idling state, the FAX 2 receives the command data and operates for responding to the command data.

The transmission and reception of coded image data and command data between the FAX 2 and the PC 4, are carried out by interruption. The FAX 2 is provided with various control programs or interrupt handlers for interrupt processing. The FAX 2 produces an interrupt vector to specify an appropriate one of the interrupt handlers which corresponds to an interrupt signal being generated.

An interrupt signal is generated each time 8-bit data are stored in the P-S RD buffer 246, or each time the P-S TD buffer 248 becomes empty. The execution of an interrupt handler in response to generation of an interrupt signal, is inhibited or permitted by setting or resetting of the first DR interrupt disable flag 241 and the first DT interrupt disable flag 242 of the P-S converting circuit 240. The first DR interrupt disable flag 241 is always reset to an interrupt-permitting state in which the interrupt flag 241 permits interruption. Thus, in the present embodiment, the FAX 2 is always ready for responding to data transmission thereto.

In the case where the FAX 2 transmits image data or command data to the PC 4, the execution of an interrupt handler is usually inhibited and, only when the data are actually transmitted, the execution is permitted by producing an interrupt vector. In the case where the FAX 2 receives image data or command data from the PC 4, only the production of an interrupt vector is performed, since the first DR interrupt disable flag 241 is always reset to the interrupt-permitting state, i.e., since the data-reception interrupt processing is always permitted.

In the FAX 2, the production of an interrupt vector and the setting and resetting of the first DT interrupt disable flag 242 are carried out according to each individual control program to transmit PC data, to record PC data, or to transmit received FAX data to the PC 4. The order of transmission or reception of image data and command data is prescribed, and the sorts of the command data used are also prescribed. When image data or command data are transmitted or received according to each individual control program, the production of an interrupt vector and the setting and resetting of the first DT interrupt disable flag 242 are performed. However, a further explanation of those operations is omitted since those operations are not pertinent to the present invention.

Interrupt processing for reception or transmission of command data between the FAX 2, being in the idling state, and the PC 4 will be described by reference to an idling-related command-data-reception P-S interrupt handler represented by the flow chart of FIG. 9 and an idling-related command-data-output P-S interrupt handler represented by the flow chart of FIG. 10, respectively.

Figure 9:
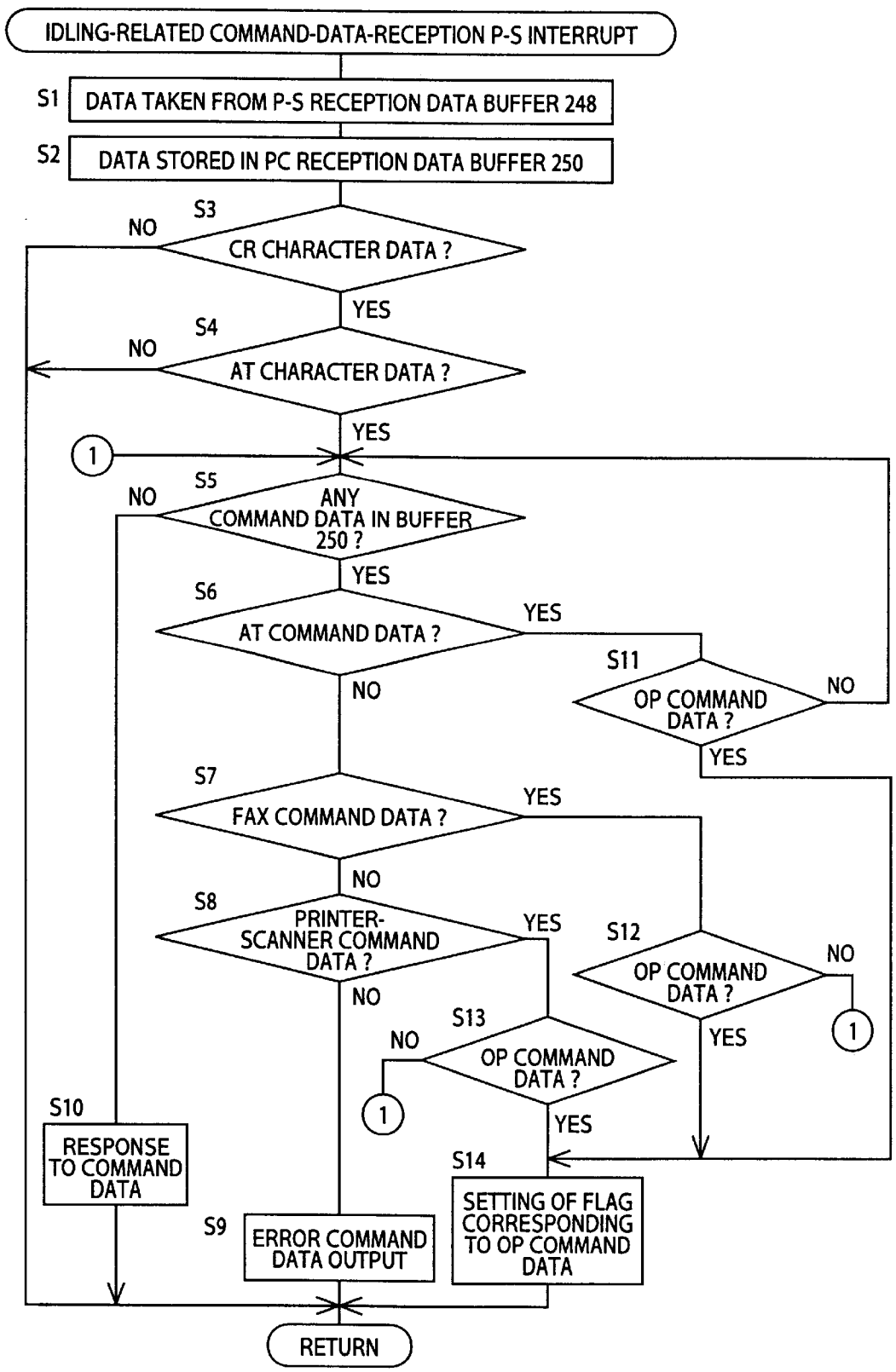
FIG. 9 is a flow chart representing an idling-related command-data-reception P-S interrupt handler pre-stored in a read only memory (ROM) of the FAX control device of FIG. 4.

If the PC 4 transmits command data to the FAX 2, the FAX 2 executes the idling-related command-data-reception P-S interrupt handler of FIG. 9. First, at Step S1, the CPU 200 of the FAX control device 40 takes out one bite of data from the P-S RD buffer 246 of the P-S converting circuit 240 and, at Step S2, the CPU 200 stores the data in the PC RD buffer 250 of the RAM 202. Subsequently, at Step S3, the CPU 200 judges whether the data are data indicative of the end of command data, i.e., CR character data.

If a negative judgment is made at Step S3, one control cycle of this program is ended, and the control of the CPU 200 starts with Step S1 again.

If a positive judgment is made at Step S3 while this program is repeated, the control goes to Step S4 to judge whether the data which have been stored in the PC RD buffer 250 until then contain AT character data indicative of the start of command data. A positive judgment made at Step S4 means that a batch of command data have been transmitted from the PC 4 to the FAX 2. The, the control goes to Step S5 and the following steps. Each batch of command data start with AT character data, contains, following the AT character data, content data indicative of the contents of the command data, and ends with CR character data. If CR character data are identified at Step S3 and AT character data are found at Step S4, the CPU 200 judges that a batch of command data have been transmitted from the PC 4.

If the command data contain content data between CT character data and AT character data, a positive judgment is made at Step S5. Then, the control of the CPU 200 goes to Steps S6, S7, and S8 to judge whether the command data are AT command data, FAX command data, or PRINTER-SCANNER command data. AT command data relate to a command to start communication with another or second machine, including dialing the second machine (i.e., sending out, into the external line 224, a pulse signal corresponding to a facsimile or telephone number of the second machine). FAX command data relates to a command to specify a procedure needed to transmit or receive FAX data (i.e., coded image data). PRINTER-SCANNER command data relate to a command to specify various parameters, such as respective levels of communication parameters, needed for the FAX 2 to record PC data, or read images according to instructions from the PC 4.

If the command data are AT command data, a positive judgment is made at Step S6, so that the control goes to Step S11 to judge whether the content data of the AT command data are operation (OP) command data to command some sort of operation, such as dialing. If the AT command data contain OP command data, the control goes to Step S14 to set a flag corresponding to the operation indicated by the OP command data. Similarly, if a positive judgment is made at Step S7 or Step S8, the control goes to Step S12 or Step S13, respectively, to judge whether the command data contain OP command data. In either case, if the command data contain OP command data, the control goes to Step S14 to set a flag corresponding to the operation indicated by the OP command data.

If the command data do not contain any OP command data, a negative judgment is made at Step S11, S12, or S13, so that the control goes back to Step S5. However, no command data remain in the PC RD buffer 250 since the command data in question have been taken out. Therefore, a negative judgment is made at Step S5, so that the control goes to Step S10 to respond to the command data. For example, in the case where the content data of the command data are data to request a list of selectable levels of communication parameters of the FAX 2, the FAX 2 transmits data indicative of the parameter list to the PC 4.

On the other hand, if the content data of the command data are not AT, FAX, or PRINTER-SCANNER command data, the control goes to Step S9 to transmit, to the PC 4, ERROR command data indicating that the command data received from the PC are erroneous command data.

If the command data transmitted to the FAX 2 contains no command data between the AT and CR data thereof, a negative judgment is made at Step S5, so that the control goes to Step S10 to respond according to the command data. Even in this case, the FAX 2 transmits, to the PC 4, OK command data indicating that the FAX 2 has received the command data, or ERROR command data.

The outputting of ERROR or OK command data at Step S10, or the outputting of ERROR command data at Step S9, is carried out by writing the ERROR or OK command data in the PC TD buffer 252. The command data written in the buffer 252 are output to the PC 4 according to the idling-related command-data-output P-S interrupt handler of FIG. 10.

Figure 10:
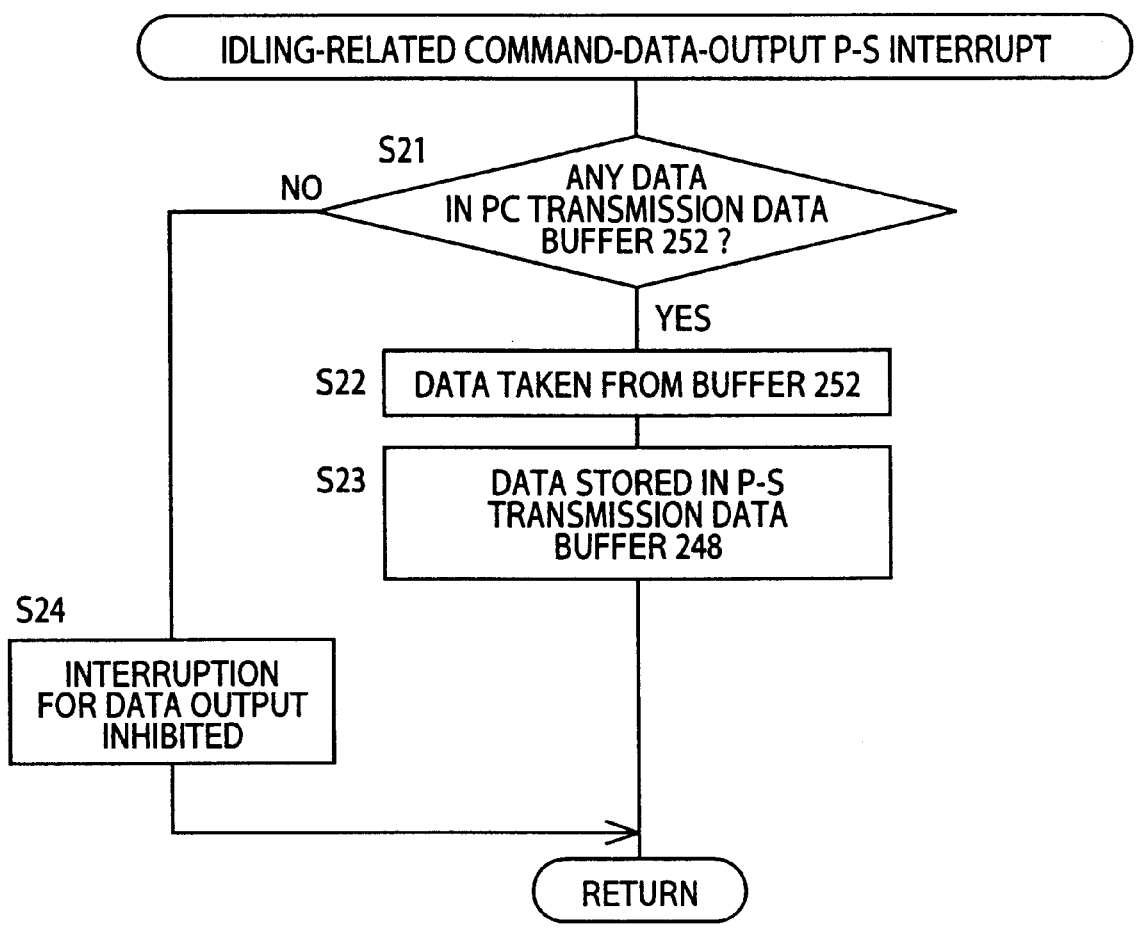
FIG. 10 is a flow chart representing an idling-related command-data-output P-S interrupt handler pre-stored in the ROM of the FAX of FIG. 1.

At Step S21 of FIG. 10, the CPU 200 judges whether some data remain in the PC TD buffer 252. If a positive judgment is made at Step S21, the control goes to Step S22 to take out the data from the PC TD buffer 252, and subsequently to Step S23 to store the data in the P-S TD buffer 248 of the P-S converting circuit 240. On the other hand, if no data is left in the PC TD buffer 252, a negative judgment is made at Step S21, so that the control goes to Step S24 to inhibit interruption from being carried out for outputting command data. Thus, when no data remains in the PC TD buffer 252, no data-output processing is effected.

The FAX 2 carries out, according to respective instructions from the PC 4, three operations, i.e., (a) transmission of PC data to the second FAX 114, (b) recording of PC data, and (c) transmission of a telephone call to another telephone set which may be a telephone set incorporated in the second FAX 114. First, there will be explained (a) the transmission of PC data to the second FAX 114.

Figure 11:
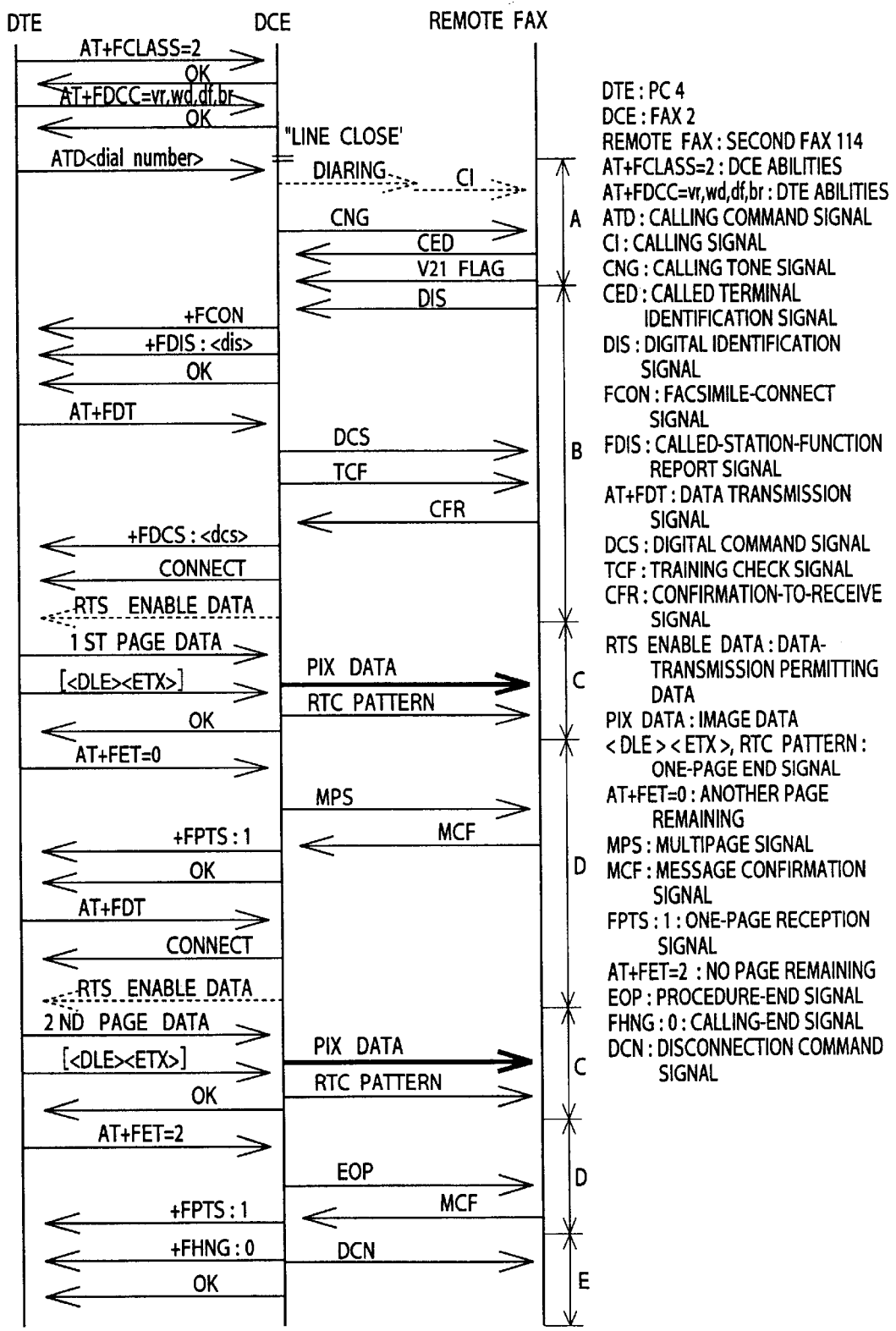
FIG. 11 is a sequence chart showing the manner of transmission and reception of image data and command data when the PC of FIG. 1 transmits data via the FAX of FIG. 1 to another facsimile machine (second FAX)

FIG. 11 shows a sequence chart representing steps carried out for receiving PC data from the PC 4 and transmitting the PC data to the second FAX 114. In FIG. 11, DTE (data terminal equipment) is the PC 4; DCE (data circuit terminating equipment) is the FAX 2; and REMOTE FAX is the second FAX 114.

While the FAX 2 is in the idling state before the PC 4 commands the FAX 2 to receive PC data transmitted therefrom, the PC 4 transmits command data, AT+FCLASS=2, to specify the data-transmission and data-reception abilities of the FAX 2. If the data transmission and reception abilities of the FAX 2 is the level of CLASS=2, the FAX 2 outputs OK command data to the PC 4. In addition, the PC 4 outputs, to the FAX 2, a signal, AT+FDCC=vr,wd,df,br, representing the communication parameters of the PC 4, and the FAX 2 stores the signal, AT+FDCC=vr,wd,df,br, in the PC CP buffer 263 and returns OK command data to the PC 4. The symbol, vr, indicates image resolution; wd sheet width; df data coding method; and br data transmission speed. The signal AT+FDCC contains the respective levels of the parameters vr, wd, df, br.

The PC 4 outputs, in response to a command to transmit PC data to the FAX 2, command data, ATD+STRING (STRING is a series of numbers or digits representing a facsimile number), to command the FAX 2 to send out the facsimile number of the second FAX 114 into the external line 224 so as to call the second FAX 114 and transmit image data to the second FAX 114. According to the command data, the FAX 2 connects itself to the external line 224, i.e., closes the line 224, and dials the facsimile number, so that a CI signal is transmitted to the second FAX 114. When the FAX 2 transmits FAX data, the FAX 2 outputs a CNG signal (calling tone signal) to the second FAX 114.

In response thereto, the second FAX 114 returns a CED signal (called station identification signal) and a V21 flag to the FAX 2. A V21 flag is transmitted each time the directions of transmission of command data between two stations are changed and accordingly a new signal or command data are output from one station to the other. The V21 flags ensure that two stations at both ends of a communication line are appropriately controlled so that data are continuously transmitted without being damaged between the two stations. The steps from the step of dialing to the step of receiving a V21 flag correspond to Phase A.

Following the V21 flag, the second FAX 114 transmits a DIS signal (digital identification signal) to the FAX 2 as a calling terminal station. The DIS signal indicates the data-reception and transmission parameters (resolution, sheet width, data coding method, data transmission speed, etc.) of the second FAX 114 as a called terminal station. When the FAX 2 receives the DIS signal, the FAX 2 transmits, to the PC 4, a +FCON signal (facsimile-connect signal), a +FDIS signal (called-station-function report signal), and an OK signal. In response thereto, the PC 4 outputs an AT+FDT signal (data transmission signal) to the FAX 2. Subsequently, the FAX 2 outputs a DCS signal (digital command signal) to the second FAX 2. The DCS signal indicates the respective levels of communication parameters which have been specified based on the communication parameters of the second FAX 114 represented by the DIS signal and which are to be used for data communication between the FAX 2 and the second FAX 114. In the case where PC data are transmitted from the PC 4 to the second FAX 114, the DCS signal indicates the highest levels of communication parameters which are common to the PC 4 and the second FAX 114, as described previously.

The symbols +FCON and +FDIS are the abbreviations of AT+FCON and AT+FDIS, respectively. In the flow charts represented by the following figures, the symbol '+' is omitted from the symbols +FCON, +FDIS.

The FAX 2 additionally transmits a TCF signal (training check signal) to the second FAX 114. The FAX 2 outputs, as the TCF signal, a prescribed number of sets of '0' bit data in a prescribed time duration, so that the second FAX 114 checks if the same 114 can receive those bit data. Thus, the FAX 2 checks if coded image data can be transmitted and received at the transmission speed specified between the two FAX machines 2, 114. If the checking result indicates that it is impossible to carry out the data communication at the specified speed, the FAX 2 lowers the speed in response to a request from the second FAX 114, and carries out the same checking again.

On the other hand, if the checking result indicates that it is possible, the second FAX 114 outputs a CFR signal (confirmation to receive signal) to the FAX 2, thereby reporting that all steps necessary before transmission of image data have been completed and the FAX 2 can start transmitting image data to the second FAX 114.

In response to the CFR signal, the FAX 2 outputs, to the PC 4, a +FDCS signal indicative of the respective levels of communication parameters specified between the FAX 2 and the second FAX 114, and additionally outputs a CONNECT signal. If the FAX TD buffer 256 has any capacity remaining for storing PC data, the FAX 2 supplies, through the RTS control signal line, an RTS ENABLE signal indicating that the FAX 2 can receive PC data from the PC 4. On the other hand, if the FAX TD buffer 256 has no capacity remaining for storing PC data, the FAX 2 supplies, through the RTS control signal line, an RTS DISABLE signal indicating that the FAX 2 cannot receive PC data from the PC 4 and thereby inhibiting the transmission of PC data. Phase B ends with the outputting of the CONNECT signal.

The checking about whether the FAX TD buffer 256 has any capacity remaining for storing PC data, is carried out by checking whether the buffer 256 is full with data and, if the buffer 256 is full, checking whether the shared buffer of the RAM 202 is also full with data. This checking manner also applies to all the other data buffers. When the PC 4 receives the RTS ENABLE signal from the FAX 2, the PC 4 supplies PC data to the FAX 2. On the other hand, when the PC 4 receives the RTS DISABLE signal from the FAX 2, the PC 4 does not supply PC data to the FAX 2.

In a state in which the PC 4 can transmit data to the FAX 2, first, the PC 4 sends out the first page of coded image data (i.e., PIX DATA) to the FAX 2 which in turn sends out the received data to the second FAX 114. Each page of data contains, at the end thereof, <DLE><ETX> data in response to which the FAX 2 outputs, to the second FAX 114, an RTC (return to control) PATTERN signal indicating that the transmission of one page of image data is ended and is changed to the transmission of command data. Phase C ends with the outputting of the RTC PATTERN signal.

Phase C is followed by Phase D that starts with the outputting of OK data to the PC 4. In response thereto, the PC 4 outputs, to the FAX 2, an AT+FET=X signal indicative of whether another page follows. If the value of X is zero (i.e., AT+FET=0), another page follows; on the other hand, if the value of X is two, no page remains. In the case where another page remains, the FAX 2 transmits, to the second FAX 114, an MPS (multipage signal) signal indicating that the transmission of one page is ended and that the data transmission steps re-start with the beginning of Phase C. In response thereto, the second FAX 114 outputs, to the FAX 2, an MCF signal (massage confirmation signal) indicating that the coded image data which have been transmitted from the FAX 2 have completely been received by the second FAX 114.

In the case where the respective levels of communication parameters are re-specified, i.e., changed when the transmission of one page of data ends, the FAX 2 transmits, to the second FAX 114, an EOM (end of message) signal in place of the MPS signal, so that the data transmitting steps return to the beginning of Phase B.

Subsequently, the FAX 2 outputs, to the PC 4, a +FPTS:1 signal indicating that the second FAX 114 has completely received one page of data, and additionally outputs OK command data. In response thereto, the PC 4 outputs, to the FAX 2, an AT+FDT signal in response to which the FAX 2 outputs a CONNECT signal to the PC 4 and outputs the RTS ENABLE (or RTS DISABLE) signal through the RTS control signal line to the PC 4. Then, Phase C begins and the PC 4 transmits another page of coded image data (PIX DATA) to the FAX 2 which in turn transmits the data to the second FAX 114. The transmission and reception of AT+FDT and CONNECT signals and the selection of the RTS ENABLE or RTS DISABLE signal, being the same operations as a part of Phase B, are carried out at Phase D, so that Phase D is followed by the beginning of Phase C to transmit the second page of data to the FAX 2 at the unchanged levels of communication parameters.

If no page of coded image data remains after the transmission of one (e.g., second) page of data is ended, the PC 4 in Phase D outputs, to the FAX 2, an AT+FET=2 indicative of no page remaining. In response thereto, the FAX 2 transmits, to the second FAX 114, an EOP (end of procedure) signal indicating that the transmission of one page has been completed and no other transmission data remain. Subsequently, the FAX 2 receives an MCF signal from the second FAX 114 and outputs a +FPTS:1 signal to the PC 4. Then, Phase D proceeds with Phase E in which, first, the FAX 2 outputs, to the PC 4, a +FHNG:0 signal indicative of the end of the data communication, and outputs, to the second FAX 114, a DCN signal (disconnect signal) and disconnects itself from the external line 224, i.e., opens the line 224. Subsequently, the FAX 2 transmits an OK signal to the PC 4. Thus, all the steps or procedures for data transmission are ended.

In the above explanation of the sequence chart of FIG. 11, the CNG and CED signals each are provided by a pulse signal, and all the other signals are provided by sets of bit data each set of which can take the value of 0 or 1.

When the PC 4 transmits PC data as described above, the PC 4 specifies the PC data to be transmitted and a machine to which the PC data are to be transmitted. The PC data transmission parameter specifying procedure is carried out according to a PC-data transmission ordering program represented by the flow chart of FIG. 12. First, at Step S31, the CPU 307 of the PC control device 306 of the PC 4 judges whether the user inputs, through the keyboard 300, a command to transmit PC data to the FAX 2. If a positive judgment is made at Step S31, the control goes to Step S32 to display, on the PC display device 116, a request to the user to select one of batches of PC data stored in the PC data buffer 320 of the RAM 308 and input the file name of the selected PC data to be transmitted. Step S32 is followed by Step S33 to judge whether the inputting of the file name has been completed.

Steps S32 and S33 are repeated until a positive judgment is made at Step S33. The file name of the selected PC data is stored in the transmission-PC-data name buffer 322. If a positive judgment is made at Step S33, the control goes to Step S34 to display, on the display 116, a request to the user to input receiver data specifying a facsimile machine which is to receive the PC data, for example, the second FAX 114. The specifying of the second FAX 114 is carried out by inputting a facsimile number allotted to the second FAX 114, the facsimile number including an area code number for the area in which the second FAX 114 is in use. The receiver data are stored in the receiver data buffer 324. If the specifying of the second FAX 114 is completed, a positive judgment is made at Step S35, and one control cycle of this program is ended.

The image data of the PC data selected to be transmitted are coded, and are stored in the coded-image-data buffer 326 of the RAM 308.

Figure 13:
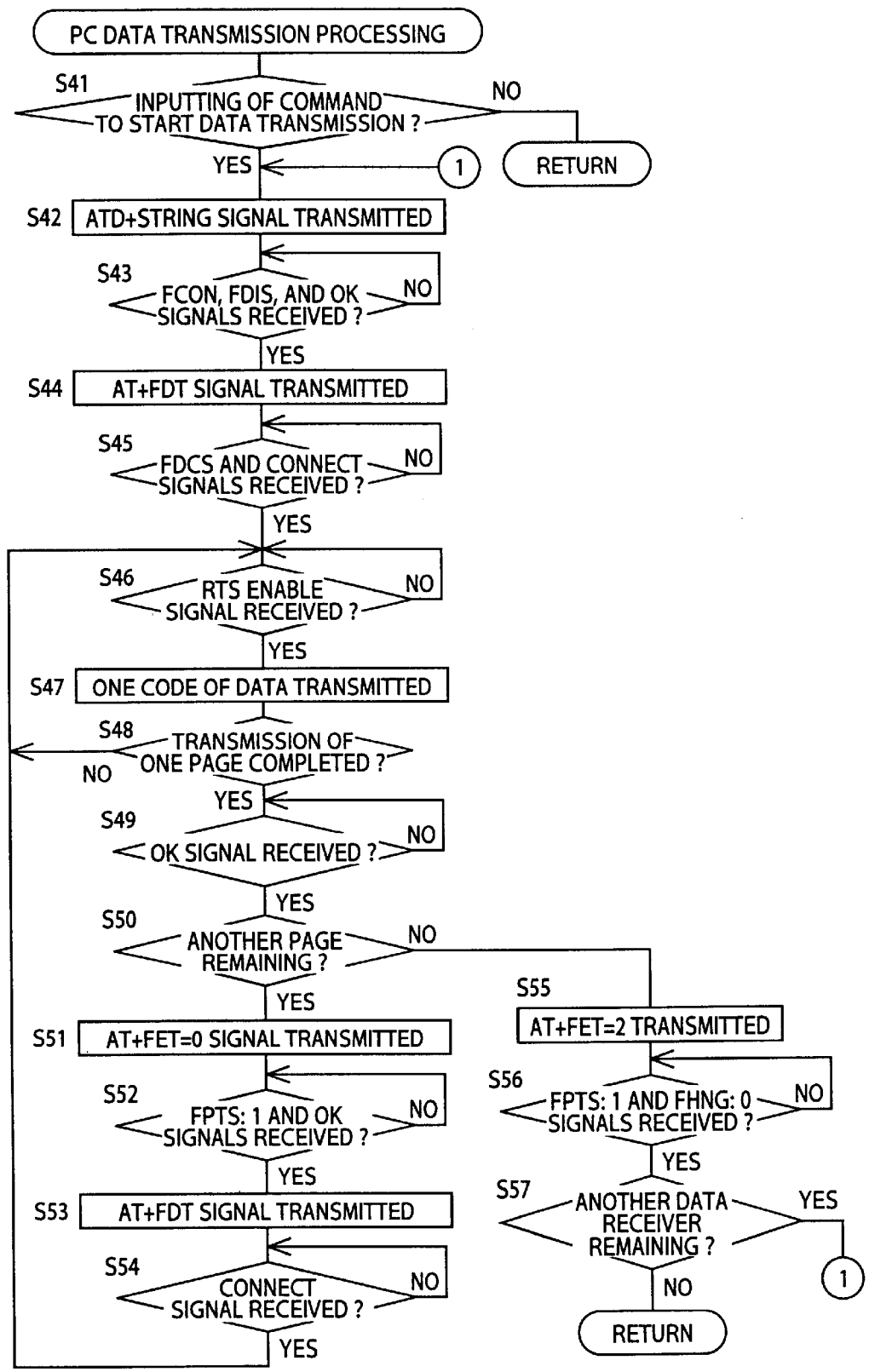
FIG. 13 is a flow chart representing a PC-data transmitting program pre-stored in the ROM of the PC of FIG. 1.

If the user inputs a command to start the transmission of PC data after the PC data and the second FAX 114 are specified, a positive judgment is made at Step S41 of a PC data transmitting program of FIG. 13. Step S41 is followed by Step S42 to output, to the FAX 2, an ATD+STRING signal to command the FAX 2 to dial the facsimile number of the second FAX 114 and transmit the image data. At Steps S43, S44, S45, and S46, the PC 4 outputs and receives various signals to and from the FAX 2, as indicated at Phase B in the PC-data-transmission sequence chart of FIG. 11. If the FAX 2 outputs an RTS ENABLE signal to the PC 4, a positive judgment is made at Step S46, and the control goes to Step S47 to transmit one code of data to the FAX 2. Steps S46 to S48 are repeated until one page of coded image data is transmitted from the PC 4 to the FAX 2. If, meanwhile, the FAX TD buffer 257 of the FAX 2 becomes full with data and has no capacity for storing additional data, a negative judgment is made at Step S46, and the PC 4 waits for a positive judgment to be made at Step S46 again.

When the transmission of one page of coded image data ends, a positive judgment is made at Step S48, and the PC 4 receives OK command data from the FAX 2. Therefore, a positive judgment is made at Step S49, and the control goes to Step S50 to judge whether another page of coded image data remains for being transmitted. If a positive judgment is made at Step S50, Steps S51, S52, S53, and S54 are carried out as indicated at Phase D in the sequence chart of FIG. 11. Then, the control of the CPU 307 returns to Step S46, so that the next page of coded image data is transmitted to the FAX 2. On the other hand, if a negative judgment is made at Step S50, i.e., if no page remains, Steps S55 and S56 are carried out to terminate the data communication, and subsequently the control goes to Step S57 to judge whether another set of receiver data remains in the receiver data buffer 324. In the case where the user has specified two or more facsimile machines to which the PC data are transmitted, a positive judgment is made at Step S57, so that the control goes back to Step S42 to transmit the second set of receiver data to the FAX 2. When the PC data have been transmitted to all the data receivers specified by the user, a negative judgement is made at Step S57, and one control cycle of this program is ended.

Figure 14:
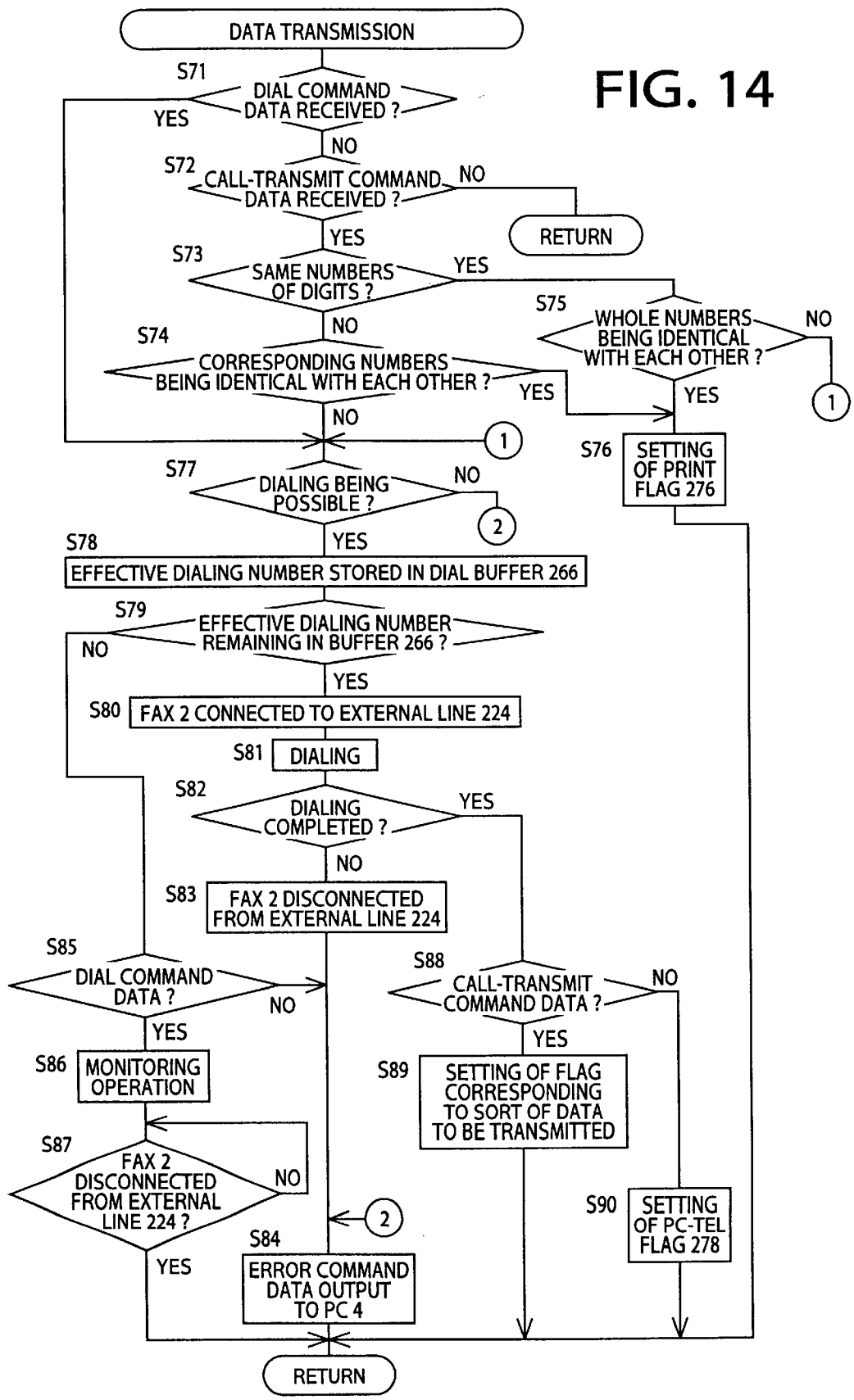
FIG. 14 is a flow chart representing a data transmitting program pre-stored in the ROM of the FAX of FIG. 1.

When the PC 4 transmits call-transmit command data ATD+STRING to the FAX 2 in order to transmit PC data to the second FAX 114, the CPU 200 of the FAX 2 obtains a negative judgment at Step S71 of a data transmitting program represented by the flow chart of FIG. 14, and obtains a positive judgment at Step S72 of the same. Therefore, the control goes to Step S73 to judge whether the number of digits of the facsimile number represented by the facsimile-number data STRING received from the PC 4 coincides with that of the own facsimile number of the FAX 2 stored in the own facsimile number buffer 264 of the RAM 202.

As described previously, the designation of the second FAX 114 through the PC 4 is carried out by inputting the facsimile number of the second FAX 114 including the area code therefor. Assuming that the own facsimile number of the FAX 2 has been stored in the buffer 264 without including an area code for the area in which the FAX 2 is used, a negative judgment is made at Step S73, because the facsimile number of the second FAX 114 is longer than that of the FAX 2. Hence, the control goes to Step S74 to take the same number of digits as the number of digits of the shorter facsimile number, i.e., number of the FAX 2, from the longer facsimile number, i.e., number of the second FAX 114, from the least significant digit of the latter, in the direction toward the most significant digit, and judge whether the part number taken from the longer facsimile number completely coincides with the whole shorter facsimile number. Assuming that the FAX 2 and the second FAX 114 are used in the same code area, a negative judgment is made at Step S74, and the control goes to Step S77.

On the other hand, assuming that the own number of the FAX 2 including the area code therefor has been stored in the own facsimile number buffer 264, a positive judgment is made at Step S73. Hence, the control goes to Step S75 to judge whether the facsimile number of the second FAX 114 completely coincides with the facsimile number of the FAX 2, i.e., whether each of all the digits of the first facsimile number coincides with a corresponding one of all the digits of the second facsimile number. Assuming that the FAX 2 and the second FAX 114 are used in the same code area, a negative judgment is made at Step S75, and the control goes to Step S77.

In many cases, a facsimile number including a hyphen or space between an exchange code and a subscriber's number and/or a parenthesized area or exchange code (e.g., (000) 000-0000), may be input by the user, whether when the user inputs the facsimile number of the second FAX 114 into the PC 4, or when the user stores the own facsimile number of the FAX 2 in the own facsimile number buffer 264. However, those symbols including the hyphen, space, and parentheses do not provide the digits of a facsimile number. Therefore, in the case where a facsimile number includes one or more symbols, a digit-only facsimile number obtained by removing the symbols therefrom is used for the comparison at Step S74 or S75. Thus, the CPU 200 judges whether the FAX 2 has been specified, by the user, as a machine to which the PC data are to be transmitted. In the following description, a facsimile number from which all symbols are removed therefrom is referred to as an effective dialing number.

At Step S77, the CPU 200 of the FAX 2 judges whether it is possible to dial a facsimile or telephone number. For example, the CPU 200 judges whether the FAX 2 is transmitting or receiving FAX data, i.e., the external line 224 is busy, or whether the FAX 2 is receiving a call signal transmitted from a calling machine. If a negative judgment is made at Step S77, the control goes to Step S84 to output ERROR command data to the PC 4.

On the other hand, if a positive judgment is made at Step S77, the control goes to Step S78 to store the effective dialing number of the FAX 114 in the dial buffer 266 of the RAM 202. Step S78 is followed by Step S79 to judge whether any effective dialing number is stored in the dial buffer 266. In the case where call-transmit command data ATD+STRING supplied from the PC 4 do not contain any series of numbers for some reason, no effective dialing number is stored in the dialing buffer 266. Therefore, a negative judgment is made at Step S79, and the control goes to Step S85 to judge whether the FAX 2 has received dial command data, i.e., command to call another telephone set.

Since the PC 4 has commanded to transmit FAX data, a negative judgment is made at Step 585, and the control goes to Step S84 to output ERROR command data to the PC 4.

If a positive judgment is made at Step S79, the control goes to Step S80 to connect the FAX 2 to the external line 224 and to Step S81 to effect a dialing operation. For example, the CPU 200 operates for outputting, into the external line 224, a pulse signal corresponding to the facsimile number (effective dialing number) of the FAX 114. Step S81 is followed by Step S82 to judge whether the dialing operation has been completed without any problem or difficulty. For example, when the second FAX 114 is in use, or when the second FAX 114 is not in use but is busy because of, e.g., confusion of a telephone exchange, it is impossible to carry out any dialing operation. In such a case, a negative judgment is made at Step S82, and the control goes to Step S83 to disconnect the FAX 2 from the external line 224 and to Step S84 to output ERROR command data to the PC 4.

If a positive judgment is made at Step S82, the control goes to Step S88 to judge whether the FAX 2 has received call-transmit command data ATD+STRING. Since the PC 4 has transmitted call-transmit command data to the FAX 2, a positive judgment is made at Step S88, and the control goes to Step S89 to terminate the dialing operation and set a flag corresponding to the sort of data to be transmitted, i.e., set the PC-data transmission flag 268.

The PC data transmitted from the PC 4 to the FAX 2 are transmitted from the FAX 2 to the second FAX 114. The reception of coded image data or command data by the FAX 2 from the PC 4, the transmission of command data or other data by the FAX 2 to the PC 4, the transmission of coded image data or command data by the FAX 2 to the second FAX 114, and the reception of command data by the FAX 2 from the second FAX 114, each are carried out by interruption.

Figure 15:
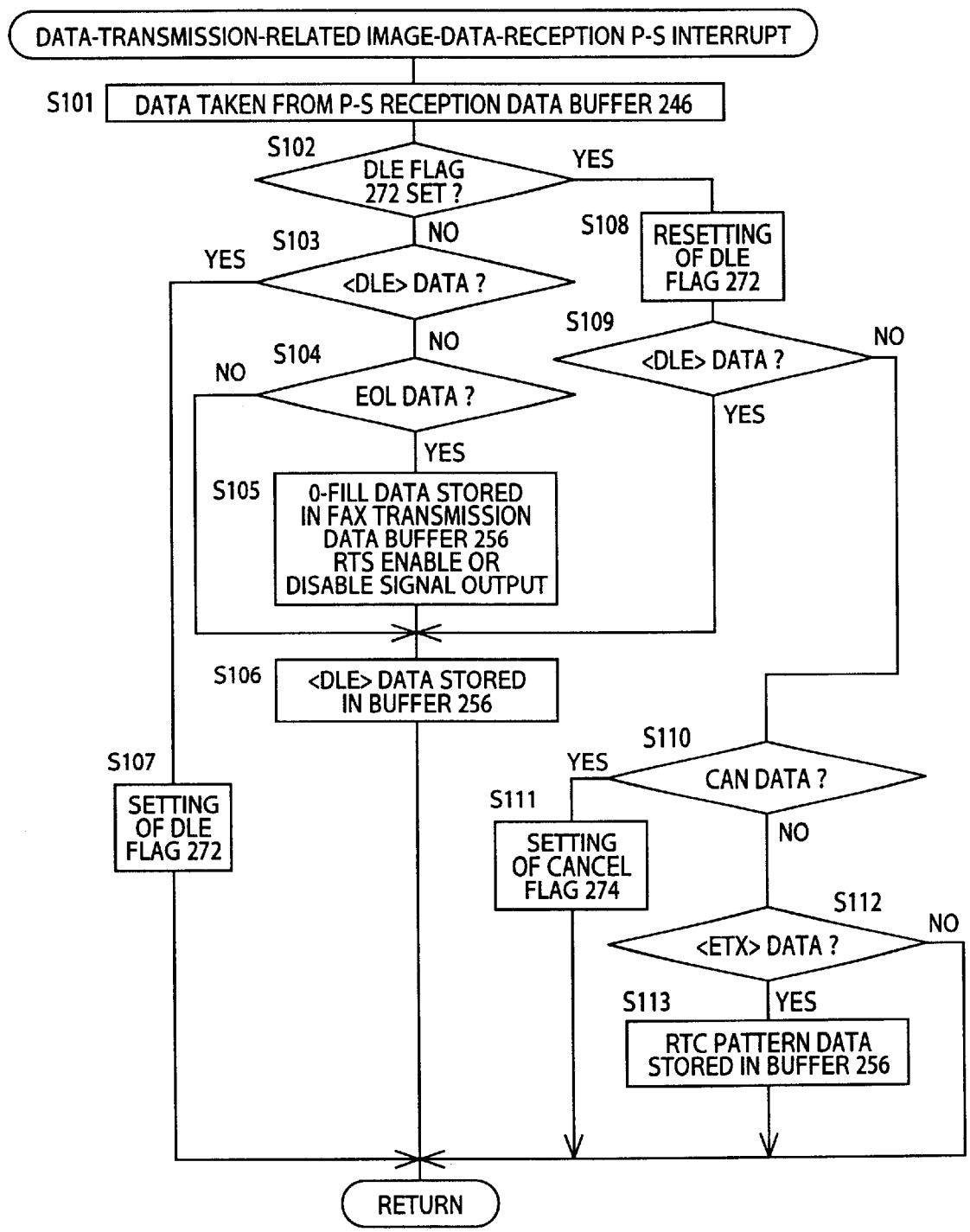
FIG. 15 is a flow chart representing a data-transmission-related image-data-reception P-S interrupt handler pre-stored in the ROM of the FAX of FIG. 1.

FIG. 15 shows a flow chart representing a data-transmission-related image-data-reception P-S interrupt handler which is executed by the FAX 2. This program is carried out each time 8 bits of coded image data are transmitted from the PC 4 and stored in the P-S RD buffer 246 of the RAM 202. According to this program, the coded image data are stored in the FAX TD buffer 256.

At Step S101, one bite of data are taken from the P-S RD buffer 246 and, at Step S102, it is judged whether the DLE flag 272 has been set. Assuming that the DLE flag 272 has been reset, a negative judgment is made at Step S102. Therefore, the control goes to Step S103 to judge whether the one-bite data are <DLE> data. If a negative judgment is made at Step S103, the control goes to Step S104 to judge whether the one-bite data are EOL (end of line) data indicative of the end of one image line. If a negative judgment is made at Step S104, the control goes to Step S106 to store the one-bite data in the FAX TD buffer 256.

If a positive judgment is made at Step S104, the control goes to Step S105 to count the number of bits of coded image data between the current EOL data and the preceding EOL data. If the counted bit number is not greater than a reference bit number corresponding to the shortest possible time needed to transmit one line of coded image data, a set of '0' bit data is stored in the FAX TD buffer 256. Thus, the shortest transmission time determined based on the specified data transmission speed is maintained. Hereinafter, a set of '0' bit data is referred to as the "0-fill" data.

Also, at Step S105, it is judged whether the FAX TD buffer 256 has any remaining capacity for storing data and, if not, the RTS DISABLE signal is output into the RTS control signal line so as to inhibit the transmission of PC data. While monitoring the RTS ENABLE or RTS DISABLE signal through the RTS control signal line, the PC 4 transmits data to the FAX 2. Upon identifying of the RTS DISABLE signal, the PC 4 stops transmitting data to the FAX 2. If the data received by the FAX 2 are transmitted to the second FAX 114, the FAX TD buffer 256 restores some capacity for storing data, so that the RTS ENABLE signal is output to the RTS control signal line so as to permit the transmission of PC data. Consequently the PC 4 resumes transmitting PC data to the FAX 2.

On the other hand, if a positive judgment is made at Step S103, the control goes to Step S107 to set the DLE flag 272. Thus, one control cycle of this program is ended. At Step S102 in the following control cycle of this program, a positive judgment is made at Step S102, and the control goes to Step S108 to reset the DLE flag 272. Step S108 is followed by Step S109 to judge the data taken from the buffer 246 at Step S101 are <DLE> data. If a positive judgment is made at Step S109, the control goes to Step S106 to store the data in the FAX TD buffer 256. On the other hand, if a negative judgment is made at Step S109, the control goes to Step S110 to judge whether the data taken at Step S101 are CAN (cancel) data. If a positive judgment is made at Step S110, the control goes to Step S111 to set the cancel flag 274.

Meanwhile, if the data taken from the buffer 246 are <ETX> data, a negative judgment is made at Step S110 and a positive judgment is made at Step S112, so that the control goes to Step S113 to store RTC PATTERN data in the FAX TD buffer 256. RTC PATTERN data contain 6 sets of EOL data.

Figure 16:
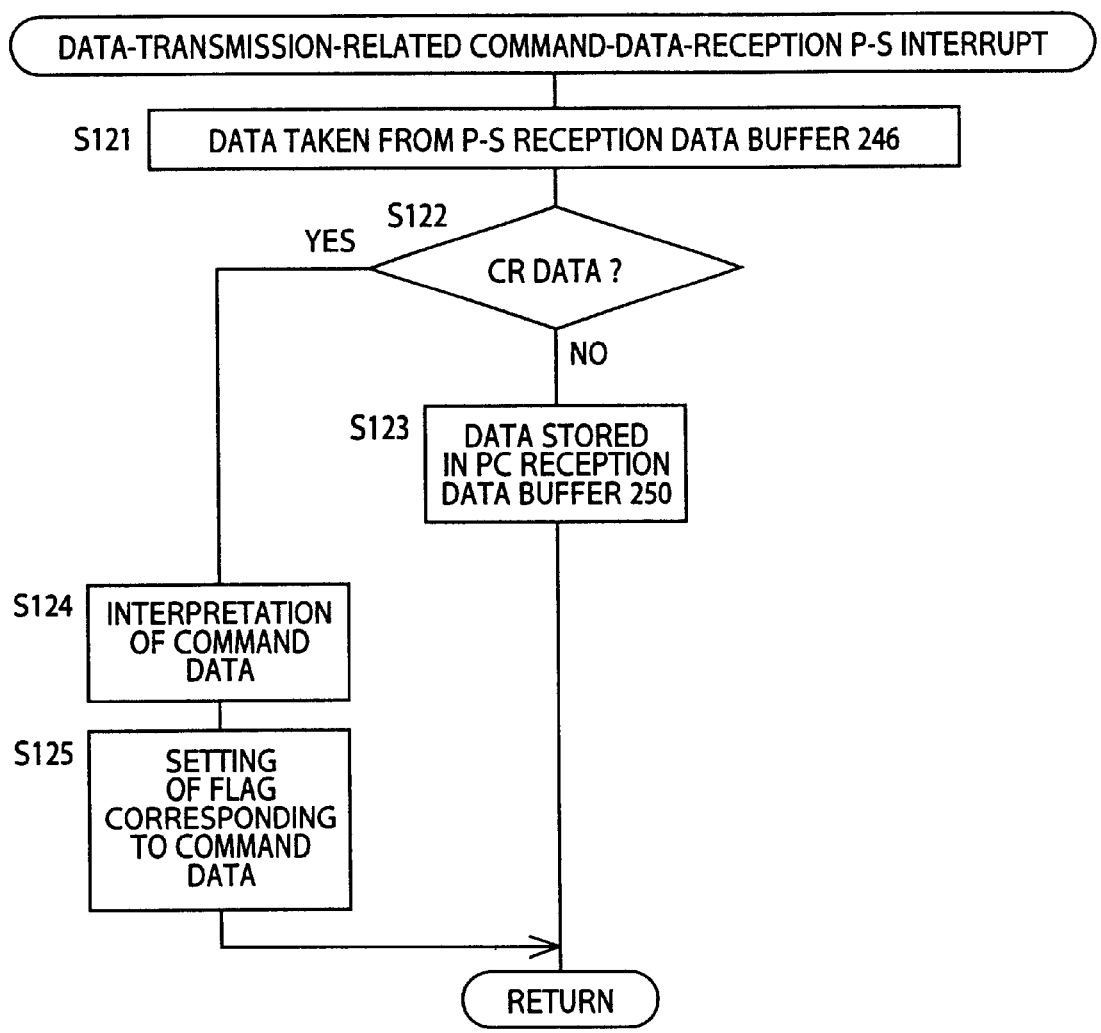
FIG. 16 is a flow chart representing a data-transmission-related command-data-reception P-S interrupt handler pre-stored in the ROM of the FAX of FIG. 1.
Figure 17:
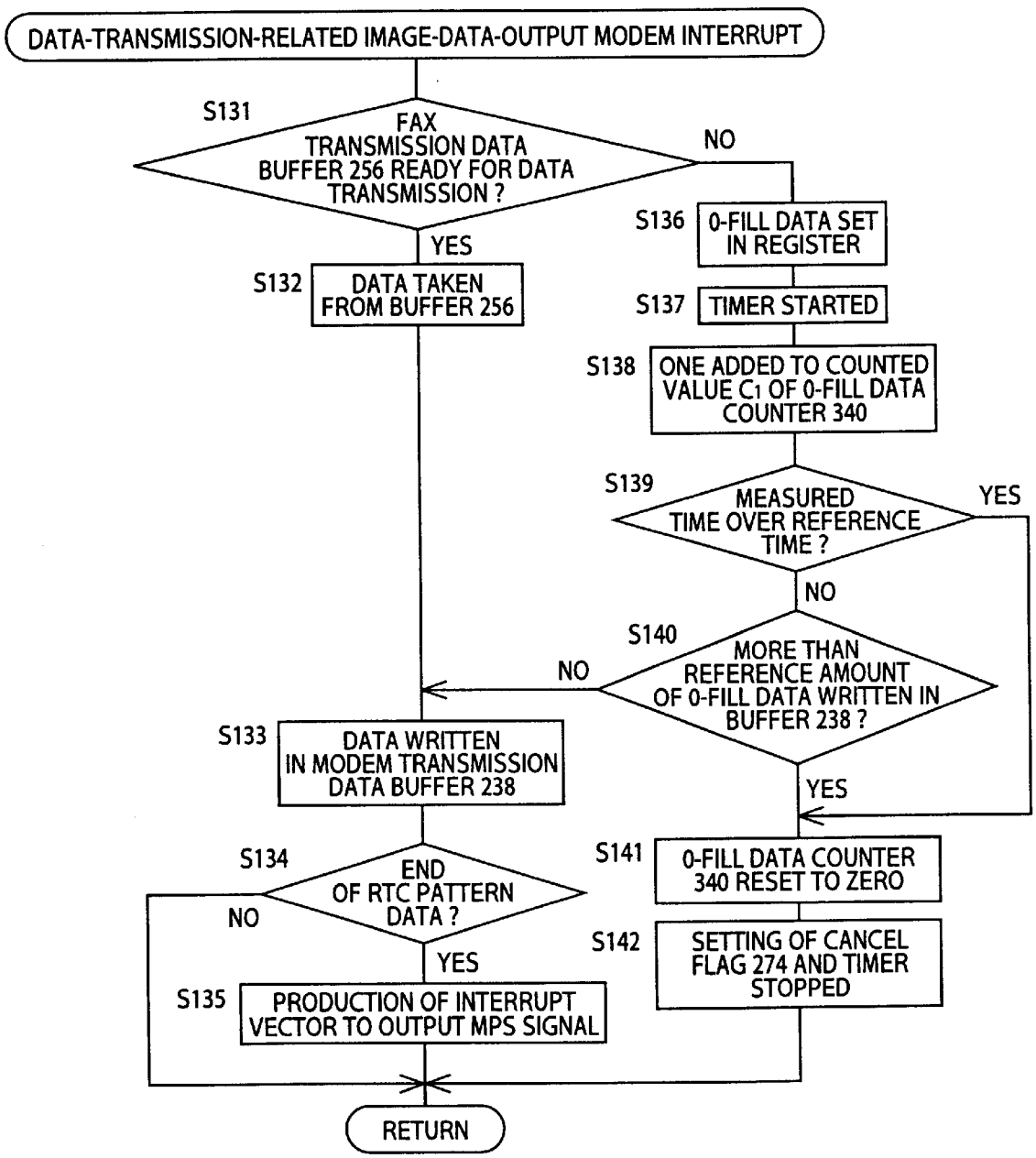
FIG. 17 is a flow chart representing a data-transmission-related image-data-output modem interrupt handler pre-stored in the ROM of the FAX of FIG. 1.

FIG. 16 shows a flow chart representing a data-transmission-related command-data-reception P-S interrupt handler which is carried out by the FAX 2 when the FAX 2 receives command data from the PC 4. First, at Step S121, one bite of data are taken from the P-S RD buffer 246 and, at Step S122, it is judged whether the one-bite data are CR data indicative of the end of a batch of command data. If a negative judgment is made at Step S122, the control goes to Step S123 to store the one-bite data in the PC RD buffer 250.

On the other hand, if a positive judgment is made at Step S122, the control goes to Step S124 to interpret the contents of the command data and then to Step S125 to set a flag corresponding to the interpreted contents of the command data.

A P-S interrupt processing for transmitting command data to the PC 4 when the PC 4 transmits PC data to the FAX 2, is carried out in the same manner as that of the idling-related command-data-output P-S interrupt handler of FIG. 10. Therefore, the description of the former processing is omitted. In addition, a P-S interrupt processing for transmitting data other than command data to the PC 4 when the PC 4 transmits PC data to the FAX 2, is carried out in the same manner as that of a P-S interrupt processing for transmitting FAX data from the FAX 2 to the PC 4, which will be described later.

The coded image data received by the FAX 2 from the PC 4 and stored in the FAX TD buffer 256, are written by interruption in the modem TD buffer 238, so that the coded imaged data are sent out from the modem TD buffer 238 to the second FAX 114.

The transmission and reception of coded image data or command data between the FAX 2 and the second FAX 114 (more precisely, modem 214), are carried out by interruption. An interrupt channel for those interruptions is different from an interrupt channel for the interruptions carried out for the transmission and reception of coded image data or command data between the FAX 2 and the PC 4. Thus, it is possible to effect the transmission or reception of coded image data or command data between the FAX 2 and the PC 4, simultaneously with the transmission or reception of coded image data or command data between the FAX 2 and the second FAX 114.

The FAX 2 has various interrupt handling programs for the interruptions carried out for the data transmission and reception between the FAX 2 and the second FAX 114. Similar to the interruptions for the data transmission and reception between the FAX 2 and the PC 4, the FAX control device 40 produces, based on an interrupt signal, an interrupt vector specifying an interrupt handling program to be executed.

An interrupt signal is produced each time 8 bits of data are stored in the modem RD buffer 239 or each time modem TD buffer 238 becomes empty. An operation in accordance with an interrupt handler corresponding to an interrupt signal, is enabled or disabled according to the setting or resetting of the second DR interrupt disable flag 243 and/or the second DT interrupt disable flag 244. The second DR interrupt disable flag 243 is always set, thereby permitting interruption, so that the FAX 2 can always receive data.

An interrupt handler for the transmission of image data or command data from the FAX 2 to the second FAX 114, is enabled only when the data are actually transmitted. When the FAX 2 receives command data or image data from the second FAX 114, only the production of an interrupt vector is effected since the reception interrupt handlers are always enabled. The production of an interrupt vector and the setting or resetting of the second DT interrupt disable flag 244 are carried out according to each interrupt handler.

An interruption for transmitting coded image data to the second FAX 114 (or the modem 214) will be explained below.

An interrupt signal is produced when the modem TD buffer 238 becomes empty. Consequently the FAX control device 40 carried out a data-transmission-related image-data-output modem interrupt handler represented by the flow chart of FIG. 17. At Step S131, it is judged whether the FAX TD buffer 256 is ready for transmitting coded image data. A positive judgment is made if coded image data corresponding to one image line have been stored in the FAX TD buffer 256. Coded image data corresponding to each image line contain EOL data at the end thereof. If a positive judgment is made at Step S131, the control goes to Step S132 to take one bite of coded image data from the FAX TD buffer 256 and then to Step S133 to store the one-bite data in the modem TD buffer 238.

Step S133 is followed by Step S134 to judge whether the one-bite data written at Step S133 are data indicative of the end of RTC PATTERN data. Since a set of RTC PATTERN data ends with 6 sets of EOL data, it is judged at Step S134 whether the written data are the 6th set of EOL data. At the beginning, a negative judgment is made at Step S134, and one control cycle of this program is ended.

Positive judgments are made at Step S131, so long as at least one set of EOL data following coded image data remains in the FAX TD buffer 256. Therefore, the coded image data stored in the buffer 256 are written, one bite by one, in the modem TD buffer 238. Also, when the 6 sets of EOL data of RTC PATTERN data are stored in the FAX TD buffer 256, a positive judgment is made at Step S131, so that each set of EOL data is written in the modem TD buffer 238. If the 6th set of EOL data is stored in the buffer 238, a positive judgment is made at Step S134, which means that a set of RTC PATTERN data ends and that the transmission of one page of coded image data ends. Then, the control goes to Step S135 to produce an interrupt vector to output an MPS signal.

On the other hand, if a negative judgment is made at Step S131, the control goes to Step S136 to set a bit of 0-fill data in a register (not shown) of the RAM 202. Then, the 0-fill data are written between the coded image data and the EOL data. After the 0-fill data are written, the control goes to Step S137 to reset, to zero, a timer provided in the CPU 200. Step S137 is followed by Step S138 to add one to a counted value of the 0-fill data counter 340, and subsequently by Step S139 to judge whether the time measured by the timer has exceeded a reference value.

The 0-fill data written in the register are written in the modem TD buffer 238, to prevent the FAX 2 from disconnecting itself from the external line 224 even if no transmission data remains in the buffer 238. However, if a prescribed number of sets of 0-fill data have been written in the buffer 238, or if a time measured by the timer has exceeded the reference value, a positive judgment is made at Step S140 or Step S139, so that the control goes to Step S141 to reset, to zero, the counted value of the 0-fill data counter 340 and then to Step S142 to set the cancel flag 274, thereby terminating the current communication with the second FAX 114, because it is abnormal that the FAX TD buffer 256 holds no data for such a long time.

Figure 18A:
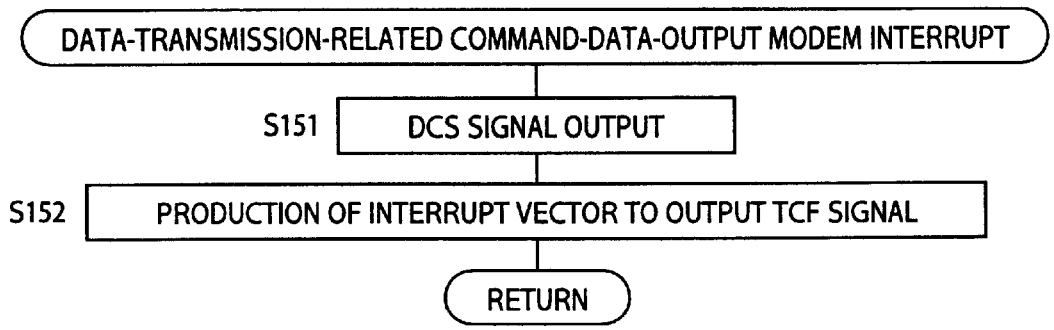
FIG. 18(A) is a flow chart representing a first data-transmission-related command-data-output modem interrupt handler pre-stored in the ROM of the FAX of FIG. 1, wherein a DCS signal (digital command signal) is output.
Figure 18B:
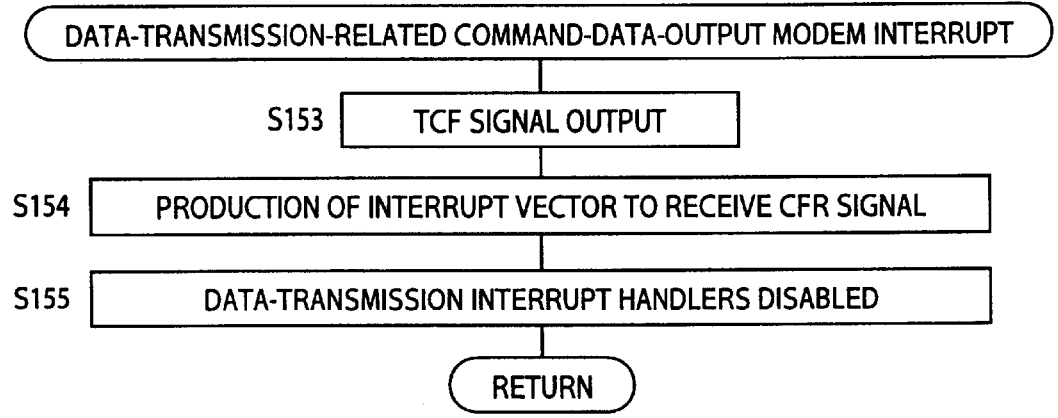
FIG. 18(B) is a flow chart representing a second data-transmission-related command-data-output modem interrupt handler pre-stored in the ROM of the FAX of FIG. 1, wherein a TCF signal (training check signal) is output.

FIG. 18 shows a flow chart representing a data-transmission-related command-data-output modem interrupt handler which is executed by the FAX 2 when the FAX 2 outputs command data to the modem 214. Various sorts of command data are transmitted and received between the FAX 2 and the modem 214 (or second FAX 114), similar to the transmission and reception of command data between the FAX 2 and the PC 4 shown in the sequence chart of FIG. 11. An interrupt handler is provided for outputting each sort of command data. The outputting of a DCS signal and a TCF signal only will be described below, by way of examples, by reference to the flow charts of FIGS. 18(A) and 18(B), respectively.

At Step S151 of FIG. 18(A), a DCS signal is written in the modem TD buffer 238 and then, at Step S152, an interrupt vector is produced to output a TCF signal so that the TCF signal is output following the DCS signal. When a TCF signal is output at Step S153 of FIG. 18(B), the TCF signal is written in the modem TD buffer 238 and subsequently, at Step S154, an interrupt vector is produced to receive a CFR signal. Then, at Step S155, the second DT interrupt disable flag 244 is set, thereby disabling the execution of any data-transmission interrupt handler.

Figure 19:
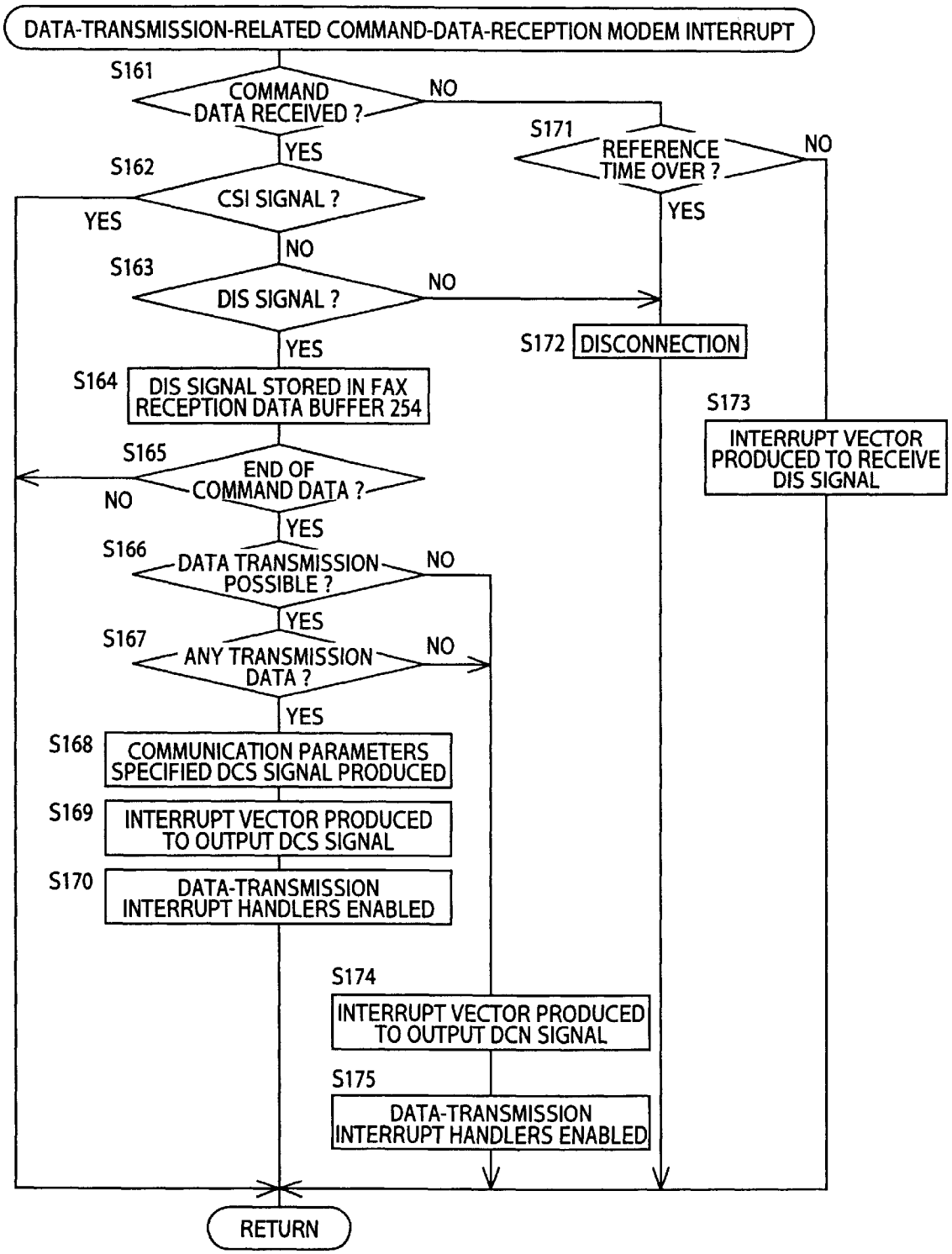
FIG. 19 is a flow chart representing a data-transmission-related command-data-reception modem interrupt handler pre-stored in the ROM of the FAX of FIG. 1.

FIG. 19 shows a data-transmission-related command-data-reception modem interrupt handler which is executed by the FAX 2 when the FAX 2 receives command data from the modem 214 (i.e., from the second FAX 114 through the modem 214). There are various sorts of command data which are received by the FAX 2, as there are various sorts of command data which are output by the FAX 2 as described previously. An interrupt handler is provided for receiving each sort of command data. The flow chart of FIG. 19 represents an interrupt handler provided for receiving a DIS signal, which will be described below by way of example.

The operation in accordance with the interrupt handler of FIG. 19 is started when, following production of an interrupt to receive a DIS signal, 8 bits of data are stored in the modem RD buffer 239 and accordingly an interrupt signal is generated.

First, at Step S161, it is judged whether the FAX 2 has received command data, by judging whether data have been stored in the modem RD buffer 239. If a positive judgment is made at Step S161, the control goes to Step S162 to judge whether the command data received are a CSI (called subscriber identification) signal indicative of a facsimile number of a called facsimile machine, i.e., second FAX 114.

The interrupt handler of FIG. 19 is started when 8 bits of data are stored in the modem RD buffer 239, as mentioned above, and the first data that are stored in the buffer 239 after starting of this interrupt handler are data indicative of the sort of the signal being received. Thus, the FAX 2 can identify whether the signal being received is a CSI signal. The FAX 2 does not utilize a CSI signal even when the CSI signal is transmitted to the FAX 2, i.e., discards the CSI signal, and does not output a TSI (transmit station identification) signal in response thereto. If a positive judgment is made at Step S162, one control cycle of this program is ended.

If a DIS signal is transmitted to the FAX 2, a negative judgment is made at Step S162, and a positive judgment is made at Step S163, so that the control goes to Step S164 to store the data in the FAX RD buffer 254. Step S164 is followed by Step S165 to judge whether the data stored in the buffer 254 are data indicative of the end of command data, i.e., DIS signal. If a positive judgment is made at Step S165, the control goes to Step S166. On the other hand, if a negative judgment is made at Step S165, one control cycle according to this program is ended and the control returns to Step S161 and the following steps. Once the leading-end data of a DIS signal are stored in the FAX RD buffer 254, positive judgments are made at Step S163 until the DIS signal is stored in its entirety in the buffer 254.

If a positive judgment is made at Step S165, the control goes to Step S166 to judge whether the respective machine types of the FAX 2 and the second FAX 114 permit data transmission therebetween. If a positive judgment is made at Step S166, the control goes to Step S167 to judge whether there are any data to be transmitted. In the case where the image data read and produced by the image-read device 42 of the FAX 2 are transmitted to the second FAX 114, the FAX 2 judges at Step S167 whether any original sheets 90 are set in the original receiver 94. In the case where PC data are transmitted to the second FAX 114, the FAX 2 judges at Step S167 whether call-transmit command data ATD+ STRING to command the transmission of PC data have been transmitted thereto from the PC 4. If a positive judgment is made at Step S167, the control goes to Step S168 to specify the respective levels of communication parameters for the data transmission and reception between the FAX 2 and the second FAX 114 and produce a DCS signal indicative of the specified levels of communication parameters. Step S168 is followed by Step S169 to produce an interrupt signal to output the DCS signal, and then by Step S170 to enable an interrupt handler for transmitting data.

In the FAX 2 does not receive any command data for a prescribed time, a negative judgment is made at Step S161 and a positive judgment is made at Step S171, so that the control goes to Step S172 to disconnect the FAX 2 from the external line 224 and terminate the current communication with the second FAX 114. While the prescribed time has not passed yet, a negative judgment is made at Step S171, and the control goes to Step S173 to produce an interrupt vector to receive a DIS signal.

If a negative judgment is made at Step S167, the control goes to Step S174 to produce an interrupt vector to output a DCN signal to disconnect the FAX 2 from the external line 224. Step S174 is followed by Step S175 to enable an interrupt handler for transmitting data.

Figure 20:
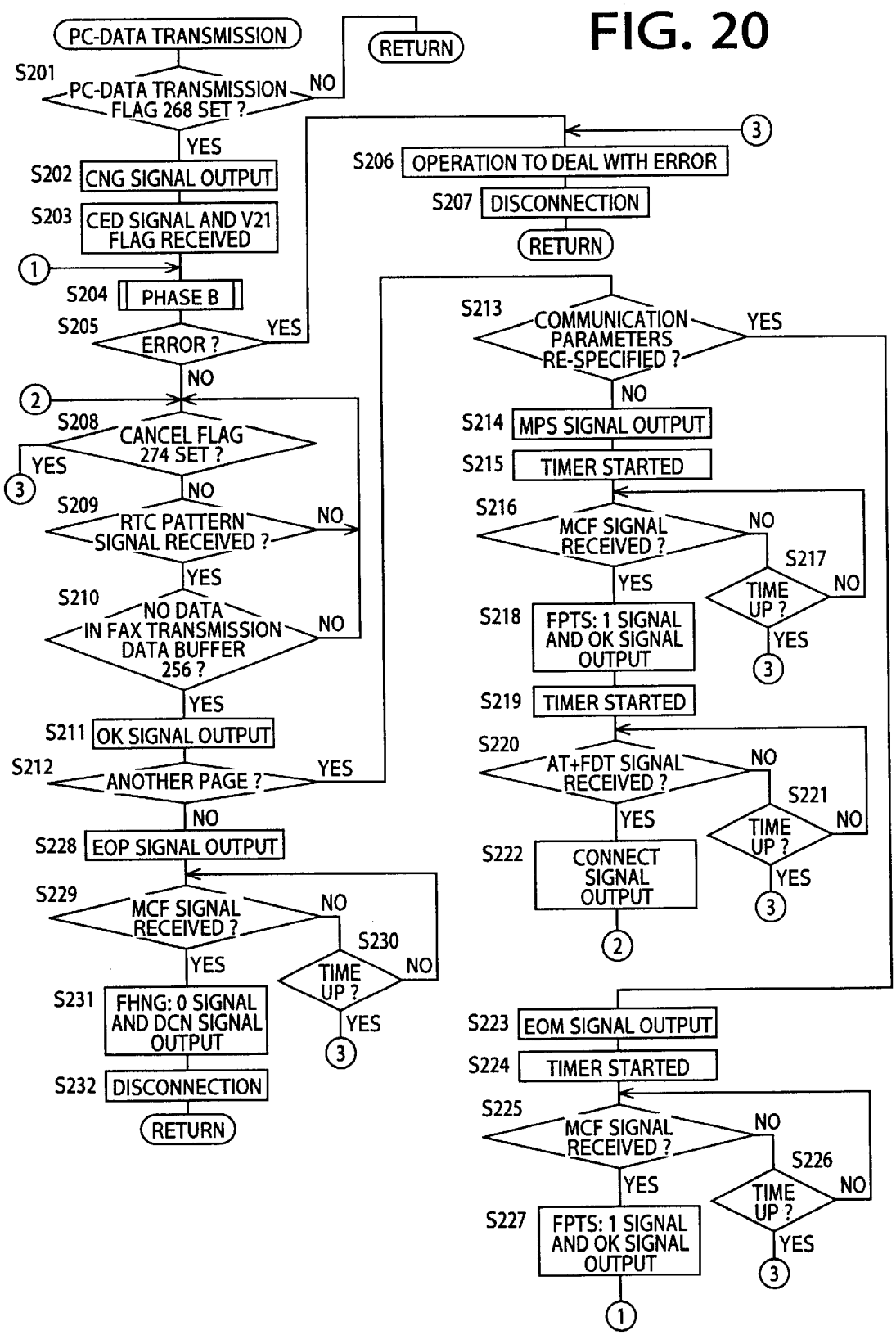
FIG. 20 is a flow chart representing a PC-data transmitting program pre-stored in the ROM of the FAX of FIG. 1.

FIG. 20 shows a flow chart representing a PC-data transmitting program which is carried out by the FAX 2 when the FAX 2 transmits PC data to the second FAX 114.

At Step S201, it is judged whether the PC-data transmission flag 268 has been set, for judging whether the FAX 2 is ready for transmitting PC data. If a positive judgment is made at Step S210, the control goes to Steps S202 and S203 to transmit and receive various signals including a CNG signal following the dialing in Phase A. Step S203 is followed by Step S204 to proceed with Phase B to specify the respective levels of communication parameters to be used for data transmission and reception between the FAX 2 and the second FAX 114. Since this program is for transmission PC data, the respective levels of communication parameters of the PC 4 are regarded as those of the FAX 2. The communication parameters of the PC 4 are stored in the PC CP buffer 263. The FAX 2 specifies, as the respective levels of communication parameters to be used for data transmission and reception between the FAX 2 and the second FAX 114, the highest levels of communication parameters which are common to both the FAX 2 and the second FAX 114.

Step S204 is followed by Step S205 to judge whether an error has occurred. An error means that the FAX 2 failed to receive a DIS signal in Phase B, or that command data could not be transmitted at a command-data transmission speed of 2,400 bps between the FAX 2 and the second FAX 114. If a positive judgment is made at Step S205, the control goes to Step S206 to deal with the error by outputting a +FHNG:2 signal to the PC 4 to inform that the current communication is ended because of occurrence of an error, and outputting a DCN signal to the second FAX 114. Step S206 is followed by Step S207 to disconnect the FAX 2 from the external line 224, so that one control cycle of this program is ended.

If a negative judgment is made at Step 5205, the FAX 2 proceeds with Phase C. Since the reception of PC data from the PC 4 and the transmission of coded image data to the second FAX 114 each are carried out by interruption, the FAX 2 only repeatedly judges, in Phase C, whether one page of coded image data has been transmitted thereto from the PC 4, according to this program.

In the case where a negative judgment is made at Step S205, the FAX 2 proceeds with Step S208 to judge whether the cancel flag 274 has been set, thereby judging whether the data transmission has been canceled. If the cancel flag 274 has been set, a positive judgment is made at Step S208, and the control goes to Steps S206 and S207 and ends the current communication. The cancel flag 274 is set in response to operation of a cancel key (not shown) provided on the keyboard 300 of the PC 4, or when the state in which the FAX TD buffer 256 is empty lasts longer than the prescribed time duration or longer than a time duration needed to write the prescribed number of sets of 0-fill data. In each case, the current communication is terminated.

At Step S208, it is also judged whether the STOP key 164 provided on the operation panel 12 has been operated or pushed. If the STOP key 164 is pushed to input a command to end the current communication, a positive judgment is made at Step S208, and the FAX 2 ends the communication.

If a negative judgment is made at Step S208, the control goes to Step S209 to judge whether the transmission of one page of data has been completed, by judging whether the data supplied from the FAX TD buffer 256 to the modem TD buffer 238 contain RTC PATTERN data. If the RTC PATTERN data have been taken by interruption from the P-S converting circuit 240, a positive judgment is eventually made at Step S209, and the control goes to Step S210 to judge whether the FAX TD buffer 256 is empty. When the data indicative of the end of transmission of one page of data are identified and the buffer 256 becomes empty, i.e. all data have been sent out, a positive judgment is made at Steps S209 and S210, and the control goes to Step S211 to output an OK signal to the PC 4. If the buffer 256 becomes empty before the RTC PATTERN data are received, the FAX 2 does not output an OK signal, thereby preventing the transmission of one page from being stopped before completion, i.e., at an intermediate location of the page.

Phase C is followed by Phase D. At Step S212, it is judged whether another page of data remains. If a positive judgment is made at Step S212, the control goes to Step S213 to judge whether it is necessary to change the specified levels of communication parameters. If a negative judgment is made at Step S213, the control goes to Steps S214, S215, S216, S217, S218, S219, S220, S221, and S222 to carry out the transmission and reception of various signals in Phase D, as briefly described below.

When the FAX 2 waits for receiving an MCF signal from the second FAX 114 or an AT+FDT signal from the PC 4, a timer is started to measure time at Step S215, and it is judged whether the time measured by the timer has exceeded a reference value at Step S217 or S221. If the FAX 2 does not receive an MCF signal or an AT+FDT signal in the reference time, the control goes to Step S206 to operate in the same manner as that upon occurrence of an error and end the current communication. On the other hand, if the FAX 2 receives the MCF and AT+FDT signals in the reference time, the control returns to Step S208, i.e., goes to Phase C.

If a positive judgment is made at Step S213, the control goes to Step S223 to output an EOM signal (end of message signal) to the second FAX 114. Step S223 is followed by Steps S224, S225, S226, and S227. If it is judged that the FAX 2 has received an MCF signal in the reference time at Step S225, the control returns to Step S204 to re-specify the respective levels of communication parameters for data transmission and reception with the second FAX 114 and thereafter transmit the next page of data to the second FAX 114.

If a negative judgment is made at Step S212, the control goes to Steps S228, S229, S230, S231, and S232, i.e., proceeds with Phase D and Phase E (disconnection), thereby ending the current communication.

Thus, the transmission of data to one facsimile machine (second FAX 114) ends. Following this, the PC 4 judges, at Step S56 of the PC-data transmitting program of FIG. 13, whether a +FHNG:0 signal has been transmitted thereto from the FAX 2 and, if yes, judges at Step S57 whether another facsimile machine to which the PC data are to be transmitted is left. If a positive judgment is made at Step S57, the PC 4 outputs a call-transmit command to the FAX 2 and transmits the same PC data to the FAX 2, so that the FAX 2 transmits the PC data to a third facsimile machine different from the second FAX 114. Thus, when the PC 4 transmits the same PC data to each of a plurality of facsimile machines including the FAX 2, the PC 4 supplies the PC data to the FAX 2, the same times as the number of the facsimile machines to each of which the PC data are to be transmitted. Thus, it is not essentially required that the FAX 2 have a memory capacity large enough to store a batch of PC data in its entirety. Thus, the FAX 2 enjoys a small memory capacity for storing PC data, and this memory capacity is protected from being filled up with PC data.

Next, there will be described the manner of transmission of PC data to the FAX 2 as a target to which the PC data are to be transmitted.

At Step S74 or S75 of the data transmitting program of FIG. 14, a positive judgment is made if the number of digits of a facsimile number supplied from the PC 4 to the FAX 2 is equal to that of the own facsimile number of the FAX 2 stored in the own facsimile number buffer 264 and simultaneously the former facsimile number completely coincides with the own facsimile number, or if one of the two digit numbers is smaller than the other and all the digits of one facsimile number having the smaller digit number coincide with the corresponding digits of the other facsimile number having the greater digit number. Consequently the control goes to Step S76 to set the print flag 276. A positive judgment made at Step S74 or S75 means that the user specified, through the PC 4, the FAX 2 as a target to which PC data are transmitted. In this case, the PC 4 transmits PC data to the FAX 2, in the same manner as that in which PC data are transmitted via the FAX 2 to the second FAX 114, and the image-record device 29 of the FAX 2 records images in accordance with the PC data.

Figure 21:
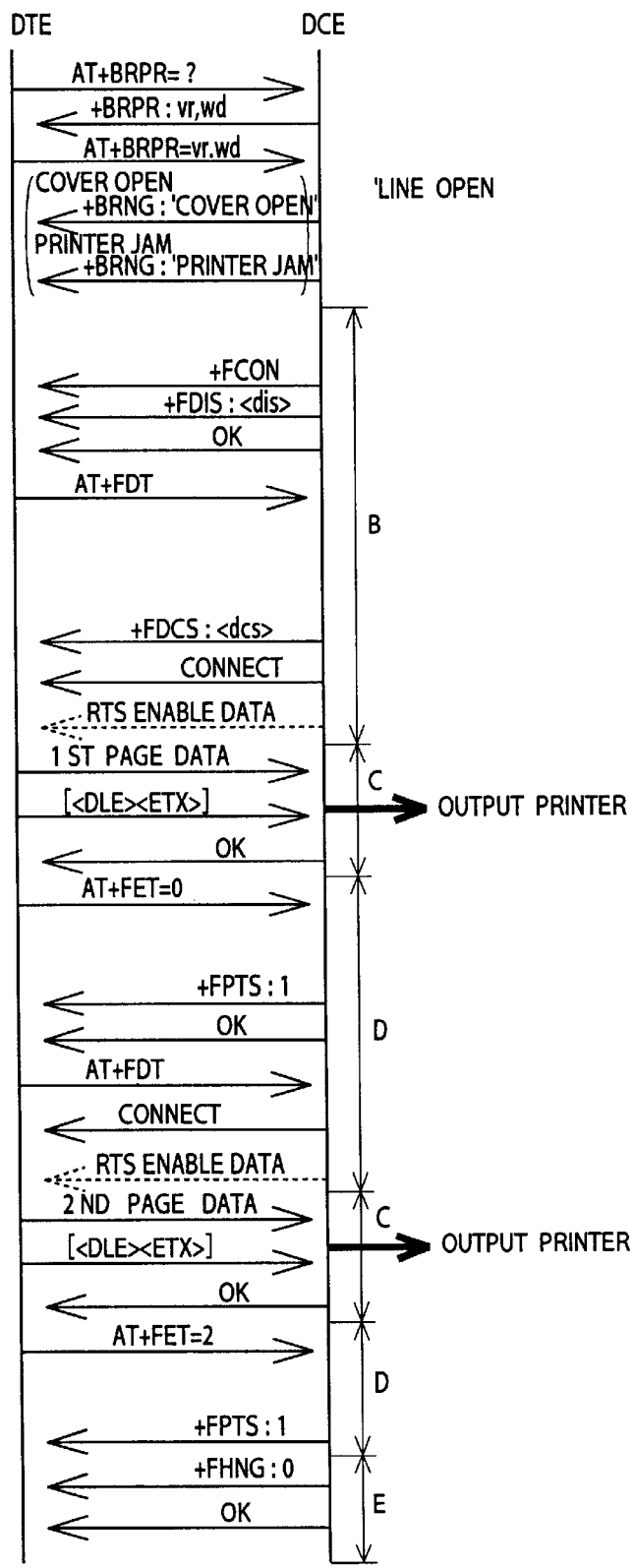
FIG. 21 is a sequence chart showing the manner of transmission and reception of image data and command data when the FAX of FIG. 1 records images according to the image data received from the PC of FIG. 1.

FIG. 21 shows a sequence chart according to which the image-record device 29 of the FAX 2 records images corresponding to the PC data supplied from the PC 4.

The PC 4 (DTE) outputs, to the FAX 2 (DCE), a signal, AT+BRPR=?, requesting the FAX 2 to supply information about the abilities thereof. In response thereto, the FAX 2 returns, to the PC 4, a signal, BRPR:vr,wd, indicative of the selectable levels of image resolution and sheet width. In response thereto, the PC 4 outputs, to the FAX 2, a signal, AT+BRPR=vr,wd, specifying the highest levels of image resolution and sheet width which are common to both the PC 4 and the FAX 2. If the FAX 2 detects an error, for example, that a main cover of the housing 10 remains open, or that a record sheet 17 is jamming, the FAX 2 outputs, to the PC 4, a signal, BRNG:COVER OPEN, indicative of opening of the main cover, or a signal, BRNG:PRINTER JAM, indicative of jamming of record sheet 17.

In order to start recording of the FAX 2, the PC 4 and the FAX 2 exchange data needed for the recording, and the PC 4 transmits PC data to the FAX 2, in the same manner as the manner indicated in the sequence chart of FIG. 11, i.e., manner in which PC data are transmitted from the PC 4 to the second FAX 114 via the FAX 2. However, the sequence chart of FIG. 21 does not include the steps or procedures carried out for the transmission of PC data from the FAX 2 to the second FAX 114, and additionally includes one or more steps needed for recording of the FAX 2 according to the PC data.

Figure 22:
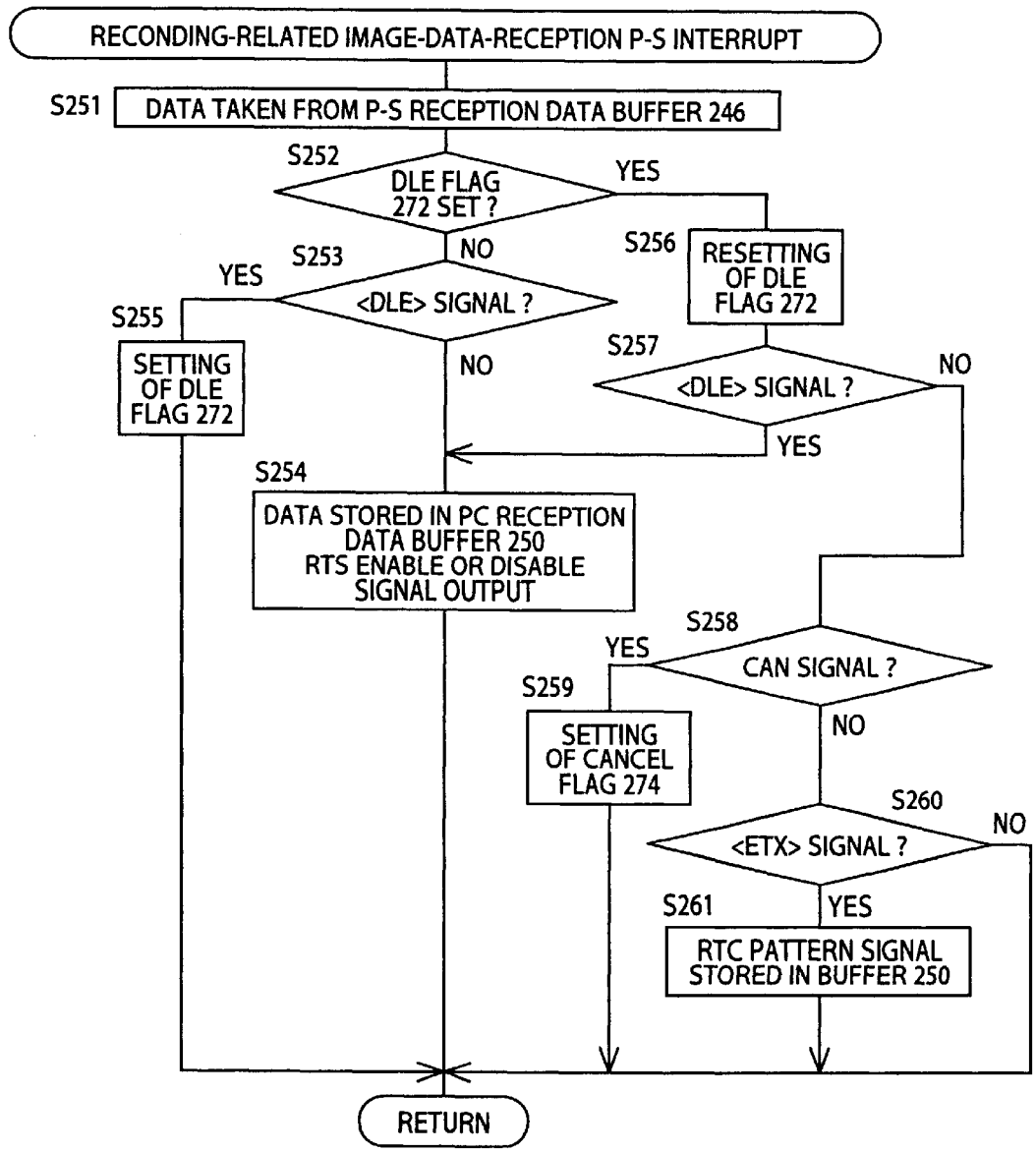
FIG. 22 is a flow chart representing a recording-related image-data-reception P-S interrupt handler pre-stored in the ROM of the FAX of FIG. 1.

FIG. 22 shows a flow chart representing a recording-related image-data-reception P-S interrupt handler which is carried out by the FAX 2 when the FAX 2 receives coded image data from the PC 4. When images corresponding to PC data are recorded according to a PC-data recording program represented by the flow chart of FIG. 23, an interrupt vector is produced to take PC data from the P-S RD buffer 246 and store the PC data in the PC RD buffer 250 according to this interrupt handler of FIG. 22. The reception of command data from the PC4 and the outputting of command data, and the transmission of the data, to the PC 4, all for recording of the FAX 2, are carried out in the same manner as that for the transmission of PC data to the second FAX 114 via the FAX 2, and the description thereof is not repeated.

The interrupt handler of FIG. 22 is carried out by the FAX 2, each time 8 bits of coded image data are supplied thereto from the PC 4. Since, however, the received coded image data are not to be transmitted to the second FAX 114, the received data are stored in the PC RD buffer 250. No 0-fill data to maintain the shortest possible time for the transmission of one-line data, is not stored in the FAX TD buffer 256. When the coded image data are stored in the PC RD buffer 250, the FAX 2 checks if the buffer 250 has a memory capacity remaining for storing additional data and, if not, outputs an L-state signal, i.e., RTS DISABLE signal into the RTS control signal line. The other steps of FIG. 22 are the same as the corresponding steps of the data-transmission-related image-data-reception P-S interrupt handler shown in FIG. 15, and the description thereof is omitted.

Figure 23:
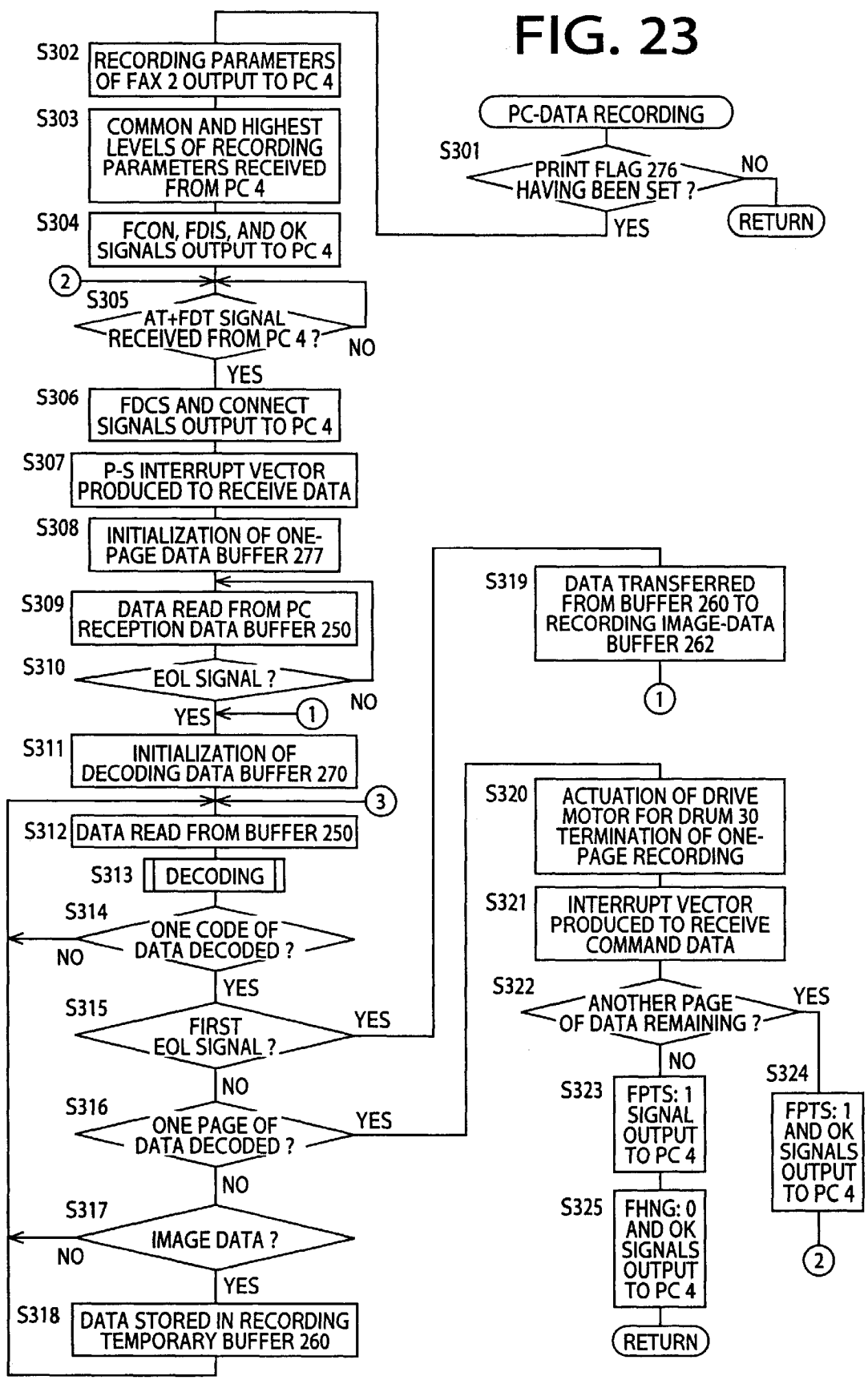
FIG. 23 is a flow chart representing a PC-data recording program pre-stored in the ROM of the FAX of FIG. 1.

If the print flag 276 is set at Step S76 of the data transmitting program of FIG. 14, a positive judgment is made at Step S301 of the PC-data recording program of FIG. 23, and the control goes to Steps S302, S303, S304, S305, and S306 to receive and transmit various signals needed for the reception of coded image data from the PC 4. Step S306 is followed by Step S307 to produce an interrupt vector to receive the coded image data, thereby placing the FAX 2 in a state in which the FAX 2 can store the coded image data in the PC RD buffer 250. Thus, each time 8 bits of coded imaged data are supplied from the PC 4 to the FAX 2, the interrupt handler of FIG. 22 is carried out, so that the coded image data are stored in the buffer 250.

According to the PC-data recording program of FIG. 23, the FAX 2 decodes the PC data stored in the PC RD buffer 250. To this end, at Step S308, the FAX 2 effects a one-page recording initiation by storing, in the one-page buffer 277 of the RAM 202, the first one of the addresses corresponding to the first page of the coded image data stored in the PC RD buffer 250, and the respective levels of resolution, coding method, and sheet width of the first page.

Step S308 is followed by Step S309 to take the coded image data, one bite by one, from the PC RD buffer 250, and then by Step S310 to judge whether the taken data are EOL data. One page of data begin with EOL data. However, data other than image data or EOL data may be added to the leading end of one page of data. Thus, Steps S309 and S310 are repeated until the EOL data followed by one page of data are found.

If a positive judgment is made at Step S310, the control goes to Step S311 to initialize the decoding data buffer 270 which is provided for use in decoding one line of data. Step S311 is followed by Step S312 to read data, one bite by one, from the PC RD buffer 250. One-bite data are copied from the PC RD buffer 250, and the copied data are stored in the decoding data buffer 270. Therefore, the coded image data are left intact in the PC RD buffer 250. Even if recording based on the decoded image data is interrupted by, e.g., jamming of a record sheet 17, the FAX 2 can record based on the coded image data stored in the PC RD buffer 250. One page of data stored in the PC RD buffer 250 are deleted each time the image-record device 29 of the FAX 2 records images corresponding to that page of data.

Step S312 is followed by Step S313 to decode the data read from the PC RD buffer 250 and then by Step S314 to judge whether the decoding of one code of data has completed. In some cases, one code of data contains more than one bite of bit data. In those cases, a negative judgment is made at Step S314, and the control goes back to Step S312. On the other hand, if a positive judgment is made at Step S314, the control goes to Step S315 to judge whether the read data are EOL data. At the beginning, a negative judgment is made at Step S315, and the control goes to Step S316 to judge whether the read data are data indicative of the end of one page, i.e., judging whether the data stored in the decoding data buffer 270 contain 6 sets of EOL data. At the beginning, a negative judgment is made at Step S316, and the control goes to Step S317 to judge whether the read data are image data. A positive judgment is made at Step S317, so that the control goes to Step S318 to store the decoded image data in the recording temporary buffer 260.

Meanwhile, if a positive judgment is made at Step S315, the control goes to Step S319 to transfer the decoded image data from the recording temporary buffer 260 to the recording image-data buffer 262.

When the first one of the 6 sets of EOL data at the end of one page of data is read from the PC RD buffer 250, a positive judgment is made at Step S315 and, at Step S319, the one-line image data which have been decoded up till then are transferred to the recording image-data buffer 262. When the second to fifth sets of EOL data are read from the buffer 250, negative judgments are made at Steps S315 and S316, respectively, since the second to fifth sets of EOL data are not indicative of the end of one line or one page. Hence, the control goes to Step S317 to judge whether the read data are image data. Since the second to fifth sets of EOL data are not image data, negative judgements are made at Step S317, and the control goes back to Step S312. Thus, the EOL data are not stored in the recording temporary buffer 260.

When the 6th set of EOL data is read from the PC RD buffer 250, a positive judgment is made at Step S316, and the control goes to Step S320 to actuate a drum motor which drives the photosensitive drum 30 of the image-record device 29 and record images on a record sheet 17 according to the decoded one-page image data, and carry out a one-page recording ending procedure by deleting the data stored in the one-page data buffer 277 at Step S308. The reception of one page of data at Step S320 is followed by Step S321 to produce a P-S interrupt vector to receive command data, thereby placing the FAX 2 in a state in which the FAX 2 can receive command data from the PC 4. Step S321 is followed by Steps S322, S323, and S324 to carry out Phase D. If it is judged at Step S322 that another page remains, the control goes to Step S305 to receive the next page of data and record images on another record sheet 17 according to the decoded next page of data. On the other hand, if no page remains, the control goes to Step S325 to carry out Phase E, i.e., output, to the PC 4, a +FHNG:0 signal indicating that the FAX 2 has received the PC data, and OK command data indicative of completion of the current communication. Thus, one control cycle of this program is ended.

When one page of decoded image data are stored in the recording image-data buffer 262, the FAX 2 starts a recording interrupt handler, so that the image-record device 29 records images corresponding to the one-page decoded image data. One page of decoded image data stored in the buffer 262 are deleted after the image-record device 29 records images corresponding to that page of data.

Next, there will be described the operation of the FAX 2 for making a telephone call according to a command from the PC 4.

If the PC 4 transmits, to the FAX 2, dial command data, ATD+STRING+;, commanding the FAX 2 to make a telephone call, a positive judgment is obtained at Step S71 of the data transmitting program of FIG. 14, and the control goes to Steps S77, S78, and S79. If the dial command data do not contain effective dial data, a negative judgment is made at Step S19, and a positive judgment is made at Step S85, so that the control goes to Steps S86 and S87 to carry out a monitoring operation. Specifically, the FAX 2 is connected to the external line 224, so that the user can hear voices from the line 224 through the speaker 226 as if the user had picked up the handset 11. The FAX 2 waits for the user to disconnect the FAX 2 from the line 2. If the user picks up the handset 11 and then puts down the same, or if the user pushes the HOOK key 188 once, the FAX 2 is disconnected from the line 224.

On the other hand, if a positive judgment is made at Step S79, the control goes to Steps S80, S81, and S82. If a dialing operation is carried out without any problem, a positive judgment is made at Step S82, and the control goes to Step S88 to judge whether the data received from the PC 4 are call-transmit data. Since the received data are dial command data, a negative judgment is made at Step S88, and the control goes to Step S90 to set the PC-TEL flag 278 indicating that the FAX 2 makes a telephone call according to a command from the PC 4.

Figure 24:
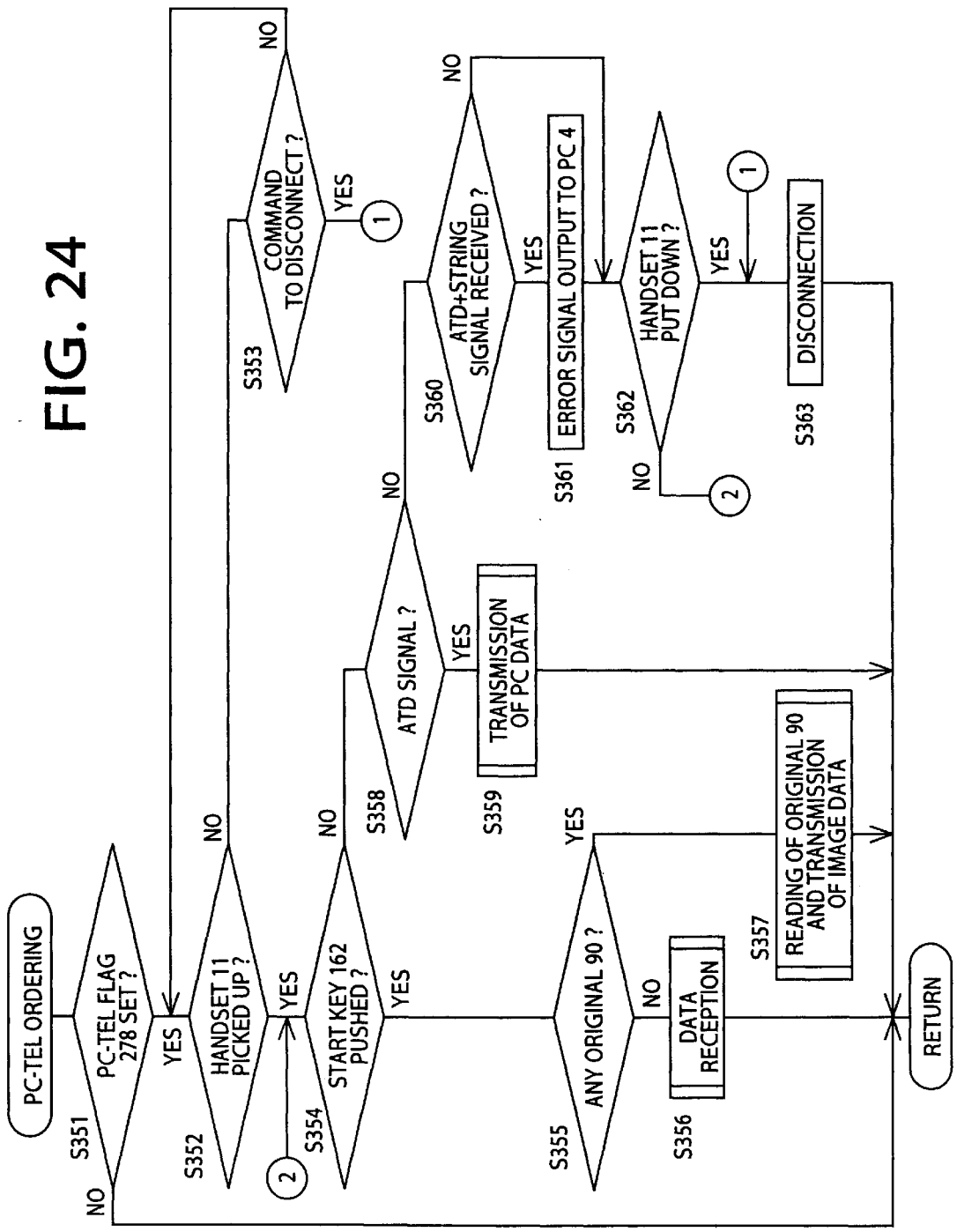
FIG. 24 is a flow chart representing a PC-TEL ordering program pre-stored in the ROM of the FAX of FIG. 1.

Thus, a positive judgment is made at Step S351 of a PC-TEL ordering program represented by the flow chart of FIG. 24, and the control goes to Step S352 to judge whether the handset 11 has been picked up by the user, thereby judging whether the user has started a telephone talk with the called person after the dialing operation has been carried out. If a negative judgment is made at Step S352, the control goes to Step S353 to judge whether the user inputs a command to disconnect the FAX 2 from the external line 224 in the manner as described above. If a positive judgment is made at Step S353, the control goes to Step S363 to disconnect the FAX 2 and end the current communication.

If the handset 11 is picked up by the user, he or she can talk with the called person. If, with the handset 11 being picked up, the START key 162 is pushed by the user, a positive judgment is made at Step S354. The pushing of the START key 162 means user's command to transmit or receive FAX data. Then, the control goes to Step S355 to judge whether any original sheets 90 are set on the FAX 2. If a negative judgment is made at Step S355, the FAX 2 judges that the pushing of the START key 162 means user's command to receive FAX data transmitted from the called person. In this case, the control goes to Step S356 to receive the FAX data. This reception of FAX data will be described later.

If one or more original sheets 90 are set on the FAX 2, a positive judgment is made at Step S355. In this case, the pushing of the START key 162 means user's command to transmit the image data read and produced by the image-read device 42 of the FAX 2, to the called person or machine. At Step S357, the image-read device 42 reads images on the original 90 and produce image data representing the original images, and the FAX control device 40 codes the image data and transmits the coded image data to the called machine. Since the reading of original images, production of image data, coding of image data, and transmission of coded image data are well known in the art, the description thereof is omitted.

If a negative judgment is made at Step S354, the control goes to Step S358 to judge whether the FAX 2 has received an ATD signal from the PC 4. The reception of ATD signal means user's command to transmit PC data to the called machine. If a positive judgment is made at Step S358, the control goes to Step S359 at which the FAX 2 receives PC data from the PC 4 and transmits the received PC data to the called machine. Since this data transmission is carried out according to the PC-data transmitting program shown in FIG. 20, the description thereof is not repeated.

If the PC 4 transmits call-transmit command data, ATD+ STRING, to the FAX 2, a negative judgment is made at Step S358, and a positive judgment is made at Step S360. For example, the user may have input, in the PC 4, a command to carry out a timer-assisted PC-data transmission to the second FAX 114 other than the currently called machine and, while the user is talking with the called person, the timer of the PC 4 may count up a pre-set time to start the transmission of PC data. In this case, however, the control goes to Step S361 to output ERROR command to the PC 4 so as to prevent the current telephone talk from being forcedly interrupted to start the data transmission. Thus, the user can continue the current telephone talk.

Step S361 is followed by Step S362 to judge whether the handset 11 has been put down on the FAX 2. If a negative judgment is made at Step S362, the control goes back to Step S354. On the other hand, if a positive judgment is made at Step S362, the control goes to Step S363 to disconnect the FAX 2 from the external line 224.

Next, there will be described the manners in which the FAX 2 receives FAX data transmitted from the second FAX 114.

Figure 25:
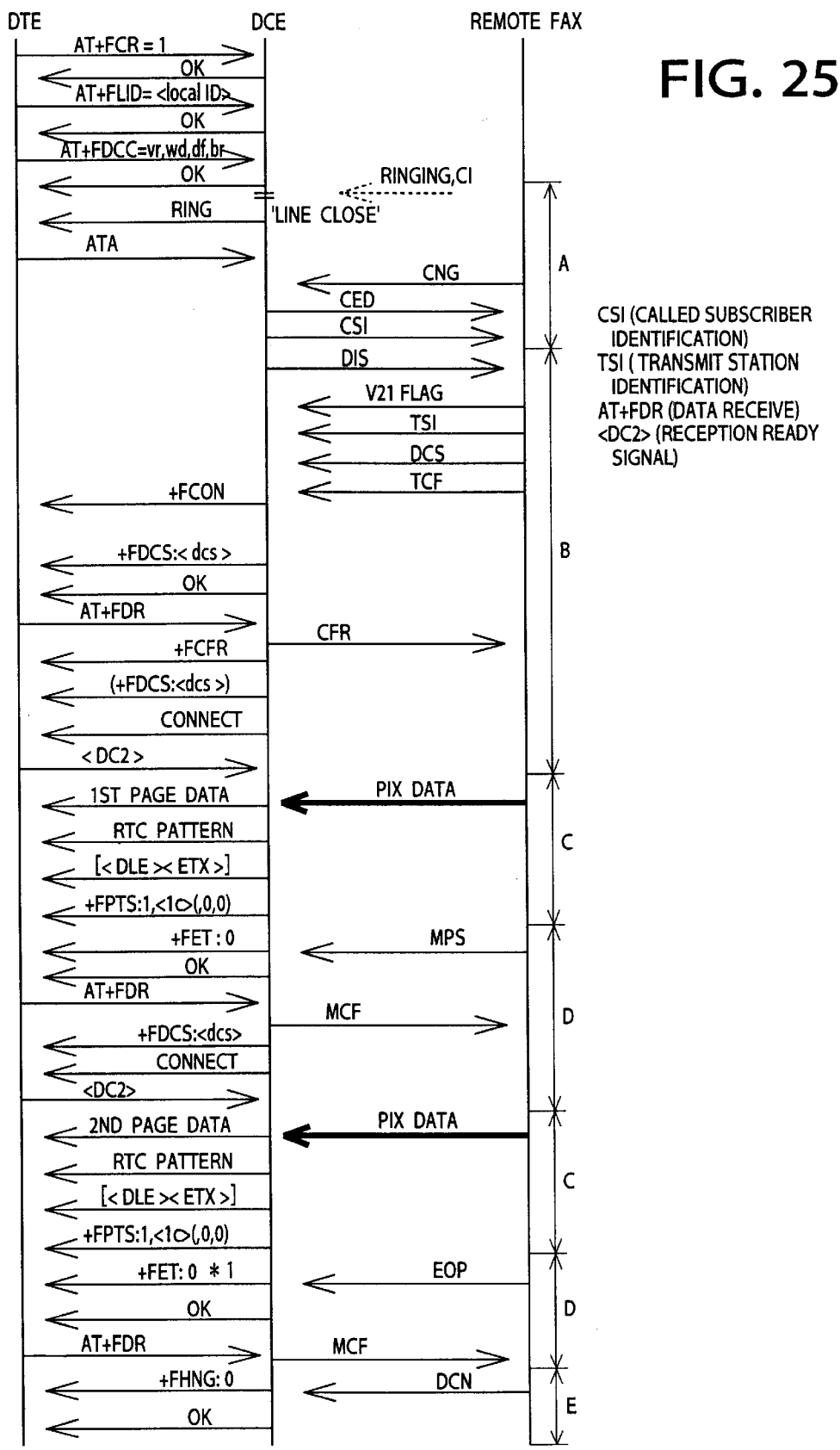
FIG. 25 is a sequence chart showing the manner of transmission and reception of image data and command data when the FAX of FIG. 1 receives facsimile (FAX) data from the second FAX and transmits the FAX data to the the PC of FIG. 1.

The manners of reception of FAX data depend on in which output mode the FAX 2 is currently placed. When the FAX 2 is placed in the PC-only mode or the PC-priority mode in each of which the PC 4 receives FAX data, the FAX 2 transmits the FAX data received from the second FAX 114, to the PC 4. FIG. 25 shows a sequence chart representing the steps or procedures taken for the reception of FAX data.

In order to receive FAX data, the PC 4 outputs, to the FAX 2, a signal, AT+FCR=X (FCR; facsimile capability to receive), indicative of data about whether the PC 4 can receive FAX data, i.e., the FAX data buffer 328 has any remaining capability for receiving additional FAX data. That the value of "X" is 0 indicates that the buffer 328 is full of data and therefore the PC 4 cannot receive any more FAX data. In response thereto, the FAX 2 outputs OK command data to the PC 4. The PC 4 further outputs, to the FAX 2, a signal, AT+FLID (facsimile local identification), indicative of a facsimile number described below, and the FAX 2 outputs OK command data to the PC 4. These communications are carried out while the FAX 2 is in the idling state.

The FAX 2 has the own FAX number buffer 264 in which the own FAX number of the FAX 2 is stored or registered. However, a plurality of different FAX numbers may be allotted to the FAX 2, so that different persons can use the FAX 2 by exclusively using the different FAX numbers, respectively. In this case, the FAX number registered on the FAX 2 may be different from the FAX number allotted to a person who is now receiving data. That person may input his or her own FAX number to the PC 4, so that the PC 4 outputs, to the FAX 2, an AT+FLID signal indicative of that FAX number. Based on the AT+FLID signal, the FAX 2 can output a CSI signal described later. In the case where just a single FAX number is allotted to the single FAX 2, the PC 4 also outputs an AT+FLID signal to the FAX 2.

The PC 4 additionally outputs, to the FAX 2, a signal, AT+FDCC, indicative of the respective levels of communication parameters thereof. In response thereto, the FAX 2 outputs OK command data to the PC 4, and stores the received signal in the PC CP buffer 263.

If the second FAX 114 transmits a CI signal to the FAX 2, the FAX 2 outputs ring (RING) command to the PC 4. In response thereto, the PC 4 outputs, to the FAX 2, an ATA signal indicating that the PC 4 can receive FAX data. When the second FAX 114 transmits a CNG signal to the FAX 2, the FAX 2 transmits, to the second FAX 114, a CED signal and a CSI signal (called subscriber identification signal) indicative of a FAX number of the FAX 2 as the called station. Phase A begins with the reception of CI signal and ends with the transmission of CSI signal.

Phase A is followed by Phase B in which the FAX 2 transmits a DIS signal to the second FAX 114. The signals exchanged between the FAX 2 and the second FAX 114 in Phase B when the FAX 2 receives FAX data from the second FAX 114, are the same as those in Phase B when the FAX 2 transmits FAX data to the second FAX 114, excepting that the directions of transmission of the former signals are opposite to those of the latter signals. Therefore, the description of the former signals is omitted. A TSI signal (transmit station identification signal) indicated in FIG. 25 is indicative of the FAX number of the second FAX 114. However, the FAX 2 does not utilize the TSI signal and discards the same. More specifically described, the FAX 2 does nothing, even if a TSI signal is transmitted thereto, according to an interrupt handler which is provided to receive a DCS signal when the FAX 2 receives FAX data.

Each time the FAX 2 receives a signal from the second FAX 114 in Phase B, the FAX 2 outputs, to the PC 4, a signal indicative of the information represented by the received signal; and, each time the FAX 2 receives a signal from the PC 4 in Phase B, the FAX 2 outputs, to the second FAX 114, a signal corresponding to the received signal. The signals transmitted from the PC 4 to the FAX 2 includes a signal, AT+FDR (facsimile data receive), indicating that the PC 4 has started preparing itself for receiving FAX data, and a signal, <DC2>, indicating that the PC 4 is ready for receiving FAX data.

The transmission of <DC2> signal is followed by Phase C in which the FAX 2 receives FAX data from the second FAX 114 and transmits the received FAX data to the PC 4. After the second FAX 114 has transmitted one page of FAX data to the FAX 2, the FAX 2 proceeds with Phase D in which the FAX 2 receives an MPS signal, an EOP signal, or an EOM signal from the second FAX 114. Also in Phase D, the signals exchanged between the FAX 2 and the second FAX 114 when the FAX 2 receives FAX data from the second FAX 114, are the same as those when the FAX 2 transmits FAX data to the second FAX 114, excepting that the directions of transmission of the former signals are opposite to those of the latter signals. Between the FAX 2 and the PC 4, a signal, +FET:0, indicative of data about whether another page of data remains, OK command data, and an AT+FDR signal are transmitted and received, as shown in FIG. 25. If the next page of data remains and the specified levels of communication parameters are not changed, the FAX 2 returns to the beginning of Phase C to receive the additional FAX data. On the other hand, when the specified levels of communication parameters are changed, the FAX returns to the beginning of Phase B to re-specify the respective levels of communication parameters and subsequently receive the additional FAX data.

If no more page of data remains, the FAX 2 proceeds with Phase E to disconnect itself from the external line 224 and terminate the current communication.

The FAX data received from the second FAX 114 are stored in the modem RD buffer 239 of the modem 214. The FAX 2 transfers, by interruption, the FAX data from the buffer 239 to the FAX RD buffer 254 and transmits, by interruption, the FAX data from the buffer 254 to the PC 4.

Figure 26:
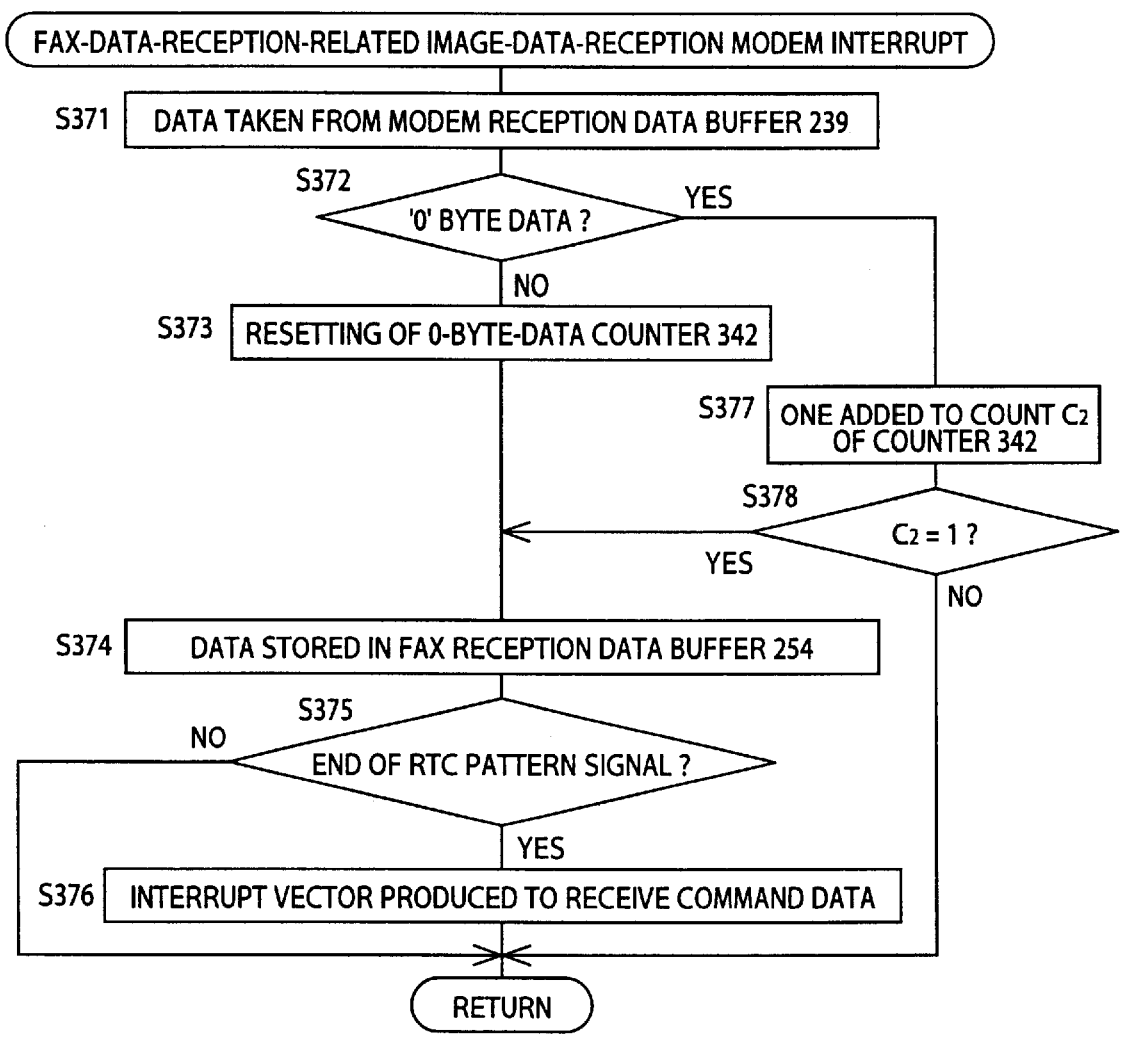
FIG. 26 is a flow chart representing a FAX-data-reception-related image-data-reception modem interrupt handler pre-stored in the ROM of the FAX of FIG. 1.
Figure 27:
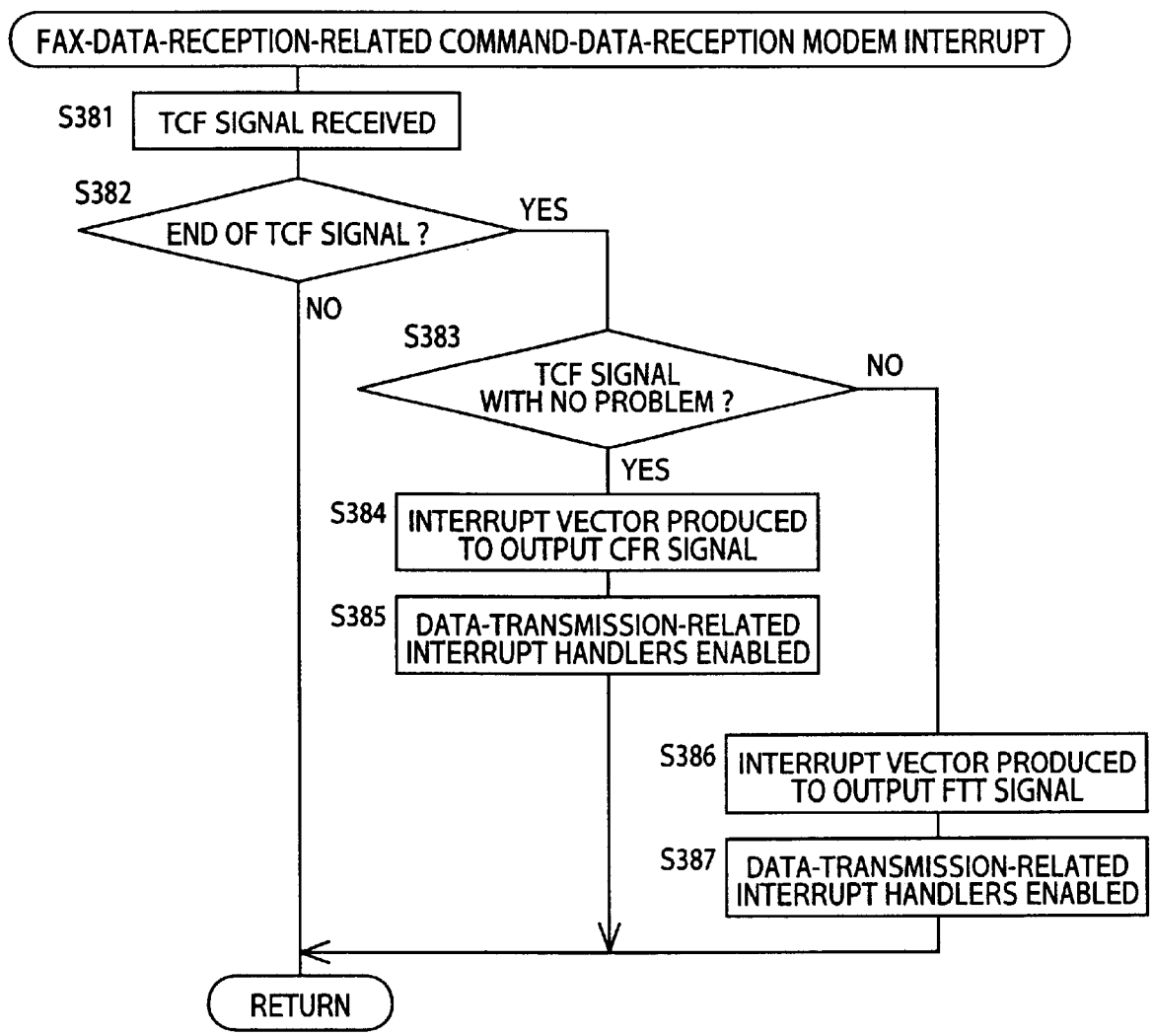
FIG. 27 is a flow chart representing a FAX-data-reception-related command-data-reception modem interrupt handler pre-stored in the ROM of the FAX of FIG. 1.
Figure 28:
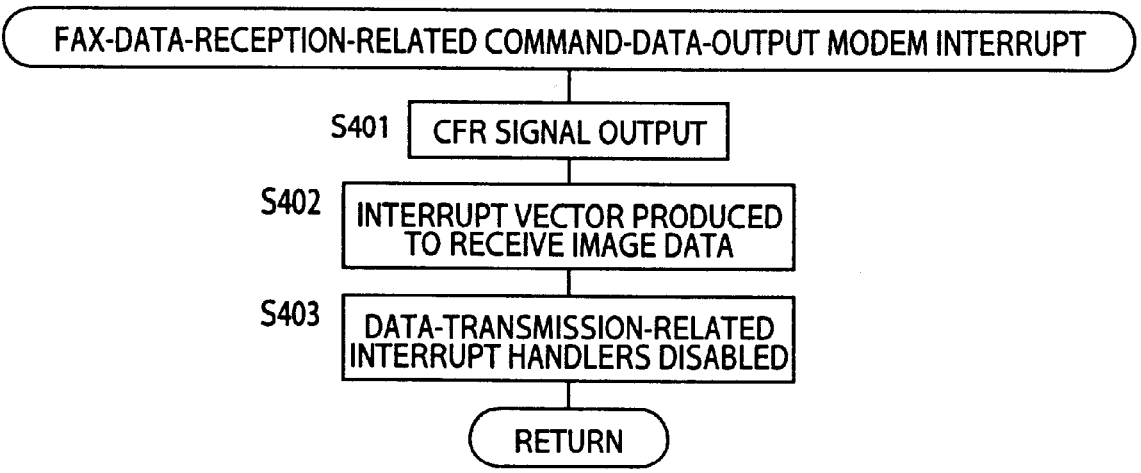
FIG. 28 is a flow chart representing a FAX-data-reception-related command-data-output modem interrupt handler pre-stored in the ROM of the FAX of FIG. 1.
Figure 29:
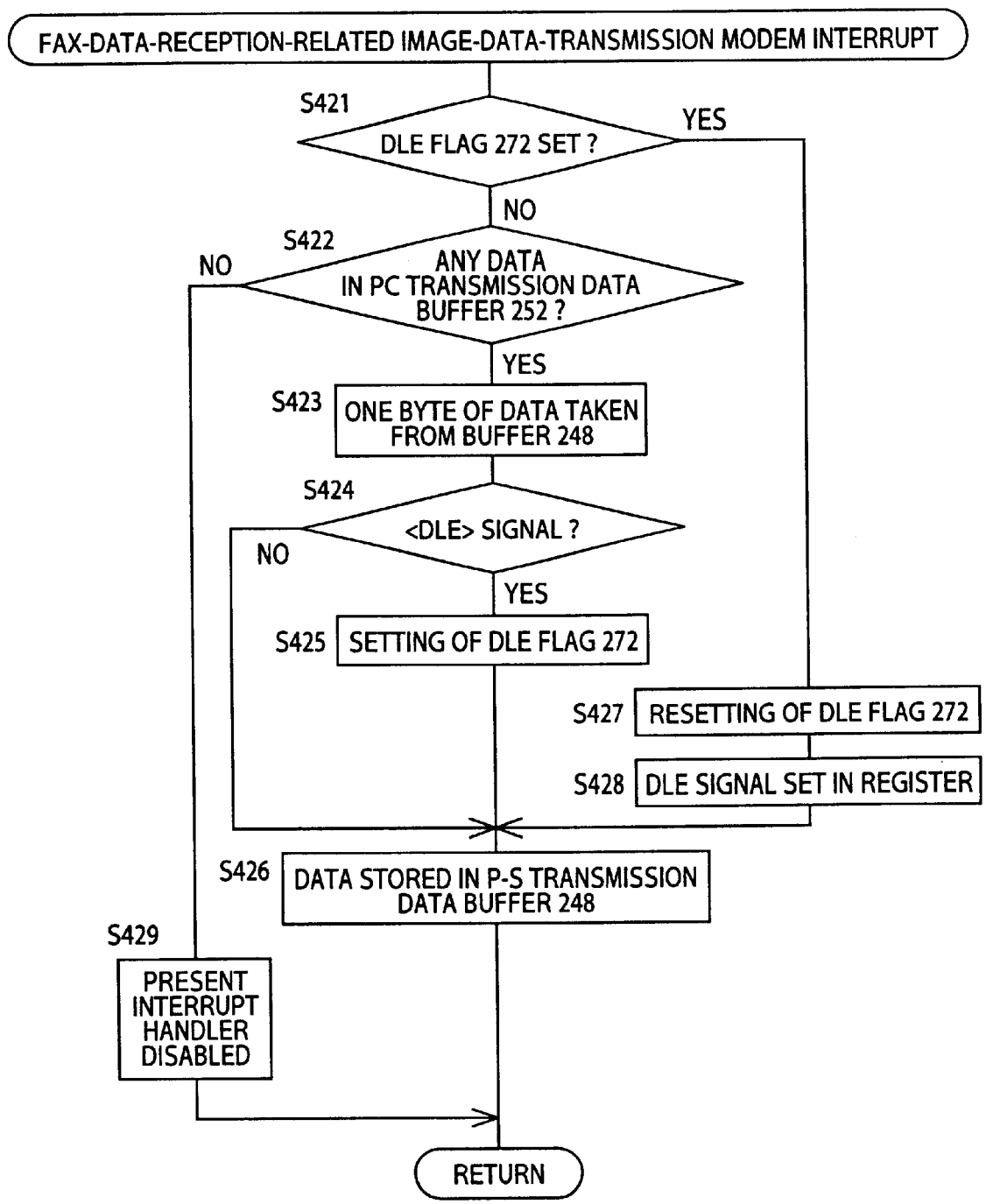
FIG. 29 is a flow chart representing a FAX-data-reception-related image-data-output P-S interrupt handler pre-stored in the ROM of the FAX of FIG. 1.

The above interruptions are carried out according to a FAX-data-reception-related image-data-reception modem interrupt handler represented by the flow chart of FIG. 26, a FAX-data-reception-related command-data-reception modem interrupt handler represented by the flow chart of FIG. 27, a FAX-data-reception-related command-data-output modem interrupt handler represented by the flow chart of FIG. 28, and a FAX-data-reception-related image-data-transmission modem interrupt handler represented by the flow chart of FIG. 29. In addition, when the FAX 2 receives FAX data from the second FAX 114, the FAX 2 receives data from the PC 4, according to a FAX-data-reception-related data-reception P-S interrupt handler represented by the flow chart of FIG. 30. The transmission and reception of command data between the FAX 2 and the PC 4 when the FAX 2 receives FAX data from the second FAX 114, are carried out according to the programs represented by the flow charts of FIGS. 10 and 16, like when the FAX 2 receives PC data from the PC 4. The description of those operations is omitted.

The FAX-data-reception-related image-data-reception modem interrupt handler of FIG. 26 is carried out each time FAX data are stored in the FAX RD buffer 239. At Step S371, one bite of FAX data are taken from the buffer 239 and, at Step S372, it is judged whether the 8 sets of bit data as the one-bite data each are indicative of '0' (hereinafter, referred to as the '0' bite data). If the one-bite data include at least one set of '1' bit data indicative of the presence of an image, i.e., if the one-bite data are image data, a negative judgment is made at Step S372, and the control goes to Step S373 to reset the 0-bite-data counter 342 to zero and then to Step S374 to store the image data in the FAX RD buffer 254.

Step S374 is followed by Step S375 to judge whether the one-bite data is indicative of the end of RTC PATTERN data, i.e., judge whether the one-bite data stored in the FAX RD buffer 254 is the 6th set of EOL data indicative of the end of RTC PATTERN data. If a positive judgment is made at Step S375, the control goes to Step S376 to produce an interrupt vector to receive the following command data.

On the other hand, if a positive judgment is made at Step S372, the control goes to Step S377 to add one to a counted number, $C_2$, of the 0-bite-data counter 342. Step S377 is followed by Step S378 to judge whether the counted number $C_2$ is one. If the number of positive judgments made at Step S372 is one, a positive judgment is made at Step S378, the '0' data are stored in the FAX RD buffer 254. If two or more sets of '0' data are successively identified at Step S372, a negative judgment is made at Step S378. Thus, the second or following set of "0" one-bite data is not stored in the buffer 254.

Since an EOL signal consists of eleven sets of '0' bit data and one set of '1' bit data, the FAX 2 stores the EOL signal in the FAX RD buffer 254, by storing one set of '0' data of the EOL signal in the buffer 254. In the case where some bits of 0-fill data are inserted to hold the shortest possible time needed for the transmission of one line of data, two or more sets of '0' data may successively be found at Step S372. The second or further set of '0' data need not be stored in the buffer 254. Therefore, if the counted number C2 is greater than one, one control cycle of this program is ended. If image data is found following one set of '0' bite data, a negative judgment is made at Step S372, and the control goes to Step S373 to reset the 0-bite-data counter 342 to zero.

The FAX 2 are provided with a plurality of FAX-data-reception-related command-data-reception modem interrupt handlers corresponding to a plurality of sorts of command data received thereby, and a plurality of FAX-data-reception-related command-data-output modem interrupt handlers corresponding to a plurality of sorts of command data transmitted thereby. The order of command-data reception and outputting and FAX data reception when the FAX 2 receives FAX data from the second FAX 114, is predetermined as indicated in the sequence chart of FIG. 25. When the FAX 2 receives a set of command data, the FAX 2 selects one of the command-data-reception-related interrupt handlers which corresponds to the sort of the command data received, and produces an interrupt vector to output or receive another set of command data, according to the selected interrupt handler. Similarly, when the FAX 2 transmits a certain set of command data, the FAX 2 selects one of the command-data-output-related interrupt handlers which corresponds to the sort of the command data to be transmitted, and produces an interrupt vector to output or receive another set of command data, according to the selected interrupt handler. In addition, the FAX 2 produces an interrupt vector to receive FAX data, after a CFR signal is output, according to an interrupt handler provided for outputting a CFR signal.

FIG. 27 shows an interrupt handler provided for receiving a TCF signal after the FAX 2 has received a DCS signal. According to an interrupt handler provided for receiving a DCS signal, the FAX 2 produces an interrupt vector to designate the interrupt handler of FIG. 27, upon reception of a DCS signal. Then, if a TCF signal is transmitted from the second FAX 114, the FAX 2 receives the TCF signal at Step S381 of FIG. 27. Steps S381 and S382 are repeated until the reception of the TCF signal is completed. Upon completion of the TCF reception, a positive judgment is made at Step S382, and the control goes to Step S383 to judge, based on the TCF signal, whether the training check carried out by the second FAX 114 has provided a good result. If a good training check was carried out on the second FAX 114, the control is allowed to proceed with the next procedure, i.e., Step S384 to produce an interrupt vector to designate a program provided for outputting a CFR signal. Step S384 is followed by Step S385 to enable the data-transmission-related interrupt handlers to be carried out.

On the other hand, if a negative judgment is made at Step S383, the control goes to Step S386 to produce an interrupt vector to allow the FAX 2 to operate according to an interrupt handler provided for outputting an FTT (failure to train) signal. Step S386 is followed by Step S387 to enable the data-transmission-related interrupt handlers to be carried out.

FIG. 28 shows an interrupt handler provided for outputting a CFR signal. This interrupt handler is enabled when an interrupt vector to output a CFR signal is produced at Step S384 of FIG. 27. At Step S401, the FAX 2 outputs a CFR signal and, at Step S402, the FAX 2 produces an interrupt vector to designate the FAX-data-reception-related image-data-reception modem interrupt handler of FIG. 26, so that the FAX 2 can receive image data from the second FAX 114. Step S402 is followed by Step S403 to disable the data-transmission-related interrupt handlers. In this situation, the FAX 2 can only receive image data.

FIG. 29 shows the FAX-data-reception-related image-data-transmission modem interrupt handler. At Step S421, it is judged whether the DLE flag 272 has been set. If a negative judgment is made at Step S421, the control goes to Step S422 to judge whether any data remain in the PC TD buffer 252. If a positive judgment is made at Step S422, the control goes to Step S423 to take one bite of data from the buffer 252. Step S423 is followed by Step S424 to judge whether the taken data are <DLE> data. If the taken data are image data, a negative judgment is made at Step S424, and the control goes to Step S426 to store the taken data in the P-S TD buffer 248.

On the other hand, if a positive judgment is made at Step S424, the control goes to Step S425 to set the DLE flag 272. Thereafter, at Step S421, a positive judgment is obtained, so that the control goes to Step S427 to reset the DLE flag 272 and then to Step S428 to write <DLE> data in a register. Following Step S428, the control goes to Step S426 to store the <DLE> data in the P-S TD buffer 248. Thus, two sets of <DLE> data are stored in the buffer 248, because the PC 4 cannot recognize one set of <DLE>data as the <DLE> data, unlike other sorts of data.

If no data is found in the PC TD buffer 252 after the FAX 2 has started the FAX-data-reception-related image-data-transmission modem interrupt handler of FIG. 29, i.e., if a negative judgment is made at Step S422, it means that the current state of the FAX 2 is abnormal. Then, the control goes to Step S429 to disable the present interrupt handler.

Figure 30:
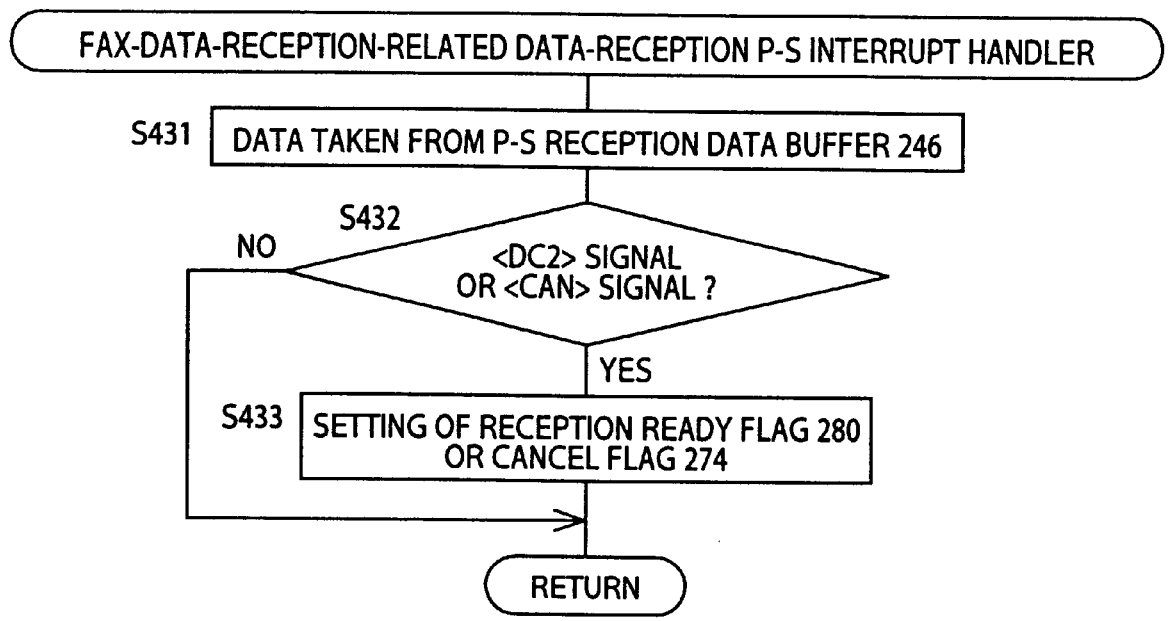
FIG. 30 is a flow chart representing a FAX-data-reception-related data-reception P-S interrupt handler pre-stored in the ROM of the FAX of FIG. 1.

FIG. 30 shows the FAX-data-reception-related data-reception P-S interrupt handler. At Step S431, one bite of data are taken from the P-S RD buffer 246 and, at Step S432, it is judge whether the taken data are <DC2> data or <CAN> data. When the FAX 2 receives FAX data from the second FAX 114 and transmits the received FAX data to the PC 4, the data transmitted from the PC 4 must be the above-mentioned <DC2> data or <CAN> data. The FAX 2 discards other sorts of data. If a positive judgment is made at Step S432, the control goes to Step S433 to set the reception ready flag 280 corresponding to the <DC2> data, or the cancel flag 274 corresponding to the <CAN> data.

Next, there will be described the reception of FAX data, by reference to the flow chart of FIG. 31. First, at Step S501, it is judge whether the FAX 2 has received FAX data, according to a FAX-data-reception judging program represented by the flow chart of FIG. 32.

Figure 32:
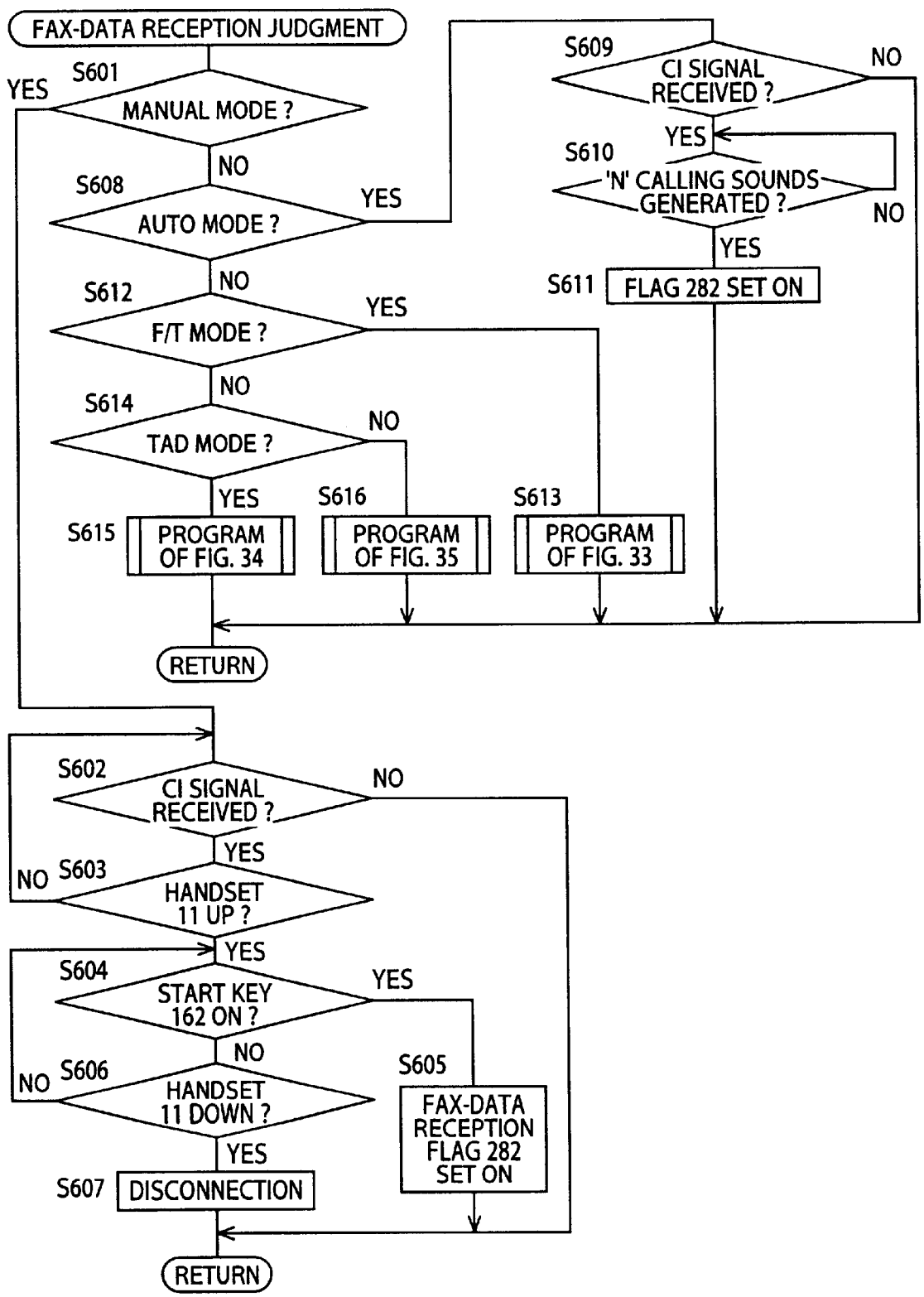
FIG. 32 is a flow chart representing a FAX-data-reception judging program pre-stored in the ROM of the FAX of FIG. 1.

At Step S601 of FIG. 32, it is judged whether the FAX 2 is currently placed in the MANUAL mode as one of the reception modes selectable thereon. If a positive judgment is made at Step S601, the control goes to Step S602 to judge whether the FAX 2 has received a CI signal from the second FAX 2. If a negative judgment is made at Step S602, one control cycle of this program is ended.

If a positive judgment is made at Step S602, the control goes to Step S603 to judge whether the handset 11 has been picked up by the user. If a negative judgment is made at Step S603, the control goes back to Step S602. Steps S602 and S603 are repeated until the CI signal ends, i.e., the calling person or machine terminates the current communication, or until the handset 11 is picked up by the user, i.e., called person. While Steps S602 and S603 are repeated, the ringing device 232 is driven to ring, i.e., generates a calling sound. If the calling person ends the communication before the handset 11 is picked by the user, a negative judgment is made at Step S602, and one control cycle of this program ends.

On the other hand, if the handset 11 is picked up, a positive judgment is made at Step S603, and the control goes to Step S604 to judge whether the START key 162 has been pushed. If, with the handset 11 being picked up, the user does not hear any voice of the calling person but hears a sound indicative of a signal, such as CNG signal, which is followed by FAX data from the calling machine, he or she can recognize that FAX data is being transmitted from the calling machine, and will push the START key 162 to input a command to receive the FAX data. Thus, a positive judgment is made at Step S604, and the control goes to Step S605 to set the FAX-data reception flag 282.

So long as the handest 11 is not picked up, the FAX 2 cannott received any FAX data even if the START key 162 may be pushed. In the MANUAL mode, the FAX 2 behaves to received FAX data, as if the FAX 2 were a telephone set, because is very common in this mode that the user picks up the handest 11 in response to ringing.

If a nagative judgment is made at Step S604, the control goes to Step S606 to judge wheter the handset 11 has been put down. If a negative judgment is made at Step S606, the control goes back to Step S604. Steps S604 and S606 are repeated until the START key 162 is pushed or until the handset 11 is put down. If the signal transmitted from the calling machine is a telephone signal representing voices of the calling person, the user will start talking with the calling person and, if the talking ends, the user will put the handset 11 down. In the letter case, a positive judgment is made at Step S606, and the control goes to Step S607 to disconnect the FAX 2 from the external line 224. Thus, one control cycle of this program ends.

On the other hand, if a negative judgment is made at Step S601, the control goes to step S608 to judge whether the FAX 2 is currently placed in the AUTO mode as one of the reception modes. If a positive judgment is made at Step S608, the control goes to Step S609 to judge wheter the FAX 2 has received a CI signal. If a negative judgment is made at Step S609, one control cycle of this routine is ended. If a positive judgment is made at Step S609, the control goes to Step S610 to judge whether the FAX 2 has been called 'N' times by the calling machine, i.e., whether the number of calling sounds generated by the FAX 2 exceeds the number 'N'. Data indicative of the number 'N' are pre-stored in the ROM 204. If a positive judgment is made at Step S610, the control goes to Step S611 to set the FAX-data reception flag 282 to an 'ON' state thereof.

If a negative judgment is made at Step S608, the control goes to Step S612 to judge whether the FAX 2 is currently placed in the F/T mode as one of the reception modes. If a positive judgment is made at Step S612, the control goes to Step S613 to carry out an F/T mode-related FAX-data-reception judging program represented by the flow chart of FIG. 33.

Figure 33:
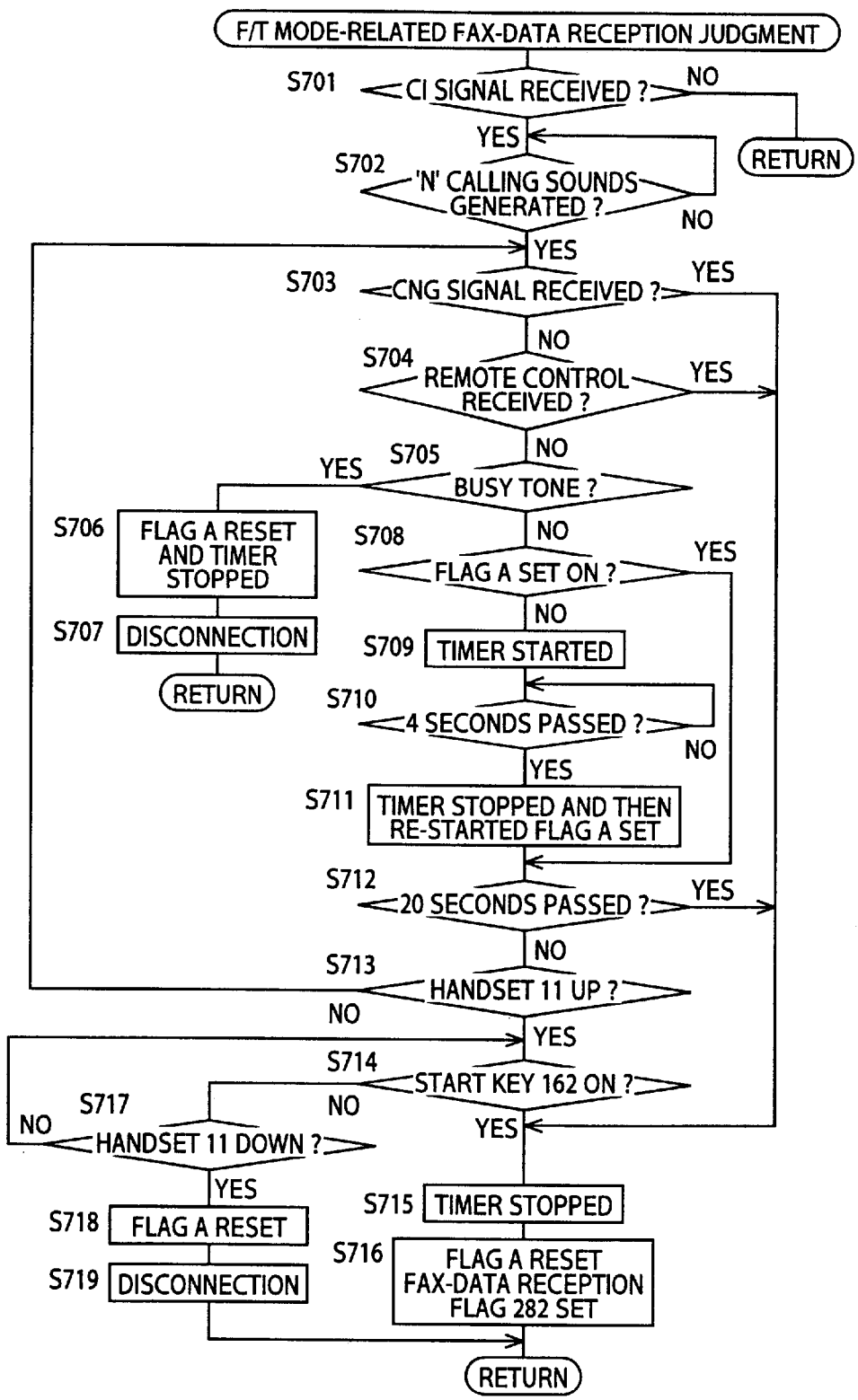
FIG. 33 is a flow chart representing an F/T-mode-related FAX-data-reception judging program pre-stored in the ROM of the FAX of FIG. 1.

A FAX-data-reception judging operation in accordance with the F/T mode-related FAX-data-reception judging program is briefly described in connection with steps of the flow chart of FIG. 33. In the F/T mode, when the FAX 2 receives a CI signal at Step S701, subsequently is called 'N' times at Step S702, and then receives a CNG signal at Step S703, or when the FAX 2 is commanded by a remote control (described below) at Step S704, or when 4 seconds have passed after a positive judgment is obtained at Step S702 and thereafter 20 seconds have passed without picking up of the handset 11 or ending of the current communication by the calling machine, at Steps S708, S709, S710, S711, S712, S713, or when the handset 11 is picked up within 20 seconds and the START key 162 is pushed to command the reception of FAX data, at Step S714, the FAX 2 prepares itself for receiving FAX data.

The outside answering telephone set 190 is connected to the FAX 2. When the FAX 2 rings, the user can pick up a handset of the outside telephone 190. If the user cannot hear any voices through this handset, i.e., if FAX data are being transmitted to the FAX 2, the user can input, into the outside telephone 190, an instruction to command the FAX 2 to receive the FAX data. This is 'remote control' utilized at Step S704.

If 4 seconds have passed after a positive judgment is made at Step S702, the control goes to Step S711 to set the flag A. Therefore, in the following control cycles, the control skips Steps S709, S710, and S711 and directly goes to Step S712 to judge whether 20 seconds have passed. Meanwhile, if the FAX 2 receives a busy tone at Step S705, i.e., identifies that the current communication has been ended by the calling machine, the FAX 2 resets, at Step S706, the flag A which has been set at Step S711 and stops a timer which has been started at Step S709 and, at Step S707, the FAX 2 disconnects itself from the external line 224.

In short, if the FAX 2 receives a CNG signal at Step S703, is commanded by a remote control at Step S704, or 20 seconds have passed at Step S712, and if the communication is not ended by the calling machine at S705 and the handset 11 is not picked up by the user at Step S713, the FAX 2 judges that the FAX 2 is receiving FAX data, so that the FAX 2 stops the timer and resets the flag A and sets the FAX-data reception flag 282 at Steps S715 and S716.

When the user takes, at Step S713, the handset 11 before the FAX 2 identifies the reception of FAX data, the user will talk with the calling person if he or she hears voices through the handset 11. In this case, when the handset 11 is put down at Step S717, the control goes to Step S718 to reset the flag A and disconnect the FAX 2 at Step S719. On the other hand, if the user cannot hear any voices through the handset 11 being picked up, he or she will identify the reception of FAX data and push the START key 162 at Step S714. Then, the control goes to Steps S715 and S716.

Figure 34:
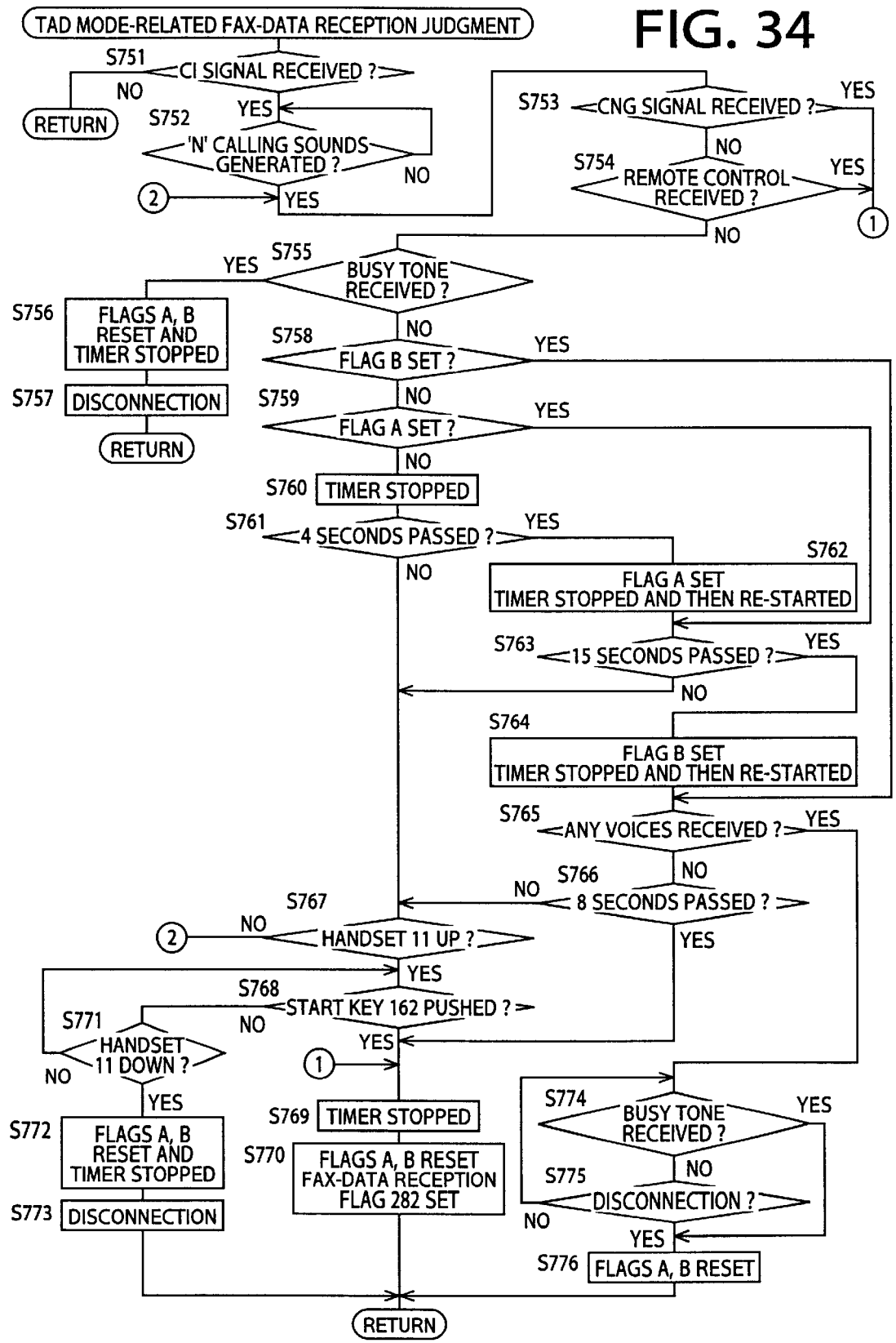
FIG. 34 is a flow chart representing a TAD-mode-related FAX-data-reception judging program pre-stored in the ROM of the FAX of FIG. 1.

When the FAX 2 is currently placed in not the F/T mode but the TAD mode as one of the reception modes, a negative judgment is made at Step S612 of the FAX-data-reception judging program of FIG. 32, and a positive judgment is made at Step S614, so that the control goes to Step S615 to carry out a TAD-mode-related FAX-data-reception judging program represented by the flow chart of FIG. 34. According to the TAD-mode-related FAX-data-reception judging program, the FAX 2 identifies the reception of FAX data if, after a CI signal is received at Step S751 and 'N' calling sounds are generated at Step S752, a CNG signal is received at Step S753, a remote control is received at Step S753, or 8 seconds have passed without reception of voices after an answering message is output to the calling machine, at Step S766.

In the TAD mode, the outside answering telephone 190 transmits, to the calling machine (e.g., second FAX 114), an answering message that the answering telephone 190 is ready for recording messages of the calling person. The FAX 2 identifies, at Steps S760, S761, S762, and S763, the end of this response message when 4 seconds have passed following the generation of 'N' calling sounds at Step S752 and then 15 seconds have passed. After 15 seconds have passed at Step S763, a timer which has been started at Step S760 is stopped and then started to measure 8 seconds at Steps S764, S765, and S766. If four seconds have passed at Step S761, the control goes to Step S762 to set the flag A and start the timer to measure 15 seconds. If 15 seconds have passed at Step S763, the control goes to Step S764 to stop the timer and then re-start the timer to measure 8 seconds.

Meanwhile, if the FAX 2 receives any voices at Step S765, the FAX 2 judges that the FAX 2 is receiving a telephone signal or data. In this case, if the FAX 2 receives, at Step S774, a busy tone indicating that the current communication is ended by the calling person, or identifies, at Step S775, that the outside answering telephone 190 has disconnected the FAX 2 from the external line 224, the FAX 2 resets the flag A and the flag B and ends the communication, at Step S776.

When the user picks up the handset 11 at Step S767 during this FAX-data reception judging operation, he or she will talk with the calling person if a telephone (TEL) signal is being received, and on the other hand will push the START key 162 to receive FAX data if the signal being received is not a TEL signal but a FAX signal or data, at Steps S768, S769, S770, S771, S772, and S773.

Figure 35:
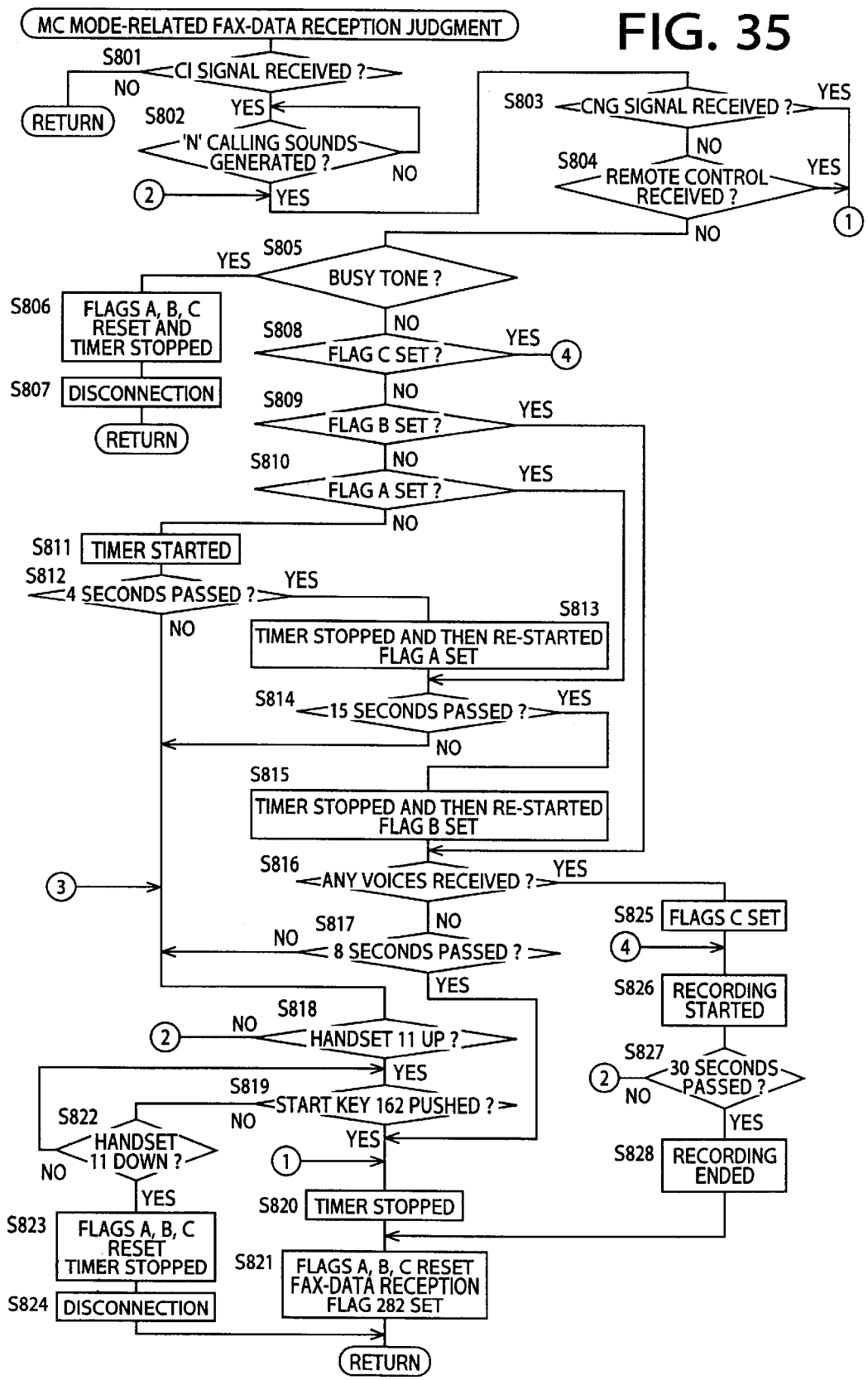
FIG. 35 is a flow chart representing an MC-mode-related FAX-data-reception judging program pre-stored in the ROM of the FAX of FIG. 1.

When the FAX 2 is currently placed in the MC mode as one of the reception modes, a negative judgment is made at Step S614 of the FAX-data reception judging program of FIG. 32, and the control goes to Step S616 to carry out an MC mode-related FAX-data reception judging program represented by the flow chart of FIG. 35. In the MC mode, the FAX 2 identifies the reception of FAX data if, after a CI signal is received at Step S801 and 'N' calling sounds are generated at Step S802, a CNG signal is received at Step S803; a remote control is received at Step S804; 8 seconds have passed without reception of voices after an answering message is output to the calling machine, at Step S817; 30 seconds have passed after recording of voices from the calling person is started, at Step S827; or the START key 162 is pushed after the handset 11 is picked up, at Steps S818 and S819.

The MC mode-related program of FIG. 35 is different from the TAD mode-related program of FIG. 34, only with regard to the manner of recording of voices received from the calling person, which will be described below. If the FAX 2 receives any voices at Step S816, the FAX starts recording those voices at Steps S825 and S826. If the calling person ends the current communication before 30 seconds have passed, at Step S827, the control goes back to Step S803. In this case, a positive judgment is made at Step S805, and the FAX 2 ends the communication at Steps S806 and S807. On the other hand, if 30 seconds have passed at Step S827, the FAX 2 recognizes the reception of FAX data. Thus, the FAX 2 can reliably receive FAX data even in the case where the FAX 2 erroneously identifies noise as a voice at Step S816 although, in fact, FAX data are being transmitted to the FAX 2. In the case where the voices identified by the FAX 2 at Step S816 are true voices of the calling person, the FAX 2 transmits FAX-related signals, such as CNG signal, to the calling machine in the following FAX-data reception procedures, so that the calling person can end the current communication in response to the CNG signal.

Figure 31:
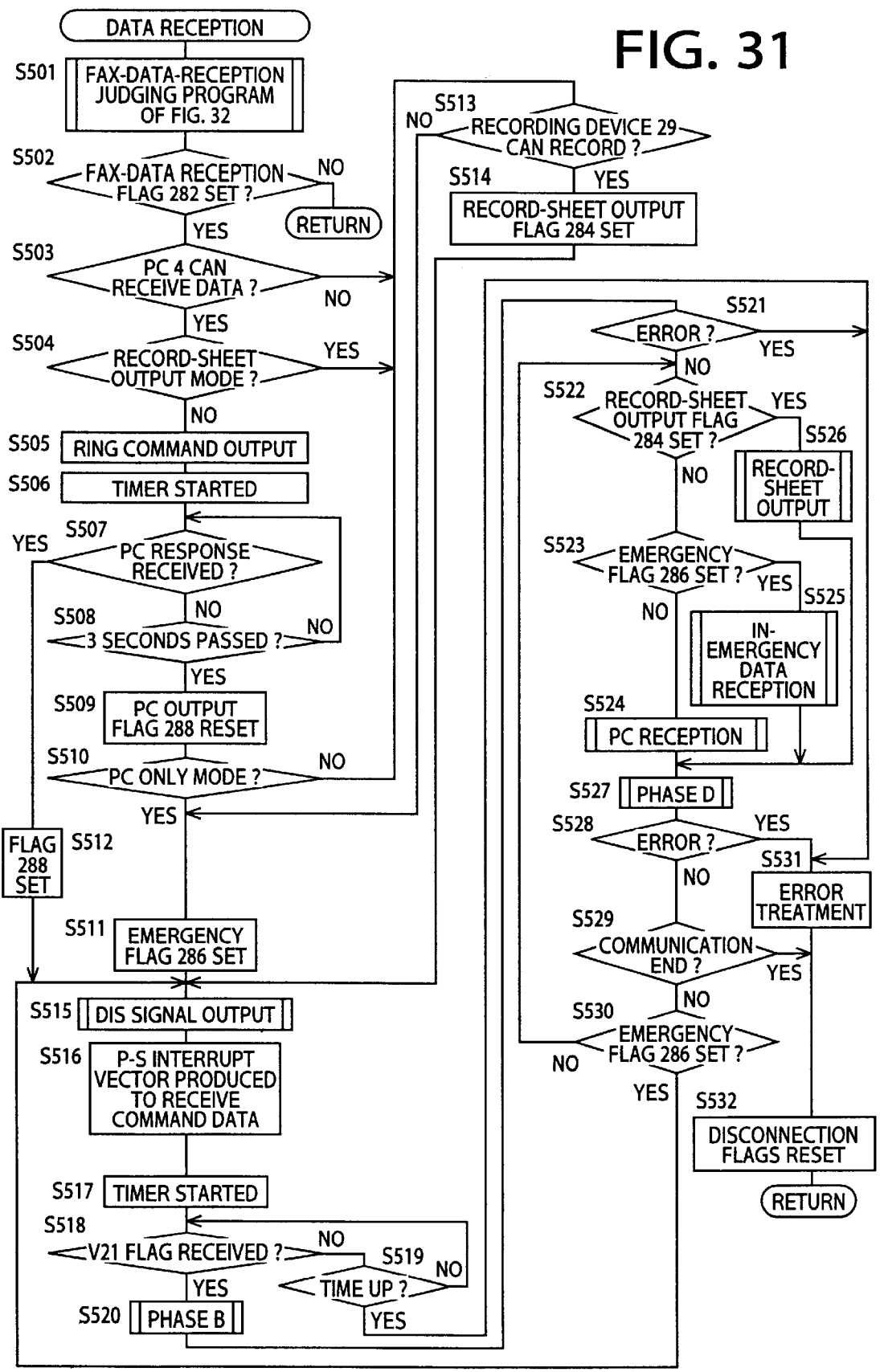
FIG. 31 is a flow chart representing a data receiving program pre-stored in the ROM of the FAX of FIG. 1.

After the above-described FAX-data-reception judging operation, Step S501 of the data receiving program of FIG. 31 is followed by Step S502 to judge whether the FAX-data reception flag 282 has been set to an 'ON' state thereof. If the signal being received is not FAX data but TEL data, the flag 282 has not been set to the 'N' state, and a negative judgment is made at Step S502. Thus, one control cycle of this program is ended.

On the other hand, if the data being received is FAX data and the FAX-data reception flag 282 is set at the 'ON' state, a positive judgment is made at Step S502, and the control goes to Step S503 to judge whether it is possible to transmit data to the PC 4, by judging whether the FAX 2 is connected to the I/F box 6. Whether the FAX 2 is connected to the I/F box 6 is judged based on an output signal produced from a connection line of the I/O port 210 which line is connected to the I/F box 6. If a negative judgment is obtained at Step S503, the control goes to Step S513 to judge whether it is possible to record images according to the FAX data being received.

Judging whether recording is possible at Step S513 is done by judging whether any record sheets 17 remain and whether toner remains in an amount sufficient to record images. Whether any record sheets 17 remain is judged based on a detection signal supplied from the record-sheet sensor 20. Whether sufficient toner remains is judged based on a detection signal supplied from the remaining-toner measuring device 80. If a positive judgment is made at Step S513, the control goes to Step S514 to set the record-sheet output flag 284. On the other hand, if a negative judgment is made at Step S513, the control goes to Step S511 to set the emergency flag 286.

If a positive judgment is made at Step S503, the control goes to Step S504 to judge whether the FAX 2 is currently placed in the RECORD-SHEET OUTPUT mode as one of the output modes selectable thereon. If a positive judgment is made at Step S504, the control goes to Step S513. If recording is possible, the record-sheet output flag 284 is set at Step S514. On the other hand, if recording is impossible, the emergency flag 286 is set at Step S511.

If the FAX 2 is not placed in the RECORD-SHEET OUTPUT mode, the FAX 2 is in the PC-ONLY mode or PC-PRIORITY mode in each of which mode the FAX 4 transmits FAX data to the PC 4. In this case, the control goes to Step S505 to output ring command data to the PC 4. Subsequently, at Steps S506, S507, and S508, the FAX 2 judges whether the FAX 2 has received a reply from the PC 4 in response to the ring command data, within a reference time duration (e.g., 3 seconds). This reply is an ATA signal, as previously described in connection with the sequence chart of FIG. 25. If a positive judgment is made at Step S507, the control goes to Step S512 to set the PC output flag 288, thereby indicating that the PC 4 can receive FAX data.

For example, when the PC 4 is operating according to a program which needs a long time to the end thereof, the PC 4 cannot respond to command data from the FAX 2, or cannot receive FAX data from the same. Consequently a positive judgment is made at Step S508, and the control goes to Step S509 to reset the PC output flag 288, thereby indicating that the PC 4 cannot receive FAX data.

Even if the FAX 2 may be placed in the PC-ONLY or PC-PRIORITY mode, FAX data cannot be received by the PC 4 unless the 'reception' function has been selected on the PC. That is, even if the FAX 2 outputs ring command data to the PC 4, the PC 4 cannot return an ATA signal to the FAX 2. Therefore, if 3 seconds have passed without any response from the PC 4, a positive judgment is made at Step S508, and the PC output flag 288 is reset at Step S509.

The PC 4 outputs an ATA signal to the FAX 2, only when there is no reason for the PC 4 to negate the capability to receive FAX data. That is, an ATA signal permits the FAX 2 to transmit FAX data to the PC 4. An ATA signal is output under the conditions that the PC 4 is connected to the I/F box 6, that the PC 4 is supplied with electric power, that the FAX data buffer 328 of the PC 4 has a remaining capacity for storing data, that the PC 4 is operating according to a program provided for receiving FAX data, and that the PC 4 is not operating according to one of the programs other than the FAX-data receiving program and therefore can receive FAX data.

Step S509 is followed by Step S510 to judge whether the FAX 2 is currently placed in the PC-ONLY mode. If the FAX 2 is in the PC-PRIORITY mode, a negative judgment is made at Step S510, and the control goes to Step S513. When the PC 4 cannot receive FAX data while the FAX 2 is in the PC-PRIORITY mode, the image-record device 29 of the FAX 2 records images according to the FAX data and outputs the record sheet or sheets 17 on which the images have been recorded. If recording is impossible, the FAX 2 stores the FAX data in the FAX RD buffer 254.

If a positive judgment is made at Step S510, the control goes to Step S511 to set the emergency flag 286, thereby indicating that the FAX data have been stored in the FAX RD buffer 254.

As is apparent from the foregoing description, the record-sheet output flag 284 is set to an 'ON' state thereof, when the FAX 2 is in the RECORD-SHEET OUTPUT mode, when the PC 4 is not connected to the FAX 2 and simultaneously recording is possible on the FAX 2, irrespective of which output mode the FAX 2 is currently placed in, or when the PC 4 cannot receive FAX data upon reception of the FAX data to the FAX 2 in the PC-PRIORITY mode and simultaneously recording is possible on the FAX 2. When the record-sheet output flag 284 is set at the 'ON' state, the reception of FAX data and the recording of images according to the FAX data are concurrently carried out, all the data from the start to the end, at Step S526.

The emergency flag 286 is set to an 'ON' state thereof, when the FAX 2 is in the RECORD-SHEET OUTPUT mode and simultaneously recording is impossible on the FAX 2, when the PC 4 is connected to the FAX 2 in the PC-ONLY mode and simultaneously the PC 4 cannot receive FAX data upon reception of the FAX data to the FAX 2, or when the PC 4 cannot receive FAX data upon reception of the FAX data to the FAX 2 in the PC-PRIORITY mode and simultaneously recording is impossible on the FAX 2. When the emergency flag 286 is set at the "ON" state, the FAX data being received are stored in the FAX RD buffer 254, all the data from the start to the end, at Step S525. When the FAX 2 is in the RECORD-SHEET OUTPUT mode and simultaneously recording is impossible on the FAX 2, the FAX data being received are stored in the buffer 254. This emergency reception is also carried out at Step S525.

The situation in which the PC 4 is connected to the FAX 2 in the PC-ONLY mode and simultaneously the PC 4 cannot receive FAX data upon reception of the FAX data to the FAX 2, or the situation in which the PC 4 cannot receive FAX data upon reception of the FAX data to the FAX 2 in the PC-PRIORITY mode and simultaneously recording is impossible on the FAX 2, is displayed or indicated on the display device 150 of the FAX 2.

Neither the record-sheet output flag 284 nor the emergency flag 286 is set when the FAX 2 is the PC-ONLY or PC-PRIORITY mode and simultaneously the PC 4 can receive FAX data. In this case, the reception of the FAX data from the second FAX 114 and the transmission of the FAX data to the PC 4 are concurrently carried out at Step S524.

Figure 36:
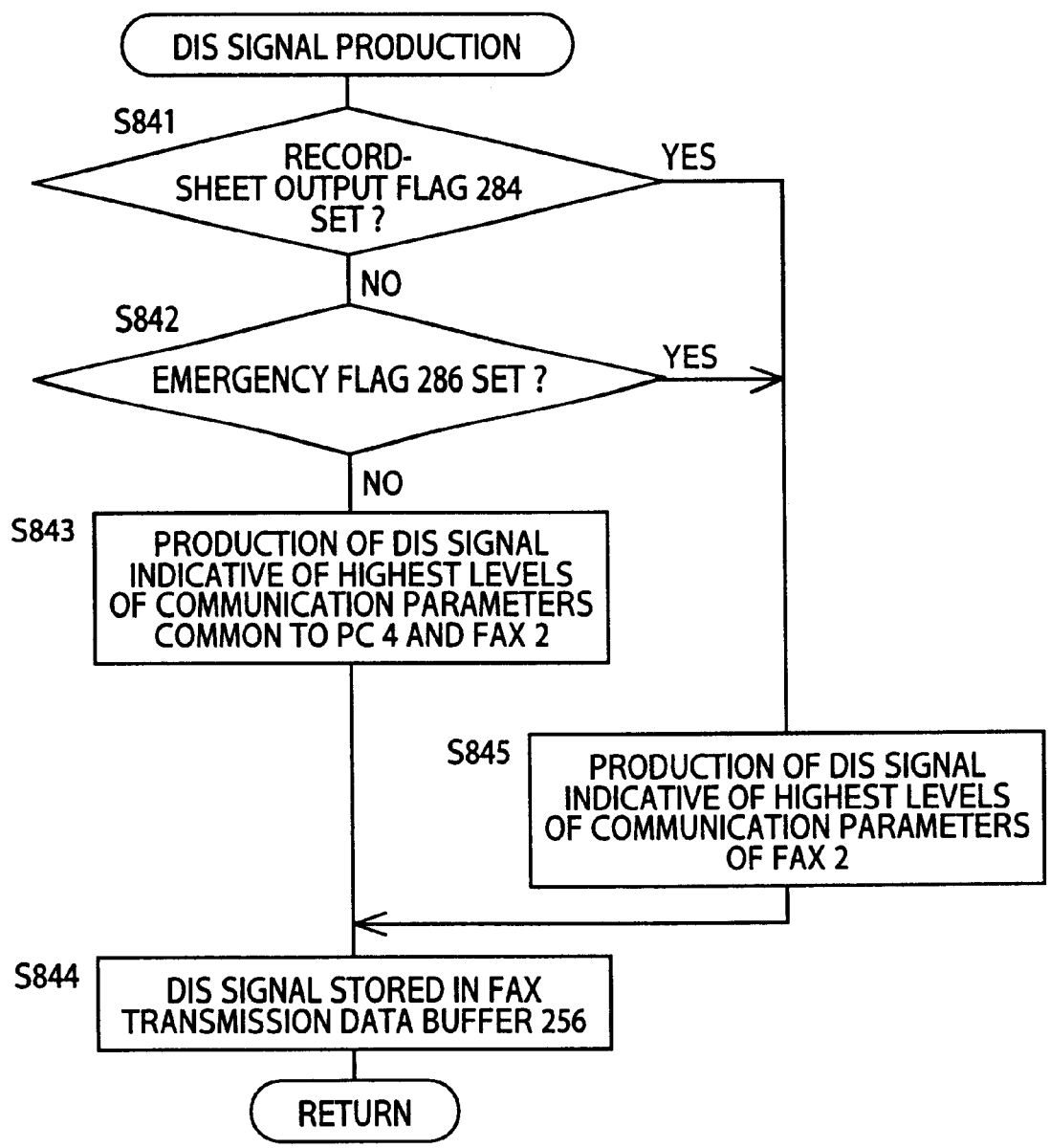
FIG. 36 is a flow chart representing a DIS-signal (digital identification signal) producing program pre-stored in the ROM of the FAX of FIG. 1.

Subsequently, the control goes to Step S515 to produce, according to a DIS-signal producing program shown in FIG. 36, a DIS signal which is transmitted, by interruption, to the second FAX 114.

As described previously, a DIS signal is output to inform the second FAX 114 of the respective levels of communication parameters of the FAX 2. A DIS signal which is output when the FAX 2 receives FAX data may be different from a DIS signal which is output when the PC 4 receives FAX data. In the DIS-signal producing program of FIG. 36, first, at Step S841, it is judged whether the record-sheet output flag 284 has been set. If the output flag 284 has been set, the image-record device 29 of the FAX 2 records, on a record sheet or sheets 17, images according to FAX data transmitted from the second FAX 114. This means that the FAX 2 receives the FAX data. In this case, a positive judgment is made at Step S841, so that the control goes to Step S845 to produce a DSI signal indicative of the respective highest levels of the communication parameters (e.g., image resolution, sheet width, coding method) of the FAX 2. Step S845 is followed by Step S844 to store the thus produced DIS signal in the FAX TD buffer 256.

On the other hand, if a negative judgment is made at Step S841, the control goes to Step S842 to judge whether the emergency flag 286 has been set. That the emergency flag 286 has been set means that the FAX 2 receives the FAX data transmitted from the second FAX 114 and stores them in the FAX RD buffer 254. In this case, a positive judgment is made at Step S842, and the control goes to Step S845.

That neither of the two flags 284, 286 has been set means that the PC 4 receives the FAX data. In this case, the control goes to Step S843 to produce a DIS signal indicative of the respective highest levels of communication parameters which are common to the FAX 2 and the PC4. Step S843 is followed by Step S844 to write or store the DIS signal in the FAX TD buffer 256. The communication parameters of the PC 4 have been stored in the PC CP buffer 263. The DIS signal is processed based on the PC communication parameters stored in the buffer 263 and the communication parameters of the FAX 2.

Step S515 is followed by Step S516 to produce a P-S interrupt vector to receive command data, such as a V21 flag, which are transmitted from the second FAX 114 in Phase B.

Steps S517, S518, and S519 are carried out to judge whether the V21 flag has been transmitted from the second FAX 114 within a prescribed time period. A V21 flag is sent when data are transmitted between two facsimile machines. That no V21 flag is transmitted means the transmission of not FAX data but telephone data, or something abnormal. If no V21 flag is obtained within the prescribed time period, a positive judgment is made at Step S519, so that the control goes to Step S531 to carry out an ERROR procedure, i.e., output a +FHNG:2 signal to the PC 4 to inform that the FAX 2 will end the current communication. In this case, the control goes to Step S532 to reset the record-sheet output flag 284 and the emergency flag 286 and disconnect the FAX 2 from the external line 224.

On the other hand, if a V21 flag is received within the prescribed time period, a positive judgment is made at Step S518, so that the control goes to Step S520 to carry out the remaining steps of Phase B other than the production of a DIS signal and the reception of a V21 fflag both of which belong to Phase B. In Phase B of Step S520, the FAX 2 specifies the respective levels of the communication parameters based on a DCS signal transmitted from the second FAX 114. The specified communication parameters are stored in the image-data-reception-related CP buffer 290.

Step S520, i.e., Phase B is followed by Step 521 to judge whether any errors have occurred. Those errors include a failure to receive a DCS signal, or a failure to receive data at a rate of 2400 bps that is the speed of transmission of command data. If a positive judgment is made at Step S521, the control goes to Steps S531 and S532, like in the case where a positive judgment is made at Step S519.

On the other hand, if a negative judgment is made at Step S521, the control goes to Steps S522 and S523 to judge whether the record-sheet output flag 284 and/or the emergency flag 286 has/have been set. Based on those judgments, the control goes to one of Steps S526, S525, and S524. At S526, the FAX 2 records, on record sheets 17, images corresponding to the FAX data; at Step S525, the FAX 2 receives the FAX data in place of the PC 4; and, at Step S524, the FAX 2 allows the PC 4 to receive the FAX data.

Figure 37:
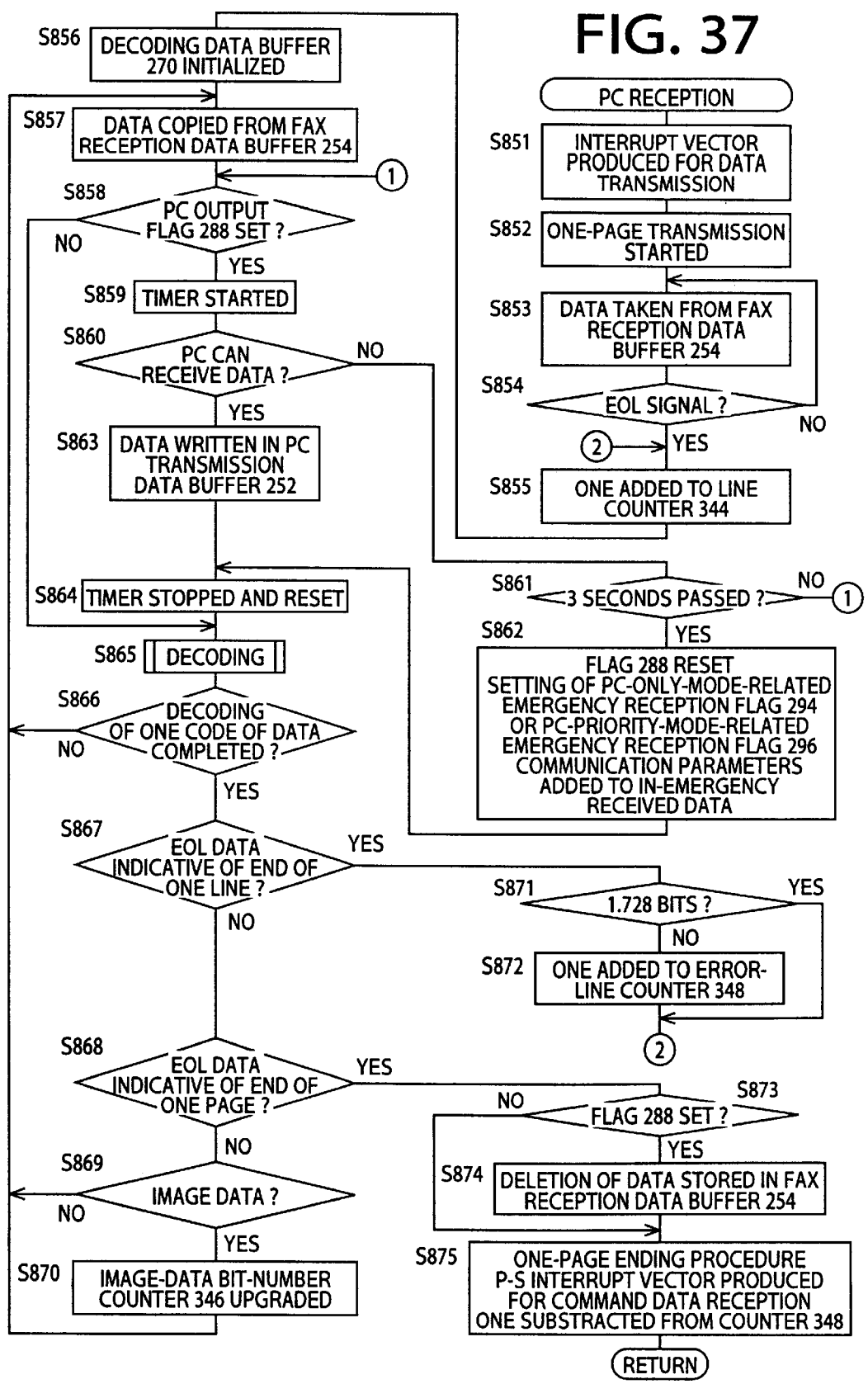
FIG. 37 is a flow chart representing a PC-reception performing program pre-stored in the ROM of the FAX of FIG. 1.

The reception of FAX data by the PC 4 at Step S524 are performed according to the program represented by the flow chart of FIG. 37.

The storing in the FAX RD buffer 254, and transmission to the PC 4, of the coded image data transmitted from the second FAX 114, are carried out by interruption. According to this program, the FAX 2 writes the coded image data in the PC TD buffer 252, decodes the coded image data, and checks the transmission of each one line of data.

First, at Step S851, the FAX control device 40 produces a P-S interrupt vector to transmit data. Step S851 is followed by Steps S852, S853, and S854 that are the same as Steps S308, S309, and S310 of the PC data recording program of FIG. 23. Thus, the FAX 2 checks for a set of EOL data indicative of the beginning of one page of data.

If EOL data are obtained, a positive judgment is made at Step S854, so that the control goes to Step S855 to add one to a current value counted by the line counter 344. The current value counted by the line counter 344 is indicative of the number of the lines contained in the data to be transmitted from the FAX 2 to the PC 4, and this value is transmitted with the data from the FAX 2 to the PC 4. This value is utilized for modifying the resolution and sheet width of the data received from the FAX 2, into a resolution and a sheet width at which the PC 4 can display the data.

At Step S856, the decoding data buffer 270 is initialized or cleared like Step S311 of FIG. 23. Step S856 is followed by Step S857 to take, by copying, one bite of data from the FAX RD buffer 254. At the following Step S858, it is judged whether the PC output flag 288 has been set. If a positive judgment is made at Step S858, Steps S859, S860, and S861 are carried out to judge whether the FAX data can be transmitted to the PC 4.

The above judgment is made by judging whether the CTS control signal supplied through the CTS control signal line is taking the ENABLE state permitting the transmission of data from the FAX 2 to the PC 4, or the DISABLE state inhibiting the same. In the case where the FAX data buffer of the PC 4 is full of data and cannot store any more data, in the case where the PC 4 is operating according to a program which inhibits the PC 4 from receiving FAX data, in the case where the PC 4 is not operating according to a program which permits the PC 4 to receive FAX data, in the case where the PC 4 is not supplied with electric power, or in the case where the PC 4 is not connected with the I/F box 6, the CTS control signal takes the DISABLE state. When the CTS control signal takes the ENABLE state, the control signal serves as a FAX-data-transmission permitting signal and, when taking the DISABLE state, the control signal serves as a FAX-data-transmission inhibiting signal.

If the CTS control signal does not continue to take the DISABLE state for a prescribed time period (3 seconds in the present embodiment), i.e., if the control signal changes to take the ENABLE state, a positive judgment is made at Step S860, so that the control goes to Step S863 to store the one bite of FAX data in the PC TD buffer 252. This one bite of FAX data will be transmitted to the PC 4, according to the FAX-data-reception-related image-data-transmission P-S interrupt handler of FIG. 29.

Step S863 is followed by Step S864 to reset a timer which has been set at Step S859, and then by Step S865 to decode the one bite of data according to an image data decoding program. At the following Step S866, it is judged whether the decoding of one code of data has been finished. In the case where one code of data consists of two or more bites of data, a negative judgment is made at Step S866, so that the control goes back to Step S857 to copy another bite of data from the FAX RD buffer 254.

If a positive judgment is made at Step S866, the control goes to Step S867 to judge whether the taken data are a set of EOL data indicative of the end of one line. In an early cycle, a negative judgment is made at Step S867, so that the control goes to Step S868 to judge whether the taken data are data indicative of the end of one page and obtain a negative judgment in the current, early control cycle. Then, the control goes to Step S869 to judge whether the taken data are image data. If a positive judgment is made at Step S869, the control goes to Step S870 to add the number of the bits of the decoded image data, to a current value counted by the image-data bit-number counter 346. Thus, the counter 346 counts the number of the bits contained in one line of image data. Subsequently, the control goes back to Step S857 to copy another bite of data, write the data in the PC TD buffer 252, and decode the data.

If the copying, decoding, and transmission of one line of data are completed without being disabled, a positive judgment is made at Step S867, so that the control goes to Step S871 to judge whether one line of data have been transmitted from the second FAX 114. This judgment is carried out by judging whether the bit number counted by the counter 346 at Step S870 is equal to the number of the bits contained in one line of data corresponding to the sheet width specified between the FAX 2 and the second FAX 114. For example, the latter bit number is 1,728 for the A4-size sheet width, and 2048 for the B4-size sheet width. In the case where FAX data are adversely influenced by external causes, the bit number counted by the counter 346 may be greater or smaller than the bit number corresponding to the specified sheet width. In this case, a negative judgment is made at Step S871, so that the control goes to Step S872 to add one to a current value counted by the error line counter 348.

The error line number counted by the counter 348 is utilized as follows: After the reception of one page of coded image data has been completed, an error treating program is carried out to judge whether the error line number is greater than a first prescribed percentage (e.g., 10%). If a positive judgment is obtained, the FAX 2 outputs an RTN signal (retrain negative signal) to the second FAX 114. The RTN signal indicates that the image data have not completely been received but, if a training or synchronous signal is re-sent, the FAX 2 can receive the next page of image data. Moreover, in the case where the error line number is greater than a second prescribed percentage (e.g., 30%) greater than the first percentage, the FAX 2 outputs a DCN signal to end the current communication.

On the other hand, if a positive judgment is made at Step S871, the control goes back to Step S855 and the following steps to transmit the next one line of coded image data.

Data indicative of the end of one page contain six sets of EOL data. When the first set of EOL data is taken, a positive judgment is made at Step S867, so that the control goes to Steps S871 and S872. Since the second to fifth set of EOL data is not data indicative of the end of one line nor data indicative of the end of one page, a negative judgment is made at each of Steps S867 and S868. Since the second to fifth set of EOL data is not image data, a negative judgment is made at Step S869, so that the control goes back to Step S857. If the taken data are not image data, the image-data bit-number counter 346 does not add. If the sixth set of EOL data is obtained, a positive judgment is made at Step S868, so that the control goes to Step S873 to judge whether the PC output flag 288 has been set.

That the flag 288 has been set means that one page of data have all been sent to the PC 4. Therefore, the data stored in the FAX RD buffer 254 can be deleted. If a positive judgment is made at Step S873, the control goes to Step S880 to delete the one page of data stored in the FAX RD buffer 254, according to an output program (not shown).

Step S874 is followed by Step S875 to carry out a one-page ending procedure including the deletion of the data stored in the one-page data buffer 277 at Step S852, the production of a P-S interrupt vector to receive command data, and the subtraction of one from the current value of the error line counter 348. When the first set of EOL data belonging to RTC PATTERN data are taken, one has been added to the counted value of the error line counter 348 at Step S872. Since, however, the EOL data are not indicative of the end of an actual line, one is subtracted from the counted value of the counter 348.

Back to Step S861, if a positive judgment is made at this step, the control goes to Step S862 to reset the PC output flag 288. Thereafter, no data is written in the PC TD buffer 252, so that no data is sent to the PC 4. In addition, at Step S862, the communication parameters stored in the image-data-reception-related CP buffer 290 are stored in the FAX RD buffer 254, so that the communication parameters for the received FAX data are easily accessible. Moreover, the FAX control device 40 sets one of the PC-ONLY-mode-related emergency reception flag 294 and the PC-PRIORITY-mode-related emergency reception flag 296 which one flag corresponds to the current output mode when the FAX 2 operates for in-emergency data reception, and resets all the other flags. Step S862 is carried out if the PC 4 becomes unable to receive FAX data while the FAX 2 transmits the FAX data to the PC 4. If Step S862 is carried out when the FAX 2 is in the PC-ONLY mode, the FAX display 150 displays a message that the current output mode is the PC-ONLY mode and the FAX 2 cannot transmit data.

If the PC 4 becomes unable to receive FAX data while receiving the data from the FAX 2, either in the PC-ONLY mode or in the PC-PRIORITY mode, the FAX 2 does not send the FAX data but decodes the data and judges whether just one line of data have been transmitted, without excess or short, from the second FAX 114.

If the decoding of one page of data has been completed, a positive judgment is made at Step S868. Since the PC output flag 288 has been reset at Step S862, a negative judgment is made at Step S873, so that the control goes to Step S875 to carry out the one-page ending procedure. In the case where a negative judgment is made at Step S860, Step S874 is skipped to keep all the one page of data stored in the FAX RD buffer 254, so that the FAX data can later be transmitted, one page by one, to the PC 4. In the PC-ONLY mode, the FAX 2 stores, in the FAX RD buffer 254, the pages of coded image data received after the PC 4 has become unable to receive data. Also, in the PC-PRIORITY mode, the FAX 2 transmits the in-emergency received FAX data, one page by one, to the PC 4 and, if the FAX 2 cannot transmit the FAX data, the FAX 2 records, on record sheets 17, images according to the FAX data, one page by one. Each time one page of coded image data are used for recording images corresponding thereto, that page of data are deleted.

Next, there will be described the in-emergency data reception carried out at Step S525.

Figure 38:
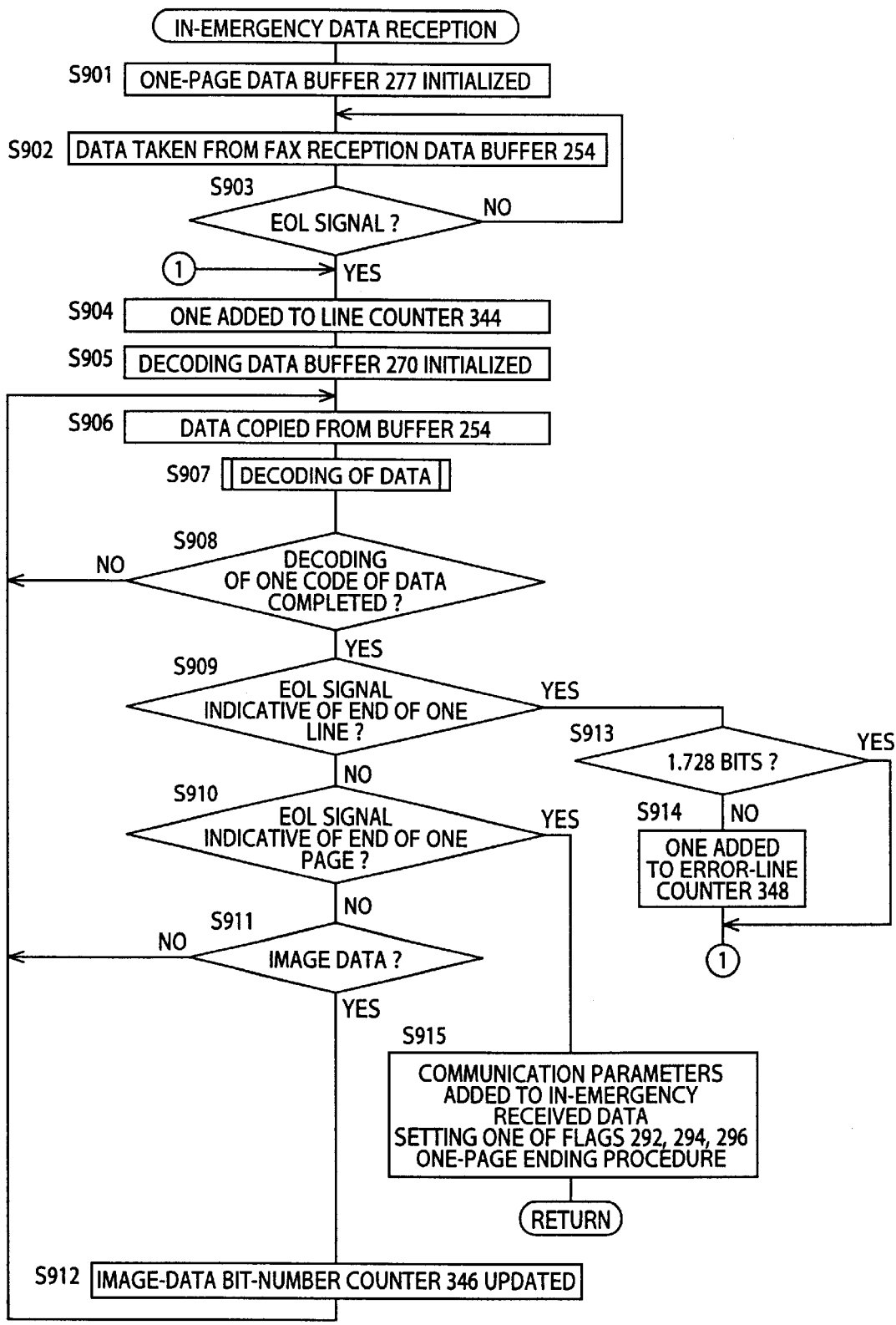
FIG. 38 is a flow chart representing an in-emergency data reception performing program pre-stored in the ROM of the FAX of FIG. 1.

In the case where the emergency flag 286 is set 'ON', an in-emergency data reception is carried out at Step S525 so that all received FAX data are stored in the FAX RD buffer 254. Therefore, it is unnecessary to judge whether the PC 4 can receive data if the FAX 2 transmits the data to the PC 4. The in-emergency data reception performing program represented by the flow chart of FIG. 38 is obtained by removing the steps of producing an interrupt vector to transmit data, judging whether the PC 4 can receive data from the FAX 2, and deleting the data stored in the buffer 254, from the PC reception performing program of FIG. 37, and the description of the former program is omitted. However, at Step S915 of the former program, the FAX control device 40 carries out a one-page ending procedure wherein the specified communication parameters are added to the data stored in the FAX RD buffer 254 so that the in-emergency received coded image data are accompanied by the communication parameters therefor. In addition, at Step S915, the FAX control device 40 sets one of the record-sheet-output-mode-related emergency reception flag 292, PC-ONLY-mode-related emergency reception flag 294; and PC-PRIORITY-mode-related emergency reception flag 296 which corresponds to the current output mode when the in-emergency data reception is carried out. All the other flags are reset.

Figure 39:
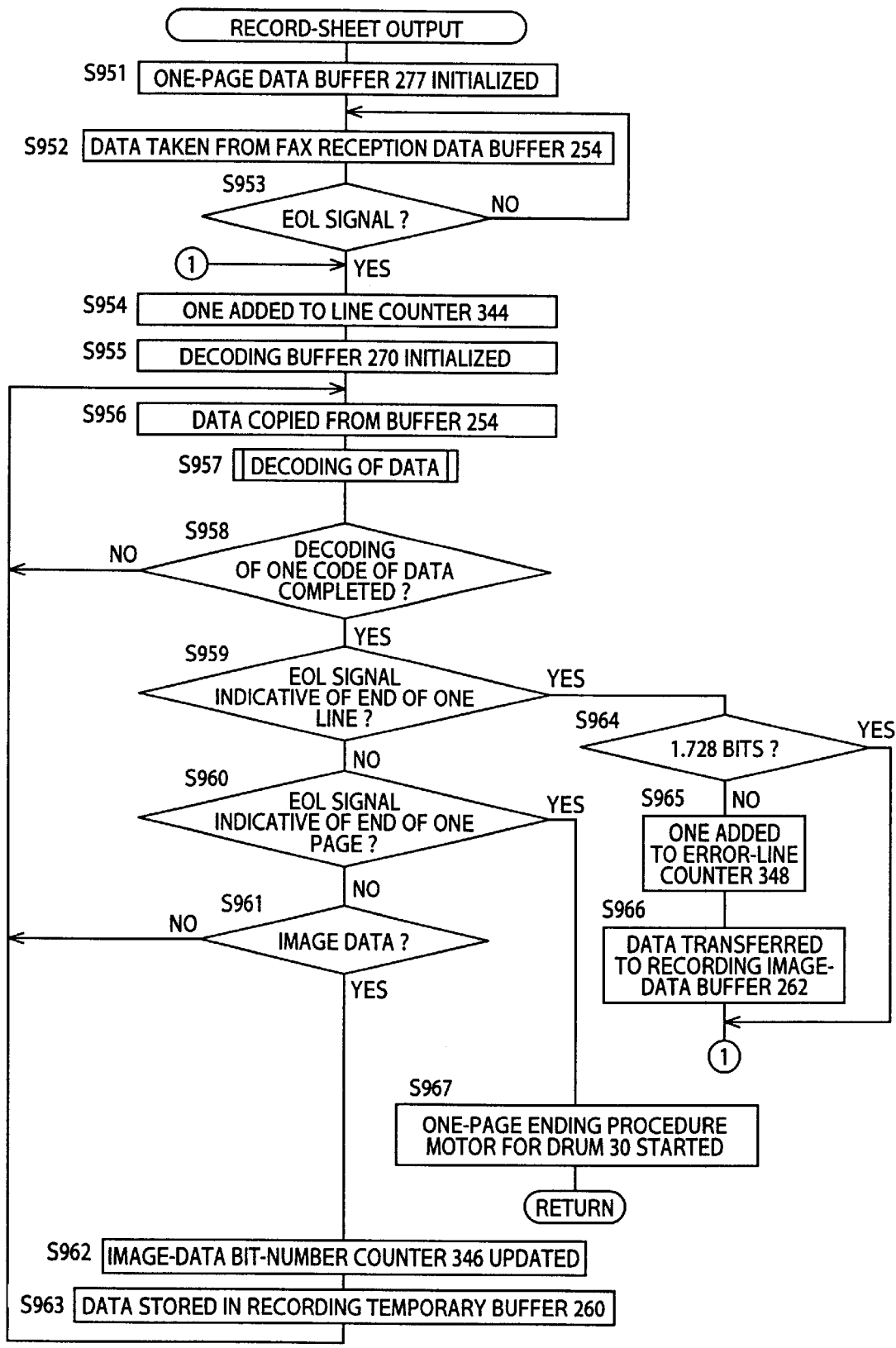
FIG. 39 is a flow chart representing a record-sheet output performing program pre-stored in the ROM of the FAX of FIG. 1.

Next, there will be described the record-sheet outputting operation effected at Step S526, by reference to the flow chart of FIG. 39.

In the case where the record-sheet output flag 284 is set, a record-sheet outputting operation is carried out at Step S526 so that all received FAX data are used by the image-record device 29 for recording images corresponding to the FAX data. According to the record-sheet output performing program shown in FIG. 39, all the received data are decoded and the decoded data are stored in the recording image-data buffer 262. When the decoding of one page of data is finished, the FAX control device 40 starts, at Step S967, the drive motor to drive the photosensitive drum 30 so that the recording device 29 records, on a record sheet 17, images corresponding to the decoded one page of data. Since the other steps of the program shown in FIG. 39 are the same as the corresponding steps of the program shown in FIG. 38, the description of the former program is omitted.

After one page of coded image data have been processed in this way, the control goes to Step S527 of FIG. 31 to carry out Phase D, and subsequently to Step S528 to judge whether an error has occurred, i.e., whether the FAX 2 has received an MPS signal, an EOM signal, or an EOP signal from the second FAX 114. This judgment is carried out by judging whether the FAX 2 can receive, within a prescribed time period, one of the above three signals. If the FAX 2 does not receive any of the three signals, a positive judgment is made at Step S528, so that the control goes to Step S531 to carry out an error treating procedure, i.e., output a +FHNG:2 signal to the PC 4.

On the other hand, if a negative judgment is made at Step S528, the control goes to Step S529 to judge whether the current communication has ended. If the FAX 2 has not received, from the second FAX 114, an EOP signal indicative of the end of transmission of the data, a negative judgment is made at Step S529, so that the control goes to Step S530 to judge whether it is necessary to change the current communication parameters specified at Step S515. If the FAX 2 has not received, from the second FAX 114, an EOM signal indicative of the necessity to change the parameters, a negative judgment is made at Step S530, so that the control goes back to Step S522 to receive another page of FAX data at the same levels of the communication parameters as used for the preceding page of FAX data. On the other hand, if a positive judgment is made at Step S530, the control goes back to Step S525 to re-specify or update the respective levels of the communication parameters so that the next page are received at the updated parameter levels. Whether the parameters are updated or not for each page of data, the current parameters are stored in the image-data-reception-related CP buffer 290.

On the other hand, if a positive judgment is made at Step S529, the control goes to Step S532 to reset the emergency flag 286 and the record-sheet output flag 284 and disconnect the FAX 2 from the external line 224. The FAX data receiving operation according to the program of FIG. 31 is thus ended.

Figure 40:
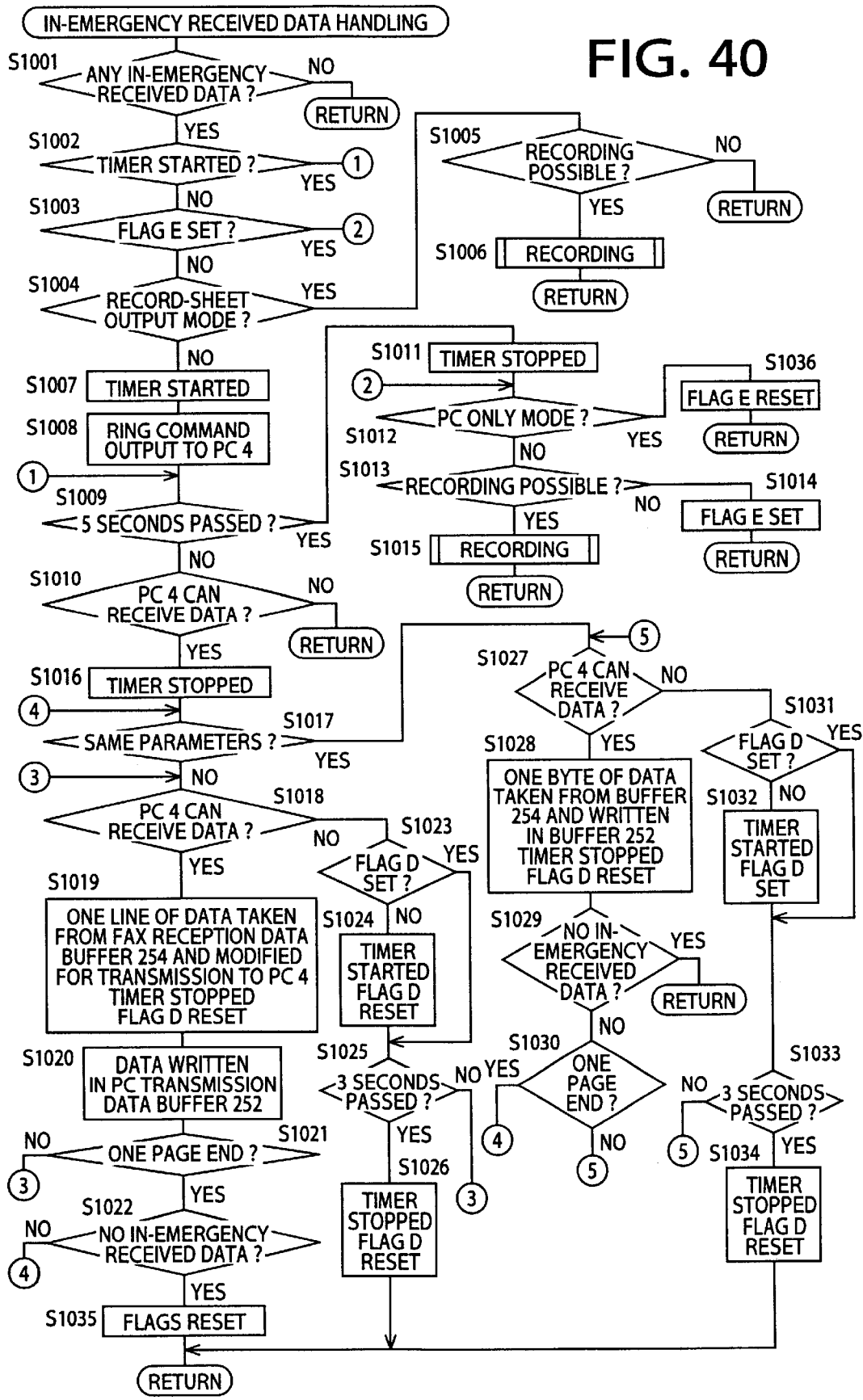
FIG. 40 is a flow chart representing an in-emergency received data handling program pre-stored in the ROM of the FAX of FIG. 1.

In the case where the emergency flag 286 is set 'ON' and accordingly the received FAX data are stored in the FAX RD buffer 254, or in the case where at the beginning of FAX data reception the PC 4 is able to receive the FAX data but intermediately becomes unable to receive and accordingly the FAX data are stored in the buffer 254, the FAX 2 first receives the FAX data to the end thereof, and then uses the FAX data for image recording or transmits the data to the PC 4. Those recording and transmission will be described by reference to the flow chart of FIG. 40 representing the in-emergency received data handling program.

First, at Step 1001, the FAX control device 40 or CPU 200 judges whether any data (i.e., in-emergency received data) remain in the FAX RD buffer 254. If a negative judgment is made at this step, one control cycle of this program is ended. On the other hand, if a positive judgment is made, the control goes to Step S1002 to judge whether a timer has been set or started, i.e., judge whether the FAX 2 has output a RING command to the PC 4 as described later. When Step S1002 is carried out for the first time, the timer has not been started yet. Therefore, a negative judgment is made at Step S1002, so that the control goes to Step S1003 to judge whether the flag E has been set. Assuming that the flag E is reset 'OFF', a negative judgment is made at Step S1003, so that the control goes to Step S1004 to judge whether the in-emergency data reception has been carried out in the RECORD-SHEET OUTPUT mode, i.e., judge whether the record-sheet-output-mode-related emergency reception flag 294 has been set.

A positive judgment obtained at Step S1004 means that the data which were received in emergency in place of the PC 4 in the RECORD-SHEET OUTPUT mode remain in the FAX RD buffer 254, i.e., that the recording device 29 could not record images corresponding to a certain portion or all of the in-emergency received data. In this case, the control goes to Step S1005 to judge whether the recording device 29 can record images corresponding to the data remaining in the buffer 254. If a negative judgment is made at Step S1005, one control cycle according to this program is ended. Steps S1001 to S1005 are repeated until the recording device 29 becomes able to record. Meanwhile, if a positive judgment is made at Step S1005, the control goes to Step S1006 to record, on a record sheet or sheets 17, images corresponding to the data stored in the buffer 254. The flag 294 is reset after all the data in the buffer 254 have been used for recording.

On the other hand, if a negative judgment is made at Step S1004, the control goes to Step S1007 to set a timer, and then to Step S1008 to output a RING command to the PC 4.

Step S1008 is followed by Step S1009 to judge whether five seconds have passed after the RING command is output. If a negative judgment is made at Step S1009, the control goes to Step S1010 to judge whether the FAX 2 can transmit data to the PC 4. This judgment is carried out by judging whether the FAX 2 has received a response, i.e., an ATA signal from the PC 4.

Steps S1001, S1002, S1009, and S1010 are repeated until the FAX 2 receives an ATA signal, or until 5 seconds pass with no ATA signal being received. If a positive judgment is made at Step S1009, the control goes to Step S1011 to reset the timer and then to Step S1012 to judge whether the output mode when the in-emergency data reception was carried out is the PC-ONLY mode. This judgment is effected by judging which flag has been set 'ON', the PC-ONLY-mode-related emergency reception flag 294 or the PC-PRIORITY-mode-related emergency reception flag 296. If the flag 296 is set, a negative judgment is made at Step S1012, so that the control goes to Step S1013 to judge whether the recording device 29 can record images corresponding to the data remaining in the buffer 254. If a positive judgment is made at Step S1013, the control goes to Step S1015 to record images corresponding to the data stored in the buffer 254. Both in the case where an in-emergency data reception is carried out according to the program of FIG. 38 because the PC 4 cannot receive FAX data at the beginning of FAX data reception, and in the case where an in-emergency data reception is carried out according to the program of FIG. 37 because the PC 4 becomes unable to receive FAX data intermediately during FAX data reception, no decoded image data is stored in the recording image-data buffer 262, so that the data remaining in the buffer 254 are decoded when being recorded at Step S1015.

On the other hand, if a negative judgment is made at Step S1013, the control goes to Step S1014 to set the flag E, and one control cycle of this program is ended. In addition, the FAX display device 150 displays a message that the FAX 2 is in the PC-PRIORITY mode and cannot carry out recording. In the next control cycle, a positive judgment is made at Step S1003, so that the control goes to Step S1012. Steps S1001 to S1003, S1012, and S1013 are repeated until the FAX 2 becomes able to record.

In the case of the PC-PRIORITY mode, the FAX 2 judges, just one time, whether the PC 4 can receive data, following the completion of an in-emergency data reception. If a negative judgment is made, the FAX 2 performs recording. In this case, the flag 296 and the flag E are reset when the recording of images corresponding to all the in-emergency received coded image data is completed.

On the other hand, in the case of the PC-ONLY mode, a positive judgment is made at Step S1012, so that the control goes to Step S1036 to reset the flag E and one control cycle of this program is terminated. In the next control cycle, at Step S1008, a RING command is output to the PC 4. RING commands are output to the PC 4 at regular intervals of five seconds, until the in-emergency received data are transmitted to the PC 4. The FAX 2 cannot distinguish the situation in which the PC 4 is not supplied with electric power and the situation in which the PC 4 has no remaining memory capacity for storing data, from each other, since the FAX 2 identifies those situations based on only the ENABLE or DISABLE state of the CTS control signal supplied thereto through the single, CTS control signal line. Therefore, the FAX 2 continues to output RING commands to the PC 4, even if the PC 4 is not supplied with electric power.

Meanwhile, if a positive judgment is made at Step S1010, the control goes to Step S1016 to reset the timer and then to Step S1017 to judge whether the PC 4 has those respective levels of the communication parameters which coincide with the respective levels of the corresponding communication parameters for the data stored in the FAX RD buffer 254.

In the case where the PC 4 becomes unable to receive FAX data intermediately during FAX data reception, the parameter levels specified between the FAX 2 and the second FAX 114 coincide with the parameter levels of the PC 4. Therefore, a positive judgment is made at Step S1017, so that Steps S1027 through S1033 are carried out. If the PC 4 can receive data, the FAX 2 transmits the data stored in the buffer 254, as they are, to the PC 4. If the PC 4 becomes unable to receive data intermediately during this data transmission, a positive judgment is made at Step S1033, so that the control goes to Step S1034 to reset the timer and the flag D, thereby ending the current control cycle of this program. In the next control cycle, at Step S1008, the FAX 2 outputs a RING command to the PC 4, again. At Step S1027, the FAX 2 judges whether the PC 4 can receive data, by judging whether the CTS control signal is taking the ENABLE or DISABLE state.

On the other hand, in the case where the I/F box 6 is not connected to the FAX 2, or in the case where the PC 4 is unable to receive data from the beginning of FAX data reception, the communication parameters specified for the in-emergency received data may differ from those of the PC 4, because the parameter levels are specified between the FAX 2 and the second FAX 114, without taking the parameter levels of the PC 4 into consideration. In this case, a negative judgment is made at Step S1017.

In the above case, the control goes to Step S1018 to judge whether the PC 4 can receive data. If a positive judgment is made at Step S1018, the control goes to Step S1019 to take one line of data from the FAX RD buffer 254 and modify the data at the resolution, sheet width, coding method, etc. which can be dealt with by the PC 4. Step S1019 is followed by Step S1020 to store the modified data in the PC TD buffer 252. For example, in the case where the respective highest levels of the communication parameters specified between the FAX 2 and the second FAX 114 include the SUPER-FINE resolution, the MMR coding method, and the B4-size sheet width, the FAX 2 modifies the data at the FINE resolution, the MH coding method, and the A4-size sheet width, and transmits the thus modified data to the PC 4.

If the parameter levels specified between the FAX 2 and the second FAX 114 are lower than the highest parameter levels of the PC 4, a positive judgment is made at Step S1017, because the PC 4 has such parameter levels which coincide with those specified between the FAX 2 and the second FAX 114. In this case, the FAX data received from the second FAX 114 at those parameter levels and stored in the FAX RD buffer 254 are sent out, as they are, to the PC 4. After all the coded image data are sent to the PC 4, the FAX 2 resets, at Step S1035, the PC-ONLY-mode-related and PC-PRIORITY-mode-related emergency reception flags 294, 296.

Step S1020 is followed by Step S1021 to judge whether one page of data have been written in the PC TD buffer 252. This judgment is carried out by judging whether <DLE><ETX> data have been written in the buffer 252. If a negative judgment is made at Step S1021, the control goes back to Step S1018.

On the other hand, if a positive judgment is made at Step S1021, the control goes to Step S1022 to judge whether no data remains in the FAX RD buffer 254, i.e., whether all the data have been sent to the PC 4. If a negative judgment is made at Step S1022, the control goes back to Step S1017 to judge whether the parameter levels for the next page of data coincide with those of the PC 4. If a positive judgment is made at Step S1017, Steps S1027 to S1033 are carried out and, otherwise, Steps S1018 to S1021 are carried out. If a positive judgment is made at Step S1022, the control goes to Step S1035 to reset all the flags, thereby terminating the current control cycle according to the program of FIG. 40.

During the above data transmission, Steps S1018 and S1023 to S1025 are carried out to judge whether the FAX 2 can transmit data to the PC 4. If the FAX 2 cannot transmit data to the PC 4, a negative judgment is obtained at Step S1025, so that the control goes to Step S1026 to reset the timer and the flag D, thereby ending the current control cycle of this program and starting with Step S1001 again.

As described previously, the FAX display device 150 can display a first message that the FAX 2 is in the PC-ONLY mode and the PC 4 cannot receive data, or a second message that the FAX 2 is in the PC-PRIORITY mode and cannot perform recording. The display device 150 deletes the first message when the PC 4 becomes able to receive data, and the second message when the recording device 29 becomes able to record images.

If, after FAX data have been received and stored, in emergency, in the FAX RD buffer 254, the current output mode is changed to a different output mode, the in-emergency stored FAX data are output according to the changed output mode. When the output mode is changed to a new output mode, the record-sheet-output-mode-related, PC-ONLY-mode-related, and PC-PRIORITY-mode-related emergency reception flags 292, 294, 296 are set or reset according to the new mode. Therefore, the FAX 2 obtains, at Steps S1004 and S1012, respective judgments corresponding to the new mode.

For example, in the case where the PC-ONLY mode is changed to the RECORD-SHEET-OUTPUT mode, a positive judgment is made at Step S1004, so that the recording device 29 performs recording according to the FAX data. If the PC 4 is out of order and the FAX 2 cannot transmit the FAX data to the PC 4, the recording device of the FAX 2 records images corresponding to the FAX data.

In the case where the RECORD-SHEET-OUTPUT mode is changed to the PC-ONLY mode, a negative judgment is made at Step S1004 and a positive judgment is made at Step S1012, so that the FAX 2 continues to output RING commands to the PC 4 until the PC 4 becomes able to receive FAX data.

In the case where the PC-PRIORITY mode is changed to the PC-ONLY mode, a positive judgment is made at Step S1012, so that the FAX 2 continues to output RING commands to the PC 4 until the PC 4 becomes able to receive FAX data. If, in the PC-PRIORITY mode, the FAX 2 identifies, upon transmission of the first RING command to the PC 4, that the PC 4 is unable to receive data, and simultaneously identifies that the recording device 29 is unable to perform recording, the FAX 2 waits for the recorder 29 to become able to record. If, in this situation, the output mode is changed to the PC-ONLY mode, a positive judgment is made at Step S1012, so that the control goes to Step S1036 to reset the flag E. Consequently a negative judgment is made at Step S1003, so that the FAX 2 outputs a RING command to the PC 4, again. In this situation, the FAX 2 can transmit the FAX data to the PC 4.

Next, there will be described the manner in which the FAX 2 reads images from originals 90 and transmits, to the PC 4, image data representative of the read original images, by reference to FIGS. 41 to 44. This procedure is carried out when the reading function is selected on the PC 4 as described previously.

On the other hand, the manner in which the FAX 2 reads the originals 90 and transmits the obtained image data to the second FAX 114, is well known in the art and the description thereof is not necessary to understand the present invention. Therefore, the description of the latter manner is omitted.

If the PC 4 is operated to select the reading function while the FAX 2 is in the idling state, a positive judgment is made at Step S2050 of the flow chart of FIG. 42 representing the reading and transmission performing program. Consequently, Steps S2100 and the following steps are carried out.

Figure 41:
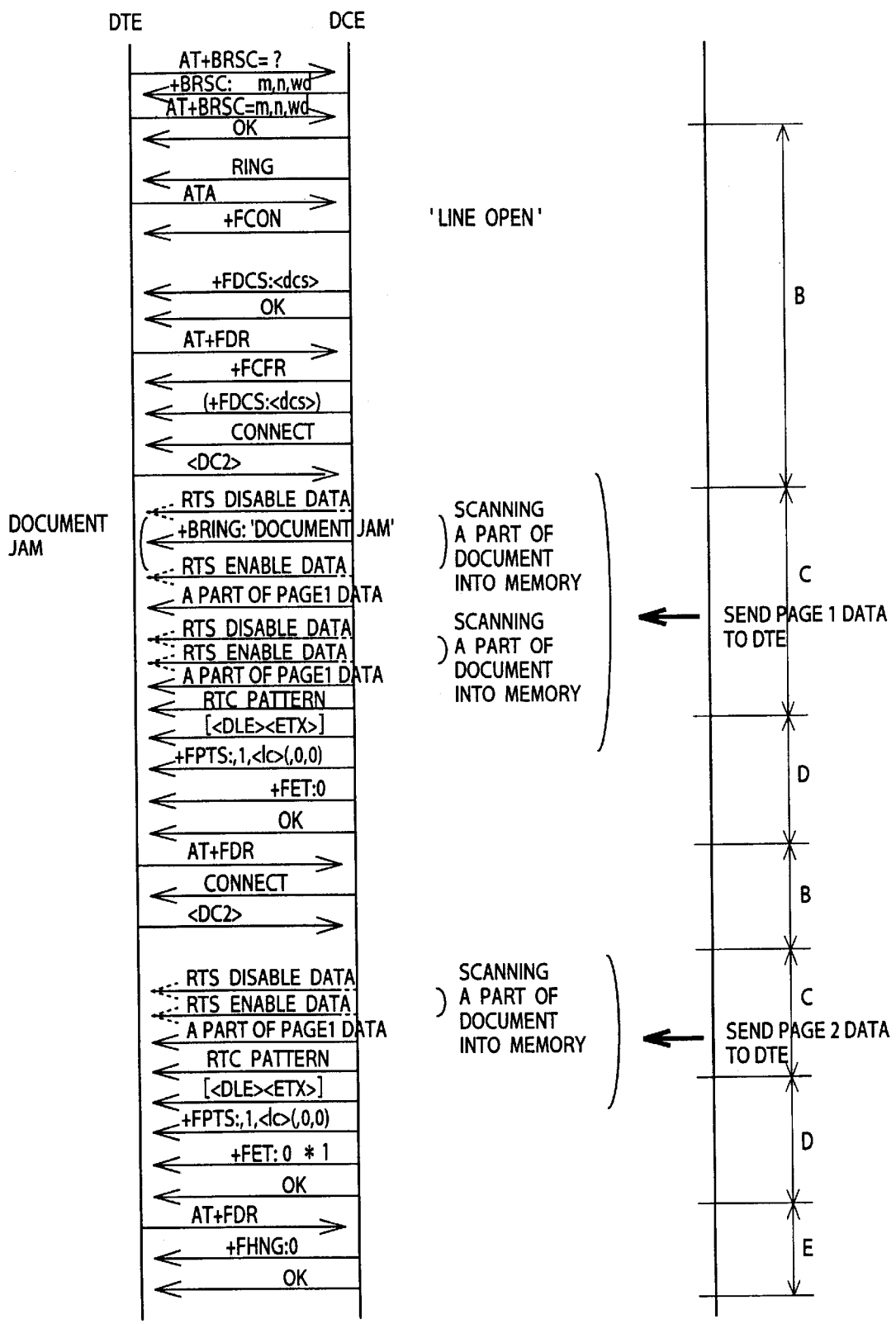
FIG. 41 is a sequence chart showing the manner of image reading of the FAX of FIG. 1 and the manner of image-data transmission of the FAX to the PC 4 of FIG. 1.

FIG. 41 shows the sequence chart showing the procedure in which the FAX 2 reads the originals 90 and transmits the obtained image data to the PC 4. Since the sequence chart of FIG. 41 is almost the same as that of FIG. 25, only the differences of the two charts will be described below.

In Phase B, the symbol, 'LINE OPEN', indicates that, when the reading function is selected on the PC 4, the FAX 2 is disconnected from the external line 224, e.g., the second FAX 114.

In Phase C, the RTS control signal takes the DISABLE state, thereby inhibiting the transmission of PC data from the PC 4, while the reading device 42 of the FAX 2 is reading the originals 90; and the RTS control signal takes the ENABLE state, thereby permitting the transmission of PC data from the PC 4, after the FAX 2 has started the transmission of the obtained image data indicative of the read original images.

In the case where an operational error such as jamming of the originals 90 occurs during the image reading, the FAX 2 outputs an error command, +BRING:'DOCUMENT JAM', to the PC 4. When the error is removed, the FAX 2 resumes the image reading.

In the present embodiment, the FAX 2 alternately carries out the reading of respective portions of a series of originals 90 and the transmission of corresponding batches of image data to the PC 4. If, during the alternate reading and transmission of the originals 90, one of the three conditions is satisfied, which includes the first condition that the FAX 2 detects the end of each page or sheet of original 90, the second condition that the remaining memory capacity of the PC TD buffer 252 is reduced to less than a prescribed amount, and the third condition that the continuous reading time exceeds a prescribed time period, as described in greater detail later, the FAX 2 suspends the image reading and starts the transmission of each batch of image data obtained up till then. When all the coded data of each batch of raw or non-coded image data (hereinafter, referred to as the "transmission coded image data" to distinguish over the non-coded image data obtained from the originals 90) are transmitted to the PC 4, the reading device 42 of the FAX 2 resumes the image reading. Thus, the FAX 2 repeats, like time sharing, the image reading and the data transmission until all the image data corresponding to the series of originals 90 are transmitted to the PC 4.

In particular, in the case where the FAX 2 suspends the image reading because the continuous reading time has exceeded the prescribed time period, the FAX 2 codes the non-coded image data while simultaneously transmits the coded image data.

At Step S2100, the FAX 2 carries out Phase B shown in FIG. 41. At the following Step S2200, the reading device 42 of the FAX 2 is initialized. That is, the FAX 2 carries out the steps necessary to start reading the originals 90, including feeding the first one of the originals sheets 90 to an appropriate reading position.

In the case where no original 90 is placed on the original receiver 94, a negative judgment is made at Step S2300, so that the control goes to Step S2310 to output, to the PC 4, an error command, +BRING:'NO DOCUMENT', indicative of no document or original 90, and then to Step S2320 to carry out the same error treating procedure as that described regarding Step S531 and additionally a reading ending procedure to end the image reading of the reading device 42. Hereinafter, the error treating and reading ending procedures carried out at Step S2320 will be referred to as the "Phase-B error treating procedure".

On the other hand, if the original receiver 94 holds one or more originals 90 whose images are to be transmitted, a positive judgment is made at Step S2300, so that the control goes to Step S2400 to judge whether any communication error has occurred. If a positive judgment is obtained at Step S2400, the control goes to Step S2320 to effect the Phase-B error treating procedure. In the present embodiment, whether a communication error has occurred, whether the cancel flag 274 has been set, and whether the STOP key 164 has been pushed are judged at prescribed steps only. If, at Step S2800, the pushing of the STOP key 164 is identified, a positive judgment is made so that the control goes to Step S2810 to operate a buzzer to generate an alarm sound and then to Step S2320. However, if, at the other prescribed steps, S3000 and S3500, the pushing of the STOP key 164 is identified, the control directly goes to Step S2320 to effect the Phase-B error treating procedure. When the occurrence of an error is identified in Phases B, D, or E, the FAX control device 40 or CPU 200 carries out the Phase-B error treating procedure as described above. However, when the occurrence of an error is identified in Phase C, the control device 40 carries out a Phase-C error treating procedure as described later.

The FAX 2 identifies a communication error when the CTS control signal is taking the DISABLE state to inhibit the FAX 2 from transmitting data to the PC 4, or when the FAX 2 finds that the cable for connection between the FAX 2 and the I/F box 6 is not connected to the FAX 2.

The FAX 2 judges whether the STOP key 164 has been pushed, based on the setting or resetting of a stop-key operation flag (not shown). When the STOP key 164 is pushed, an operation-panel control device (not shown) provided in the operation panel 12 sets the stop-key operation flag and supplies a signal indicative of the setting of the flag to the FAX control device 40.

At Step S2500, the control device 40 produces an interrupt vector. At an address designated by the interrupt vector, there is stored a transmission preparing program according to which the 47th terminal, i.e, clock-signal input/output terminal, of the CPU 200 is switched, the frequency of the clock signal supplied to the S-P converting circuit 240 is selected, and the first DT interrupt disable flag 242 is set or or reset. The transmission preparing program is carried out when an interrupt signal is produced. This interrupt signal is produced when one of the previously explained three conditions is satisfied.

The switching of the clock-signal input/output (I/O) terminal of the CPU 200 is carried out by a multiplexer. The multiplexer switches the terminal from the DMAC 208 to the S-P converting circuit 240. The rate or speed of transmission of image data, i.e., communication speed depends on the frequency of the clock signal supplied to the S-P converting circuit 240. When the first DT interrupt disable flag 242 is reset to permit the data transmission, the FAX 2 is permitted to carry out a FAX-reading-related image-data-transmission P-S interrupt handler described later.

After an interrupt vector is produced at Step S2500, Steps S2600, S2700, and S2800 are carried out to judge whether any communication error has occurred, and make other judgements. If a negative judgement is made at each of those steps, the control goes to Step S2900 to perform a one-page reading and transmission procedure in Phase C. Step S2900 is followed by Step S3000 to judge whether the STOP key 164 has been pushed, and then by Step S3100 to judge whether any communication error or any operational (i.e. mechanical) error has occurred.

If the occurrence of a communication error or the pushing of the STOP key 164 is identified in Phase C, the control goes to Step S3111 to carry out a common (not 'Phase-B') error treating procedure and additionally a reading ending procedure, including the deletion of data stored in the PC TD buffer 252 and the reading image-data buffer 258, to end the reading operation of the reading device 42. Hereinafter, those error treating and reading ending procedures carried out at Step S3111 will be referred to as the "Phase-C error treating procedure".

If a negative judgment is made at each of Steps S3000 and S3100, the control goes to Step S3200 to proceed with Phase D. Thus, the reading and transmission of one page of data is ended.

After Phase D is finished at Step S3200, the control goes to Steps S3300, S3400, and S3500 to judge whether any communication has occurred, and make other judgments. If a negative judgement is made at each of those steps, the control goes to Step S3600 to judge whether another page or sheet of original 90 exists in the original receiver 94. If a positive judgment is made at Step S3600, the control goes back to Steps S2500 to S3600, which are repeated until the original-sheet sensor 98 detects that no original 90 is left in the original receiver 94.

If a positive judgment is made at one of Steps S3300 to S3500, the control goes to Step S2320 to perform the Phase-B error treating procedure.

If a negative judgment is made at Step S3600, the control goes to Steps S3700, S3800, and S3900 to proceed with Phase E and perform a reading ending procedure to end the reading of the originals 90 by the reading device 42. In the present embodiment, the FAX 2 identifies the end of a series of originals 90, by detecting that no original 90 is left in the original receiver 94.

Next, there will be described the one-page reading and transmission procedure carried out at Step S2900, by reference to the flow chart of FIG. 43.

First, at Step S2910, the FAX control device 40 carries out the initialization step necessary to read one original page or sheet 90. Specifically described, the control device 40 determines, based on a selected image resolution for reading, a sheet-feeding rate or speed for the original-feed device 96 of the reading device 42, and initializes the reading image-data buffer 258.

In the present embodiment, the FAX 2 is operable to specify, for each page of the originals 90, conditions necessary for reading, including the reading image resolution. Accordingly, the user can select desired reading conditions for each original page 90. However, it is possible to adapt the FAX 2 such that the user can input desired conditions only when the reading of a series of originals 90 is started. In the latter case, Phase C may be carried out after Phase D.

At Step S2911, reading is started. The operation of the reading device 42 is started, including the actuation of the original-feed device 96. In addition, a port to which binary-coded or binary data are input, is established in a gate array of the I/O port 210 to which image data obtained by reading (hereinafter, referred to as the "reading image data") are input. In response to transfer request signals which the DMAC 208 generates at regular intervals of about 10 $\mu$sec, the CPU 200 produces transfer-request permitting signals.

Thus, the respective output voltages of the CCDs of the reading device 42 are binary-coded based on a threshold value supplied from the DMAC 208. The thus produced binary data are input, as the reading image data, to the above-mentioned, prescribed gate array of the I/O port 210, so as to be stored in the reading image-data buffer 258 under command of the DMAC 208.

At Step S2912, the time-up flag 298 is reset and a timer is started to measure a prescribed time-up period, e.g., 60 seconds. This time-up period is longer than those prescribed for the other functions than the reading function. However, the 60 seconds time-up period is shorter than 90 seconds as the time-out period of the FAX 2.

At Step S2913, coding is carried out according to an image data coding program pre-stored in the ROM 204 and represented by the flow chart of FIG. 44. Since reading and binary-coding are carried out by hardware, i.e., the reading device 42 and the binary-coding circuit 228, the coding of reading image data is carried out by software, concurrently with the reading and binary-coding operations.

If one of the above-described three conditions is satisfied while the reading of the reading device 42 and the coding of reading image data are concurrently carried out, the control goes to Step S2914 to suspend the reading of the reading device 42. That is, the I/O port 210 is switched from the gate array thereof for receiving the reading image data to a port for outputting the coded image data. The original-feed device 96 is stopped. Thus, the reading is suspended with the stopping of feeding of the original 90.

In the present embodiment, the reading of the reading device 42 is suspended when one of the above-mentioned three conditions is satisfied. Upon satisfaction of any one of the three conditions, the reading is stopped immediately, i.e., before an interrupt signal is produced for switching the reading to the transmission. In other words, after the reading is suspended, the interruption is enabled.

At Steps S2915 and S2916, the CPU 200 judges whether the STOP key 164 has been pushed and whether any operational error has occurred, respectively. If a positive judgment is made at Step S2915, the control goes to Step S2918 to disable any interruption and then goes to Step S3000 of FIG. 42. In this case, a positive judgment is obtained at Step S3000, so that the control goes to Step S3111 to perform the Phase-C error treating procedure. If a positive judgment is made at Step S2916, the control likewise goes to Step S3000 of FIG. 42. In this case, a positive judgment is obtained at Step S3100, so that the control goes to Step S3110 to output an error command to the PC 4 and then to Step S3111 to perform the Phase-C error treating procedure.

If a negative judgment is made at each of Steps S2915 and S2916, the control goes to Step S2917 to start the transmission of the coded image data, based on the interrupt signal. Specifically described, the clock signal is supplied to the S-P converting circuit 240, and the first DT interrupt disable flag 242 is reset to permit the data transmission. In other words, when the reading function is selected on the PC 4, the first DT interrupt disable flag 242 is switched from the DISABLE state, to the ENABLE state permitting the data transmission.

Consequently the control device 40 is permitted to carry out the FAX-data-reception-related image-data-transmission P-S interrupt handler of FIG. 29. At Step S426 of this program, the transmission coded image data are stored in the P-S TD buffer 248, so that the coded image data are converted into serial data which in turn are transmitted to the PC 4.

At Step S424 of the program of FIG. 29, <DLE> data are obtained when the end of one page of data is found, and the <DLE> data are stored in the PC TD buffer 252 at Step S2959 described later.

Until the outputting of the transmission coded image data to be sent out is completed, the CPU 200 judges whether the STOP key 164 has been pushed, each time the outputting of one bite of data is finished. As previously described, when one bite of transmission coded image data as parallel data are converted into serial data, the clock signal is supplied, for one msec, to the P-S converting circuit 240.

If, during the outputting of the transmission coded image data, the FAX 2 detects the pushing of the STOP key 164, a positive judgment is made at Step S2919, so that the control goes to Step S2918 to disable any interruption, and carry out an error treating procedure, as described above. During the outputting of the transmission coded image data, the FAX control device 40 carries out a program (not shown) to judge whether the CTS control signal is taking the DISABLE state inhibiting the data transmission from the FAX 2 and, if the DISABLE state of the CTS control signal continues for more than a prescribed time period, the control device 40 carries out, by interruption, the Phase-C error treating procedure.

The CPU 200 judges whether all the transmission coded image data have been output, based on the address where the leading or initial portion of the coded image data is stored in the PC TD buffer 252. That is, the CPU 200 identifies the completion of outputting of all the transmission coded image data, when a pointer which points to the addresses of the PC TD buffer 252 is changed to point to the address where the image data are first stored.

Following the completion of outputting, the control goes to Step S2921 to judge whether the reading of one page has ended. Thus, the CPU 200 judges whether the reading by the reading device 42 has been suspended because the reading of one page has ended. If a positive judgment is made at Step S2921, the control goes to Step S2922 to carry out a one-page reading ending procedure to end the one-page reading of the reading device 42. Then, the control goes to S3000 of the main routine of FIG. 42. Thus, the reading and transmission of one page of original 90 is completed.

In the case where the reading of the reading device 42 is suspended because of the other reasons than indicated above, a negative judgment is made at Step S2921, so that the control goes back to Step S2911 and the following steps so as to resume reading the originals 90. Steps S2911 to S2921 are repeated until a positive judgment is made at Step S2921.

Next, the coding operation carried out at Step S2913 of FIG. 43 will be described by reference to the flow chart of FIG. 44.

At Step S2950, the CPU 200 judges whether at least one line of reading image data are left in the reading image-data buffer 258. If a positive judgment is made at Step S2950, the control goes to Step S2951 to supply one line of reading image data to the coding data buffer 271 as a one-line data buffer, so that the one-line data are coded into transmission coded image data according to a transmission coded image data producing program. Step S2951 is followed by Step S2952 to store the thus produced transmission coded image data in the PC TD buffer 252. In addition, <EOL> data indicative of the end of one line of image data are stored in the buffer 252.

On the other hand, if a negative judgment is made at Step S2950, Steps S2951 and S2952 are skipped, and only the reading is carried out. However, since the rate or speed of reading is very high, at least one line of reading image data usually remain in the reading image-data buffer 258 while the reading of the reading device 42 is not suspended but carried out.

At Step S2953, the CPU 200 judges whether all the transmission coded image data to be output to the PC 4 have been output to the PC 4. In the case where the CPU 200 carries out Step S2953 in the first or initial control cycle according to this program, the outputting of the transmission coded image data has not been started. In this case, a negative judgment is made, so that the control goes to Step S2954 to judge whether the coding of one page has ended, subsequently to Step S2955 to judge whether the STOP key 164 has been pushed, and then to Step S2956 to judge whether the PC TD buffer 252 has a remaining memory capacity less than a prescribed amount.

Strictly speaking, the remaining memory capacity of the PC TD buffer 252 includes (a) a remaining memory capacity of an exclusive buffer (i.e., proper PC TD buffer 252) of the RAM 202 provided for storing transmission coded image data and control data, and (b) a remaining memory capacity of a shared buffer of the RAM 202 provided for additionally storing other data than the above-mentioned data. However, in the following description, both the exclusive and shared buffers are referred to as the "PC TD buffer 252", and the summed remaining memory capacities of the two buffers are referred to as the "remaining memory capacity of the PC TD buffer 252", if otherwise specified. In the present embodiment, the above-mentioned prescribed memory amount employed at Step S2956 is one cluster, i.e., 4K bites.

A positive judgment is made at Step S2954, after all the information carried on one page of original 90 is read by the reading device 42, the read information is changed to binary data, the binary reading image data are coded by the specified coding method, and the coded image data are stored in the PC TD buffer 252. In the present embodiment, the CPU 200 obtains a positive judgment at Step S2954, when the sheet end sensor 99 detects the end of each original sheet 90 and simultaneously when the CPU 200 identifies that no reading image data remains in the reading image-data memory 258. A positive judgment obtained at Step S2954 means that the image reading of the FAX 2 has come to the end of each one page of original 90 as a pausing position or location of a series of originals 90.

When the user wishes to stop the reading of the originals 90, the user pushes the STOP key 164. Accordingly, if the pushing of the START key 164 is detected and a positive judgment is made at Step S2955, the FAX 2 stops the reading operation.

If the PC TD buffer 252 is filled up with data, the buffer 252 will then be unable to store the transmission coded image data. To avoid this, it is necessary to stop the reading operation before the remaining memory capacity of the buffer 252 is decreased to less than the prescribed amount.

In the case where the original 90 has a regular sheet size such as the A4 or B4 size, the reading of one page does not usually result in filling the PC TD buffer 252 with data. However, in the case where the original 90 is a long sheet, the buffer 252 may be filled with the data produced from the original 90.

Even though the original 90 may have a regular size, the PC TD buffer 252 may be filled with data, in the case where the reading device 42 operates in the middletone (or halftone) mode or in the case where the original 90 has a highly fine images. In those cases, the sets of dot data as the reading image data change very frequently in the matrix and, even after the sets of dot data are coded by a specified coding method, the amount of the coded data may not be less than that of the original data or otherwise the former may even be larger than the latter.

Meanwhile, the previously-described shared buffer of the RAM 202 is used, during the in-emergency data reception, for storing data, such as reception image data, other than transmission coded image data. In this case, the memory capacity of the shared buffer which can be used for storing the transmission coded image data is eventually decreased. Consequently the PC TD buffer 252 may be filled with data even if the reading device 42 does not read so much information.

In the case where Steps S2954 to S2956 of FIG. 44 are carried out for the first time, a negative judgment is made at each of Steps S2954 and S2956, although there is a possibility that a positive judgment be made at Step S2955. If a negative judgment is made at Step S2956, the control goes to Step S2957 to judge whether the time-up flag 298 has been set, and then to Step S2958 to judge whether the time measured by the timer is up to the prescribed time-up period of 60 seconds. In the case where Steps S2957 and S2958 are carried out for the first time, a negative judgment is made at each of those steps, so that the control goes back to Step S2951. In this case, the control is not returned to Step S2950, because a page end has not been identified and the reading operation has not been stopped and accordingly at least one line of reading image data remain in the reading image-data buffer 258 as previously described.

Thereafter, Steps S2951 to S2958 are repeated. If a positive judgment is made at Step S2954 or S2955, the control goes to Step S2959 to carry out a page ending procedure, e.g., store <DLE> data, together with the transmission coded image data, in the PC TD buffer 252. Step S2959 is followed by Step S2960 to reset or stop the timer. Then, the control goes to Step S2914 of FIG. 43. On the other hand, if a positive judgment is made at Step S2956, the control goes to Step S2960 to stop the timer and then goes to Step S2914.

In the present embodiment, also when the pushing of the STOP key 164 is identified, the control goes to Step S2959 to effect a page ending procedure. However, it is not essential to effect the page ending procedure. In the case where, even if the STOP key 164 is pushed, the image data produced up till then are transmitted to the PC 4, it is preferred that <DLE> data indicative of the end of the image data be stored in the PC TD buffer 252.

In the case where a positive judgment is made at Step S2958 even if a negative judgment is made at each of Steps S2954 to S2956, the control goes to Step S2961 to stop the timer and then to Step S2962 to stop the reading operation. Then, in response to an interrupt signal, the FAX control device 40 starts the transmission of data at Step S2963 and set the time-up flag 298 at Step S2964.

The reading operation is stopped when the time is up to 60 seconds, even though no page end is identified, because the FAX 2 is disconnected from the PC 4 if the continuous reading time measured by the timer exceeds the prescribed time-out period (e.g., 90 seconds).

Thereafter, the control goes back to Step S2950 to judge whether any reading image data remain in the reading image-data buffer 258. If a positive judgment is made at Step S2950, the control goes to Steps S2951 and S2952 to code the reading image data. When the coding operation is carried out concurrently with the transmitting operation, the reading operation of the reading device 42 is suspended. Therefore, before the coding operation is started, it is judged, in advance, whether any reading image data remain in the reading image-data buffer 258. If a negative judgment is made at Step S2950, the control skips Steps S2951 and S2952 and directly goes to Step S2953 and the following steps. In the latter case, the coding is not effected concurrently with the data transmission.

As previously described, after the data transmission is started, the clock signal is supplied to the P-S converting circuit 240 via the 47th, clock-signal input terminal of the CPU 200. In this situation, the CPU 200 can operate according to another control program.

At Step S2953, it is judged whether all the transmission coded image data have been sent out. If a negative judgment is made, the control goes to Steps S2954 to S2956 to make the above-described judgments. If a negative judgment is made at each of those steps, the control goes to Step S2957 to obtain a positive judgment since the time-up flag 298 has been set at Step S2964. Then, the control goes back to Step S2950.

As described above, only in the case where the image reading operation is stopped, and switched to the data transmitting operation, because the time is up to 60 seconds, the data transmission is effected concurrently with the data coding operation. When a page end is identified, no reading image data remain in the reading image-data buffer 258 and therefore it is not needed to carry out the data coding. When the reading is stopped because the remaining memory capacity of the PC TD buffer 252 has decreased to less than the prescribed amount, the buffer 252 may not be able to store coded reading image data (i.e., transmission coded image data) which are obtained from the reading image data in the coding operation.

The data transmission and the data coding are carried out concurrently with each other, until all the transmission coded image data are sent out to the PC 4, i.e., while the reading image data remain in the reading image-data buffer 258. When the data transmission is ended, a positive judgment is made at Step S2953, so that the control goes to Steps S2965, S2966, and S2967 to reset the time-up flag 298, start the reading operation, and start the timer, respectively. Then, the control goes back to Steps S2951 and S2952 to carry out the coding operation concurrently with the reading operation.

If a positive judgment is made at Step S2958 while the reading and coding operations are concurrently effected, the time-up flag 298 is set at Step S2964, so that the concurrent reading and coding and the concurrent transmission and coding are carried out in a manner similar to time sharing. On the other hand, if a positive judgment is made at Step S2954, S2955, or S2955 during the concurrent reading and coding, the control goes to Step S2914 and the following steps, so that the transmission of data is started at Step S2917. Thus, the concurrent reading and coding and the data transmission are carried out like time sharing.

As is apparent from the foregoing description, in the present embodiment, the image reading device 42 of the FAX 2 can be used to input the images of an original or originals 90 into the PC 4. Thus, the PC 4 does not need an exclusive image reading device.

Moreover, the FAX 2 performs the reading and transmitting operations alternately, like time sharing, by using the PC TD buffer 252 having a small memory capacity, thereby avoiding an increase in the production cost thereof. Thus, the present invention is applicable to such facsimile machines which cannot perform the reading and transmitting operations concurrently.

Furthermore, even in the case where the FAX 2 is used to read a series of originals 90 having a great amount of information, the FAX 2 does not require the user to carry out the cumbersome work of dividing the originals 90 in advance.

Performing the image reading and the image-data transmission like time sharing results in taking a longer time from the starting of transmission of the first portion of the image data to the ending of transmission of the last portion of the same image data. Consequently it takes a longer time of occupation of a communication line through which the image data are transmitted. Thus, it is preferable to perform the reading and transmitting operations like time sharing, between the FAX 2 and the PC 4 connected via the personal communication line 7, 6, 8, to between the FAX 2 and the second FAX 114 connected via the community or public communication line (i.e., telephone line) 224.

However, even in the case of performing the reading and transmitting operations like time sharing between the FAX 2 and the second FAX 114, the FAX 2 can use the reading image-data buffer 258 having a small memory capacity, thereby providing the advantage of reducing the necessity to divide a series of originals 90 in advance.

In the present embodiment, the reading and the transmission can be carried out like time sharing, and the coding can be carried out concurrently with the reading when the reading is carried out, and concurrently with the transmission when the transmission is carried out. Thus, the FAX 2 can perform the reading and the transmission in a reduced time as compared with a facsimile machine which *** performs the coding concurrently with only one of the reading and the transmission. Since the coding is performed by software, i.e., according to the image-data coding program, the coding takes a longer time than that taken by the reading or the transmission each of which is performed by hardware. In the case where the coding is performed concurrently with only one of the reading and the transmission, the reading and transmission needs an additional time equal to the difference between the time needed for that one operation and the time needed for the coding. In contrast, in the case where the coding is performed concurrently with each of the reading and the transmission, the reading and transmission can be free of the above additional time.

In the present embodiment, the reading operation is suspended if the continuous reading time of the reading device 42 exceeds the prescribed time-up period shorter than the prescribed time-out period at which the FAX 2 disconnects itself from the PC 4. Thus, the FAX 2 effectively prevents the continuous reading time from exceeding the time-out period, thereby avoiding the automatic disconnection thereof from the PC 4.

As can be understood from the foregoing description, in the present embodiment, the FAX 2 provides a first facsimile-data transmitter and a first facsimile-data receiver; the I/O port 210 provides a connector connecting between the FAX 2 and the PC 4; and the second FAX 114 provides a second facsimile-data transmitter and a second facsimile-data receiver.

A portion of the ROM 204 which stores Steps S201 to S232 of the PC-data transmitting program, a portion of the CPU 200 which carries out those steps, the modem 214, and the NCU 222 cooperate with one another to provide a first facsimile-data transmitter and a computer-data transmitter. The facsimile number of the second FAX 114 supplied from the PC 4 provides receiver-designating data designating the second facsimile-data receiver 114. The own facsimile-number buffer 264 provides a facsimile-number memory as a memory which stores self-designating data designating the first facsimile-data receiver 2.

A portion of the ROM 204 which stores Steps S73 to S76 of the data transmitting program and Steps S301 to S325 of the PC-data recording program, and a portion of the CPU 200 which carries out those steps, cooperate with each other to provide a control device which compares the receiver-designating data with the self-designating data and controls the recording device 42 to record an image represented by the facsimile data supplied from the PC 4, when the receiver-designating data are identical with the self-designating data, and does not control the recorder 42 to record the image when the receiver-designating data are not identical with the self-designating data.

The NCU 222 provides a connector for connecting between the FAX 2 and the second FAX 114. A portion of the ROM 204 which stores Steps S851 to S857, S863, S867, S868, and S875 and a portion of the CPU 200 which carries out those steps cooperate with each other to a control device which controls the first facsimile-data transmitter to transmit the FAX data received from the second FAX 114, to the PC 4.

A portion of the ROM 204 which stores Steps S502 and S503 and a portion of the CPU 200 which carries out those steps cooperate with each other to provide a control device which controls the first facsimile-data transmitter to transmit, to the PC 4, a first batch of data out of a plurality of batches of data transmitted from the second FAX 114, and not to transmit, to the PC 4, a second batch of data out of the plurality of batches of data.

A portion of the ROM 204 which stores Steps S703, S7053, and S803 and a portion of the CPU 200 which carries out those steps cooperate with each other to provide a judging means for judging, based on a CNG signal, whether data received from the second FAX 114 are FAX data or TEL data (i.e., telephone signal). A portion of the ROM 204 which stores Step S712 and a portion of the CPU 200 which carries out that step cooperate with each other to provide a judging means for judging, based on a time measured after the reception of a call signal, whether data received from the second FAX 114 are FAX data or TEL data. A portion of the ROM 204 which stores Step S605 and a portion of the CPU 200 which carries out that step cooperate with each other to provide a judging means for judging, based on a command input by the user, whether data received from the second FAX 114 are FAX data or TEL data. A portion of the ROM 204 which stores Step S611 and a portion of the CPU 200 which carries out that step cooperate with each other to provide a judging means for judging, based on the generation of the prescribed number of calling sounds to call the user, whether data received from the second FAX 114 are FAX data or TEL data. A portion of the ROM 204 which stores Steps S766 and S817 and a portion of the CPU 200 which carries out those steps cooperate with each other to provide a judging means for judging, based on the reception of no sound data or signal from the second FAX 114, whether data received from the second FAX 114 are FAX data or TEL data.

The FAX RD (reception data) buffer 254 provides a memory for storing FAX data. The recording device 29, the record-sheet output flag 284, a portion of the ROM 204 which stores Step S526 of the data receiving program of FIG. 31, and a portion of the CPU 200 which carries out those steps cooperate with each other to provide a recorder which records, on a recording medium, an image corresponding to the FAX data received by the first facsimile-data receiver in place of the PC 4. The emergency flag 286, a portion of the ROM 204 which stores Steps S511 and S525, and a portion of the CPU 200 which carries out those steps cooperate with each other to provide a memory for storing the the FAX data received by the first facsimile-data receiver when the above recorder cannot record the image. A portion of the ROM 204 which stores Steps S901 to S915 of the in-emergency data receiving program of FIG. 38 and Steps S951 to S967 of the record-sheet outputting program of FIG. 39, and a portion of the CPU 200 which carries out those steps cooperate with each other to provide a control device which controls the first facsimile-data transmitter not to transmit the FAX data transmitted from the second FAX 114, to the PC 4, and controls the first facsimile-data receiver to receive the FAX data in place of the PC 4.

A portion of the ROM 204 which stores Steps S507 and S508 of the data receiving program of FIG. 31 and a portion of the CPU 200 which carries out those steps cooperate with each other to provide a judging means for judging whether the first facsimile-data transmitter is permitted to transmit the FAX data to the PC 4, based on information indicative of a state of the PC 4 relating to data reception, before the second FAX 114 starts transmitting the FAX data to the FAX 2. A portion of the ROM 204 which stores Steps S860 and S861 of the PC reception performing program of FIG. 37 and a portion of the CPU 200 which carries out those steps cooperate with each other to provide a judging means for judging whether the first facsimile-data transmitter is permitted to transmit the FAX data to the PC 4, based on information indicative of a state of the PC 4 relating to data reception, while the second FAX 114 starts transmitting the FAX data to the FAX 2. A portion of the ROM 204 which stores Step S845 of the DIS-signal producing program of FIG. 36 and a portion of the CPU 200 which carries out that step cooperate with each other to provide a control device which controls the first facsimile-data receiver to receive the FAX data having the highest one of a plurality of different levels of one or more communication parameters each of which levels is feasible, i.e., can be performed by the FAX 2.

A portion of the ROM 204 which stores the FAX-data-reception-related image-data-reception modem interrupt handler of FIG. 26 and a portion of the CPU 200 which carries out that handler or program cooperate with each other to provide a control device which controls the first facsimile-data receiver to receive the FAX data in place of the PC 4, while the above judging means judges whether the first facsimile-data transmitter is permitted to transmit the FAX data to the PC 4.

A portion of the ROM 204 which stores Step S1008 of the in-emergency received data handling program of FIG. 40 and a portion of the CPU 200 which carries out that step cooperate with each other to provide a control device which transmits a command to request the PC 4 to receive the FAX data received by the first facsimile-data receiver, after the second FAX 114 ends the transmission of the FAX data. A portion of the ROM 204 which stores Steps S1020 and S1028 and a portion of the CPU 200 which carries out those steps cooperate with each other to provide a control device which controls the first facsimile-data transmitter to transmit, to the PC 4, the FAX data received by the first facsimile-data receiver, when the above judging means makes a positive judgment after the ending of transmission of the FAX data. A portion of the ROM 204 which stores Steps S1013, S1015, S1005, and S1006 and a portion of the CPU 200 which carries out those steps cooperate with each other to provide a control device which controls the recorder to record the image corresponding to the FAX data stored in the memory, when the record is changed to be able to record the image.

A portion of the ROM 204 which stores Step S1019 of the in-emergency received data handling program of FIG. 40 and a portion of the CPU 200 which carries out that step cooperate with each other to provide a modifying device which modifies the FAX data received by the first facsimile-data receiver, into the modified FAX data having a level of each of one or more communication parameters which level is feasible by the PC 4, more specifically, the modified FAX data having the highest one of a plurality of different levels of each communication parameter each of which levels is feasible by the PC 4.

A portion of the ROM 204 which stores Steps S371 to S378 of the FAX-data-reception-related image-data-reception modem interrupt handler of FIG. 26 and a portion of the CPU 200 which carries out those steps cooperate with each other to provide a storing device including a memory, for storing FAX data transmitted from the second FAX 114, in the memory, at a timing of transmission of the FAX data. A portion of the ROM 204 which stores Step S860 of the PC reception performing program of FIG. 37 and a portion of the CPU 200 which carries out that step cooperate with each other to provide a judging means for judging whether the first facsimile-data transmitter is permitted to transmit the FAX data stored in the memory, to the PC 4, while the storing device stores, in the memory, the FAX data transmitted from the second FAX 114. A portion of the ROM 204 which stores Step S863 and a portion of the CPU 200 which carries out that step cooperate with each other to provide a control device which controls, while the above judging means continues to make positive judgments, the first facsimile-data transmitter to transmit, to the PC 4, the FAX data stored in the memory by the storing device.

A portion of the ROM 204 which stores Step S862 of the PC reception performing program of FIG. 37 and a portion of the CPU 200 which carries out that step cooperate with each other to provide a control device which controls the first facsimile-data transmitter to end the transmission of the FAX data stored in the memory, when the above judging means has continues to make negative judgments for more than a prescribed time period.

A portion of the ROM 204 which stores Step S1015 of the in-emergency received data handling program of FIG. 40 and a portion of the CPU 200 which carries out that step cooperate with each other to provide a control device which controls the recording device 29 to record, on a recording medium, an image corresponding to the FAX data stored in the memory, when the control device ends the transmission of the FAX data stored in the memory.

A portion of the ROM 204 which stores Steps S71 and S77 to S81 of the data transmitting program of FIG. 14 and a portion of the CPU 200 which carries out those steps cooperate with each other to provide a calling device which calls a second telephone set designated by designating data received from the PC 4, so as to connect a first telephone set of the FAX 2 to the second telephone set of, e.g., the second FAX 114. A portion of the ROM 204 which stores Steps S357 and S359 of the PC-TEL ordering program of FIG. 24 and a portion of the CPU 200 which carries out those steps cooperate with each other to provide a control device which controls the first facsimile-data transmitter to transmit FAX data via the external line 224 to the second FAX comprising the second telephone set designated by the designating data, while the first telephone set is connected to the second telephone set via the same line 224. A portion of the ROM 204 which stores Step S356 and a portion of the CPU 200 which carries out that step cooperate with each other to provide a control device which controls the first facsimile-data receiver to receive FAX data via the external line 224 from the second FAX comprising the second telephone set designated by the designating data, while the first telephone set is connected to the second telephone set via the same line 224. A portion of the ROM 204 which stores Steps S360 and S361 and a portion of the CPU 200 which carries out those steps cooperate with each other to provide an inhibiting means for inhibiting the calling device from calling a facsimile machine different from the second FAX 114, while the first telephone set is connected to the second telephone set of the second FAX 114. A portion of the ROM 204 which stores Step S82 of the data transmitting program of FIG. 14 and a portion of the CPU 200 which carries out that step cooperate with each other to provide a judging means for judging whether the calling device successfully called the second telephone set of the second FAX 114. A portion of the ROM 204 which stores Step S84 and a portion of the CPU 200 which carries out that step cooperate with each other to provide an informing device which informs the PC 4 of a judgment made by the judging means that the calling device failed to call the second telephone set.

The reading image-data buffer 258 of the RAM 202 provides a memory for storing the batch of image data obtained by the reading device 42 of the FAX 2. The PC TD (transmission data) buffer 252 provides a memory for storing output image data based on the image data, more specifically, storing coded image data provided by a data coding device from the image data. A portion of the ROM 204 which stores Steps S2951 and S2952 of the flow chart of FIG. 44 and a portion of the CPU 200 which carries out those steps cooperate with each other to provide the data coding device. The S-P converting circuit 240, the CPU 200, and others cooperate with each other to provide an output device which outputs the output image data, more specifically, the coded image data. A portion of the ROM 204 which stores Steps S2914, S2917, and S2954 to S2958 and a portion of the CPU 200 which carries out those steps cooperate with each other to provide a control device which suspends the reading of an original 90 by the reading device 42, at least one time, before the reading device 42 reads to the end of the original 90, and starting the output device to output a portion of the output image data which corresponds to a portion of the image data obtained by the reading device 42 before the suspension of the reading operation. A portion of the ROM 204 which stores Steps S2963 and S2950 to S2952 and a portion of the CPU 200 which carries out those steps cooperate with each other to provide a concurrent-control means for, when the reading of the reading device 42 is suspended, controlling the coding device to code a portion of the image data obtained by the reading device 42 before the suspension of the reading operation, and provide a corresponding portion of the coded image data, and concurrently controlling the coding device to output the portion of the coded image data.

While in the illustrated embodiment a facsimile machine to which the PC 4 transmits PC data via the FAX 2 is specified or designated by the facsimile number of that facsimile machine, it is possible to use receiver-designating data corresponding to the facsimile number and thereby identifying the facsimile machine, e.g., the second FAX 114. The receiver-designating data may be a small number which corresponds to the facsimile number of the second FAX 114 and whose number of digits is smaller than the number of digits of that facsimile number, a name or an address of an owner of the second FAX 114, an identification number identifying the owner of the second FAX 114, an abbreviation of the owner's name, or a popular or common name of the same. In the latter cases, the own facsimile number buffer 264 is replaced by a first memory which stores such self-designating data which designate the FAX 2 and which are of same kind of data as the receiver-designating data. In addition, the FAX 2 needs a second memory for storing data relating receiver-designating data to a facsimile number designated by the data. In the case where the data received from the PC 4 are identical with the self-designating data stored in the first memory, the recording device 29 of the FAX 2 records images corresponding to the FAX data received from the PC 4. On the other hand, if the data received from the PC 4 are not identical with the self-designating data, the control device 40 of the FAX 2 selects a facsimile number designated by the receiver-designating data, from the second memory, and transmits a calling signal to call a facsimile machine having the designated facsimile number via the external line 224.

Although in the illustrated embodiment the FAX 2 inhibits the transmission of FAX data if, during a telephone talk, the FAX 2 receives, from the PC 4, a call-transmit command to transmit FAX data, it is possible to additionally output an error command to the PC 4 to reject the transmission of FAX data and light or flash a lamp provided on the operation panel 12 of the FAX 2 so as to inform the user of the situation that the PC 4 is ready for transmitting FAX data.

While in the illustrated embodiment the FAX display 150 displays the list of selectable output modes in response to the operation of the FUNCTION key 174, irrespective of whether or not the I/F box 6 is connected to the FAX 2, it is possible to adapt the display 150 such that the display 150 does not do so while the I/F box 6 is not connected to the FAX 2. Since the recording device 29 records images corresponding to FAX data, irrespective of the currently selected output mode, while the I/F box 6 is not connected to the FAX 2, it is not needed to select one of the output modes displayed by the display 150. To this end, the FAX 2 may be provided with a judging means for judging, upon operation of the FUNCTION key 174, whether the I/F box 6 is connected to the FAX 2. If the judging means makes a negative judgment, the display 150 does not display the list of selectable output modes.

The FAX 2 modified as described above requires the user to establish or initialize a reduced number of functions, thereby facilitating the function-initialization job of the user.

In the illustrated embodiment, if FAX data are not transmitted to the PC 4 and accordingly are stored in the FAX RD buffer 254, although the PC-only mode is currently selected as the output mode, the FAX RD buffer 254 may be filled with the FAX data, so that the buffer 254 may not store any additional FAX data. In contrast, the modified FAX 2 is free from this problem.

An output mode which is selected on the FAX 2 while the I/F box 6 is connected to the FAX 2, is stored or held by the FAX 2, even after the I/F box 6 is disconnected from the FAX 2. Therefore, the FAX 2 outputs FAX data according to the stored output mode, when the I/F box 6 is connected to the FAX 2 again.

In the illustrated embodiment, whether the PC 4 is supplied with electric power is indicated by the ENABLE or DISABLE state of the CIS control signal supplied from the PC 4 to the FAX 2. The FAX 2 may be provided with a display device for exclusively indicating that the PC 4 is not supplied with electric power. While the PC 4 is not supplied with electric power, the FAX 2 may operate such that the recording device 29 records images corresponding to FAX data received thereby, irrespective of the current output mode, such that the display 150 does not display the list of selectable output modes even if the FUNCTION key 174 is operation, and/or such that the FAX 2 does not output a ring command to the PC 4 before transmitting thereto the FAX data received in emergency in place of the PC 4.

In the illustrated embodiment, the FAX 2 judges, based on the ENABLE or DISABLE state of the CTS control signal supplied from the PC 4, whether the FAX 2 is permitted to transmit FAX data to the PC 4, while the FAX 2 transmits to the PC 4 the FAX data received from the second FAX 114. The FAX 2 may be provided with a sensor for detecting that the personable cable 7 connected to the I/F box 6 is connected to, or disconnected from, the FAX 2. In this case, the FAX 2 can recognize a reason why the FAX 2 is not permitted to transmit FAX data to the PC 4.

In the illustrated embodiment, at Steps S507 and S508 of FIG. 31, the FAX 2 judges whether the FAX 2 is permitted to transmit FAX data to the PC 4, by judging whether the FAX 2 receives an ATA signal from the PC 4 within 3 seconds. However, it is possible to employ a time period longer than 3 seconds.

In the illustrated embodiment, the PC 4 carries out the control program provided for receiving FAX data from the FAX 2, only when the FAX-data receiving function is selected on the PC 4. However, the FAX 2 may be used by being connected to a personal computer which starts executing a FAX-data receiving program upon application thereto of electric power.

In the case where the FAX 2 receives FAX data from a facsimile-data transmitter having communication parameter levels lower than those of the FAX 2 or the PC 4, the FAX data are transmitted at the lower communication parameter levels. In this case, the data modifying device of the FAX 2 modifies the FAX data received in emergency in place of the PC 4, into modified FAX data having the higher communication parameter levels of the PC 4. Thus, the FAX 2 transmits the modified FAX data having a higher degree of image reproducibility, in a shorter time.

In the illustrated embodiment, the FAX 2 suspends the reading of originals 90 by the reading device 42, when one of the four conditions is satisfied which include (a) the first condition that the processing of one page of reading image data provided by the reading device 42 is finished, (b) the second condition that the remaining memory capacity of the PC TD buffer 252 is reduced to less than the prescribed amount, (c) the third condition that the continuous reading time of the reading device 42 exceeds the prescribed time-up period, and (d) the fourth condition that the STOP key 164 is operated. Alternatively, it is possible to adapt the FAX 2 such that the FAX 2 suspends the reading operation of the reading device 42 when any two, or all, of the four conditions are satisfied. Furthermore, it is possible to adapt the FAX 2 such that when the STOP key 164 is pushed, i.e., when the fourth condition is satisfied, the FAX 2 suspends the reading of the reading device 42 in a manner different from that employed when one of the other three conditions is satisfied.

In addition to the above four conditions (a) to (d), it is possible to employ (e) the fifth condition that the remaining memory capacity of the reading image-data buffer 258 is reduced to less than a prescribed amount. In the case where the time needed for data coding is longer than that for image reading (including binary-coding), the amount of reading image data stored in the buffer 258 increases as the amount of information obtained by the reading device 42 from the originals 90 increases. Therefore, the remaining memory capacity of the buffer 258 decreases. Thus, it is preferable to suspend the reading operation of the reading device 42 when the remaining memory capacity of the buffer 258 is reduced to less than a prescribed amount.

Moreover, it is possible to use the above fifth condition as a condition for the FAX 2 to suspend the reading of the reading device 42 and concurrently carry out the data transmission and the data coding.

Furthermore, it is possible to employ (f) the sixth condition that the sheet end sensor 99 detects the trailing end of one page or sheet 90, as a condition for the FAX 2 to suspend the reading of the reading device 42. The reading itself of the originals 90 by the reading device 42 can be said to be a processing relating to the reading of the originals 90 by the reading device 42. Moreover, it is possible to use the sixth condition as a condition for the FAX 2 to suspend the reading of the reading device 42 and concurrently carry out the data transmission and the data coding.

In the illustrated embodiment, the reading image data provided by the reading device 42 are coded into transmission coded image data, and subsequently the parallel, coded image data are converted into serial image data which are to be transmitted to the PC 4. However, it is not essential to code the reading image data into the coded image data. It is possible to convert the parallel, reading image data as they are, i.e., without being subjected to data coding, into serial data as transmission data to be transmitted to the PC 4. In the latter case, the reading image data serve as the transmission or output image data, and one of the reading image-data buffer 258 and the PC TD buffer 252 may be omitted. This modified FAX 2 employs the single memory 252 or 258 enjoying a reduced memory capacity, thereby contributing to reducing the overall production cost as such.

That it is not essential to code image data is correct not only in the case where the reading image data provided by the reading device 42 in response to a command from the PC 4 are transmitted from the FAX 2 to the PC 4 but also in the case where image data are transmitted from the FAX 2 to a third machine (the third machine may be the second FAX 114) in response to a command from the PC 4, or in the case where the FAX data received by the FAX 2 from a third machine are transmitted from the FAX 2 to the PC 4.

The principle of the present invention is applicable to such a facsimile machine which receives and/or transmits FAX data which have not been coded by any coding method.

The present invention is applicable to not only a facsimile machine which can perform the image reading and data coding operations alternately with the data transmitting operation but cannot concurrently perform the three operations, but also a facsimile machine which can concurrently perform the three operations.

A facsimile machine which can concurrently perform the above three operations may be adapted such that the reading and coding operations and the transmitting operation are performed like time sharing and the transmitting operation is performed concurrently with the coding operation. Even in the case where it takes a longer time to code reading image data than to read and provide the image data, this facsimile machine is free from the problem that the amount of reading image data stored in a reading image-data buffer (258) excessively increases as a reading device (42) continues to read originals (90). Thus, the facsimile machine can employ the reading image-data buffer having a reduced memory capacity, thereby contributing to reducing the overall production cost thereof.

In the illustrated embodiment, the display 116 of the PC 4 includes a matrix of liquid-crystal elements each of which has dimensions equal to those of a unit area (i.e., picture element) of the images read by the reading device 42 at the SUPER-FINE (S-FINE) resolution level of the FAX 2. The present invention is applicable to such a facsimile machine which is used by being connected to a computer having a display whose liquid-crystal element has the ratio of a length thereof to a width thereof that is different from that of any of the respective unit areas corresponding to the plurality of resolution levels of the FAX 2. In this case, a data processing means is employed for processing FAX data into data which can directly be used by the display for displaying images corresponding to the data. The data processing means processes the FAX data, by increasing or decreasing the number of sets of dot data with respect to the scanning direction and increasing or decreasing the number of data lines with respect to the sub-scanning direction perpendicular to the scanning direction. The data processing means may be incorporated in at least one of the facsimile machine or the computer. For the particular purpose of reducing the time needed for data transmission, it is preferred that in the case where the the number of sets of dot data or data lines is decreased, the processing means be disposed in the data transmitter and that in the case where the the number of dot-data sets or data lines is increased, the processing means be disposed in the data receiver.

The foregoing description has been made on the assumption that the second FAX 114 has an image recording device and an image reading device. However, the FAX 2 can communicate with a facsimile modem that has a FAX-data receiving and transmitting functions but does not have an image recording or reading device.

A machine to which the FAX 2 transmits FAX data may not be limited to a facsimile machine but may be a facsimile-data receiver which has at least the function of receiving FAX data.

A machine which transmits FAX data to the FAX 2 may not be limited to a facsimile machine but may be a facsimile-data transmitter which has at least the function of transmitting FAX data.

In the illustrated embodiment, the current output mode when the FAX 2 receives FAX data in emergency in place of the PC4 is stored or held by setting one of the record-sheet-output-mode-related emergency reception flag 292, PC-only-mode-related emergency reception flag 294, and PC-priority-mode-related emergency reception flag 296. However, this is not essentially required. Alternatively, the FAX data received in emergency may be handled or processed according to the output mode which has been selected by operating the FUNCTION key 174 and stored in the FAX 2.

Figure 45A:
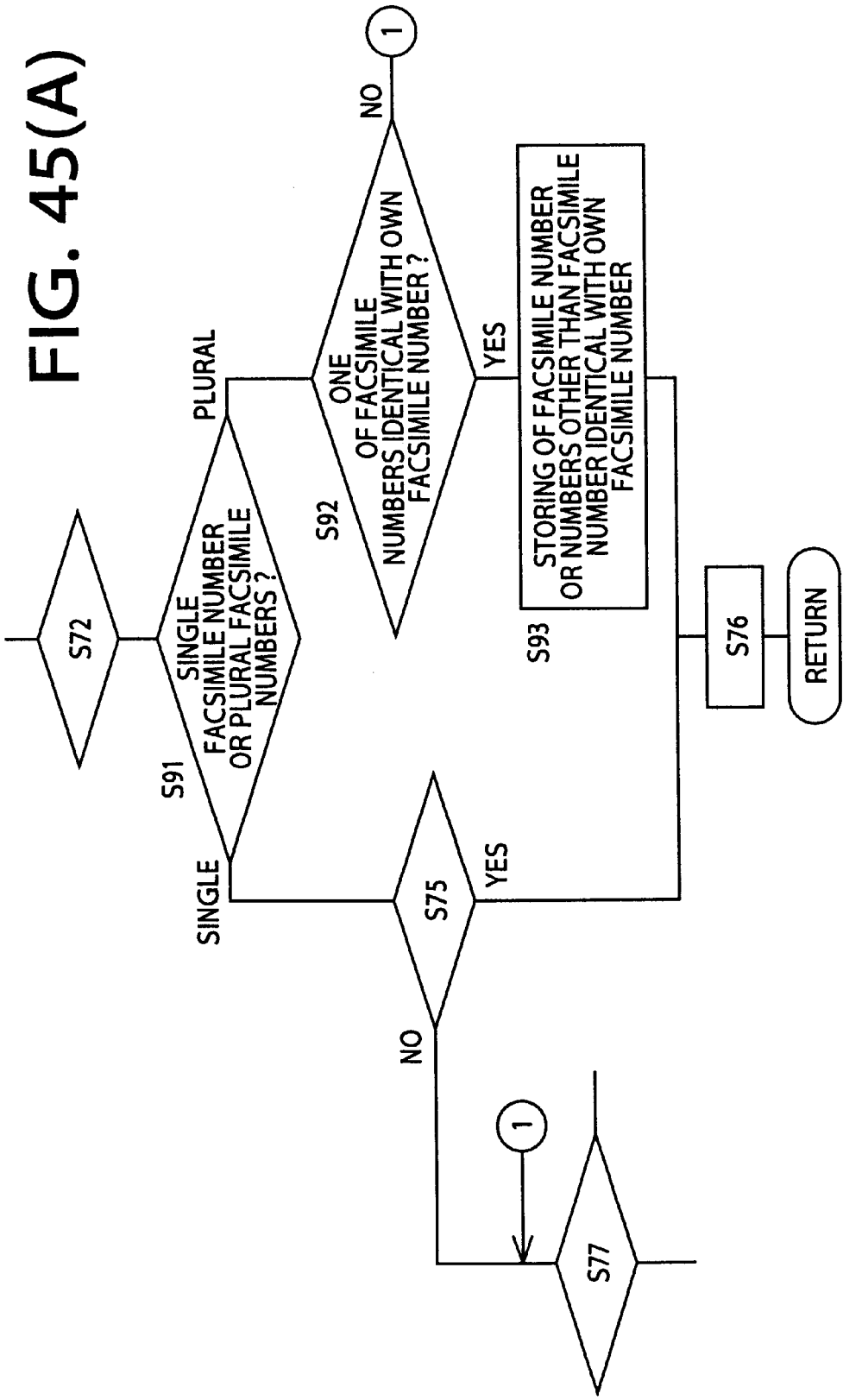
FIG. 45(A) is a flow chart representing a modified form of the program of FIG. 14.
Figure 45B:
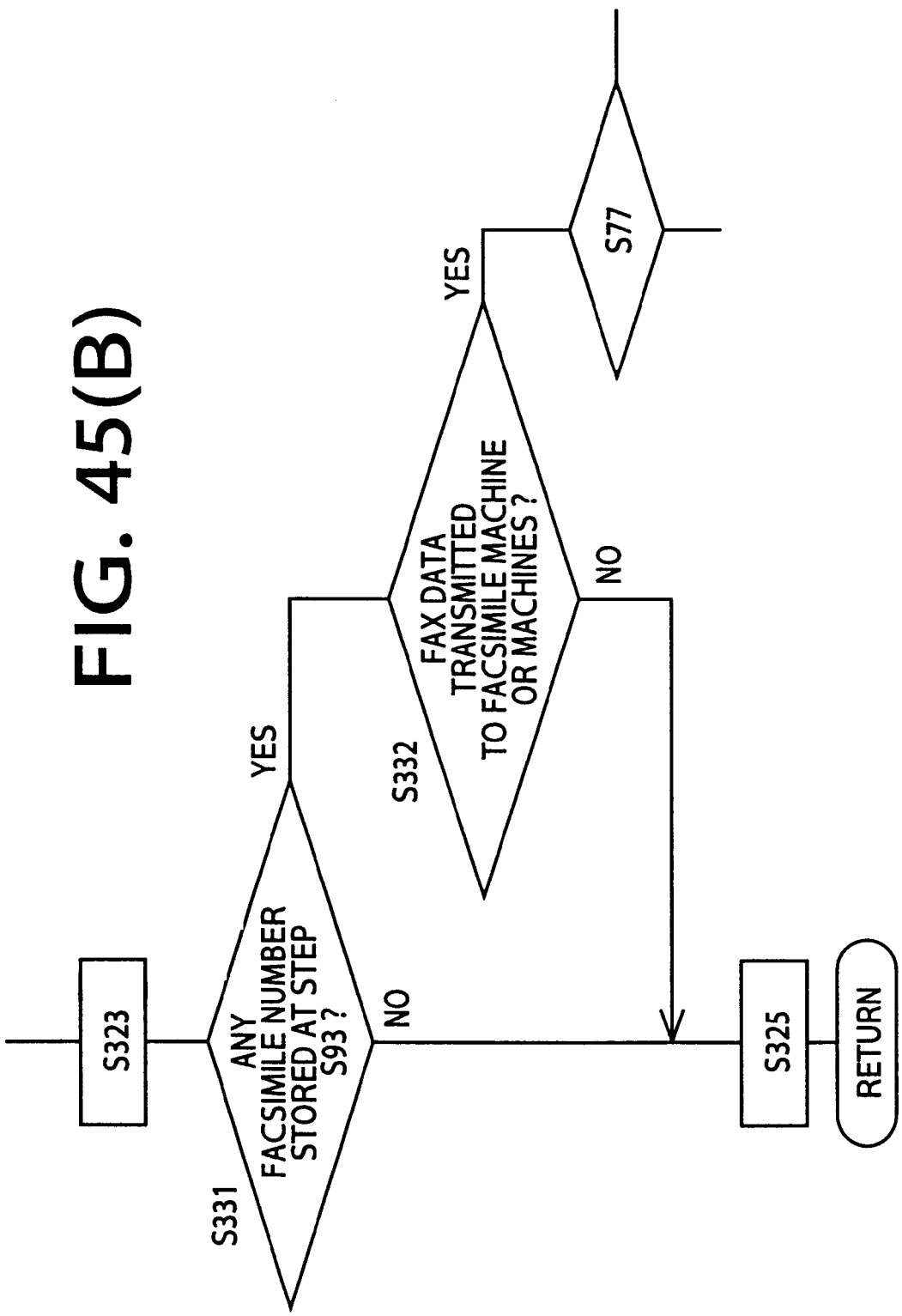
FIG. 45(B) is a flow chart representing a modified form of the program of FIG. 23.

In the illustrated embodiment, at Step S42 of FIG. 13, the PC 4 transmits, to the FAX 2, only a single facsimile number designating a single facsimile machine (e.g., second FAX 114) to which the PC 4 transmits FAX data via the FAX 2, even if the user inputs a plurality of facsimile numbers designating a plurality of facsimile machines which may, or may not, include the FAX 2. However, the PC 4 may be adapted to transmit the input facsimile numbers all at once. In this case, the flow charts of FIG. 14 and FIG. 23 may be modified as indicated in FIGS. 45(A) and 45(B), respectively. More specifically described, in FIG. 14, Steps S73 and S74 are replaced by Steps S91, S92, and S93 and, in FIG. 23, Steps S331 and S332 are inserted between Steps S323 and S325. At Step S91, the CPU 200 of the control device 40 of the FAX 2 judges whether the receiver-designating data supplied from the PC 4 represents a single facsimile number or a plurality of facsimile numbers. In the first case, the control of the CPU 200 goes to Step S75 to judge whether the single facsimile number completely coincides with the own facsimile number of the FAX 2 stored in the own facsimile number buffer 264. On the other hand, in the second case, i.e., in the case where the data represent two or more facsimile numbers, the control goes to Step S92 to judge whether any of the two or more facsimile numbers completely coincides with the own facsimile number of the FAX 2. If a negative judgment is made at Step S92, the control goes to Step S77. On the other hand, if a positive judgment is made, the control goes to Step S93 to store, in a certain order, the facsimile number or numbers other than the facsimile number judged to be identical with the own facsimile number of the FAX. Step S93 is followed by Step S76. At Step S331 of FIG. 45(B), the CPU 200 judges whether any facsimile number has been stored at Step S93 of FIG. 45(A). If a negative judgment is made at Step S331, the control goes to Step S325. On the other hand, if a positive judgment is made, the control goes to Step S332 to display, on the display 150, a question if the user wishes to transmit the FAX data to the facsimile machine or machines designated by the facsimile number or numbers stored at Step S93. If the user finds any errors in the image-recorded sheets 17 produced at Step S320 and wishes to revise the FAX data, the user can operate the STOP key 164 not to transmit the FAX data. In this case, a negative judgment is made at Step S332, so that the control goes to Step S325. On the other hand, if the user finds no error or fault with the images recorded on the sheets 17, the user can operates the START key 162 to start transmitting the FAX data. In this case, a positive judgment is made at Step S332, so that the control goes to Step S77 of FIG. 14. In the case where two or more facsimile numbers are stored at Step S93 and a positive judgment is made at Step S332, Steps S77 to S90 of FIG. 14 are repeated for each of those facsimile numbers in the order of storage of those numbers. In the thus modified FAX 2, a pause is made after the recording of images by the recording device 29 and before the transmission of FAX data, and the user can input, during this pause, a command to start transmitting the FAX data to each of the facsimile machines designated by the facsimile numbers except for the facsimile number judged to be identical with the own facsimile number of the FAX 2. However, Step S332 may be omitted. In the latter case, the FAX 2 may be provided with an all-page memory having a large memory capacity for storing all pages of the FAX data. In the case where the FAX 2 only has the PC RD buffer 250 for storing one page of data, the control device 40 requests the PC 4 to transmit the same FAX data two or more times. However, in the latter case where the FAX 2 has the all-page memory, the control device 40 can read the FAX data from the all-page memory, two or more times, so that the recording device 29 produces a copy corresponding to the FAX data and/or the FAX 2 transmits the FAX data to one or more facsimile-data receivers. In the latter case, since the PC 4 need not transmit the FAX data again, the PC 4 can perform other operations with improved efficiency.

Figure 46:
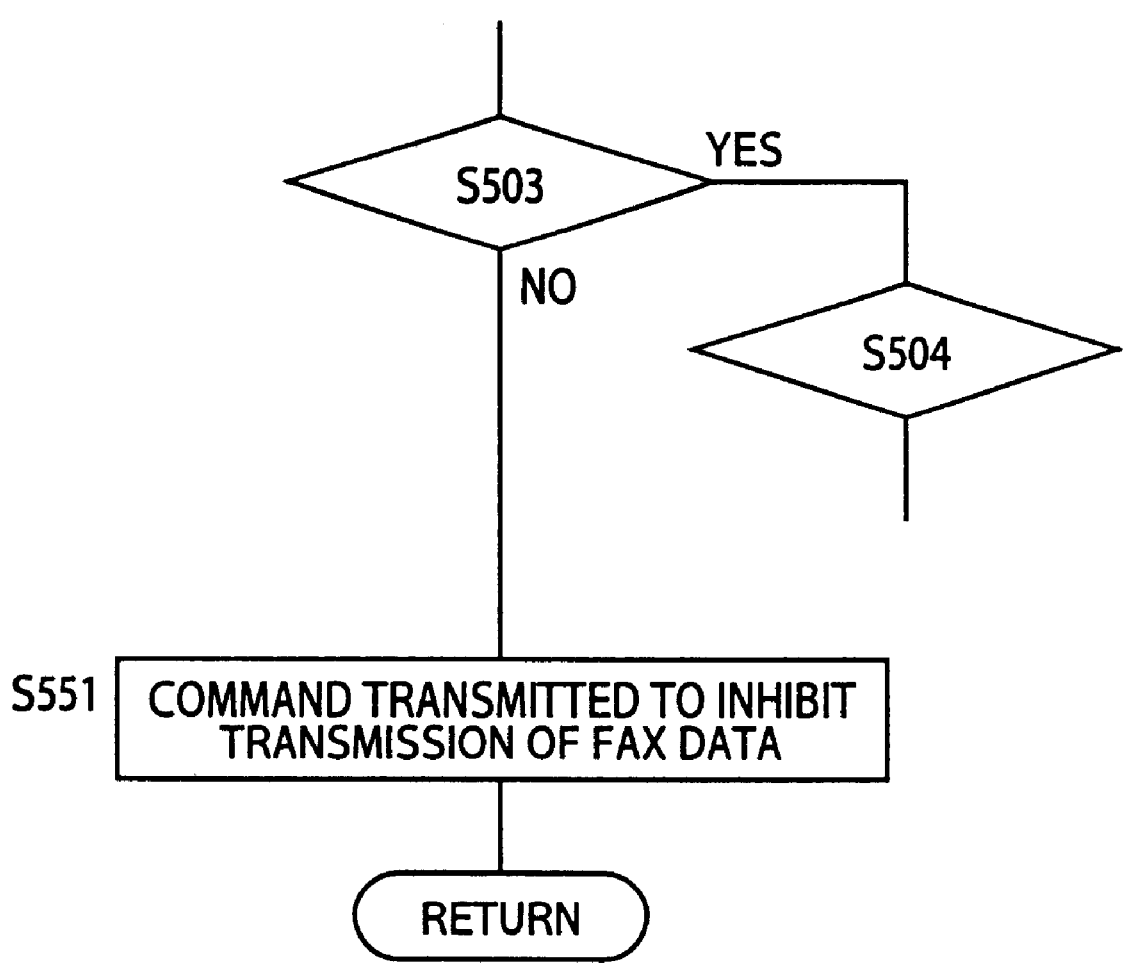
FIG. 46 is a flow chart representing a modified form of the program of FIG. 31.

In the illustrated embodiment, if a negative judgment is made at Step S503 of FIG. 31, the control of the CPU 200 goes to Step S504 to receive the FAX data transmitted from the second FAX 114. However, the flow chart of FIG. 31 may be modified as indicated in FIG. 46 in which Step S551 is inserted after Step S503. If a negative judgment is made at Step S503, i.e., if the I/F box 6 is not connected to the FAX 2, the control of the CPU 200 goes to not Step S513 but Step S551 to transmit, to the second FAX 114, a command to inhibit the second FAX 114 from transmitting FAX data to the FAX 2. The thus modified FAX 2 is free from the problem that the FAX 2 may fail to receive a portion of the FAX data which is transmitted while the FAX 2 judges whether the FAX 2 is permitted to transmit the FAX data to the PC 4, more specifically, while the FAX 2 continues to obtain negative judgments.

While the present invention has been described in its preferred embodiments, the present invention is by no means limited to the details of the illustrated embodiments but may be embodied with other changes, improvements, and modifications that may occur to those skilled in the art without departing from the spirit and scope of the invention defined in the appended claims.

What is claimed is:

1. A facsimile machine, comprising:

an image reader which reads an original image from an original and produces original-image data representing said original image;

a first connector connectable to an external computer via a communication cable;

a second connector connectable to an additional facsimile machine via a communication line;

a facsimile-data receiver which receives first facsimile data transmitted from the additional facsimile machine, via said communication line and said second connector;

an image recorder which records, on a recording sheet, an image corresponding to said first facsimile data received by said facsimile-data receiver;

a facsimile-data transmitter which transmits second facsimile data including said original-image data to the additional machine via said second connector and said communication line, said facsimile-data transmitter transmitting, to the external computer via said first connector and said communication cable, said first facsimile data transmitted from the additional facsimile machine via said communication line and said second connector;

a facsimile-data memory;

a control device which controls, in a first control mode, said facsimile-data receiver to receive said first facsimile data and controls said image recorder to record said image corresponding to said first facsimile data received by the facsimile-data receiver, said control device controlling, in a second control mode, said facsimile-data transmitter to transmit said first facsimile data to the external computer, said control device controlling, in a third control mode, said facsimile-data transmitter not to transmit said first facsimile data to the external computer, and controlling said facsimile-data receiver to receive, in place of the computer, said first facsimile data and store the received first facsimile data in said facsimile-data memory, said control device comprising judging means for judging whether said facsimile-data transmitter is permitted to transmit said first facsimile data to the external computer, based on information indicative of a state of the computer relating to data reception, said control device controlling, in said second control mode, said facsimile-data transmitter to transmit said first facsimile data to the external computer when said judging means makes a positive judgment, and controlling, in said third control mode, said facsimile-data receiver to start receiving said first facsimile data in place of the computer when said judging means makes a negative judgment and to continue the reception of said first facsimile data until the additional facsimile machine ends the transmission of said first facsimile data; and an operation-mode selector which selectively places the facsimile machine in a first operation mode in which said control device operates in said first control mode, and in a second operation mode in which said control device refers to a judgment of said judging means and, when said judging means makes said positive judgment, the control device operates in said second control mode and, when said judging means makes said negative judgment, the control device operates in said third control mode.

2. A facsimile machine according to claim 1, wherein said judging means comprises means for judging whether said facsimile-data transmitter is permitted to transmit said first facsimile data to the external computer, before the additional facsimile machine starts transmitting said first facsimile data to the facsimile machine.

3. A facsimile machine according to claim 1, wherein said judging means comprises means for judging whether said facsimile-data transmitter is permitted to transmit said first facsimile data to the external computer, while the additional facsimile machine transmits said first facsimile data to the facsimile machine.

4. A facsimile machine according to claim 1, wherein said control device comprises means for controlling said facsimile-data receiver to receive said first facsimile data in place of the external computer, while said judging means judges whether said facsimile-data transmitter is permitted to transmit said first facsimile data to the external computer.

5. A facsimile machine according to claim 1, wherein said control device comprises means for transmitting a command to inhibit the additional facsimile machine from transmitting said first facsimile data to the facsimile machine, while said judging means judges whether said facsimile-data transmitter is permitted to transmit said first facsimile data to the external computer.

6. A facsimile machine according to claim 1, wherein said control device comprises means for transmitting a command to request the external computer to receive said first facsimile data received by said facsimile-data receiver in place of the external computer, after the additional facsimile machine ends the transmission of said first facsimile data, and wherein said facsimile-data transmitter transmits, to the computer, the first facsimile data received by the facsimile-data receiver in place of the external computer, when said judging means makes said positive judgment after the ending of the transmission of said first facsimile data.

7. A facsimile machine according to claim 1, wherein said control device comprises means for controlling said facsimile-data receiver to receive said first facsimile data having a highest one of a plurality of different levels of at least one communication parameter each of which level is feasible by the facsimile machine.

8. A facsimile machine according to claim 7, wherein said at least one communication parameter is selected from the group consisting of image resolution, sheet width, coding method, and data-transmission speed.

9. A facsimile machine according to claim 1 further comprising:
  a modifying device which modifies said first facsimile data received by said facsimile-data receiver in place of the external computer, into the modified facsimile data having a level of at least one communication parameter which level is feasible by the external computer.

10. A facsimile machine according to claim 9, wherein said modifying device comprises means for modifying said first facsimile data received by said facsimile-data receiver in place of the external computer, into said modified facsimile data having a highest one of a plurality of different levels of said communication parameter each of which levels is feasible by the external computer.

11. A facsimile machine according to claim 9, wherein said at least one communication parameter is selected from the group consisting of image resolution, sheet width, coding method, and data-transmission speed.

12. A facsimile machine according to claim 9, wherein said control device comprises means for controlling said facsimile-data transmitter to transmit said modified facsimile data to the external computer, when said judging means makes a positive judgment.

13. A facsimile machine according to claim 1, wherein said facsimile-data receiver comprises a storing device including said facsimile-data memory, for storing said first facsimile data transmitted from the additional facsimile machine, in said facsimile-data memory, at a timing of transmission of said first facsimile data,
  said judging means comprises a consecutive judging means for consecutively judging whether said facsimile-data transmitter is permitted to transmit the first facsimile data stored in said facsimile-data memory, to the external computer, while said storing device stores, in said facsimile-data memory, said first facsimile data transmitted from the additional facsimile machine, and
  said control device controls, while said consecutive judging means continues to make a positive judgment, said. facsimile-data transmitter to transmit, to the external computer, the first facsimile data stored in said facsimile-data memory by said storing device.

14. A facsimile machine according to claim 13, wherein said controk device comprises first control means for controlling said facsimile-data transmitter to end the transmission of the first fsacimile data stored in said fascimile-data memory, when said judging means has continued to make negative judgments for more than a predetermined time.

15. A facsimile machine according to claim 14, wherein said control device comprises second control means for controlling said image recorder to record, on said recording sheet, said image corresponding to the first facsimile data stored in said facsimile-data memory, when said first control means ends the transmission of the first facsimile data stored in said facsimile-data memory and after the additional facsimile machine ends the transmission of said first facsimile data to the facsimile machine.

16. A facsimile machine according to claim 1, wherein said control device comprises means for operating in said first control mode, independent of said judgment of said judging means, when said first operation mode is selected by said operation-mode selector.

17. A facsimile machine according to claim 16, wherein said control device comprises means for inhibiting the operation of said judging means, when said first operation mode is selected by said operation-mode selector.

18. A facsimile machine, comprising:
  an image reader which reads an original image from an original and produces original-image data representing said original image;
  a first connector connectable to an external computer via a communication cable;
  a second connector connectable to an additional facsimile machine via a communication line;
  a facsimile-data receiver which receives first facsimile data transmitted from the additional facsimile machine, via said communication line and said second connector;
  an image recorder which records, on a recording sheet, an image corresponding to said first facsimile data received by said facsimile-data receiver;
  a facsimile-data transmitter which transmits second facsimile data including said original-image data to the additional machine via said second connector and said communication line, said facsimile-data transmitter transmitting, to the external computer via said first connector and said communication cable, said first facsimile data transmitted from the additional facsimile machine via said communication line and said second connector;
  a control device which controls, in a first control mode, said facsimile-data receiver to receive said first facsimile data and controls said image recorder to record said image corresponding to said first facsimile data received by the facsimile-data receiver,
  said control device controlling, in a second control mode, said facsimile-data transmitter to transmit said first facsimile data to the external computer, when the facsimile-data transmitter is permitted to transmit said first facsimile data to the computer,
  said control device controlling, in a third control mode, said facsimile-data transmitter not to transmit said first facsimile data to the computer, controlling said facsimile-data receiver to receive, in place of the computer, said first facsimile data, and controlling said image recorder to record said image corresponding to said first facsimile data received by the facsimile-data receiver in place of the computer, when the facsimile-data transmitter is not permitted to transmit said first facsimile data to the computer,
  said control device comprising judging means for judging whether said facsimile-data transmitter is permitted to transmit said first facsimile data to the external computer, based on information indicative of a state of the computer relating to data reception,
  said control device controlling, in said second control mode, said facsimile-data transmitter to transmit said first facsimile data to the external computer when said judging means makes a positive judgment, and controlling, in said third control mode, said image recorder to record said image corresponding to said first facsimile data received by the facsimile-data receiver in place of the computer, when said judging means makes a negative judgment; and an operation-mode selector which selectively places the facsimile machine in a first operation mode in which said control device does not operate said judging means and operates in said first control mode, and in a second operation mode in which said control device operates said judging means and, when said judging means makes said positive judgment, the control device operates in said second control mode and, when said judging means makes said negative judgment, the control device operates in said third control mode.

19. A fascimile machine according to claim 18, wherein said facsimile-data receiver comprises a facsimile-data memory which stores said first facsimile data received by said facsimile-data receiver in place of the external computer, when said judging means makes a negative judgment and simultaneously when said image recorder cannot record said image.

20. A facsimile machine according to claim 19, wherein said control device comprises means for controlling said image recorder to record said image corresponding to said first facsimile data stored in said facsimile-data memory, when the image recorder becomes able to record said image.

21. A facsimile machine, comprising:
an image reader which reads an original image from an original and produces original-image data representing said original image;
a first connector connectable to an external computer via a communication cable;
a second connector connectable to a remote data transmitter and a remote data receiver via a communication line;
a first data receiver which receives first facsimile data transmitted from the remote data transmitter, via said communication line and said second connector;
an image recorder which records, on a recording sheet, an image corresponding to said first facsimile data received by said first data receiver;
a first data transmitter which transmits second facsimile data including said original-image data to the remote data receiver as a second data receiver via said second connector and said communication line; and
a control device which controls, in a first control mode, said first data receiver to receive said first facsimile data transmitted from the remote data transmitter as a second data transmitter, and controls said image recorder to record said image corresponding to said first facsimile data received by the first data receiver,
said control device controlling, in a second control mode, said first data transmitter to transmit, to the external computer via said first connector and said communication cable, a first batch of data out of a plurality of batches of data transmitted from the second data transmitter via said communication line and said second connector, and not to transmit, to the computer, a second batch of data out of said plurality of batches of data,
said control device comprising first judging means for judging whether each batch of data out of said plurality of batches of data transmitted from the second data transmitter is a first sort of data or a second sort of data, said first sort of data and said second sort of data being different from each other,
said control device further comprising first control means for controlling, when said first judging means judges that each said batch of data is said first sort of data, said first data transmitter to transmit the first sort of data as said first batch of data, to the external computer, and controlling, when said first judging means judges that each said batch of data is said second sort of data, said first data transmitter not to transmit the second sort of data as said second batch of data, to the external computer.

22. A facsimile machine according to claim 21, further comprising a telephone set, and wherein said first judging means judges whether each said batch of data out of said plurality of batches of data transmitted from the second data transmitter is one of facsimile data comprising image data as said first sort of data and telephone data comprising sound data as said second sort of data and said first control means controls, when said first judging means judges that each said batch of data is said facsimile data as said first sort of data, said first data transmitter to transmit the facsimile data as said first batch of data, to the external computer, and controls, when said first judging means judges that said each batch of data is said telephone data as said second sort of data, said first data transmitter to transmit said telephone data as said second batch of data, to said telephone set.

23. A facsimile machine according to claim 21, wherein said first judging means comprises facsimile-data judging means for judging whether each said batch of data out of said plurality of batches of data transmitted from the second data transmitter is facsimile data comprising image data as said first sort of data, based on at least one detectable event relating to transmission of facsimile data.

24. A facsimile machine according to claim 23, wherein said fascimile date judging means comprises means for judging whether said each batch of data transmitted from the second data transmitter is said facsimile data, based on said at least one event selected from the group consisting of (a) a first event that the facsimile machine has received, from the second data transmitter, a CNG signal indicating that a batch of facsimile data follows, (b) a second event that a predetermined time has passed after the facsimile machine receives a call signal from the second data transmitter, (c) a third event that a user has input a command to receive said each batch of data transmitted from the second data transmitter, (d) a fourth event that the facsimile machine has generated a predetermined number of calling sounds to call a user, and (e) a fifth event that the facsimile machine has not received any sound data from the second data transmitter for more than a predetermined time after the facsimile machine transmits an answering message to the second data transmitter.

25. A facsimile machine according to claim 21, wherein said control device comprises:
second judging means for judging whether said first data transmitter is permitted to transmit, to the external computer, each said batch of data out of said batches of data transmitted from the second data transmitter, based on information indicative of a state of the computer relating to data reception; and
second control means for controlling, when said second judging means makes a positive judgment, said first data transmitter to transmit said first sort of data to the external computer, and controlling, when said second judging means makes a negative judgment, not to transmit the first sort of data to the computer.

26. A facsimile machine, comprising:
an image reader which reads an original image from an original and produces original-image data representing said original image;
a first connector connectable to an external computer via a communication cable;

a second connector connectable to an additional facsimile machine via a communication line;

a facsimile-data receiver which receives first facsimile data transmitted from the additional facsimile machine, via said communication line and said second connector;

an image recorder which records, on a recording sheet, an image corresponding to said first facsimile data received by said facsimile-data receiver;

a facsimile-data transmitter which transmits second facsimile data including said original-image data to the additional machine via said second connector and said communication line, said facsimile-data transmitter transmitting, to the external computer via said first connector and said communication cable, said first facsimile data transmitted from the additional facsimile machine via said communication line and said second connector;

a facsimile-data memory;

a control device which controls, in a first control mode, said facsimile-data receiver to receive said first facsimile data and controls said image recorder to record said image corresponding to said first facsimile data received by the facsimile-data receiver, said control device controlling, in a second control mode, said facsimile-data transmitter to transmit said first facsimile data to the external computer, said control device controlling, in a third control mode, said facsimile-data transmitter not to transmit said first facsimile data to the external computer, and controlling said facsimile-data receiver to receive, in place of the computer, said first facsimile data and store the received first facsimile data in said facsimile-data memory, said control device controlling, in a fourth control mode, said facsimile-data transmitter not to transmit said first facsimile data to the computer, controlling said facsimile-data receiver to receive, in place of the computer, said first facsimile data, and controlling said image recorder to record said image corresponding to said first facsimile data received by the facsimile-data receiver in place of the computer, said control device comprising judging means for judging whether said facsimile-data transmitter is permitted to transmit said first facsimile data to the external computer, based on information indicative of a state of the computer relating to data reception; and an operation-mode selector which selectively places the facsimile machine in a first operation mode in which said control device operates in said first control mode, in a second operation mode in which said control device refers to a judgment of said judging means, and in a third operation mode which is different from said first and second operation modes and in which said control device refers to said judgment of said judging means, said control device operating in said second control mode when said judging means makes a positive judgment in each of said second and third operation modes, said control device operating in said third control mode when said judging means makes a negative judgment in said second operation mode, said control device operating in said fourth control mode when said judging means makes said negative judgment in said third operation mode.

27. A facsimile machine according to claim 26, wherein said control device comprises means for controlling said facsimile-data transmitter to transmit, to the external computer, said first facsimile data received by said facsimile-data receiver in place of the computer, when said judging means makes said positive judgment after the additional facsimile machine ends the transmission of said first facsimile data.

28. A facsimile machine according to claim 26, wherein said control device comprises means for operating in said first control mode, independent of said judgment of said judging means, when said first operation mode is selected by said operation-mode selector.

29. A facsimile machine, comprising:

an image reader which reads an original image from an original and produces original-image data representing said original image;

a first connector connectable to an external computer via a communication cable;

a second connector connectable to an additional facsimile machine via a communication line;

a facsimile-data receiver which receives first facsimile data transmitted from the additional facsimile machine, via said communication line and said second connector;

an image recorder which records, on a recording sheet, an image corresponding to said first facsimile data received by said facsimile-data receiver;

a facsimile-data transmitter which transmits second facsimile data including said original-image data to the additional machine via said second connector and said communication line, said facsimile-data transmitter transmitting, to the external computer via said first connector and said communication cable, said first facsimile data transmitted from the additional facsimile machine via said communication line and said second connector;

a facsimile-data memory;

a control device which controls, in a first control mode, said facsimile-data transmitter to transmit said first facsimile data to the said external computer, said control device controlling, in a second control mode, said facsimile-data transmitter not to transmit said first facsimile data to the external computer, and controlling said facsimile-data receiver to receive, in place of the computer, said first facsimile data and store the received first facsimile data in said facsimile-data memory, said control device controlling, in a third control mode, said facsimile-data transmitter not to transmit said first facsimile data to the external computer, controlling said facsimile-data receiver to receive, in place of the computer, said first facsimile data, and controlling said image recorder to record said image corresponding to said first facsimile data received by the facsimile-data receiver in place of the computer, said control device comprising judging means for judging whether said facsimile-data transmitter is permitted to transmit said first facsimile data to the external computer, based on information indicative of a state of the computer relating to data reception; and an operation-mode selector which selectively places the facsimile machine in a first and a second operation mode which are different from each other and in each of which said control device refers to a judgment of said judging means, said control device operating in said first control mode when said judging means makes a positive judgment in said each of said first and second operation modes, said control device operating in said second control mode when said judging means makes a negative judgment in said first operation mode, said control device operating in said third control mode when said judging means makes said negative judgment in said second operation mode.

30. A facsimile controller, comprising:

an image input unit which obtains input image data representing an input image;

a first connector connectable to an external computer via a communication cable;

a second connector connectable to an additional facsimile machine via a communication line;

a facsimile-data receiver which receives first facsimile data transmitted from the additional facsimile machine, via said communication line and said second connector;

an image output unit which outputs output image data corresponding to said first facsimile data received by said facsimile-data receiver;

a facsimile-data transmitter which transmits second facsimile data including said input image data to the additional machine via said second connector and said communication line, said facsimile-data transmitter transmitting, to the external computer via said first connector and said communication cable, said first facsimile data transmitted from the additional facsimile machine via said communication line and said second connector;

a facsimile-data memory;

a control device which controls, in a first control mode, said facsimile-data receiver to receive said first facsimile data and controls said image output unit to output said output image data corresponding to said first facsimile data received by the facsimile-data receiver, said control device controlling, in a second control mode, said facsimile-data transmitter to transmit said first facsimile data to the external computer, said control device controlling, in a third control mode, said facsimile-data transmitter not to transmit said first facsimile data to the external computer, and controlling said facsimile-data receiver to receive, in place of the computer, said first facsimile data and store the received first facsimile data in said facsimile-data memory, said control device comprising judging means for judging whether said facsimile-data transmitter is permitted to transmit said first facsimile data to the external computer, based on information indicative of a state of the computer relating to data reception, said control device controlling, in said second control mode, said facsimile-data transmitter to transmit said first facsimile data to the external computer when said judging means makes a positive judgment, and controlling, in said third control mode, said facsimile-data receiver to start receiving said first facsimile data in place of the computer when said judging means makes a negative judgment and to continue the reception of said first facsimile data until the additional facsimile machine ends the transmission of said first facsimile data; and an operation-mode selector which selectively places the facsimile machine in a first operation mode in which said control device operates in said first control mode, and in a second operation mode in which said control device refers to a judgment of said judging means and, when said judging means makes said positive judgment, the control device operates in said second control mode and, when said judging means makes said negative judgment, the control device operates in said third control mode.

31. A facsimile controller, comprising:

an image input unit which obtains input image data representing an input image;

a first connector connectable to an external computer via a communication cable;

a second connector connectable to an additional facsimile machine via a communication line;

a facsimile-data receiver which receives first facsimile data transmitted from the additional facsimile machine, via said communication line and said second connector;

an image output unit which outputs output image data corresponding to said first facsimile data received by said facsimile-data receiver;

a facsimile-data transmitter which transmits second facsimile data including said input image data to the additional machine via said second connector and said communication line, said facsimile-data transmitter transmitting, to the external computer via said first connector and said communication cable, said first facsimile data transmitted from the additional facsimile machine via said communication line and said second connector;

a control device which controls, in a first control mode, said facsimile-data receiver to receive said first facsimile data and controls said image output unit to output said output image data corresponding to said first facsimile data received by the facsimile-data receiver, said control device controlling, in a second control mode, said facsimile-data transmitter to transmit said first facsimile data to the external computer, said control device controlling, in a third control mode, said facsimile-data transmitter not to transmit said first facsimile data to the external computer, controlling said facsimile-data receiver to receive, in place of the computer, said first facsimile data, and controlling said image output unit to output said output image data corresponding to said first facsimile data received by the facsimile-data receiver in place of the computer, said control device comprising judging means for judging whether said facsimile-data transmitter is permitted to transmit said first facsimile data to the external computer, based on information indicative of a state of the computer relating to data reception, said control device controlling, in said second control mode, said facsimile-data transmitter to transmit said first facsimile data to the external computer when said judging means makes a positive judgment, and controlling, in said third control mode, said image output unit to output said output image data corresponding to said first facsimile data received by the facsimile-data receiver in place of the computer, when said judging means makes a negative judgment; and an operation-mode selector which selectively places the facsimile machine in a first operation mode in which said control device operates in said first control mode, and in a second operation mode in which said control device refers to a judgment of said judging means and, when said judging means makes said positive judgment, the control device operates in said second control mode and, when said judging means makes said negative judgment, the control device operates in said third control mode.

32. A facsimile controller, comprising:

an image input unit which obtains input-image data representing an input image;

a first connector connectable to an external computer via a communication cable;

a second connector connectable to a remote data transmitter and a remote data receiver via a communication line;

a first data receiver which receives first facsimile data transmitted from the remote data transmitter, via said communication line and said second connector;

an image output unit which outputs output image data representing an output image corresponding to said first facsimile data received by said first data receiver;

a first data transmitter which transmits second facsimile data including said input image data to the remote data receiver as a second data receiver via said second connector and said communication line; and a control device which controls, in a first control mode, said first data receiver to receive said first facsimile data transmitted from the remote data transmitter as a second data transmitter, and controls said image output unit to output said output image data corresponding to said first facsimile data received by the first data receiver, said control device controlling, in a second control mode, said first data transmitter to transmit, to the external computer via said first connector and said communication cable, a first batch of data out of a plurality of batches of data transmitted from the second data transmitter via said communication line and said second connector, and not to transmit, to the computer, a second batch of data out of said plurality of batches of data, said control device comprising first judging means for judging whether each batch of data out of said plurality of batches of data transmitted from the second data transmitter is a first sort of data or a second sort of data, said first sort of data and said second sort of data being different from each other, said control device further comprising first control means for controlling, when said first judging means judges that said each batch of data is said first sort of data, said first data transmitter to transmit the first sort of data as said first batch of data, to the external computer, and controlling, when said first judging means judges that said each batch of data is said second sort of data, said first data transmitter not to transmit the second sort of data as said second batch of data, to the external computer.

33. A facsimile controller, comprising:

an image input unit which obtains input-image data representing an input image;

a first connector connectable to an external computer via a communication cable;

a second connector connectable to an additional facsimile machine via a communication line;

a facsimile-data receiver which receives first facsimile data transmitted from the additional facsimile machine, via said communication line and said second connector;

an image output unit which outputs output image data corresponding to said first facsimile data received by said facsimile-data receiver;

a facsimile-data transmitter which transmits second facsimile data including said input-image data to the additional machine via said second connector and said communication line, said facsimile-data transmitter transmitting, to the external computer via said first connector and said communication cable, said first facsimile data transmitted from the additional facsimile machine via said communication line and said second connector;

a facsimile-data memory;

a control device which controls, in a first control mode, said facsimile-data receiver to receive said first facsimile data and controls said image output unit to output said output image data corresponding to said first facsimile data received by the facsimile-data receiver, said control device controlling, in a second control mode, said facsimile-data transmitter to transmit said first facsimile data to the external computer, said control device controlling, in a third control mode, said facsimile-data transmitter not to transmit said first facsimile data to the external computer, and controlling said facsimile-data receiver to receive, in place of the computer, said first facsimile data and store the received first facsimile data in said facsimile-data memory, said control device controlling, in a fourth control mode, said facsimile-data transmitter not to transmit said first facsimile data to the computer, controlling said facsimile-data receiver to receive, in place of the computer, said first facsimile data, and controlling said image output unit to output said output image data corresponding to said first facsimile data received by the facsimile-data receiver in place of the computer, said control device comprising judging means for judging whether said facsimile-data transmitter is permitted to transmit said first facsimile data to the external computer, based on information indicative of a state of the computer relating to data reception; and an operation-mode selector which selectively places the facsimile machine in a first operation mode in which said control device operates in said first control mode, in a second operation mode in which said control device refers to a judgment of said judging means, and in a third operation mode which is different from said first and second operation modes and in which said control device refers to said judgment of said judging means, said control device operating in said second control mode when said judging means makes a positive judgment in each of said second and third operation modes, said control device operating in said third control mode when said judging means makes a negative judgment in said second operation mode, said control device operating in said fourth control mode when said judging means makes said negative judgment in said third operation mode.

34. A facsimile controller, comprising:

an image input unit which obtains input-image data representing an input image;

a first connector connectable to an external computer via a communication cable;

a second connector connectable to an additional facsimile machine via a communication line;

a facsimile-data receiver which receives first facsimile data transmitted from the additional facsimile machine, via said communication line and said second connector;

an image output unit which outputs output image data corresponding to said first facsimile data received by said facsimile-data receiver;

a facsimile-data transmitter which transmits second facsimile data including said input image data to the additional machine via said second connector and said communication line, said facsimile-data transmitter transmitting, to the external computer via said first connector and said communication cable, said first facsimile data transmitted from the additional facsimile machine via said communication line and said second connector;

a facsimile-data memory;

a control device which controls, in a first control mode, said facsimile-data transmitter to transmit said first facsimile data to the external computer, said control device controlling, in a second control mode, said facsimile-data transmitter not to transmit said first facsimile data to the external computer, and controlling said facsimile-data receiver to receive, in place of the computer, said first facsimile data and store the received first facsimile data in said facsimile-data memory, said control device controlling, in a third control mode, said facsimile-data transmitter not to transmit said first facsimile data to the external computer, controlling said facsimile-data receiver to receive, in place of the computer, said first facsimile data, and controlling said image output unit to output said output image data corresponding to said first facsimile data received by the facsimile-data receiver in place of the computer, said control device comprising judging means for judging whether said facsimile-data transmitter is permitted to transmit said first facsimile data to the external computer, based on information indicative of a state of the computer relating to data reception; and an operation-mode selector which selectively places the facsimile machine in a first and a second operation mode which are different from each other and in each of which said control device refers to a judgment of said judging means, said control device operating in said first control mode when said judging means makes a positive judgment in said each of said first and second operation modes, said control device operating in said second control mode when said judging means makes a negative judgment in said first operation mode, said control device operating in said third control mode when said judging means makes said negative judgment in said second operation mode.

35. A facsimile machine, comprising:

at least one of a first facsimile-data transmitter and a first facsimile-data receiver;

a data receiver including a connector connectable via a private communication line to an external personal computer for receiving, from the personal computer, designating data designating a telephone set;

a calling device which calls said telephone set designated by said designating data so as to connect said facsimile machine to the telephone set via a public communication line;

a judging means for judging a condition of a facsimile transmission; and informing means for informing said external personal computer of said judged condition, wherein said judging means and said informing means are housed in said facsimile machine.

36. A facsimile machine, comprising: at least one of a facsimile-data transmitter and a first facsimile-data receiver;

a data receiver including a connector connectable via a private communication line to an external personal computer for receiving, from the personal computer, designating data designating a telephone set;

a calling device which calls said telephone set designated by said designating data, so as to connect said facsimile machine to the telephone set via a public communication line;

judging means for judging whether said calling device successfully called the telephone set; and informing means for informing the external personal computer of a judgment made by said judging means that said calling device failed to call the telephone set.

37. A facsimile machine, comprising:

at least one of a first facsimile-data transmitter and a first facsimile-data receiver;

a data receiver including a connector connectable via a first communication line to an external computer for receiving, from the computer, designating data designating a telephone set;

a calling device which calls said telephone set designated by said designating data, so as to connect said facsimile machine to the telephone set via a second communication line;

judging means for judging whether said calling device successfully called the telephone set; and informing means for informing the external computer of a judgment made by said judging means that said calling device failed to call the telephone set.

38. A facsimile machine, comprising:

a data receiver including a connector connectable via a private communication line to an external personal computer;

a calling device which calls a telephone set so as to connect said facsimile machine to the telephone set via a public communication line;

judging means for judging whether said calling device successfully called the telephone set; and informing means for informing the external personal computer of a judgment made by said judging means that said calling device failed to call the telephone set.

39. A facsimile machine, comprising:

at least one of a first facsimile-data transmitter and a first facsimile-data receiver;

a calling device which calls a telephone set so as to connect said facsimile machine to the telephone set via a communication line;

judging means for judging whether said calling device successfully called the telephone set; and informing means for informing the external computer of a judgment made by said judging means that said calling device failed to call the telephone set.

40. A facsimile machine, comprising:

at least one of a first facsimile-data transmitter and a first facsimile-data receiver;

a data receiver including a connector connectable via a private communication line to an external personal computer for receiving, from the personal computer, designating data designating a second facsimile machine;

a communication device that communicates with said second facsimile machine designated by said designating data so as to connect said facsimile machine to the second facsimile machine via a public communication line;

a judging means for judging a condition of a facsimile transmission; and informing means for informing said external personal computer of said judged condition, wherein said judging means and said informing means are housed in said facsimile machine.

41. A facsimile machine, comprising:

at least one of a facsimile-data transmitter and a first facsimile-data receiver;

a data receiver including a connector connectable via a private communication line to an external personal computer for receiving, from the personal computer, designating data designating a second facsimile machine;

a communication device that communicates with said second facsimile machine designated by said designating data, so as to connect said facsimile machine to the second facsimile machine via a public communication line;

judging means for judging whether said calling device successfully called the second facsimile machine; and informing means for informing the external personal computer of a judgment made by said judging means that said communication device failed to communicate with the second facsimile machine.

42. A facsimile machine, comprising:

at least one of a first facsimile-data transmitter and a first facsimile-data receiver;

a data receiver including a connector connectable via a first communication line to an external computer for receiving, from the computer, designating data designating a second facsimile machine;

a communication device that communicates with said second facsimile machine designated by said designating data, so as to connect said facsimile machine to the second facsimile machine via a second communication line;

judging means for judging whether said communication device successfully communicates with the second facsimile machine; and informing means for informing the external computer of a judgment made by said judging means that said communication device failed to communicate with the second facsimile machine.

43. A facsimile machine, comprising:

at least one of a first facsimile-data transmitter and a first facsimile-data receiver;

a data receiver including a connector connectable via a first communication line to an external personal computer for receiving, from the personal computer, designating data designating a telephone set;

a calling device which calls said telephone set designated by said designating data so as to connect said facsimile machine to the telephone set via a second communication line;

a judging means for judging a condition of a facsimile transmission; and informing means for informing said external personal computer of said judged condition, wherein said judging means and said informing means are housed in said facsimile machine.

44. A facsimile machine, comprising:

at least one of a first facsimile-data transmitter and a first facsimile-data receiver;

a data receiver including a connector connectable via a first communication line to an external personal computer for receiving, from the personal computer, designating data designating a second facsimile machine;

a communication device that communicates with said second facsimile machine designated by said designating data so as to connect said facsimile machine to the second facsimile machine via a second communication line;

a judging means for judging a condition of a facsimile transmission; and informing means for informing said external personal computer of said judged condition, wherein said judging means and said informing means are housed in said facsimile machine.

45. A facsimile machine, comprising:

a connector connectable to an external computer;

a calling device which calls, based on a command received from the external computer, one of a plurality of facsimile machines other than the facsimile machine, so as to connect the facsimile machine to said one facsimile machine; and inhibiting means for inhibiting said calling device from calling any of said plurality of facsimile machines other than the facsimile machine while said facsimile machine is connected to a telephone set.

46. A facsimile machine, comprising:

a first facsimile-data receiver comprising a connector connectable via a first communication line to an external computer for receiving, from the computer, computer data comprising first facsimile data;

a facsimile-data transmitter which transmits second facsimile data via a second communication line to a second facsimile-data receiver;

a calling device which calls, based on a command received from the computer, one of a plurality of facsimile machines other than the facsimile machine, so as to connect the facsimile machine to said one facsimile machine via a corresponding one of respective communication lines; and inhibiting means for inhibiting said calling device from calling any of said plurality of facsimile machines other than the facsimile machine while said facsimile machine is connected to a telephone set via a third communication line.

47. A facsimile machine, comprising:

a calling device which calls, based on a command received from the external computer, one of a plurality of facsimile machines other than the facsimile machine, so as to connect the facsimile machine to said one facsimile machine; and inhibiting means for inhibiting said calling device from calling any of said plurality of facsimile machines other than the facsimile machine while said facsimile machine is connected to a telephone set.

48. A facsimile machine, comprising:

a connector connectable to an external computer;

a communication device that communicates, based on a command received from the external computer, one of a plurality of facsimile machines other than the facsimile machine, so as to connect the facsimile machine to said one facsimile machine; and inhibiting means for inhibiting said communication device from communicating with any of said plurality of facsimile machines other than the facsimile machine while said facsimile machine is connected to a second facsimile machine.

49. A facsimile machine, comprising:

a first facsimile-data receiver comprising a connector connectable via a first communication line to an external computer for receiving, from the computer, computer data comprising first facsimile data;

a facsimile-data transmitter which transmits second facsimile data via a second communication line to a second facsimile-data receiver;

a communication device that communicates with one of a plurality of facsimile machines other than the facsimile machine based on a command received from the computer so as to connect the facsimile machine to said one facsimile machine via a corresponding one of respective communication lines; and inhibiting means for inhibiting said communication device from communicating with any of said plurality of facsimile machines other than the facsimile machine while said facsimile machine is connected to a second facsimile machine via a third communication line.

50. A facsimile machine, comprising:

at least one of a first facsimile-data transmitter and a first facsimile-data receiver;

a data receiver including a connector connectable via a first communication line to an external computer for receiving, from the computer, designating data designating a second facsimile machine;

a communication device that communicates with said second facsimile machine designated by said designating data, so as to connect said facsimile machine to the second facsimile machine via a second communication line;

said first facsimile-data receiver which receives computer data comprising first facsimile data from the external computer via said first communication line; and said first facsimile-data transmitter which transmits, in response to a command received from the external computer, said first facsimile data to one of a plurality of facsimile-data receivers other than said first facsimile-data receiver via a corresponding one of respective communication lines.

51. A facsimile machine, comprising:

a facsimile-data transmitter and a first facsimile-data receiver;

a data receiver including a connector connectable via a private communication line to an external personal computer for receiving, from the personal computer, designating data designating a telephone set; and a calling device which calls said telephone set designated by said designating data, so as to connect said facsimile machine to the telephone set via a public communication line;

said first facsimile-data receiver receiving computer data comprising first facsimile data from the external personal computer via said private communication line;

said first facsimile-data transmitter transmitting, in response to a command received from the external personal computer, said first facsimile data to one of a plurality of facsimile-data receivers other than said first facsimile-data receiver via a corresponding one of respective communication lines.

52. A facsimile machine, comprising:

at least one of a first facsimile-data transmitter and a first facsimile-data receiver;

a data receiver including a connector connectable via a first communication line to an external computer for receiving, from the computer, designating data designating a telephone set;

a calling device which calls said telephone set designated by said designating data, so as to connect said facsimile machine to the telephone set via a second communication line;

said first facsimile-data receiver which receives computer data comprising first facsimile data from the external computer via said first communication line; and said first facsimile-data transmitter which transmits, in response to a command received from the external computer, said first facsimile data to one of a plurality of facsimile-data receivers other than said first facsimile-data receiver via a corresponding one of respective communication lines.

53. A facsimile machine, comprising:

a facsimile-data transmitter and a first facsimile-data receiver;

a data receiver including a connector connectable via a private communication line to an external personal computer;

said first facsimile-data receiver receiving computer data comprising first facsimile data from the external personal computer via said private communication line; and said first facsimile-data transmitter transmitting, in response to a command received from the external personal computer, said first facsimile data to one of a plurality of facsimile-data receivers other than said first facsimile-data receiver via a corresponding one of respective communication lines.

54. A facsimile machine, comprising:

at least one of a first facsimile-data transmitter and a first facsimile-data receiver;

a data receiver including a connector connectable via a first communication line to an external computer;

said first facsimile-data receiver which receives computer data comprising first facsimile data from the external computer via said first communication line; and said first facsimile-data transmitter which transmits, in response to a command received from the external computer, said first facsimile data to one of a plurality of facsimile-data receivers other than said first facsimile-data receiver via a corresponding one of respective communication lines.

55. A facsimile machine, comprising:

a facsimile-data transmitter and a first facsimile-data receiver;

a data receiver including a connector connectable via a private communication line to an external personal computer for receiving, from the personal computer, designating data designating a second facsimile machine; and a communication device that communicates with said second facsimile machine designated by said designating data, so as to connect said facsimile machine to the second facsimile machine via a public communication line;

said first facsimile-data receiver receiving computer data comprising first facsimile data from the external personal computer via said private communication line;

said first facsimile-data transmitter transmitting, in response to a command received from the external personal computer, said first facsimile data to one of a plurality of facsimile-data receivers other than said first facsimile-data receiver via a corresponding one of respective communication lines.

\* \* \* \* \*